(12) United States Patent
Mendelsohn et al.

(10) Patent No.: US 12,250,060 B2
(45) Date of Patent: Mar. 11, 2025

(54) COVERAGE AREA ADJUSTMENT TO ADAPT SATELLITE COMMUNICATIONS

(71) Applicant: Viasat, Inc., Carlsbad, CA (US)

(72) Inventors: Aaron Mendelsohn, Dana Point, CA (US); Donald Runyon, Duluth, GA (US)

(73) Assignee: Viasat, Inc., Carlsbad, CA (US)

( * ) Notice: Subject to any disclaimer, the term of this patent is extended or adjusted under 35 U.S.C. 154(b) by 11 days.

(21) Appl. No.: 18/307,707

(22) Filed: Apr. 26, 2023

(65) Prior Publication Data
US 2023/0283360 A1 Sep. 7, 2023

Related U.S. Application Data

(63) Continuation of application No. 17/192,788, filed on Mar. 4, 2021, now Pat. No. 11,770,179, which is a
(Continued)

(51) Int. Cl.
*H04B 7/185* (2006.01)
*H01Q 1/28* (2006.01)
(Continued)

(52) U.S. Cl.
CPC ......... *H04B 7/18515* (2013.01); *H01Q 1/288* (2013.01); *H01Q 3/02* (2013.01);
(Continued)

(58) Field of Classification Search
CPC ............ H01Q 1/28; H01Q 1/288; H01Q 3/01; H01Q 3/02; H01Q 3/18; H01Q 15/14;
(Continued)

(56) References Cited

U.S. PATENT DOCUMENTS

| 3,711,855 A | 1/1973 | Schmidt et al. |
| 4,232,266 A | 11/1980 | Acampora |

(Continued)

FOREIGN PATENT DOCUMENTS

| CN | 103022728 A | 4/2013 |
| CN | 204045740 | 12/2014 |

(Continued)

OTHER PUBLICATIONS

Davis, et al., Big Deployables In Small Satellites, 28th Annual AIAA/USU Conference on Small Satellites, 2014, 8 pgs.
(Continued)

*Primary Examiner* — Myron Wyche
(74) *Attorney, Agent, or Firm* — Holland & Hart LLP

(57) ABSTRACT

The described features generally relate to adjusting a native antenna pattern of a satellite to adapt communications via the satellite. For example, a communications satellite may include an antenna having a feed array assembly, a reflector, and a linear actuator coupled between the feed array assembly and the reflector. The feed array assembly may have a plurality of feeds for communicating signals associated with a communications service, and the reflector may be configured to reflect the signals transmitted between the feed array assembly and one or more target devices. The linear actuator may have an adjustable length, or otherwise provide an adjustable position between the feed array assembly and the reflector. By adjusting the position of the feed array assembly relative to the reflector, the communications satellite may provide a communications service according to a plurality of native antenna patterns.

17 Claims, 51 Drawing Sheets

Related U.S. Application Data continuation of application No. 16/500,394, filed as application No. PCT/US2017/026839 on Apr. 10, 2017, now Pat. No. 10,985,833.

(51) Int. Cl.
  *H01Q 3/02* (2006.01)
  *H01Q 3/18* (2006.01)
  *H01Q 19/17* (2006.01)
  *H01Q 25/00* (2006.01)
  *H04B 7/204* (2006.01)

(52) U.S. Cl.
  CPC ............... *H01Q 3/18* (2013.01); *H01Q 19/17* (2013.01); *H01Q 25/007* (2013.01); *H04B 7/2041* (2013.01)

(58) Field of Classification Search
  CPC .......... H01Q 19/17; H04B 7/15; H04B 7/185; H04B 7/2041
  See application file for complete search history.

(56) References Cited

U.S. PATENT DOCUMENTS

| | | | |
|---|---|---|---|
| 4,381,562 A | 4/1983 | Acampora | |
| 4,931,802 A | 6/1990 | Assal et al. | |
| 5,151,706 A * | 9/1992 | Roederer | H01Q 3/40 342/372 |
| 5,315,795 A | 5/1994 | Chae et al. | |
| 5,485,168 A * | 1/1996 | Parekh | H01Q 5/45 343/781 P |
| 5,936,592 A * | 8/1999 | Ramanujam | H01Q 25/007 343/778 |
| 5,996,940 A | 12/1999 | McVey et al. | |
| 6,031,502 A | 2/2000 | Ramanujam et al. | |
| 6,049,307 A | 4/2000 | Lim | |
| 6,128,487 A | 10/2000 | Wiedeman | |
| 6,149,307 A | 11/2000 | Kamimura et al. | |
| 6,157,812 A | 12/2000 | Sarraf | |
| 6,377,561 B1 | 4/2002 | Black et al. | |
| 6,414,646 B2 | 7/2002 | Luh | |
| 6,522,643 B1 | 2/2003 | Jacomb-Hood et al. | |
| 6,577,282 B1 * | 6/2003 | Rao | H01Q 3/18 343/781 CA |
| 6,625,129 B1 | 9/2003 | Olds et al. | |
| 6,778,809 B2 | 8/2004 | Morimoto | |
| 6,801,565 B1 | 10/2004 | Bottomley et al. | |
| 6,842,437 B1 | 1/2005 | Heath | |
| 6,943,745 B2 | 9/2005 | Rao et al. | |
| 6,957,078 B1 | 10/2005 | Yousefi et al. | |
| 6,992,992 B1 | 1/2006 | Cooper et al. | |
| 7,013,165 B2 | 3/2006 | Yoon et al. | |
| 7,299,589 B2 | 11/2007 | Campbell et al. | |
| 7,362,822 B2 | 4/2008 | Li | |
| 7,466,282 B2 | 12/2008 | Ho et al. | |
| 7,982,687 B1 | 7/2011 | Santoru | |
| 8,111,646 B1 | 2/2012 | Chang | |
| 8,144,643 B2 | 3/2012 | Miller et al. | |
| 8,149,791 B2 | 4/2012 | Li et al. | |
| 8,218,476 B2 | 7/2012 | Miller | |
| 8,448,902 B2 | 5/2013 | Gelon | |
| 8,542,629 B2 | 9/2013 | Miller | |
| 8,789,796 B2 | 7/2014 | Boccio et al. | |
| 8,995,943 B2 | 3/2015 | Corman et al. | |
| 9,004,409 B1 | 4/2015 | Baghdasarian | |
| 9,184,829 B2 | 11/2015 | Miller et al. | |
| 10,211,911 B2 | 2/2019 | Buer et al. | |
| 10,313,002 B2 | 6/2019 | Miller et al. | |
| 10,498,433 B2 | 12/2019 | Miller et al. | |
| 10,985,833 B2 | 4/2021 | Mendelsohn | |
| 2002/0159403 A1 | 10/2002 | Reddy | |
| 2002/0178263 A1 | 11/2002 | Hreha et al. | |
| 2003/0189916 A1 | 10/2003 | Cornett, Jr. et al. | |
| 2004/0087294 A1 | 5/2004 | Wang | |
| 2004/0097192 A1 | 5/2004 | Schiff | |
| 2004/0189538 A1 | 9/2004 | Rao et al. | |
| 2004/0189548 A1 | 9/2004 | Takeuchi et al. | |
| 2004/0209584 A1 | 10/2004 | Bargroff et al. | |
| 2005/0260948 A1 | 11/2005 | Regulinkski et al. | |
| 2006/0241919 A1 | 10/2006 | Kobayashi et al. | |
| 2007/0135051 A1 | 6/2007 | Zheng et al. | |
| 2007/0182654 A1 | 8/2007 | Rao et al. | |
| 2007/0192805 A1 | 8/2007 | Dutta et al. | |
| 2007/0195974 A1 | 8/2007 | Li et al. | |
| 2007/0281612 A1 | 12/2007 | Benjamin | |
| 2008/0111031 A1 | 5/2008 | Mobrem | |
| 2008/0274690 A1 | 11/2008 | Laufer | |
| 2009/0023384 A1 | 1/2009 | Miller | |
| 2009/0046807 A1 | 2/2009 | Xia | |
| 2009/0213782 A1 | 8/2009 | Yee et al. | |
| 2009/0298416 A1 | 12/2009 | Dankberg et al. | |
| 2010/0157958 A1 | 6/2010 | Wong et al. | |
| 2010/0232350 A1 | 9/2010 | Leong et al. | |
| 2010/0265925 A1 | 10/2010 | Liu et al. | |
| 2011/0032173 A1 * | 2/2011 | Chang | H01Q 3/04 343/880 |
| 2011/0189947 A1 | 8/2011 | Miller | |
| 2011/0189948 A1 | 8/2011 | Miller | |
| 2011/0268017 A1 | 8/2011 | Miller | |
| 2011/0268158 A1 | 8/2011 | Miller | |
| 2012/0092225 A1 * | 4/2012 | Schreider | H01Q 15/147 343/915 |
| 2012/0274507 A1 | 11/2012 | Cherkaoui et al. | |
| 2013/0331026 A1 | 12/2013 | O'Neill et al. | |
| 2014/0348140 A1 | 11/2014 | Atkinson | |
| 2016/0172752 A1 | 6/2016 | Eutelsat | |
| 2016/0204854 A1 | 7/2016 | Miller et al. | |
| 2017/0055162 A1 | 2/2017 | Takano | |
| 2019/0280765 A1 | 9/2019 | Miller et al. | |

FOREIGN PATENT DOCUMENTS

| | | |
|---|---|---|
| EP | 1130800 A2 | 9/2001 |
| EP | 1128670 A2 | 1/2002 |
| EP | 1168667 A2 | 1/2002 |
| EP | 2567473 B1 | 4/2018 |
| EP | 3346619 A1 | 7/2018 |
| EP | 3610536 B1 | 11/2021 |
| JP | 10247812 | 9/1998 |
| JP | 2002299941 | 10/2002 |
| JP | 2004299604 | 10/2004 |
| JP | 2011124855 | 6/2011 |
| RU | 2491685 C2 | 8/2013 |
| RU | 2608763 C2 | 1/2017 |
| WO | WO1998/32245 | 7/1998 |
| WO | WO2001/011802 A1 | 2/2001 |
| WO | WO2006/107988 A1 | 10/2006 |
| WO | WO2008/076877 A2 | 12/2007 |
| WO | WO2008/116075 A1 | 9/2008 |
| WO | WO2008/1070101 A1 | 9/2008 |
| WO | WO2011/139991 A1 | 11/2011 |
| WO | WO2018/190794 A1 | 10/2018 |

OTHER PUBLICATIONS

Biochemtronics, Repurposed Satellite Dish Antenna Captures Wi-Fi and Cell Phone Signals, www.instructables.com/id/Cell-Phone-WiFi-Signal-Booster-Antenna/, 20 pgs.

Arnold, et al., Mobile Communications In A Geosynchronous Regenerative Satellite MESH (RSM) System, Feb. 12, 2007, 6 pgs.

Bergamo, et al., "Network Using NASA's Advanced Communications Technology Satellites (ACTS) Features, Capabilities and Operations", dated Mar. 1999, 11 pgs.

Couchman, et al., "Defocused Array Fed Reflector Antennas for Ka, Broad Band Satellites" dated Jul. 29, 2013, 8 pgs.

Di Cecca, et al., "The On-Board Processor For Italsat SS-TDMA MultiBeam Package" Copyright 1989 IEEE, 5 pgs.

EMS Technologies, "Beam Forming Networks" Aug. 2004, 36 pgs.

European Search Report for Appl. No. 11778122.9, dated Sep. 8, 2016 11 pgs.

(56) References Cited

OTHER PUBLICATIONS

Notice of Opposition to a European Patent, Appl. No. 11778122.9, dated Apr. 4, 2018, 7 pgs.
Summons to attend oral proceedings for Appl. No. 11778122.9, dated Sep. 23, 2019, 20 pgs.
European Search Report for Appl. No. 18158990.4 dated May 16, 2018, 8 pgs.
Communication pursuant to Rule 114(2) EPC for Appl. No. 18158990.4, dated Jul. 8, 2019, 7 pgs.
Communication pursuant to Article 94(3) for Application No. 18158990.4, dated Sep. 3, 2019, 6 pgs.
Observations by Third Party for Appl. No. 18158990.4, dated Sep. 9, 2019, 6 pgs.
Franchi, et al., entitled, Technology Trends and Market Drivers For Broadband Mobile Via Satellite: INMARSAT BGAN, dated Sep. 2009, 9 pgs.
Gopal, et al, entitled, Regenerative Satellite MESH System For Real Time Multi-Party Multimedia Traffic, dated Sep. 2009, 9 pgs.
Gopal, et al, entitled, "Technology Readiness of Future Generation Networks Leveraging Regenerative Satellite MESH Architecture—A Space Way Perspective", dated Oct. 23, 2006, 7 pgs.
Gopal, entitled Innovations In Satellite Networking Technology and Products, dated Dec. 7, 2006, 10 pgs.
Hadinger, et al., entitled, "Next Generation High Capacity Ka-Band Satellite Systems" dated Sep. 24, 2007, 8 pgs.
Intellect, entitled, "Satellite Provision of Next Generation Broadband Services in UK", dated Oct. 29, 2007, 27 pgs.
Kitao, et al., entitled "Proto-flight model Development of the Multi-beam Active Phased Array Antenna for WINDS" dated Dec. 2006, 4 pgs.
Mallison, et al., entitled "Enabling Technologies for the Eurostar Geomobile Satellite", Jan. 2001, 10 pgs.
Morgan, entitled "Time Domain Multiple Access (TDMA)", Dated 1989, 29 pgs.
Naderi, et al., entitled "Advanced Satellite Concepts for Future Generation VSAT Networks", published in IEEE Communications Magazine, vol. 26, Issue: 9, Sep. 1988, 10 pgs.
Nelson, entitled "Top Satellite Technology at Forefront" http://www.boeing.com/news/frontiers/archive/2002/july/i_sc.html, 2002.
ISR and Written Opinion for PCT/US2011/034845, dated May 2, 2011, 5 pgs.
IPRP for PCT/US2011/034845 dated Aug. 26, 2011, 4 pgs.
IPRP for PCT/US2017/026839 dated, Oct. 24, 2019, 16 pgs.
Reudink, et al., entitled, "A Scanning Spot-Beam Satellite System" dated Jul. 20, 1977, 12 pgs.
Rooney, entitled, Evolving Satellite Markets and their Enabling Technologies, dated Oct. 2002, 18 pgs.
Roper, et al., entitled, "WGS Phased Arrays Support Next Generation DOD SATCOM Capability" © 2003 IEEE.
Rustako, et al., entitled, "An Experimental Scanning Spot Beam Satellite System Implementing 600 MBIT/SEC TDA", dated Sep. 19, 1983, 7 pgs.
Science Applications International Corporation, NASA, entitled, "Satellite Communications Technology Database" dated Mar. 2001, 71 pgs.
Near Earth LLC, entitled "Spaceway 3 Takes Flight" dated Aug. 2007, 4 pgs.
Sunderland, et al., entitled, "Megagate ASICs for the Thuraya Satellite Digital Signal Processor" Copyright 2002, IEEE, 8 pgs.
Torlak, et al., entitled, "Fast Estimation of Weight Vectors to Optimize Multi-Transmitter Broadcast Channel Capacity" Copyright 1998 IEEE, 4 pgs.
Notice of Allowance for U.S. Appl. No. 16/216,009, filed Dec. 11, 2018, 9 pgs.
Watt, entitled, "Multibeam SS-TDMA design considerations related to the Olympus Specialized Services Payload" dated Jul. 1986, IEEE Proceedings, vol. 133, Pt. F. No. 4, 7 pgs.
Whitefield, et al., entitled, "Spaceway Now and in the Future: O-Board IP Packet Switching Satellite Communication Network".
Winds, entitled, "Wideband InterNetworking engineering test and Demonstration Satellite", http://www.eoportal.org/directory/pres_WINDSWidebandInterNetworkingengineeringtest . . . .
Yajima, et al., entitled, "3-6 Ka-band Active Phased Array Antenna", Journal of the National Institute of Information and Communications Technology, vol. 54. No. 4, 2007, 7 pgs.
Kramer, "WINDS (Wideband InterNetworking engineering test and Demonstration Satellite)", retrieved Jul. 27, 2012, 14 pgs.
Wiley, Handbook on Satellite Communications, Third Edition, International Telecommunication Union, 2002, 1108 pgs.
Office Action and Search Report for Russian Application Serial No. 201913341/28 mailed Jul. 21, 2020.
International Search Report and Written Opinion mailed in International (PCT) Application No. PCT/US2011/034845 on Aug. 26, 2011, 5 pgs.
"International Preliminary Report on Patentability mailed in International (PXT) Application No. PCT/US2011/034845 on Nov. 15, 2012, 4 pgs."
Extended European Search Report mailed in European Patent Application No. 11778122.9 on Sep. 8, 2016, 11 pgs.
"Notice of Opposition mailed in European Patent Application No. 11778122.9 on Jan. 11, 2019, 7 pgs."
Extended European Search Report mailed in European Patent Application No. 18158990.4 on May 16, 2018, 8 pgs.
International Search Report and Written Opinion mailed in International (PCT) Application No. PCT/US2017/026839 on Mar. 23, 2018, 21 pgs.
"Satellite Provision of Next Generation Broadband Services in UK, Prepared for the Broadband Stakeholder Group, pp. 1-27, Oct. 29, 2007. Information Technology Telecommunications and Electronics Association, London, Retrieved Aug. 9, 2010 at, http://www.intelectuk.org/component/option.com-docman/task,doc-download/gid,2370/Itemid, 102."
"Morgan, L.W. et al., "Communications Satellite Handbook", Chapters 4.3 and 4.4, pp. 458-515, John Wiley & Sons, Jan. 1989."
Notice of Allowance mailed in U.S. Appl. No. 14/887,147 on Sep. 11, 2018, 5 pgs.
Cooley, "Phased Array-Fed Reflector (PAFR) Antenna Architectures for Space-Based Sensors" Published IEEE Aerospace Conference dated Jun. 8, 2015, 11 pages.
Notice of Opposition by Airbus Defense and Space Limited and Airbus Defense and Space SAS, against European Patent No. EP 3,610,536 B1, dated Aug. 10, 2022, 61 pages.
Decision of Opposition in EP Application No. 11778122.9 dated Mar. 3, 2021, 31 pgs.
Written Submission in Appeal Procedure against EP 2567473 dated Jun. 10, 2022, 5 pgs.
Grounds of Appeal against EP 2567473 dated Jul. 15, 2021, 22 pgs.

\* cited by examiner

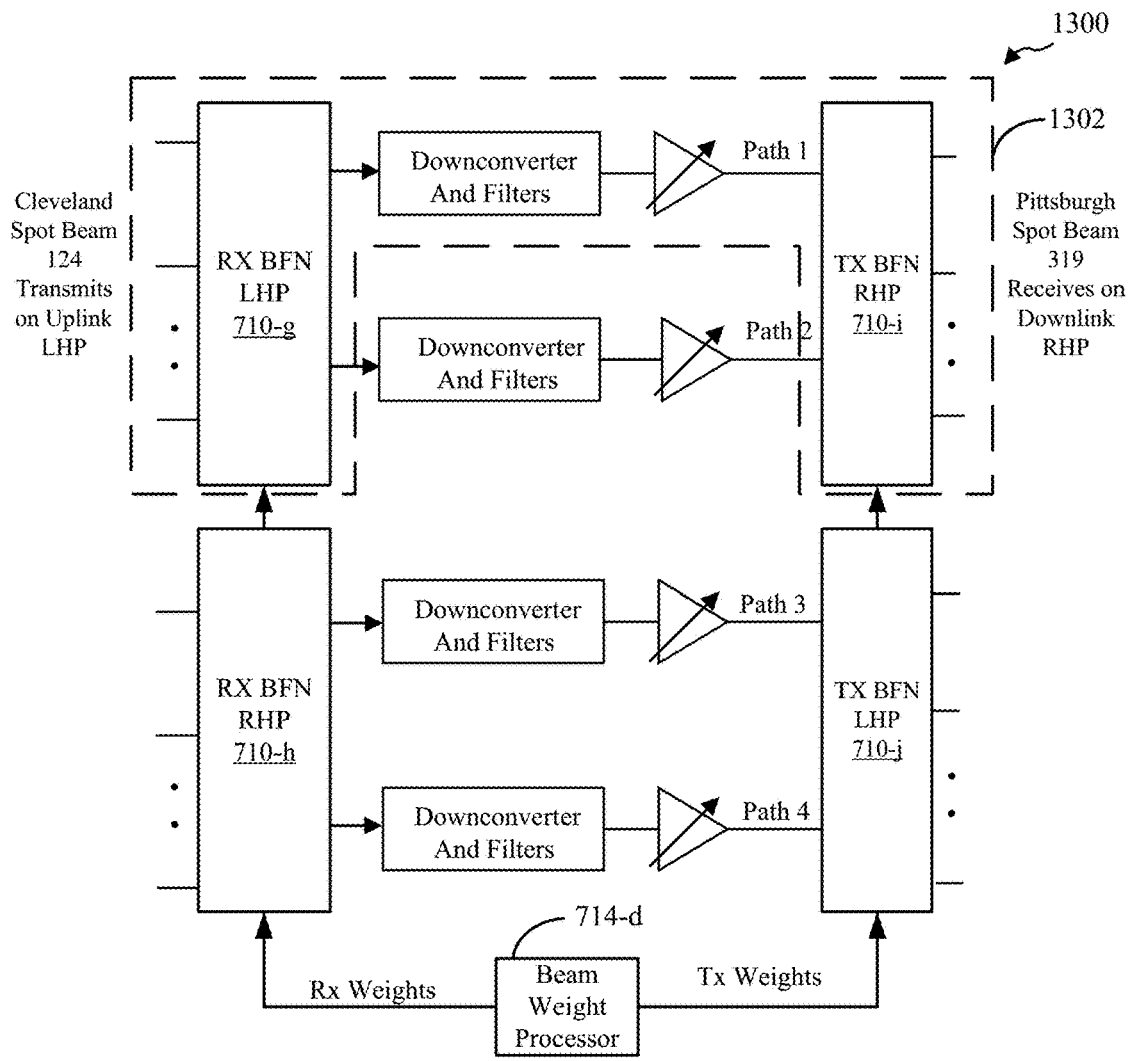
FIG. 13A
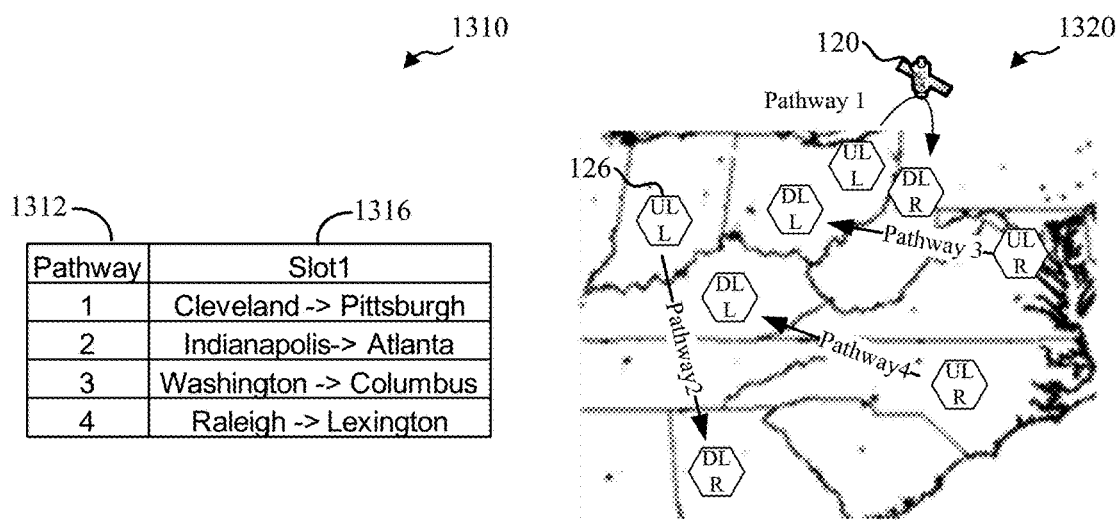
FIG. 13B
FIG. 13C

1510

| Pathway | Slot1 | Slot2 | SLOT USAGE |
|---|---|---|---|
| 1 | GW1->B1 | B1->GW1 | FR |
| 2 | GW3->B3 | B3->GW3 | FR |
| 3 | GW2->B7 | B7->GW2 | FR |
| 4 | GW4->B5 | B5->GW4 | FR |
| 5 | GW1->B2 | B2->GW1 | FR |
| 6 | GW3->B4 | B4->GW3 | FR |
| 7 | GW2->B8 | B8->GW2 | FR |
| 8 | GW4->B6 | B6->GW4 | FR |
| PW USAGE | 8F | 8R | |

1610

| Pathway | Slot1 | Slot2 | SLOT USAGE |
|---|---|---|---|
| 1 | GW1->B1 | B1->GW1 | FR |
| 2 | B7->GW1 | GW1->B7 | RF |
| 3 | GW2->B3 | B3->GW2 | FR |
| 4 | B5->GW2 | GW2->B5 | RF |
| 5 | GW1->B2 | B2->GW1 | FR |
| 6 | B8->GW1 | GW1->B8 | RF |
| 7 | GW2->B4 | B4->GW2 | FR |
| 8 | B6->GW2 | GW2->B6 | RF |
| PW USAGE | 4F,4R | 4F,4R | |

75%/25% Time Allocation

1 Frame
(Q = multiple of 4) Time Slots

| F | F | F | R |
|---|---|---|---|
| R | F | F | F |
| F | R | F | F |
| F | F | R | F |
| F | F | F | R |
| R | F | F | F |
| F | R | F | F |
| F | F | R | F |

K=8 Pathways

FW BW Used   3KW/4   3KW/4   3KW/4   3KW/4

Ret BW Used   KW/4    KW/4    KW/4    KW/4

→ Time →

| GW USAGE | Pathway | Slot1 | Slot2 | Slot3 | SLOT USAGE |
|---|---|---|---|---|---|
| SHARED | 1 | B1->GW1 | B3->GW2 | B5->GW3 | R |
| GW2 | 2 | | GW2->B3 | | F |
| GW3 | 3 | | GW3->B5 | | F |
| GW1 | 4 | | GW1->B1 | | F |
| SHARED | 5 | B2->GW1 | B4->GW2 | B6->GW3 | R |
| GW2 | 6 | | GW2->B4 | | F |
| GW3 | 7 | | GW3->B6 | | F |
| GW1 | 8 | | GW1->B2 | | F |
| | PW USAGE | 6F,2R | 6F,2R | 6F,2R | |

1870

| GW USAGE | Pathway | Slot1 | Slot2 | Slot3 | SLOT USAGE |
|---|---|---|---|---|---|
| GW1 | 1 | B1->GW1 | B3->GW1 | B5->GW1 | R |
| GW2 | 2 | | GW2->B3 | | F |
| GW3 | 3 | | GW3->B5 | | F |
| GW1 | 4 | | GW1->B1 | | F |
| GW1 | 5 | B2->GW1 | B4->GW1 | B6->GW1 | R |
| GW2 | 6 | | GW2->B4 | | F |
| GW3 | 7 | | GW3->B6 | | F |
| GW1 | 8 | | GW1->B2 | | F |
| | PW USAGE | 6F,2R | 6F,2R | 6F,2R | |

1880

Example with 8 dwell times, Q=32 and $C_b$=4.5 Gbps
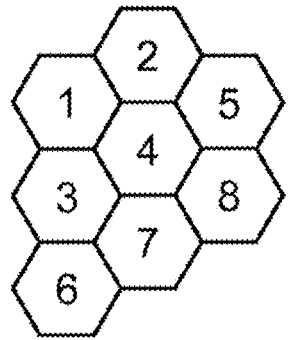
Cell Location from Beam#1 at 8 different Time intervals in the beam hopping Frame
FIG. 21A
| Dwell Time # | qj, # slots Assigned | Area Capacity, Mbps |
|---|---|---|
| 1 | 16 | 2250 |
| 2 | 1 | 141 |
| 3 | 2 | 281 |
| 4 | 3 | 422 |
| 5 | 2 | 281 |
| 6 | 5 | 703 |
| 7 | 1 | 141 |
| 8 | 2 | 281 |
| Total | 32 | 4500 |
FIG. 21B
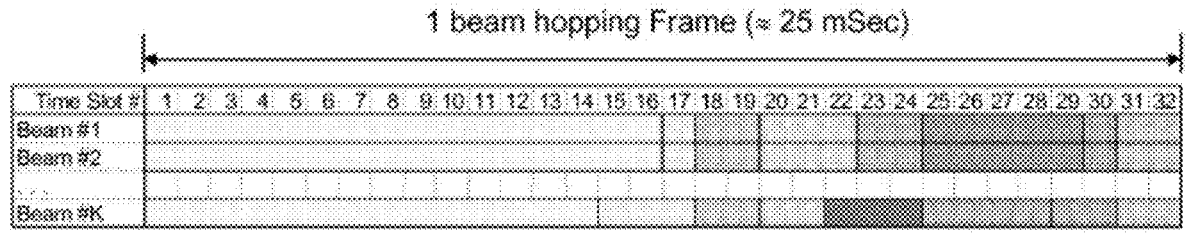
FIG. 21C

| GW# | Location | # Beam Issues | Ci |
|---|---|---|---|
| 1 | Sanderson, TX | 0 | 8 |
| 2 | Ft. Hancock, TX | 2 | 6 |
| 3 | Amarillo, TX | 0 | 8 |
| 4 | Milford, UT | 0 | 8 |
| 5 | Ellis, KN | 0 | 8 |
| 6 | Lovelock, NV | 1 | 7 |
| 7 | Green River, WY | 0 | 8 |
| 8 | Boise, ID | 2 | 6 |
| 9 | Rapid City, SD | 1 | 7 |
| 10 | Bozeman, MT | 2 | 6 |
| 11 | Winnipeg, Canada | 0 | 8 |
| 12 | Duluth, MI | 0 | 8 |
| 13 | Syracuse, NY | 2 | 6 |
| 14 | Little Rock, AK | 0 | 8 |
| 15 | St. Louis, MO | 1 | 7 |
| 16 | Louisville, KY | 1 | 7 |
| 17 | Kansas City, MO | 1 | 7 |
| 18 | Las Vegas, NV | 3 | 5 |
| 19 | Montreal | 0 | 8 |
| 20 | Eugene, OR | 0 | 8 |
| 21 | Jacksonville, FL | 0 | 8 |
| 22 | Savannah, GE | 0 | 8 |
| 23 | Des Moines, IO | 0 | 8 |
| | Total | | 168 |

2900

2905
Communications Service Manager

Communications Manager 2910

Command Signal Determiner 2920

Coverage Area Manager 2930

Beamforming Manager 2940

FIG. 29

COVERAGE AREA ADJUSTMENT TO ADAPT SATELLITE COMMUNICATIONS

CROSS REFERENCES

The present Application for Patent is a continuation of U.S. patent application Ser. No. 17/192,788 by Mendelsohn et al., entitled "Coverage Area Adjustment to Adapt Satellite Communications," filed Mar. 4, 2021, which is a continuation of U.S. patent application Ser. No. 16/500,394 by Mendelsohn, et al., entitled "Coverage Area Adjustment to Adapt Satellite Communications," filed Oct. 2, 2019, which is a national stage entry of PCT Application No. PCT/US2017/026839 by Mendelsohn, et al., entitled "Coverage Area Adjustment to Adapt Satellite Communications," filed Apr. 10, 2017, each of which is assigned to the assignee hereof, and each of which is expressly incorporated by reference herein, in its entirety.

BACKGROUND

Communications satellites typically include one or more antenna assemblies for communicating with various terrestrial target devices, which may include ground-based access node terminals or user terminals, any of which may be stationary (e.g., installed at a permanent installation site, moved from one fixed installation site to another, etc.) or mobile (e.g., installed at a vehicle, a boat, a plane, etc.). An antenna assembly of a communications satellite may be configured for transmitting downlink signals (e.g., forward link signals to user terminals, return link signals to access nodes) and/or receiving uplink signals (e.g., forward link signals from access nodes, return link signals from user terminals). The antenna assembly may be associated with a service coverage area within which devices may be provided a communications service via the antenna assembly. The satellite may be a geostationary satellite, in which case the satellite's orbit is synchronized with the rotation of the Earth, keeping the service coverage area essentially stationary with respect to the Earth. In other cases, the satellite is in an orbit about the Earth that causes the service coverage area to move over the surface of the Earth as the satellite traverses its orbital path.

Some satellite communication systems employ "bent-pipe" satellites that relay signals among terminals located in the same antenna footprint (e.g., service coverage area), for example, the continental Unites States. In circumstances where transmit and receive coverage areas are overlapping, separate frequency bands and/or polarizations may be used for the uplink (to the satellite) and the downlink (from the satellite). The "bent-pipe" designation refers to the fact that the relayed signals are effectively retransmitted after the signals are received by the satellite, as if redirected through a bent pipe. The data in the relayed signals is not demodulated or remodulated as in a "regenerative" or processing satellite architecture. Rather, signal manipulation on the satellite in a bent-pipe architecture is generally limited to functions such as frequency translation, filtering, amplification, and the like.

Other satellite communication systems were developed around satellites that employ innovations such as digital channelization and routing of signals, demodulation/routing/re-modulation of the data in the relayed signals, narrow antenna footprint spot beams to allow frequency reuse, and phased array antennas to allow dynamic placement of coverage areas.

For example, satellites for Mobile Satellite Services (MSS) typically employ spot beam coverage areas with a greater degree of frequency reuse. Examples of satellites for MSS include the Inmarsat-4 satellites and the Thuraya satellites. These satellites typically feature a large number of narrow spot beams covering a large composite area and allow for flexible and configurable allocation of bandwidth. However, the total system bandwidth is low (such as a 34 MHz allocation at L-band), and service is generally categorized as "narrow band" (e.g., carrier bandwidths of hundreds of kHz), which allows the flexible and configurable bandwidth allocation to be accomplished using digital beamforming techniques. These satellites use a large reflector with an active feed array. The signals associated with each antenna feed element are digitized, and the beamforming and bandwidth flexibility are provided by a digital signal processor. The digital beamforming is performed on narrowband channels, allowing any narrowband channel on the feeder link to be placed at any frequency for any spot beam shape.

The Wideband InterNetworking Engineering Test and Demonstration Satellite (WINDS) is an experimental Ka-band satellite system. The satellite implements both fixed spot beams using a fixed multi-beam antenna (MBA) and steerable beams using an active phased array antenna (APAA). The MBA serves fixed beams, and the communications link can be switched over time in a pattern consisting of combinations of receiving and transmitting beams. The APAA has been developed as a beam-hopping antenna with a potential service area that covers almost the entire visible region of earth from the satellite. The APAA can provision communications between arbitrary users using two independently steerable beams for each of the transmitting and receiving antennas. Beam steering is achieved by updating pointing directions via control of digital phase shifters in switching interval slots as short as 2 ms in Satellite Switched Time Division Multiple Access (SS-TDMA) mode, where the shortest beam dwell time corresponds to the slot time of the SS-TDMA system. Beam switching at high speed is supported for up to eight locations per beam. Switching patterns for both the MBA and APAA are uploaded from a network management center.

Spaceway is a Ka-band satellite system that services 112 uplink beams and nearly 800 downlink beams over the United States. The Spaceway satellite uses a regenerative on-board satellite processor to route data packets from one of 112 uplink beams to one of nearly 800 possible downlink beams. At any time the downlink consists of up to 24 hopping beams. The downlink scheduler determines which beams should be transmitting bursts for each downlink timeslot depending on each beams downlink traffic queue and power and interference constraints.

The Wideband Global SATCOM (WGS) satellite, formerly known as the Wideband Gapfiller Satellite, is a U.S. government satellite that employs steerable Ka-band spot beams and X-band beamforming. The Ka-band spot beams are mechanically steered. Up to eight X-band beams are formed by the transmit and receive X-band arrays using programmable amplitude and phase adjustments applied to beamforming modules (BFMs) in each antenna feed element. Bandwidth assignment is flexible and configurable using a broadband digital channelizer, which is not involved in beamforming.

More recent satellite architectures have resulted in further increases in system capacity. For example, ViaSat-1 and the Ka-band spot beam satellite architectures disclosed in Dankberg et al. U.S. Pat. App. Pub. No. 2009-0298416, which is incorporated by reference herein in its entirety, can provide over 150 Gbps of physical layer capacity. This spot beam architecture provides over an order of magnitude capacity increase over prior Ka-band satellites. Other satellites, for example KA-SAT and Jupiter, use similar architectures to achieve similarly high capacities. The architecture used in all of these satellites is a "bent pipe" hub-spoke architecture that includes small spot beams targeted at fixed locations. Each spot beam may use a large amount of spectrum, typically 250-1000 MHz. The resulting large capacity is a product of several characteristics of the satellite system, including, for example, (a) the large number of spot beams, typically 60 to 80 or more, (b) the high antenna directivity associated with the spot beams (resulting in, for example, advantageous link budgets), and (c) the relatively large amount of bandwidth used within each spot beam.

The aforementioned high capacity satellite architectures are valuable, but may still be limited in certain respects. For example, scaling the architecture to support higher capacities while maintaining the same spectrum allocation and power budget is typically accomplished using larger reflectors to create spot beams with smaller diameters. The use of smaller diameter spot beams may increase the directivity (or gain) of the satellite antenna, thus enhancing the link signal-to-noise ratio (SNR) and capacity. However, the smaller spot beams necessarily reduce the service coverage area (e.g., the coverage area for which a communications service can be provided). These satellite architectures, therefore, have an inherent tradeoff of capacity versus coverage area.

In addition, these architectures typically place all spot beams, both user beams and gateway (GW) beams, in fixed locations. There is generally no ability to move the spot beams around to accommodate changes in the service coverage area. Moreover, the architectures essentially provide uniformly distributed capacity over the service coverage area. The capacity per spot beam, for example, is strongly related to the allocated bandwidth per spot beam, which is predetermined for every spot beam and allows for little to no flexibility or configurability.

Although these satellite communications architectures are valuable when the desired service coverage area is well-known and the demand for capacity is uniformly distributed over the service coverage area, the inflexibility of the aforementioned architectures can be limiting for certain applications. For example, a communications satellite may be retasked or deployment conditions (e.g., orbital slot, etc.) may change. Additionally, a satellite communications service may see changes in user demands (e.g., fixed vs. mobile users, etc.). Although signal processing techniques such as beamforming may provide some ability to adapt the arrangement of spot beams or service coverage area, additional flexibility in adaptation of service coverage area and spot beam arrangement may be desired. For example, it may be desirable for a satellite communications system architecture to support flexibility in the locations and sizes of spot beam coverage areas, the locations of user terminals and access node terminals, the spatial distribution of the communications service capacity, and the capacity allocation of the communications service. Further, it may be desirable to support such flexibility along with changes in orbital position of a communications satellite or allow moving a communications satellite to another orbital slot during the mission lifetime.

SUMMARY

In view of the foregoing, aspects for providing flexible satellite communications are described.

An example of a hub-spoke, bent-pipe satellite communications system includes: multiple user terminals; multiple access node terminals configured to communicate with the multiple user terminals; a controller configured to specify data for controlling satellite operations in accordance with a frame definition, the frame definition including multiple timeslots for a frame and defining an allocation of capacity between forward traffic, from at least one access node terminal to multiple user terminals, and return traffic, from multiple user terminals to at least one access node terminal; and a communications satellite including: multiple pathways; at least one low noise amplifier (LNA), wherein an output of the at least one LNA is configured to be coupled to a pathway of the multiple pathways and to amplify uplink beam signals in accordance with the allocation of capacity between forward traffic and return traffic defined by the frame definition; and at least one high power amplifier (HPA), wherein an input of the at least one HPA is configured to be coupled to the pathway of the multiple pathways and to amplify downlink beam signals in accordance with the allocation of capacity between forward traffic and return traffic defined by the frame definition, and wherein the frame definition specifies configuration of at least one pathway of the multiple pathways as a forward pathway for at least one timeslot in the frame, and configuration of the at least one pathway as a return pathway for at least one other timeslot in the frame.

Embodiments of such a satellite communications system may include one or more of the following features. The communications satellite further includes one or more beamforming networks configured to couple the output of the at least one LNA to the pathway of the multiple pathways and to couple the input of the at least one HPA to the pathway of the multiple pathways. The communications satellite further includes a phased array of antenna feed elements, and an input of the at least one LNA is configured to be coupled to an output of an antenna feed element of the phased array. The communications satellite further includes a phased array of antenna feed elements, and at least one harmonic filter, wherein an output of the at least one harmonic filter is configured to be coupled to an input of an antenna feed element of the phased array, and an output of the at least one HPA is configured to be coupled to an input of the at least one harmonic filter.

An example of a method for hub-spoke, bent-pipe satellite communications utilizing a communications satellite containing multiple pathways and in communication with multiple user terminals and multiple access node terminals, includes: at a controller, specifying data for controlling communications satellite operations in accordance with a frame definition, the frame definition including multiple timeslots for a frame and defining an allocation of capacity between forward traffic, from at least one access node terminal to multiple user terminals, and return traffic, from multiple user terminals to at least one access node terminal; and at the communications satellite, receiving uplink beam signals and transmitting downlink beam signals in accordance with the allocation of capacity between forward traffic and return traffic defined by the frame definition, and wherein the frame definition specifies configuration of at least one pathway of the multiple pathways as a forward pathway for at least one timeslot in the frame, and configuration of the at least one pathway as a return pathway for at least one other timeslot in the frame.

An example of a communications satellite for hub-spoke, bent-pipe satellite communications includes: multiple pathways; at least one low noise amplifier (LNA), wherein an output of the at least one LNA is configured to be coupled to a pathway of the multiple pathways and to amplify uplink beam signals in accordance with an allocation of capacity between forward traffic, from at least one access node terminal to multiple user terminals, and return traffic, from multiple user terminals to at least one access node terminal, defined by a frame definition, the frame definition including multiple timeslots for a frame; and at least one high power amplifier (HPA), wherein an input of the at least one HPA is configured to be coupled to the pathway of the multiple pathways and to amplify downlink beam signals in accordance with the allocation of capacity between forward traffic and return traffic defined by the frame definition, and wherein the frame definition specifies configuration of at least one pathway of the multiple pathways as a forward pathway for at least one timeslot in the frame, and configuration of the at least one pathway as a return pathway for at least one other timeslot in the frame.

Embodiments of such a communications satellite may include one or more of the following features. The communications satellite further includes one or more beamforming networks configured to couple the output of the at least one LNA to the pathway of the multiple pathways and to couple the input of the at least one HPA to the pathway of the multiple pathways. The communications satellite further includes a phased array of antenna feed elements, wherein an input of the at least one LNA is configured to be coupled to an output of an antenna feed element of the phased array. The communications satellite further includes a phased array of antenna feed elements, and at least one harmonic filter, wherein an output of the at least one harmonic filter is configured to be coupled to an input of an antenna feed element of the phased array, and an output of the at least one HPA is configured to be coupled to an input of the at least one harmonic filter.

An example of a method for hub-spoke, bent-pipe satellite communications utilizing a communications satellite containing multiple pathways and in communication with multiple user terminals and multiple access node terminals, where the method is performed at the communications satellite, includes: receiving uplink beam signals; and transmitting downlink beam signals, wherein receiving the uplink beam signals and transmitting the downlink beam signals are in accordance with an allocation of capacity between forward traffic, from at least one access node terminal to multiple user terminals, and return traffic, from multiple user terminals to at least one access node terminal, defined by a frame definition, the frame definition including multiple timeslots for a frame, and wherein the frame definition specifies configuration of at least one pathway of the multiple pathways as a forward pathway for at least one timeslot in the frame, and configuration of the at least one pathway as a return pathway for at least one other timeslot in the frame.

In some examples, a communications satellite may be configured to provide a communications service via one or more antenna assemblies according to different native antenna patterns, where each native antenna pattern may refer to a composite of the native feed element patterns for each of the plurality antenna feed elements of a respective antenna assembly in a given operating condition. Such antenna assemblies may include a feed array assembly (e.g., a phased array of antenna feed elements), a reflector, and an actuator coupled between the feed array assembly and the reflector. The reflector may have a focal point or focal region where radio frequency (RF) signals are concentrated when received from a distant source. The feed array assembly may have a plurality of antenna feed elements for communicating signals associated with a communications service, and the reflector may be configured to reflect the signals transmitted between the feed array assembly and one or more target devices (e.g., user terminals and/or access node terminals). The actuator may be a linear actuator having an adjustable length, or may otherwise provide an adjustment in a relative distance between the feed array assembly and the reflector.

A feed array assembly may be positioned (e.g., using the linear actuator) in a region between the focal region and the reflector surface to operate as a defocused system where RF signals from a distant source illuminate a plurality of antenna feed elements. By adjusting the position of the reflector relative to the feed array assembly from a first defocused operating condition to a second defocused operating condition, the satellite may therefore provide a communications service according to different native antenna patterns for a respective antenna assembly. The adaptation of the native antenna patterns by in part changing the defocused operating condition may improve the versatility of the communications satellite by supporting additional adjustability in providing a desired coverage area, user beam characteristics, operating orbital position, or other coverage aspects.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 13A through 13C illustrate an example of a communications satellite having K=4 pathways, in accordance with aspects of the present disclosure;

FIG. 17A shows an illustrative interleaved timeslot allocation, in accordance with aspects of the present disclosure;

FIG. 21A shows an illustrative beam hop pattern of a single beam for the timeslot dwell times of a beam hopping frame, in accordance with aspects of the present disclosure;

FIG. 21B shows an illustrative timeslot dwell time table in accordance with aspects of the present disclosure;

FIG. 21C shows an illustrative beam hopping frame in accordance with aspects of the present disclosure;

FIG. 29 shows a block diagram of a communications service manager that supports providing a communications service according to a plurality of native antenna patterns, in accordance with aspects of the present disclosure;

DETAILED DESCRIPTION

Figure 1A:
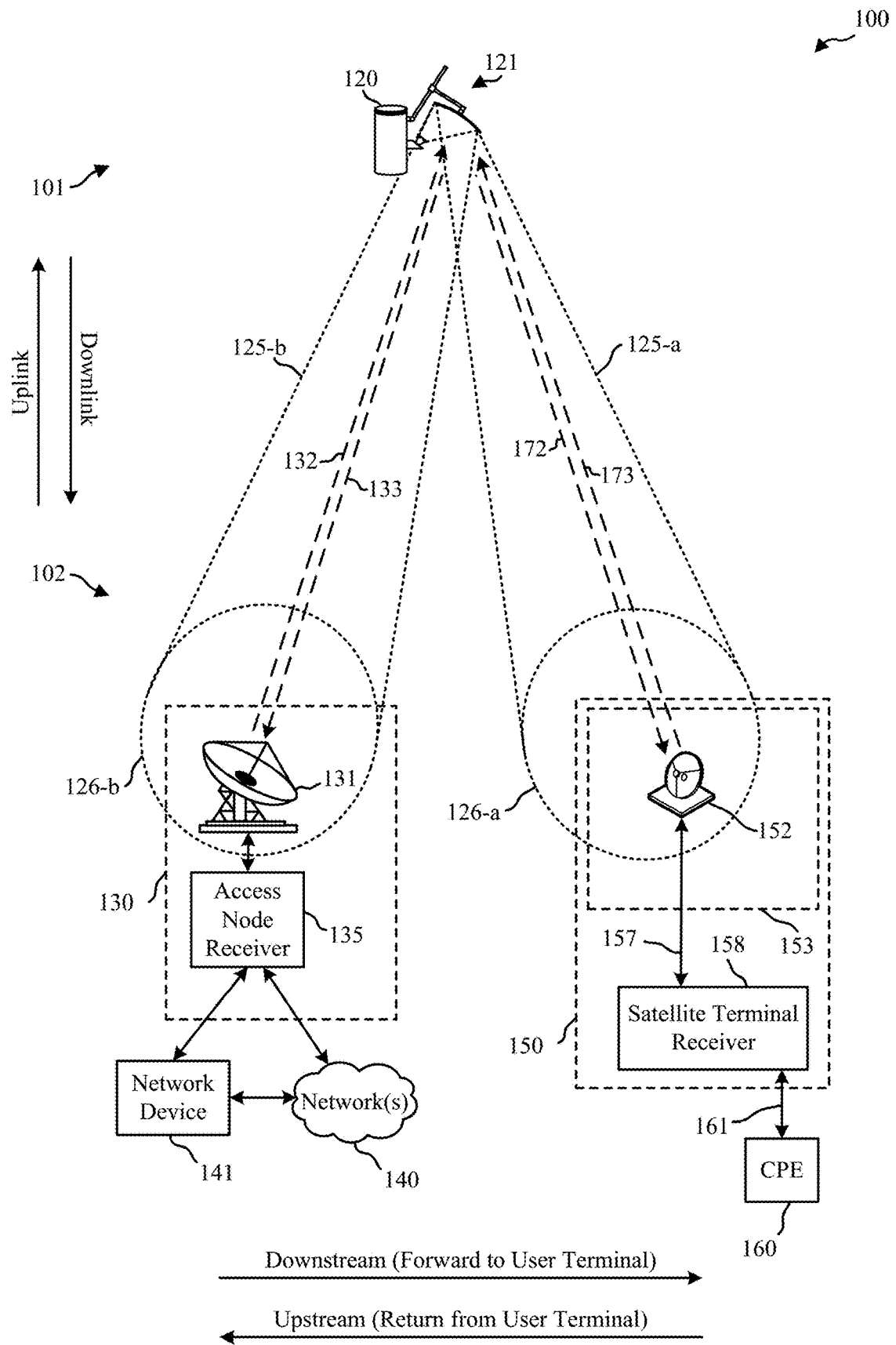
FIG. 1A shows a diagram of a satellite communication system that supports flexible beamforming of satellite communications, in accordance with aspects of the present disclosure.

A communications satellite may be configured to provide a communications service between terrestrial target devices (e.g., terminals), which may be stationary (e.g., installed at a permanent installation site, moved from one fixed installation site to another, etc.) or mobile (e.g., installed at a vehicle, a boat, a plane, etc.). The communications service may include, for example, bi-directional network access service between access node terminals and user terminals. To support the communications service, one or more antenna assemblies of the communications satellite may be configured for transmitting downlink communications (e.g., to user terminals or access node terminals), receiving uplink communications (e.g., from user terminals or access node terminals), or both transmitting downlink communications and receiving uplink communications (e.g., operating as a transceiver).

Antenna assemblies of a communications satellite may include a feed array assembly, such as phased arrays of antenna feed elements, which may be used to target beamformed spot beams on desired spot beam coverage areas (e.g., cells) across a given system coverage geography (e.g., high population areas in North America). Beamformed spot beams may be formed from transmissions and/or receptions via a plurality of the antenna feed elements, and use phase and amplitude characteristics of the transmissions and/or receptions to provide the directional transmission and reception associated with each of the beamformed spot beams.

According to examples of the present disclosure, beamformed spot beams may hop from location to location according to weight vectors of a beamforming weight set and beam hop timeslot definitions included in a beam hopping frame definition. The beam hopping timeslot definitions may include associated dwell times and pathway gains for all spot beams during one timeslot. The beam hopping timeslot definitions included within a beam hopping frame definition may be automatically repeated until a new beam hopping frame definition is received or an interrupt is signaled, allowing for dynamic changes to the downlink service coverage area, uplink service coverage area, and spot beam coverage area locations.

A feed array assembly may have multiple feed elements for communicating signals (e.g., signals associated with a communications service, diagnostic and/or configuration signals for the communications satellite, etc.). Each feed element of the feed array assembly may be associated with a respective native feed element pattern (e.g., a native component beam), which may provide a projected native feed element pattern coverage area (e.g., as projected on a terrestrial surface, plane, and/or volume after reflection from the reflector). The collection of native feed element pattern coverage areas for a feed array assembly of an antenna assembly may be referred to as a native antenna pattern.

Different characteristics of native antenna patterns may be desirable for various operating conditions. For example, with broader native feed element pattern coverage areas, a greater quantity of antenna feed elements of a feed array assembly may be able to support a particular spot beam coverage area. Moreover, broader native feed element patterns may also allow each antenna feed element of a feed array assembly to support a greater quantity of beamformed spot beams. However, broader native feed element patterns may have lower power density of radiation, and therefore it may be desirable to use narrower native feed element patterns in some cases. In some examples, a desired native antenna pattern may be based at least in part on the orbital position of a communications satellite.

According to aspects of the present disclosure, an antenna assembly of a communications satellite may support operation at one of multiple native antenna patterns. For example, the communications satellite may provide a communications service according to a first native antenna pattern of an antenna assembly, and an actuator associated with the antenna assembly may subsequently be adjusted to provide a second native antenna pattern of the same antenna assembly. Following the adjustment to the actuator, the communications satellite may therefore provide the communications service according to a second native antenna pattern, different from the first native antenna pattern. In various examples, the second native antenna pattern may be associated with a different native antenna pattern coverage area size, a different native feed element pattern coverage area size (e.g., native feed element pattern beamwidth) and/or position, a different degree of overlap of native feed element pattern coverage areas, a different spot beam size (e.g., beamwidth), a different spot beam coverage area size and/or position, a different degree of overlap of spot beams, different beamforming weight sets, or any combination thereof, than those of the first native antenna pattern.

In some examples, an antenna assembly of a communications satellite may include a feed array assembly, a reflector, and an actuator coupled between the feed array assembly and the reflector. The reflector may be shaped to have focal region (e.g., a focal point), and the reflector may be configured to reflect the signals transmitted between the feed array assembly and one or more target devices (e.g., access node terminals and/or user terminals). The actuator may, for example, include a linear actuator that provides a change in length, thereby providing a change in relative position between the feed array assembly and the reflector (e.g., a different position with reference to the focal region of the reflector). In some examples, a communications satellite may include both a linear actuator and a second actuator to provide an additional degree of freedom between the feed array assembly and the reflector. In such examples, the second actuator may be commanded to cause a change in relative position between the feed array assembly and the reflector about an axis different from an axis of the linear actuator, with such a change combining with the adjustment of the linear actuator to provide the change in native antenna pattern.

The feed array assembly may be operatively located between the reflector surface and the reflector focal region (e.g., in a defocused position). In some examples, the actuator may provide an adjustment to the relative distance between the reflector and the feed array assembly of a communications satellite (e.g., using a linear actuator), which may, in turn, support operation at one of multiple native antenna patterns. In some examples, following a change in relative position between the feed array assembly and the reflector, a different beamforming weight set may be applied as part of the second native antenna pattern (e.g., to adapt a size and/or position of spot beam coverage areas, to adapt a degree of overlap amongst a plurality of spot beam coverage areas, to adapt a set of antenna feed elements of the feed array assembly used for one or more satellite spot beams, etc.).

As used herein, the term "focal region" refers to the one, two, or three dimensional regions in front of a reflector (e.g., a spherical reflector or a parabolic reflector) in which the reflector will reflect electromagnetic energy received from a particular direction. For an ideal parabolic reflector, the focal region is a single point in the high frequency limit scenario. This is often referred to as the "geometric optics" focal point for the ideal parabolic reflector. In real world implementations, the surfaces of even the most advanced reflectors include errors, distortions, and deviations from the profile of the deal surface. Uncorrelated errors, distortions, or deviations in the surface of a reflector of any significant size may cause a distribution of focal points in a two or three dimensional focal region. Similarly, in the case of a spherical reflector, in which the ideal surface results in a line of focal points instead of single focal point, errors, distortions, or deviations in the surface of real world spherical reflectors from the ideal spherical surface result in a three dimensional spread of the line focal region. In some embodiments, the focal region associated with the reflector is determined based on rays that are on-boresight, or parallel to the optical axis, of the reflector. In other embodiments, the focal region may be defined relative to a reference direction that is off-boresight of the reflector. A system of two or more reflectors may also be fed by a phased array with the system having a focal region.

Operationally, positioning of a feed array assembly between the surface of a shaped reflector and a focal region of the shaped reflector (e.g., the feed array assembly having a reference surface of antenna feed element aperture openings located between the shaped reflector and the focal region along a reference axis of the reflector, etc.) corresponds to a defocused position. Such an arrangement may result in a broader native feed element pattern (e.g., broader native feed element beamwidth) than when the feed array assembly is positioned at the focal region of the shaped reflector, which may improve versatility for forming beamformed spot beams using multiple native feed element patterns.

Various other configurations are possible for providing a change in native antenna pattern for providing a communications service. For example, an antenna assembly may include more than one reflector, and one or more actuators may be located between the feed array assembly and one of the reflectors, and/or between a first reflector and a second reflector. In some examples, a reflector may have its own actuator that may change the reflection characteristics of the reflector (e.g., change the location of a focal region, change the focal region from a one-dimensional focal region to a two-dimensional region, change from a single focal point to multiple focal points, change the shape of a focal region, etc.). Additionally or alternatively, a feed array assembly may include an actuator, which may provide a change in position and/or orientation for one or more feed elements of the feed array assembly (e.g., changing a feed array assembly from having feed element apertures on a planar surface to having feed element apertures on an arced or spherical surface, moving a subset of feed element apertures with respect to another subset of feed element apertures, expanding or contracting a pattern of feed elements, etc.). In various examples, an antenna assembly may include any combination of the described actuator assemblies to provide various changes in native antenna pattern for adapting a communications service.

An actuator of a communications satellite may be commanded in various ways to provide an adjustment to the native antenna pattern of an antenna assembly. For example, a central controller or central operator (e.g., a communications service manager) may provide an indication of the adjustment to the communications satellite by way of wireless signaling received at the communications satellite. In some examples, the change may be commanded by a controller of the communications satellite itself. Commanding the adjustment to the actuator may include providing an indication of a new position of the actuator, a difference in relative distance between the reflector and the feed array assembly, a desired position of the reflector, a desired position of the feed array assembly, a length of the actuator, a parameter of a new native antenna pattern, a lookup value associated with a new native antenna pattern, or any other suitable parameter or indication.

In some examples, commanding an adjustment to the native antenna pattern may be triggered by, or be otherwise based on an orbital position or a change in orbital position of the communications satellite (e.g., a deployed orbital position or path being different from a designed position, a drift from a desired position or path over time, etc.). In some examples, this flexibility may permit an antenna assembly to be designed without prior knowledge of a deployed orbital position, without prior knowledge of a desired service coverage area, and/or to be designed to support operation at a plurality of orbital positions or service coverage areas. Accordingly, once deployed in a particular orbital position, such an antenna assembly may be commanded to provide a native antenna pattern that supports a communications service over a desired service coverage area according to the deployed orbital position. Additionally or alternatively the communications satellite may be commanded to move to a different orbital position (e.g., a different orbital slot) along with the command to adjust the native antenna pattern, and provide the communications service from a new orbital position. In some examples, commanding the adjustment to the native antenna pattern may be triggered based at least in part on various other conditions, such as a level of communications traffic associated with the communication service, relative levels of traffic between a plurality of beamformed spot beams, signal quality characteristics (e.g., signal strength, signal to noise ratio (SNR), signal to interference plus noise ratio (SINR), signal quality characteristics of a native feed element pattern, signal quality characteristics of a spot beam, etc.), an outage or other failure of one or more antenna feed elements, an outage (e.g., loss of communications with), addition (e.g., initiation of communications with), or other change in service of one or more access node terminals, thermal expansion and/or other distortion that changes a relative position between a feed array assembly and a reflector, etc.

This description provides examples, and is not intended to limit the scope, applicability or configuration of embodiments of the principles described herein. Rather, the following description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1A shows a diagram of a satellite communications system 100 that supports flexible beamforming of satellite communications, in accordance with aspects of the present disclosure. Satellite communications system 100 may use a number of network architectures consisting of a space segment 101 and ground segment 102. The space segment may include one or more communications satellites 120. The ground segment may include the one or more user terminals 150, one or more access node terminals 130 (e.g., gateway terminals), as well as network devices 141 such as network operations centers (NOCs), and satellite and gateway terminal command centers. The terminals of the satellite communications system 100 (e.g., access node terminals 130) may be connected to each other, and/or to one or more networks 140, via a mesh network, a star network, or the like.

The communications satellite 120 may be any suitable type of communications satellite configured for wireless communication with the one or more access node terminals 130 and the one or more user terminals 150. In some examples, the communications satellite 120 may be deployed in a geostationary orbit, such that its orbital position with respect to terrestrial devices is relatively fixed, or fixed within an operational tolerance or other orbital window (e.g., within an orbital slot). In other examples, the communications satellite 120 may operate in any appropriate orbit (e.g., low Earth orbit (LEO), medium Earth orbit (MEO), etc.). In some examples, the communications satellite 120 may have an uncertain orbital position, which may be associated with the communications satellite 120 being designed prior to determining an orbital slot deployment, being deployed to one of a range of possible orbital positions (e.g., an orbital slot having a range of orbital positions, or being deployed to one of a set of orbital slots), a range of orbital paths, and/or drifting over time after deployment to an unintended orbital position and/or orbital path. In various examples the communications satellite 120 may be retasked (e.g., moved to a different geostationary orbital slot, adjusted to a different LEO or MEO orbital path, etc.), wherein such retasking may be commanded by the communications satellite 120 itself, and/or commanded by signals received at the communications satellite 120 (e.g., from an access node terminal 130, from a network device 141, etc.).

Communications satellite 120 may use an antenna assembly 121, such as a phased array antenna assembly, a phased array fed reflector (PAFR) antenna, or any other mechanism known in the art for transmission and/or reception of signals of a communications service. Communications satellite 120 may receive forward uplink signals 132 from one or more access node terminals 130 and provide corresponding forward downlink signals 172 to one or more user terminals 150. Communications satellite 120 may also receive return uplink signals 173 from one or more user terminals 150 and forward corresponding return downlink signals 133 to one or more access node terminals 130. A variety of physical layer transmission modulation and coding techniques may be used by the communications satellite 120 for the communication of signals between access node terminals 130 and user terminals 150 (e.g., adaptive coding and modulation (ACM), etc.).

In some embodiments, a Multi-Frequency Time-Division Multiple Access (MF-TDMA) scheme is used for forward uplink signals 132 and return uplink signals 173, allowing efficient streaming of traffic while maintaining flexibility in allocating capacity among user terminals 150. In these embodiments, a number of frequency channels are allocated which may be fixed, or which may be allocated in a more dynamic fashion. A Time Division Multiple Access (TDMA) scheme may also be employed in each frequency channel. In this scheme, each frequency channel may be divided into several timeslots that can be assigned to a connection (e.g., to a particular user terminal 150). In other embodiments, one or more of the forward uplink signals 132 and uplink return signals 173 may be configured using other schemes, such as Frequency Division Multiple Access (FDMA), Orthogonal Frequency Division Multiple Access (OFDMA), Code Division Multiple Access (CDMA), or any number of hybrid or other schemes known in the art. In various embodiments, physical layer techniques may be the same for each of the signals 132, 133, 172, and 173, or some of the signals may use different physical layer techniques than other signals.

The antenna assembly 121 may support communication via one or more beamformed spot beams 125, which may be otherwise referred to as service beams, satellite beams, or any other suitable terminology. Signals may be passed via the antenna assembly 121 to form the spatial electromagnetic radiation pattern of the spot beams 125. A spot beam 125 may use a single carrier, i.e., one frequency or a contiguous frequency range, per spot beam. In some examples, a spot beam 125 may be configured to support only user terminals 150, in which case the spot beam 125 may be referred to as a user spot beam or a user beam (e.g., user spot beam 125-a). For example, a user spot beam 125-a may be configured to support one or more forward downlink signals 172 and/or one or more return uplink signals 173 between the communications satellite 120 and user terminals 150. In some examples, a spot beam 125 may be configured to support only access node terminals 130, in which case the spot beam 125 may be referred to as an access node spot beam, an access node beam, or a gateway beam (e.g., access node spot beam 125-b). For example, an access node spot beam 125-b may be configured to support one or more forward uplink signals 132 and/or one or more return downlink signals 133 between the communications satellite 120 and access node terminals 130. In other examples, a spot beam 125 may be configured to service both user terminals 150 and access node terminals 130, and thus a spot beam 125 may support any combination of forward downlink signals 172, return uplink signals 173, forward uplink signals 132, and/or return downlink signals 133 between the communications satellite 120 and user terminals 150 and access node terminals 130.

A spot beam 125 may support the communications service between target devices (e.g., user terminals 150 and/or access node terminals 130) within a spot beam coverage area 126. A spot beam coverage area 126 may be defined by an area of the electromagnetic radiation pattern of the associated spot beam 125, as projected on the ground or some other reference surface, having a signal power (e.g., SNR, SINR, etc.) of spot beam 125 above a threshold. A spot beam coverage area 126 may cover any suitable service area (e.g., circular, elliptical, hexagonal, local, regional, national, etc.) and may support a communications service with any number of target devices located in the spot beam coverage area 126 (which may include target devices located within the associated spot beam 125, but not necessarily at the reference surface of a spot beam coverage area 126, such as airborne or underwater terminals).

In some examples, the communications satellite 120 may support multiple beamformed spot beams 125 covering respective spot beam coverage areas 126, each of which may or may not overlap with adjacent spot beam coverage areas 126. For example, the communications satellite 120 may support a service coverage area (e.g., a regional coverage area, a national coverage area, etc.) formed by the combination of any number (e.g., tens, hundreds, thousands, etc.) of spot beam coverage areas 126. The communications satellite 120 may support a communications service by way of one or more frequency bands, and any number of sub-bands thereof. For example, the communications satellite 120 may support operations in the International Telecommunications Union (ITU) Ku, K, or Ka-bands, C-band, X-band, S-band, L-band, V-band, and the like.

A service coverage area may be broadly defined as a coverage area from which, and/or to which, either a terrestrial transmission source, or a terrestrial receiver may be participate in (e.g., transmit and/or receive signals associated with) a communications service via the communications satellite 120, and may be defined by a plurality of spot beam coverage areas 126. In some systems, the service coverage area for each communications link (e.g., a forward uplink coverage area, a forward downlink coverage area, a return uplink coverage area, and/or a return downlink coverage area) may be different. While the service coverage area may only be active when the communications satellite 120 is in service (e.g., in a service orbit), the communications satellite 120 may have (e.g., be designed to have) a native antenna pattern that is based on the physical components of the antenna assembly 121, and their relative positions, for example. A native antenna pattern of the communications satellite 120 may refer to a distribution of energy with respect to an antenna assembly 121 of a satellite (e.g., energy transmitted from and/or received by the antenna assembly 121).

In some service coverage areas, adjacent spot beam coverage areas 126 may have some degree of overlap. In some examples, a multi-color (e.g., two, three or four-color re-use pattern) may be used, wherein a "color" refers to a combination of orthogonal communications resources (e.g., frequency resources, polarization, etc.). In an example of a four-color pattern, a number of overlapping spot beam coverage areas 126 may each be assigned with one of the four colors, and each color may be allocated a unique combination of frequency (e.g., a frequency range or ranges, one or more channels, etc.) and/or signal polarization (e.g., a right-hand circular polarization (RHCP), a left-hand circular polarization (LHCP), etc.). By assigning different colors to respective spot beam coverage areas 126 that have overlapping regions, there may be relatively little mutual interference between the spot beams 125 associated with those overlapping spot beam coverage areas 126. These combinations of frequency and antenna polarization may accordingly be re-used in the repeating non-overlapping "four-color" re-use pattern. In some examples, a desired communication service may be provided by using more or fewer colors. Additionally or alternatively, time sharing among spot beams 125 and/or other interference mitigation techniques may be used. For example, spot beams 125 may concurrently use the same resources (the same polarization and frequency range) with interference mitigated using interference mitigation techniques such as ACM, interference cancellation, space-time coding, and the like.

In some examples, the communications satellite 120 may be configured as a "bent pipe" satellite. In a bent pipe configuration, communications satellite 120 may perform frequency and polarization conversion of the received carrier signals before re-transmission of the signals to their destination. In some examples, the communications satellite 120 may support a non-processed bent pipe architecture, with phased array antennas used to produce small spot beams 125 (e.g., by way of ground-based beamforming (GBBF)). The communications satellite 120 may contain K generic pathways, each of which can be allocated as a forward pathway or a return pathway at any instant of time. Large reflectors may be illuminated by a phased array of antenna feed elements, providing the ability to make various patterns of spot beams 125 within the constraints set by the size of the reflector and the number and placement of the antenna feed elements. Phased array fed reflectors may be employed for both receiving uplink signals 132, 173, or both, and transmitting downlink signals 133, 172, or both.

Communications satellite 120 may operate in a multiple spot beam mode, transmitting a number of narrow spot beams 125 directed at different regions of the earth. This may allow for segregation of user terminals 150 into the various narrow spot beams 125. Beamforming networks (BFNs) associated with the receive (Rx) and transmit (Tx) phased arrays may be dynamic, allowing for frequent movement of the locations of both the Tx spot beams 125 (e.g., downlink spot beams 125) and Rx spot beams 125 (e.g., uplink spot beams 125). The dynamic BFNs may be used to quickly hop the positions of both Tx and Rx spot beams 125. The BFN may dwell in one beam hopping pattern (e.g., both Tx and Rx spot beams 125) for a period of time called a timeslot dwell time. Individual timeslots may all be associated with the same dwell time or different dwell times. A number Q of these timeslots, with each timeslot associated with a potentially different location pattern of Rx and Tx spot beams, are arranged into a sequence called a beam hopping frame. These frames can repeat, but may also be dynamic and time-varying. The duration and location of the Rx and Tx spot beams associated with beam hop timeslots can also vary, both between frames and within a frame.

User terminals 150 may include any number of devices configured to communicate signals with the communications satellite 120, which may include fixed terminals (e.g., ground-based stationary terminals) or mobile terminals such as terminals on boats, aircraft, ground-based vehicles, and the like. A user terminal 150 may communicate data and information via the communications satellite 120, which may include communications via an access node terminal 130 to a destination device such as a network device 141, or some other device or distributed server associated with a network 140. A user terminal 150 may communicate signals according to a variety of physical layer transmission modulation and coding techniques, including, for example, those defined with the DVB-S2, WiMAX, LTE, and DOCSIS standards.

A user terminal 150 may include a user terminal antenna 152 configured for receiving forward downlink signals 172 from the communications satellite 120. The user terminal antenna 152 may also be configured to transmit return uplink signals 173 to the communications satellite 120. Thus, a user terminal 150 may be configured for uni-directional or bi-directional communications with the communications satellite 120 via a spot beam 125 (e.g., user spot beam 125-a). In some examples, the user terminal antenna 152 may be directional. For example, the user terminal antenna 152 may have a peak gain along a primary axis (e.g., an antenna boresight direction), which may be provided by way of a fixed configuration of focusing and/or reflecting elements, and/or by way of electronically configurable beamforming.

A user terminal antenna 152 may be part of a user terminal antenna assembly 153, which may also include various hardware for mounting the satellite terminal antennas. A user terminal antenna assembly 153 may also include circuits and/or processors for converting (e.g., performing frequency conversion, modulating/demodulating, multiplexing/demultiplexing, filtering, forwarding, etc.) between radio frequency (RF) satellite communication signals (e.g., forward downlink signals 172 and/or return uplink signals 173), and user terminal communications signals 157 transmitted between the user terminal antenna 152 and a user terminal receiver 158. Such circuits and/or processors may be included in an antenna communication assembly, which may also be referred to as a transmit and receive integrated assembly (TRIA). Additionally or alternatively, the user terminal receiver 158 may include circuits and/or processors for performing various RF signal operations (e.g., receiving, performing frequency conversion, modulating/demodulating, multiplexing/demultiplexing, etc.). The user terminal antenna assembly 153 may also be known as a satellite outdoor unit (ODU), and the user terminal receiver 158 may be known as a satellite indoor unit (IDU). In some examples, the user terminal antenna 152 and user terminal receiver 158 together comprise a very small aperture terminal (VSAT), with user terminal antenna 152 measuring approximately 0.6 meters in diameter and having approximately 2 watts of power. In other embodiments, a variety of other types of user terminal antennas 152 may be used at user terminals 150 to receive forward downlink signals 172 from the communications satellite 120. Each of user terminals 150 may comprise a single user terminal or, alternatively, may comprise a hub or router (not shown) that is coupled to multiple user terminals 150.

A user terminal 150 may be connected via a wired or wireless connection 161 to one or more consumer premises equipment (CPE) 160 and may provide network access service (e.g., Internet access, etc.) or other communication services (e.g., broadcast media, etc.) to CPEs 160 via the satellite communications system. The CPE(s) 160 may include user devices such as, but not limited to, computers, local area networks, internet appliances, wireless networks, mobile phones, personal digital assistants (PDAs), other handheld devices, netbooks, notebook computers, tablet computers, laptops, display devices (e.g., TVs, computer monitors, etc.), printers, and the like. The CPE(s) 160 may also include any equipment located at a premises of a subscriber, including routers, firewalls, switches, private branch exchanges (PBXs), Voice over Internet Protocol (VoIP) gateways, and the like. In some examples, the user terminal 150 provides for two-way communications between the CPE(s) 160 and network(s) 140 via the communications satellite 120 and the access node terminal(s) 130.

An access node terminal 130 may service forward uplink signals 132 and return downlink signals 133 to and from communications satellite 120. Access node terminals 130 may also be known as ground stations, gateways, gateway terminals, or hubs. An access node terminal 130 may include an access node terminal antenna system 131 and an access node receiver 135. The access node terminal antenna system 131 may be two-way capable and designed with adequate transmit power and receive sensitivity to communicate reliably with the communications satellite 120. In one embodiment, access node terminal antenna system 131 may comprise a parabolic reflector with high directivity in the direction of a communications satellite 120 and low directivity in other directions. Access node terminal antenna system 131 may comprise a variety of alternative configurations and include operating features such as high isolation between orthogonal polarizations, high efficiency in the operational frequency bands, low noise, and the like.

An access node terminal 130 may schedule traffic to user terminals 150. Alternatively, the scheduling may be performed in other parts of satellite communications system 100 (e.g., at one or more network devices 141, which may include network operations centers (NOC) and/or gateway command centers). Although only one access node terminal 130 is shown in FIG. 1A, embodiments of the present invention may be implemented in satellite communications systems having a plurality of access node terminals 130, each of which may be coupled to each other and/or one or more networks 140.

In some satellite communications systems, there may be a limited amount of frequency spectrum available for transmission. Communication links between access node terminals 130 and the communications satellite 120 may use the same, overlapping, or different frequencies as communication links between communications satellite 120 and user terminals 150. Access node terminals 130 may also be located remotely from user terminals 150 to facilitate frequency re-use.

The communications satellite 120 may communicate with an access node terminal 130 by transmitting return downlink signals 133 and/or receiving forward uplink signals 132 via one or more spot beams 125 (e.g., access node spot beam 125-*b*, which may be associated with a respective access node spot beam coverage area 126-*b*). Access node spot beam 125-*b* may, for example, support a communications service for one or more user terminals 150 (e.g., relayed by the communications satellite 120), or any other communications between the communications satellite 120 and the access node terminal 130.

Access node terminal 130 may provide an interface between the network 140 and the communications satellite 120, and may be configured to receive data and information directed between the network 140 and one or more user terminals 150. Access node terminal 130 may format the data and information for delivery to respective user terminals 150. Similarly, access node terminal 130 may be configured to receive signals from the communications satellite 120 (e.g., from one or more user terminals 150) directed to a destination accessible via network 140. Access node terminal 130 may also format the received signals for transmission on network 140.

The network(s) 140 may be any type of network and can include, for example, the Internet, an IP network, an intranet, a wide-area network (WAN), a metropolitan area network (MAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network(s) 140 may include both wired and wireless connections as well as optical links. Network(s) 140 may connect the access node terminal 130 with other access node terminals that may be in communication with the communications satellite 120 or with other satellites.

One or more network device(s) 141 may be coupled with the access node terminal 130 and may control aspects of the satellite communications system 100. In various examples a network device 141 may be co-located or otherwise nearby the access node terminal 130, or may be a remote installation that communicates with the access node terminal 130 and/or network(s) 140 via wired and/or wireless communications link(s).

Figure 1B:
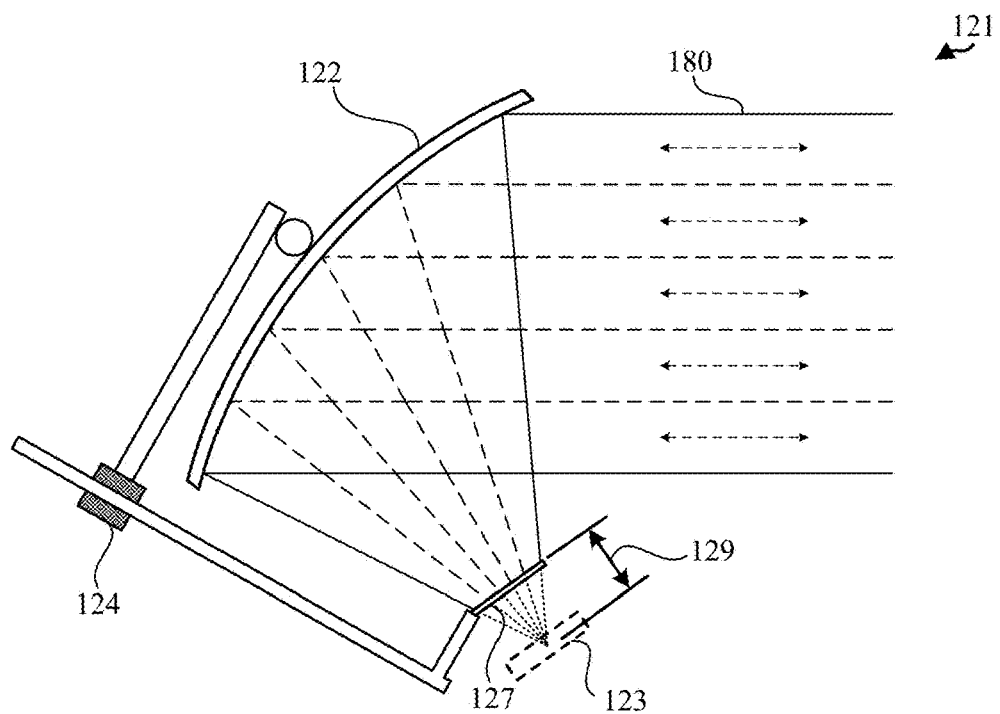
FIG. 1B illustrates an antenna assembly of a communications satellite that supports flexible beamforming of satellite communications, in accordance with aspects of the present disclosure.

FIG. 1B illustrates an antenna assembly 121 of a communications satellite 120 that supports flexible beamforming of satellite communications, in accordance with aspects of the present disclosure. As shown in FIG. 1B, the antenna assembly 121 may include a feed array assembly 127 and a reflector 122 that is shaped to have a focal region 123 where electromagnetic signals (e.g., inbound electromagnetic signals 180) are concentrated when received from a distant source. Similarly, a signal emitted by a feed array assembly 127 located at the focal region 123 will be reflected by reflector 122 into an outgoing plane wave (e.g., outbound electromagnetic signals 180). The feed array assembly 127 and the reflector 122 may be associated with a native antenna pattern formed by the composite of native feed element patterns for each of a plurality of feed elements 128 of the feed array assembly 127.

A communications satellite 120 may operate according to native antenna pattern of the antenna assembly 121 when the communications satellite 120 is in a service orbit, as described herein. The native antenna pattern may be based at least in part on a pattern of feed elements 128 of a feed array assembly 127, a relative position (e.g., a focal offset distance 129) of a feed array assembly 127 with respect to a reflector 122, etc. The native antenna pattern 220 may be associated with a native antenna pattern coverage area. Antenna assemblies 121 described herein may be designed to support a particular service coverage area with the native antenna pattern coverage area of an antenna assembly 121, and various design characteristics may be determined computationally (e.g., by analysis or simulation) and/or measured experimentally (e.g., on an antenna test range or in actual use).

As shown in FIG. 1B, the feed array assembly 127 of the antenna assembly 121 is located between the reflector 122 and the focal region 123 of the reflector 122. Specifically, the feed array assembly 127 is located at a focal offset distance 129 from the focal region 123. Accordingly, the feed array assembly 127 of the antenna assembly 121 may be located at a defocused position with respect to the reflector 122. The antenna assembly 121 may also include an actuator 124, which may provide for a change in native antenna pattern as described herein. For example, the actuator 124 may be a linear actuator coupled between the reflector 122 and the feed array assembly 127, which provides a change to the focal offset distance 129 to provide the change in native antenna pattern. A linear actuator 124 may be constrained to move in one direction, which in some examples may be aligned along a direction predominantly between a center of the shaped reflector 122 and the focal region 123 of the shaped reflector 122. Although illustrated in FIG. 1B as a direct offset feed array assembly 127, a front feed array assembly 127 may be used, as well as other types of configurations, including the use of a secondary reflector (e.g., Cassegrain antenna, etc.).

Figure 1C:
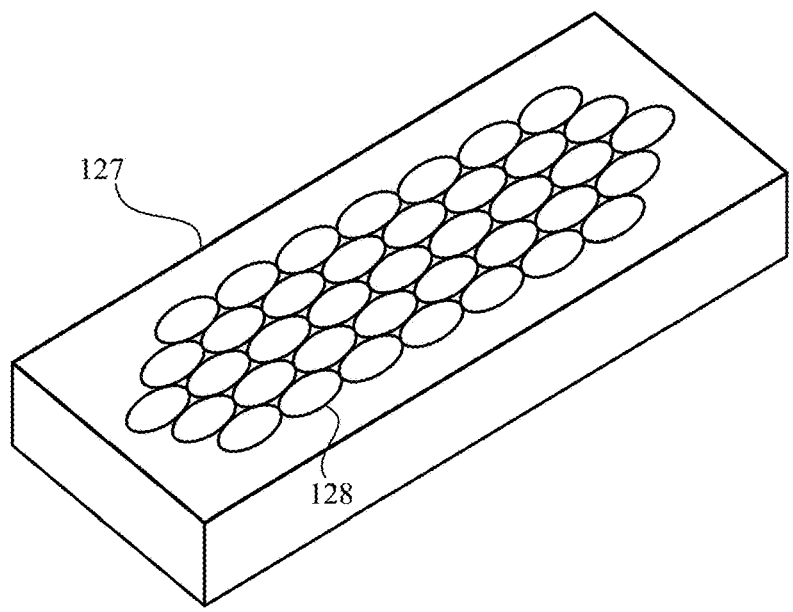
FIG. 1C illustrates a feed array assembly of an antenna assembly that supports flexible beamforming of satellite communications, in accordance with aspects of the present disclosure.

FIG. 1C illustrates a feed array assembly 127 of an antenna assembly 121 that supports flexible beamforming of satellite communications, in accordance with aspects of the present disclosure. As shown in FIG. 1C, the feed array assembly 127 may have multiple antenna feed elements 128 for communicating signals (e.g., signals associated with a communications service, signals associated with a configuration or control of the communications satellite 120, etc.).

As used herein, a feed element 128 may refer to a receive antenna element, a transmit antenna element, or an antenna element configured to support both transmitting and receiving (e.g., a transceiver element). A receive antenna element may include a physical transducer (or RF transducer) that converts an electromagnetic signal to an electrical signal, and the term transmit antenna element may refer to an element including a physical transducer that emits an electromagnetic signal when excited by an electrical signal. The same physical transducer may be used for transmitting and receiving, in some cases.

Each of the feed elements 128 may include, for example, a feed horn, a polarization transducer (e.g., a septum polarized horn, which may function as two combined elements with different polarizations), a multi-port multi-band horn (e.g., dual-band 20 GHz/30 GHz with dual polarization LHCP/RHCP), a cavity-backed slot, an inverted-F, a slotted waveguide, a Vivaldi, a Helical, a loop, a patch, or any other configuration of an antenna element or combination of interconnected sub-elements. Each of the feed elements 128 may also include, or be otherwise coupled with an RF signal transducer, a low noise amplifier (LNA), or power amplifier (PA), and may be coupled with transponders in the communications satellite 120 that may perform other signal processing such as frequency conversion, beamforming processing, and the like.

The reflector 122 may be configured to reflect the signals transmitted between the feed array assembly 127 and one or more target devices (e.g., user terminals 150, access node terminals 130, etc.). Each feed element 128 of the feed array assembly 127 may be associated with a respective native feed element pattern, which may be further associated with a projected native feed element pattern coverage area (e.g., as projected on a terrestrial surface, plane, or volume after reflection from the reflector 122). The collection of the native feed element pattern coverage areas for a multi-feed antenna may be referred to as a native antenna pattern. The feed array assembly 127 may include any number of feed elements 128 (e.g., tens, hundreds, thousands, etc.), which may be arranged in any suitable arrangement (e.g., a linear array, an arcuate array, a planar array, a honeycomb array, a polyhedral array, a spherical array, an ellipsoidal array, or combinations thereof). Although each feed element 128 is shown in FIG. 1C as circular, feed elements 128 may be other shapes such as square, rectangular, hexagonal, and others.

FIGS. 2A through 2D illustrate examples of antenna characteristics for an antenna assembly 121-*a* having a feed array assembly 127-*a* located at a focal region 123 of a shaped reflector 122-*a*, in accordance with aspects of the present disclosure.

Figure 2A:
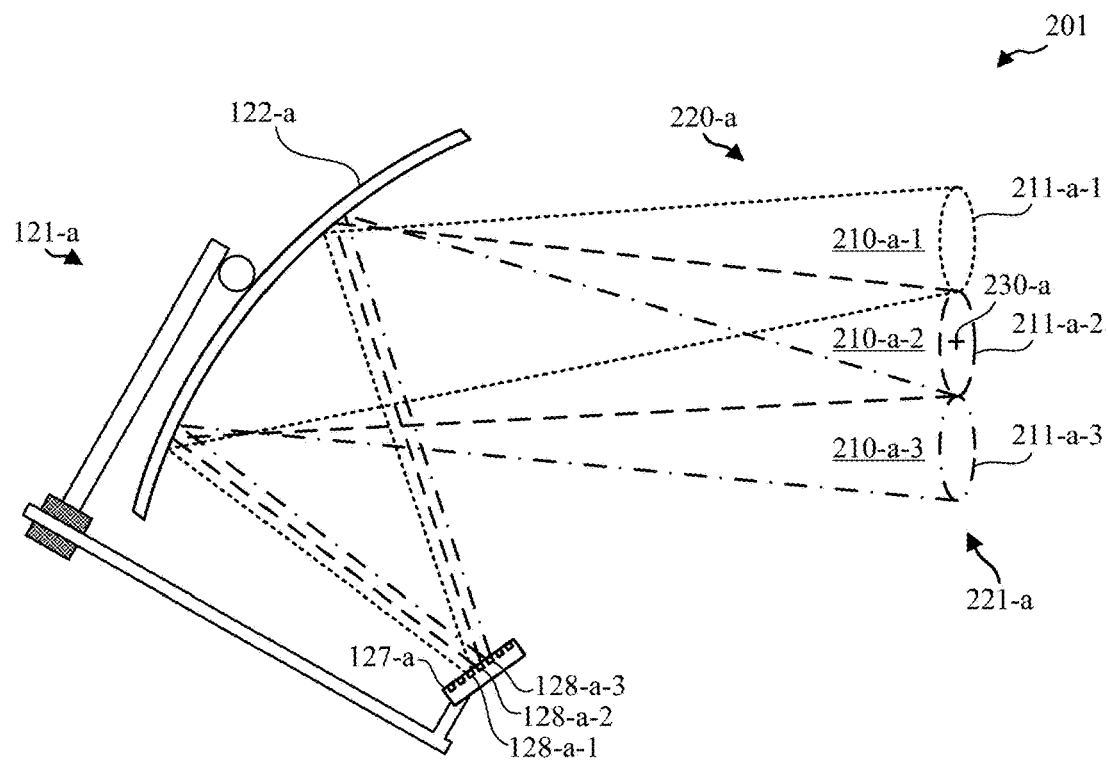
FIGS. 2A through 2D illustrate examples of antenna characteristics for an antenna assembly having a feed array assembly located at a focal region of a shaped reflector, in accordance with aspects of the present disclosure.

FIG. 2A shows a diagram 201 of native feed element patterns 210-*a* associated with feed elements 128-*a* of the feed array assembly 127-*a*. Specifically, diagram 201 illustrates native feed element patterns 210-*a*-1, 210-*a*-2, and 210-*a*-3, associated with feed elements 128-*a*-1, 128-*a*-2, and 128-*a*-3, respectively. The native feed element patterns 210-*a* may represent the spatial radiation pattern associated with each of the respective feed elements 128. For example, when feed element 128-*a*-2 is transmitting, transmitted electromagnetic signals may be reflected off the reflector 122-*a*, and propagate in a generally conical native feed element pattern 210-*a*-2 (although other shapes are possible depending on the characteristics of a feed element 128 and/or reflector 122). Although only three native feed element patterns 210-*a* are shown for the antenna assembly 121-*a*, each of the feed elements 128 of an antenna assembly 121 is associated with a respective native feed element pattern 210. The composite of the native feed element patterns 210-*a* associated with the antenna assembly 121-*a* (e.g., native feed element patterns 210-*a*-1, 210-*a*-2, 210-*a*-3, and other native feed element patterns 210-*a* that are not illustrated) may be referred to as the native antenna pattern 220-*a*.

Each of the feed elements 128-*a* may also be associated with a native feed element pattern coverage area 211-*a* (e.g., native feed element pattern coverage areas 211-*a*-1, 211-*a*-2, and 211-*a*-3, associated with feed elements 128-*a*-1, 128-*a*-2, and 128-*a*-3, respectively), representing the projection of the native feed element patterns 210-*a* on a reference surface (e.g., the ground, or some other reference plane or surface). A native feed element pattern coverage area 211 may represent an area in which various devices (e.g., access node terminals 130 and/or user terminals 150) may receive signals transmitted by a respective feed element 128. Additionally or alternatively, a native feed element pattern coverage area 211 may represent an area in which transmissions from various devices may be received by a respective feed element 128. For example, a device located at an area of interest 230-*a*, located within the native feed element pattern coverage area 211-*a*-2 may receive signals transmitted by feed element 128-*a*-2, and may have transmissions received by feed element 128-*a*-2. The composite of the native feed element pattern coverage areas 211-*a* associated with the antenna assembly 121-*a* (e.g., native feed element pattern coverage areas 211-*a*-1, 211-*a*-2, 211-*a*-3, and other native feed element pattern coverage areas 211-*a* that are not illustrated) may be referred to as the native antenna pattern coverage area 221-*a*. It should be understood that diagram 201 is not drawn to scale and that native feed element pattern coverage areas 211 are generally each much larger than the reflector 122-*a*. Because the feed array assembly 127-*a* is located at a focal region 123 of the reflector 122-*a*, the native feed element patterns 210-*a* are substantially non-overlapping in the region of the native antenna pattern coverage area 221-*a*, and thus the native feed element pattern coverage areas 211-*a*, are substantially non-overlapping. Therefore each position in the native antenna pattern coverage area 221-*a* is associated with one or a small number (e.g., 3 or fewer) of feed elements 128.

Figure 2B:
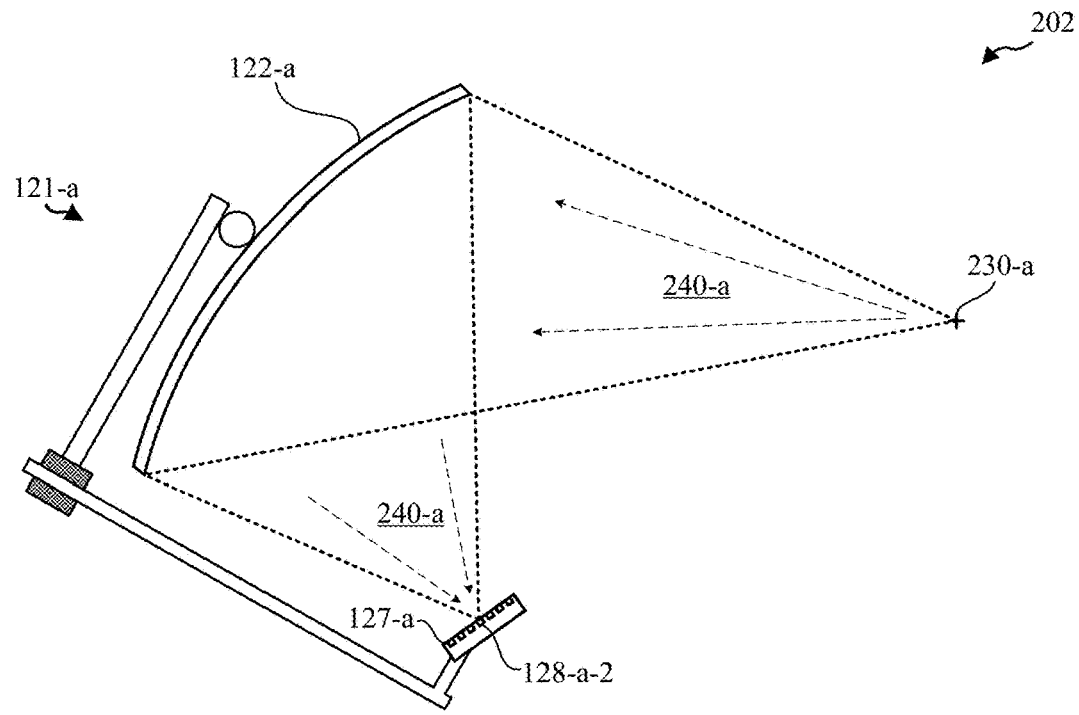

FIG. 2B shows a diagram 202 illustrating signal reception of the antenna assembly 121-*a* for transmissions 240-*a* from the point of interest 230-*a*. Transmissions 240-*a* from the point of interest 230-*a* may illuminate the entire reflector 122-*a*, or some portion of the reflector 122-*a*, and then be focused and directed towards the feed array assembly 127-*a* according to the shape of the reflector 122-*a* and the angle of incidence of the transmission 240 on the reflector 122-*a*. Because the feed array assembly 127-*a* is located at a focal region 123 of the reflector 122-*a*, the transmissions 240-*a* may be focused to a single feed element (e.g., feed element 128-*a*-2, associated with the native feed element pattern coverage area 211-*a*-2 in which the point of interest 230-*a* is located), or, if located in an area of overlap of the native feed element pattern coverage areas 211-*a*, a small number (e.g., 3 or fewer) of feed elements 128-*a*.

Figure 2C:
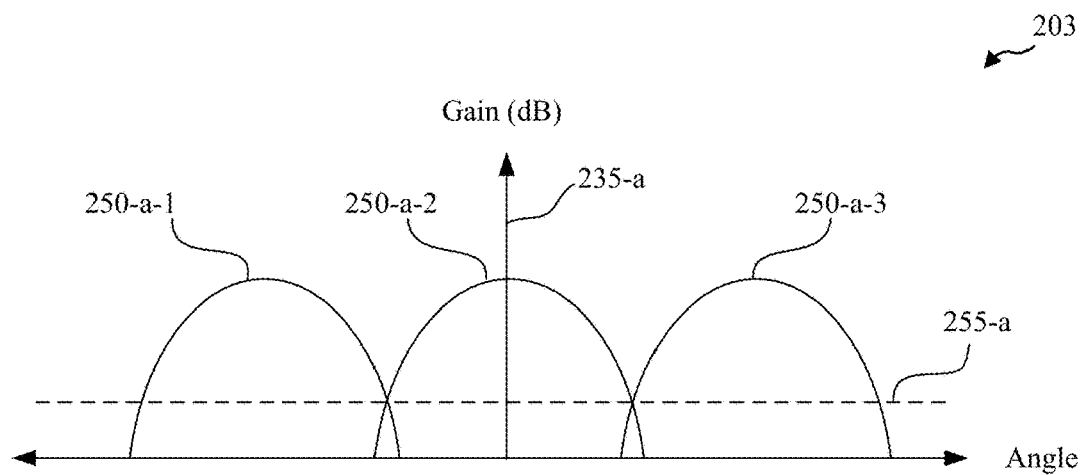

FIG. 2C shows a diagram 203 of native feed element pattern gain profiles 250-*a* associated with three antenna feed elements 128-*a* of the feed array assembly 127-*a*, with reference to angles measured from a zero offset angle 235-*a*. For example, native feed element pattern gain profiles 250-*a*-1, 250-*a*-2, and 250-*a*-3 may be associated with antenna feed elements 128-*a*-1, 128-*a*-2, and 128-*a*-3, respectively, and therefore may represent the gain profiles of native feed element patterns 210-*a*-1, 210-*a*-2, and 210-*a*-3. As shown in diagram 203, the gain of each native feed element pattern gain profile 250 may attenuate at angles offset in either direction from the peak gain. In diagram 203, beam contour level 255-*a* may represent a desired gain level (e.g., to provide a desired information rate, etc.) to support a communications service via the antenna assembly 121-*a*, which therefore may be used to define a boundary of respective native feed element pattern coverage areas 211-*a* (e.g., native feed element pattern coverage areas 211-*a*-1, 211-*a*-2, and 211-*a*-3). Beam contour level 255-*a* may represent, for example, a −1 dB, −2 dB, or −3 dB attenuation from the peak gain, or may be defined by an absolute signal strength, SNR, or SINR level. Although only three native feed element pattern gain profiles 250-*a* are shown, other native feed element pattern gain profiles 250-*a* may be associated with other antenna feed elements 128-*a*.

Figure 2D:
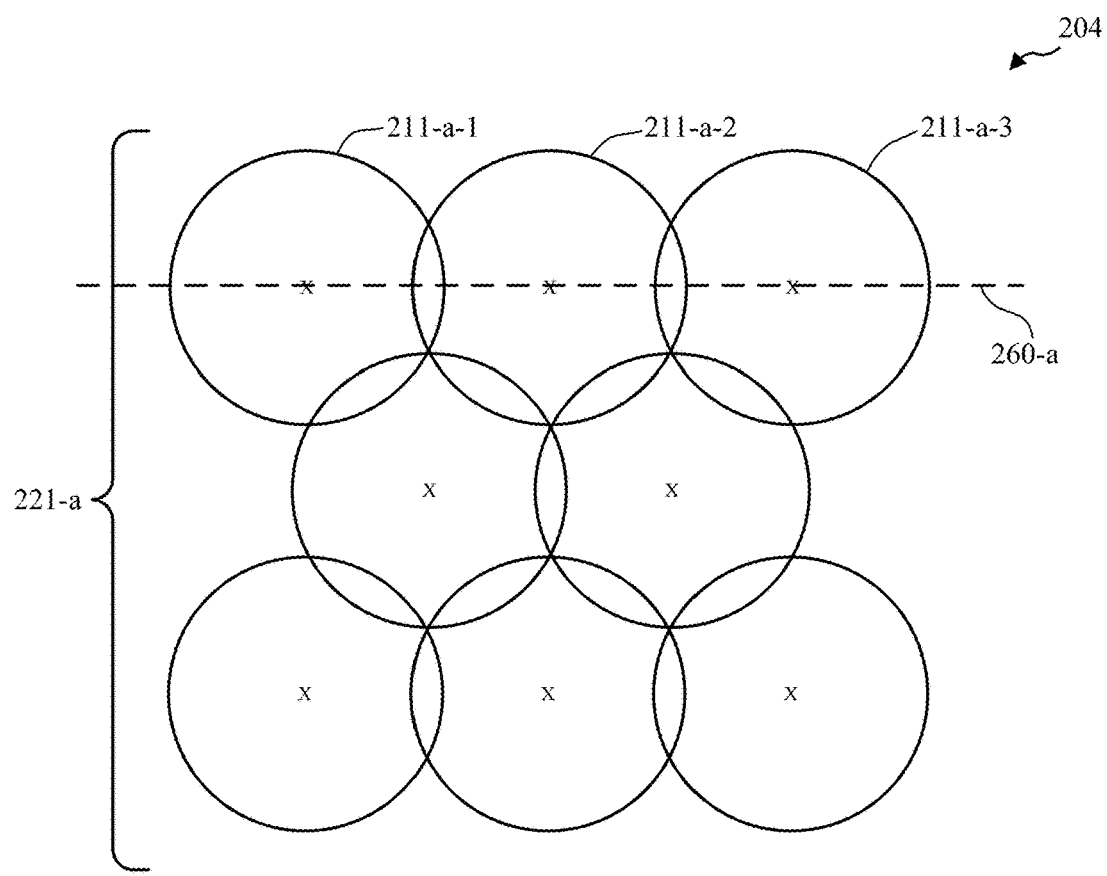

FIG. 2D shows a diagram 204 illustrating a two-dimensional array of idealized native feed element pattern coverage areas 211 of several feed elements 128 of the feed array assembly 127-*a* (e.g., including feed elements 128-*a*-1, 128-*a*-2, and 128-*a*-3). The native feed element pattern coverage areas 211 may be illustrated with respect to reference surface (e.g., a plane at a distance from the communications satellite, a plane at some distance from the ground, a spherical surface at some elevation, a ground surface, etc.), and may additionally include a volume adjacent to the reference surface (e.g., a substantially conical volume between the reference surface and the communications satellite, a volume below the reference surface, etc.). The multiple native feed element pattern coverage areas 211-*a* may collectively form the native antenna pattern coverage area 221-*a*. Although only eight native feed element pattern coverage areas 211-*a* are illustrated, a feed array assembly 127 may have any number of feed elements 128 (e.g., fewer than eight or more than eight), each associated with a native feed element pattern coverage area 211.

The boundaries of each native feed element pattern coverage area 211 may correspond to the respective native feed element pattern 210 at the beam contour level 255-*a*, and the peak gain of each native feed element pattern coverage area 211 may have a location designated with an 'x.' Native feed element pattern coverage areas 211-*a*-1, 211-*a*-2, and 211-*a*-3 may correspond to the projection of the native feed element patterns associated with native feed element pattern gain profiles 250-*a*-1, 250-*a*-2, and 250-*a*-3, respectively, where diagram 203 illustrates the native feed element pattern gain profiles 250 along section plane 260-*a* of diagram 204. In diagram 204, because the feed array assembly 127-*a* is located at a focal region of the reflector 122-*a*, only a relatively small portion of each native feed element pattern coverage area 211 overlaps with an adjacent native feed element pattern coverage area 211. In addition, generally locations within a service coverage area (e.g., a total coverage area of a plurality of spot beams of a communications satellite) fall within the native feed element pattern coverage area 211 of two or fewer antenna feed elements 128. For example, the antenna assembly 121-*a* may be configured such that the area where more than two native feed element pattern coverage areas 211 overlap is minimized (e.g., three native feed element pattern coverage areas 211 may be configured to intersect at or close to a point as shown in FIG. 2D, etc.). In some examples, this condition may also be referred to as having feed elements 128 of a feed array assembly 127, or native feed element pattern coverage areas 211, being tiled. The native feed element pattern coverage areas 211 are referred to herein as idealized because the coverage areas are shown as circular for the sake of simplicity. However, in various examples a native feed element pattern coverage area 211 may be some shape other than a circle (e.g., an ellipse, a hexagon, a rectangle, etc.). Thus, tiled native feed element pattern coverage areas 211 may have more overlap with each other (e.g., more than three native feed element pattern coverage areas 211 may overlap, in some cases) than shown in diagram 204.

FIGS. 3A through 3D illustrate examples of antenna characteristics for an antenna assembly 121-*b* having a feed array assembly 127-*b* operating in a defocused position, in accordance with aspects of the present disclosure. When feed array assembly 127-*b* is not located at a focal region 123 of an antenna assembly 121, the antenna assembly 121 may be understood as operating in a defocused condition. In a defocused condition, an antenna assembly 121 spreads received transmissions from a given location to more of the antenna feed elements 128, and spreads transmitted power from a feed element 128 over a larger area. Thus, each native feed element pattern 210 has a larger beamwidth, and there is a larger amount of overlap between native feed element patterns 210. According to the example of FIGS. 3A through 3D, the defocused condition may be provided by locating the feed array assembly 127-*b* between the reflector 122-*b* and a focal region 123 of the reflector 122-*b* (e.g., offset by focal offset distance 129) as shown in FIG. 1B.

Figure 3A:
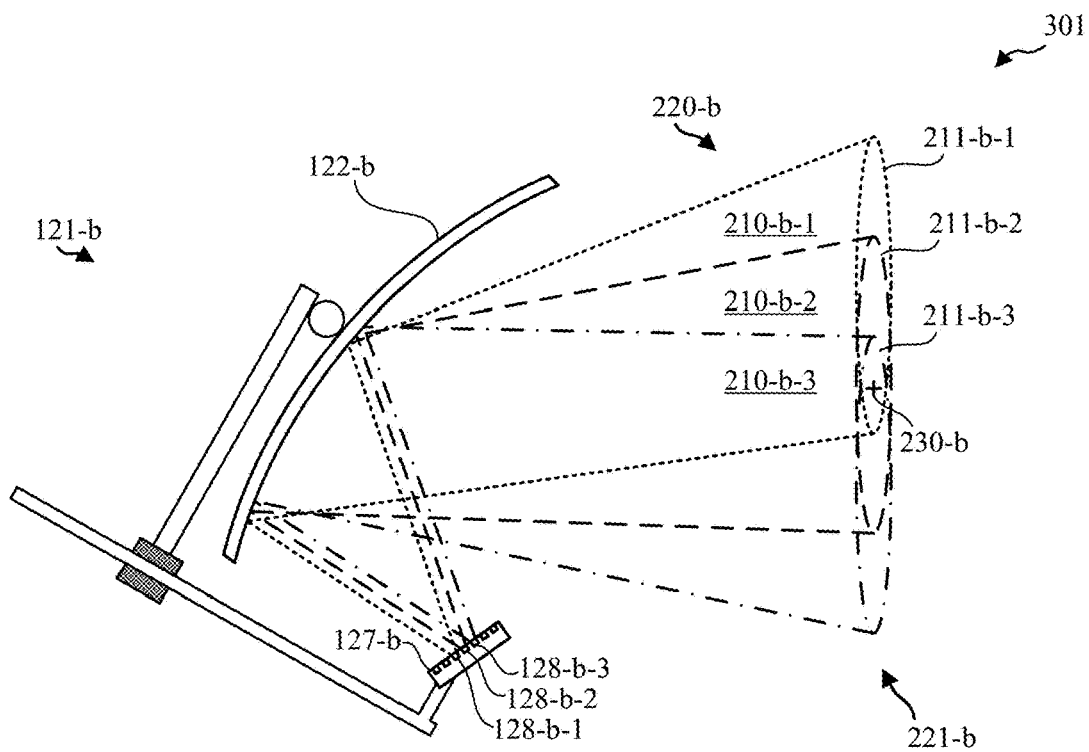
FIGS. 3A through 3D illustrate examples of antenna characteristics for an antenna assembly having a feed array assembly operating in a defocused position, in accordance with aspects of the present disclosure.

FIG. 3A shows a diagram 301 of native feed element patterns 210-*b* associated with feed elements 128-*b* of the feed array assembly 127-*b*. Specifically, diagram 301 illustrates native feed element patterns 210-*b*-1, 210-*b*-2, and 210-*b*-3, associated with feed elements 128-*b*-1, 128-*b*-2, and 128-*b*-3, respectively. Although only three native feed element patterns 210-*b* are shown for the antenna assembly 121-*b*, each of the feed elements 128 of an antenna assembly 121 is associated with a respective native feed element pattern 210. The composite of the native feed element patterns 210-*b* associated with the antenna assembly 121-*b* (e.g., native feed element patterns 210-*b*-1, 210-*b*-2, 210-*b*-3, and other native feed element patterns 210-*b* that are not illustrated) may be referred to as the native antenna pattern 220-*b*.

Each of the feed elements 128-*b* may also be associated with a native feed element pattern coverage area 211-*b* (e.g., native feed element pattern coverage areas 211-*b*-1, 211-*b*-2, and 211-*b*-3, associated with feed elements 128-*b*-1, 128-*b*-2, and 128-*b*-3, respectively), representing the projection of the native feed element patterns 210-*b* on a reference surface (e.g., the ground, or some other reference plane or surface). The composite of the native feed element pattern coverage areas 211-*b* associated with the antenna assembly 121-*b* (e.g., native feed element pattern coverage areas 211-*b*-1, 211-*b*-2, 211-*b*-3, and other native feed element pattern coverage areas 211-*b* that are not illustrated) may be referred to as the native antenna pattern coverage area 221-*b*. Because the feed array assembly 127-*b* is operating at a defocused position with respect to the reflector 122-*b*, the native feed element patterns 210-*b*, and thus the native feed element pattern coverage areas 211-*b*, are substantially overlapping. Therefore each position in the native antenna pattern coverage area 221-*b* may be associated with a plurality of feed elements 128.

Figure 3B:
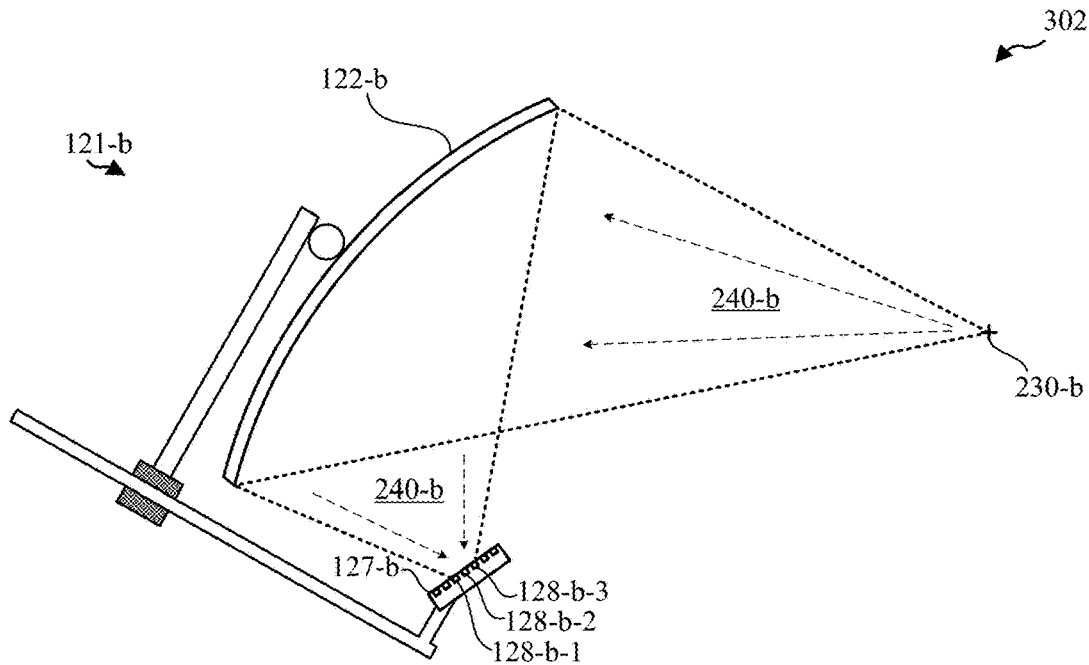

FIG. 3B shows a diagram 302 illustrating signal reception of the antenna assembly 121-*b* for transmissions 240-*b* from a point of interest 230-*b*. Transmissions 240-*b* from the point of interest 230-*b* may illuminate the entire reflector 122-*b*, or some portion of the reflector 122-*b*, and then be focused and directed towards the feed array assembly 127-*b* according to the shape of the reflector 122-*b* and the angle of incidence of the transmission 240 on the reflector 122-*b*. Because the feed array assembly 127-*b* is operating at a defocused position with respect to the reflector 122-*b*, the transmissions 240-*b* may be focused on a plurality of feed elements 128 (e.g., feed elements 128-*b*-1, 128-*b*-2, and 128-*b*-3, associated with the native feed element pattern coverage areas 211-*b*-1, 211-*b*-2, and 211-*b*-3, each of which contain the point of interest 230-*b*).

Figure 3C:
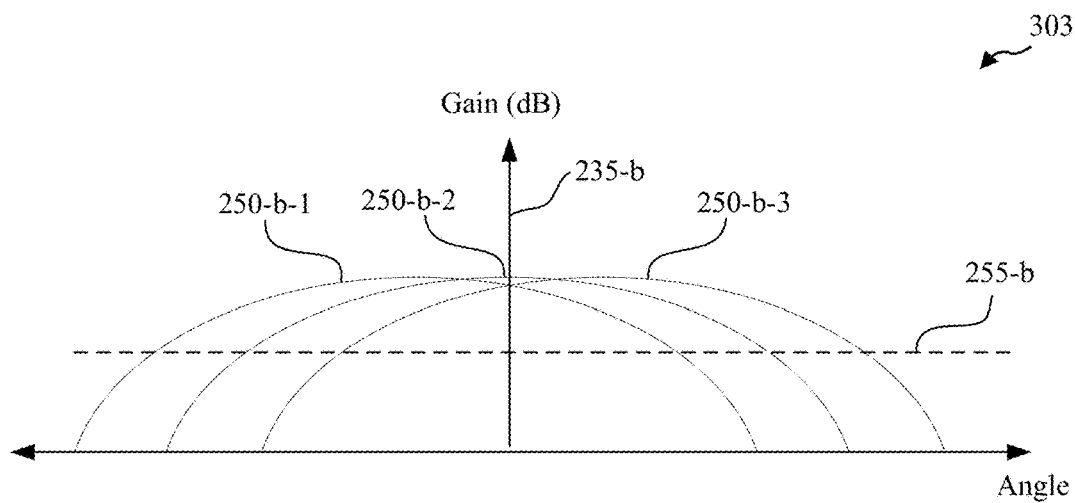

FIG. 3C shows a diagram 303 of native feed element pattern gain profiles 250-*b* associated with three antenna feed elements 128-*b* of the feed array assembly 127-*b*, with reference to angles measured from a zero offset angle 235-*b*. For example, native feed element pattern gain profiles 250-*b*-1, 250-*b*-2, and 250-*b*-3 may be associated with antenna feed elements 128-*b*-1, 128-*b*-2, and 128-*b*-3, respectively, and therefore may represent the gain profiles of native feed element patterns 210-*b*-1, 210-*b*-2, and 210-*b*-3. As shown in diagram 303, the gain of each native feed element pattern gain profile 250-*b* may attenuate at angles offset in either direction from the peak gain. In diagram 303, beam contour level 255-*b* may represent a desired gain level (e.g., to provide a desired information rate, etc.) to support a communications service via the antenna assembly 121-*b*, which therefore may be used to define a boundary of respective native feed element pattern coverage areas 211-*b* (e.g., native feed element pattern coverage areas 211-*b*-1, 211-*b*-2, and 211-*b*-3). Beam contour level 255-*b* may represent, for example, a −1 dB, −2 dB, or −3 dB attenuation from the peak gain, or may be defined by an absolute signal strength, SNR, or SINR level. Although only three native feed element pattern gain profiles 250-*b* are shown, other native feed element pattern gain profiles 250-*b* may be associated with other antenna feed elements 128-*b*.

As shown in diagram 303, each of the native feed element pattern gain profiles 250-*b* may intersect with another native feed element pattern gain profile 250-*b* for a substantial portion of the gain profile above the beam contour level 255-*b*. Accordingly, diagram 303 illustrates an arrangement of native feed element pattern gain profiles 250 where multiple antenna feed elements 128 of a feed array assembly 127 may support a communications service at a particular angle (e.g., at a particular direction of the native antenna pattern 220-*b*). In some examples, this condition may be referred to as having feed elements 128 of a feed array assembly 127, or native feed element pattern coverage areas 211, having a high degree of overlap.

Figure 3D:
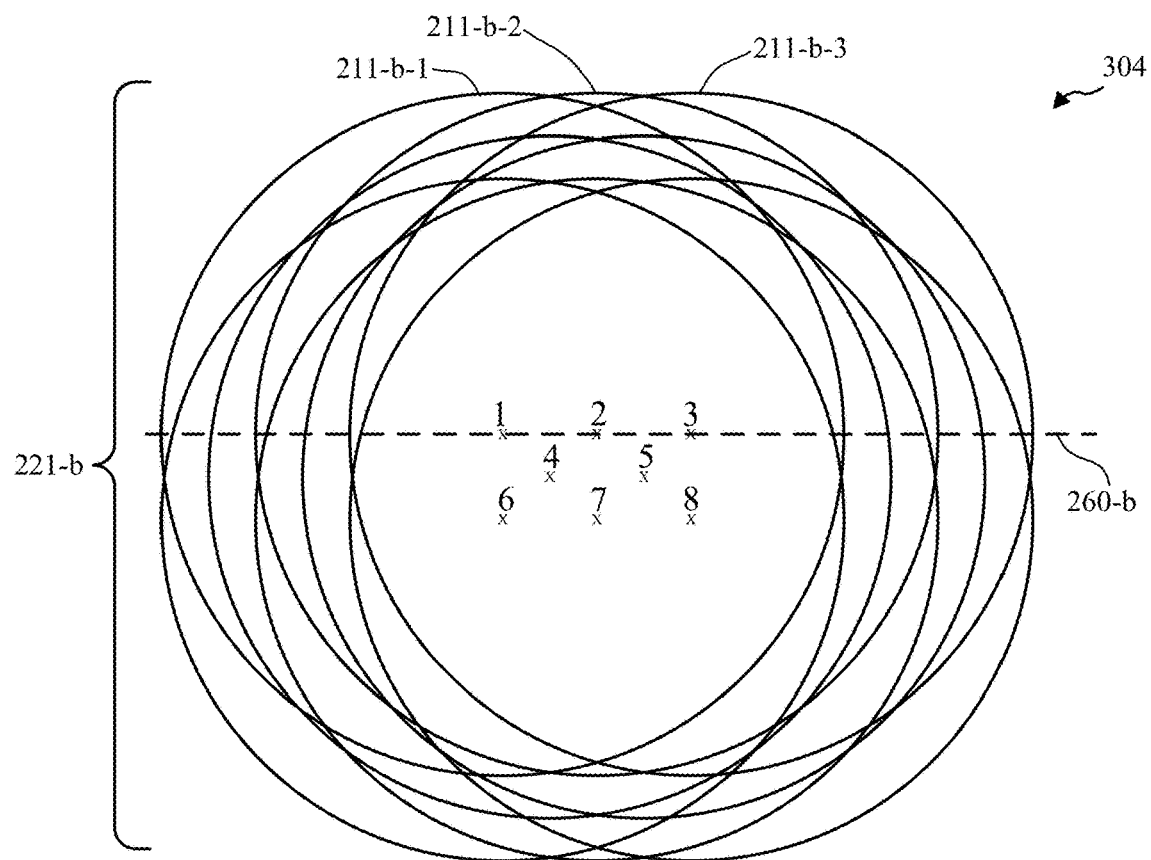

FIG. 3D shows a diagram 304 illustrating a two-dimensional array of idealized native feed element pattern coverage areas 211 of several feed elements 128 of the feed array assembly 127-*b* (e.g., including feed elements 128-*b*-1, 128-*b*-2, and 128-*b*-3). The native feed element pattern coverage areas 211 may be illustrated with respect to reference surface (e.g., a plane at a distance from the communications satellite, a plane at some distance from the ground, a spherical surface at some elevation, a ground surface, etc.), and may additionally include a volume adjacent to the reference surface (e.g., a substantially conical volume between the reference surface and the communications satellite, a volume below the reference surface, etc.). The multiple native feed element pattern coverage areas 211-*b* may collectively form the native antenna pattern coverage area 221-*b*. Although only eight native feed element pattern coverage areas 211-*b* are illustrated, a feed array assembly 127 may have any number of feed elements 128 (e.g., fewer than eight or more than eight), each associated with a native feed element pattern coverage area 211.

The boundaries of each native feed element pattern coverage area 211 may correspond to the respective native feed element pattern 210 at the beam contour level 255-*b*, and the peak gain of each native feed element pattern coverage area 211 may have a location designated with an 'x.' Native feed element pattern coverage areas 211-*b*-1, 211-*b*-2, and 211-*b*-3 may correspond to the projection of the native feed element patterns associated with native feed element pattern gain profiles 250-*b*-1, 250-*b*-2, and 250-*b*-3, respectively, where diagram 303 illustrates the beam gain profiles along section plane 260-*b* of diagram 304. In diagram 304, because the feed array assembly 127-*a* is located at a defocused position with respect to the reflector 122-*b*, a substantial portion (e.g., a majority) of each native feed element pattern coverage area 211 overlaps with an adjacent native feed element pattern coverage area 211. In addition, generally locations within a service coverage area (e.g., a total coverage area of a plurality of spot beams of a communications satellite) fall within the native feed element pattern coverage area 211 of two or more antenna feed elements 128. For example, the antenna assembly 121-*b* may be configured such that the area where more than two native feed element pattern coverage areas 211 overlap is maximized. In some examples, this condition may also be referred to as having feed elements 128 of a feed array assembly 127, or native feed element pattern coverage areas 211, having a high degree of overlap. Although only eight native feed element pattern coverage areas 211 are illustrated, a feed array assembly 127 may have any number of antenna feed elements 128, associated with native feed element pattern coverage areas 211 in a like manner.

In some cases, for a feed array assembly 127 operating at a defocused position, a substantial amount (e.g., more than half) of a service coverage area (e.g., a total coverage area of a plurality of spot beams of a communications satellite) falls within the boundaries of native feed element pattern coverage areas 211 of several (e.g., more than 2 or more than 3) antenna feed elements 128. In one such case, at least one point is within the boundaries of at least 50% of the native feed element pattern coverage areas 211 of the feed array assembly 127. In another case, at least 10 percent of a service coverage area lies within the boundaries of at least 25% of the native feed element pattern coverage areas 211. In another case, at least 20% of a service coverage area lies within the boundaries of at least 20% of the native feed element pattern coverage areas 211. In another case, at least 30% of the service coverage area lies within the boundaries of at least 10% of the native feed element pattern coverage areas 211. In another case, at least 50% of the service coverage area lies within the boundaries of at least 4 different native feed element pattern coverage areas 211. For example, for a service coverage area of 100 square miles and 200 feed elements 128, at least one point may be within 100 native feed element pattern coverage areas 211, at least 10 square miles may be within 50 native feed element pattern coverage areas 211, at least 20 square miles may be within 40 native feed element pattern coverage areas 211, at least 30 square miles may be within 20 native feed element pattern coverage areas 211, or at least 50 square miles may be within 4 or more of the native feed element pattern coverage areas 211. However, in some cases, more than one of these relationships may be true.

In some cases, a single antenna assembly 121 may be used for transmitting and receiving signals between user terminals 150 or access node terminals 130. In other examples, a communications satellite 120 may include separate antenna assemblies 121 for receiving signals and transmitting signals. A receive antenna assembly 121 of a communications satellite 120 may be pointed generally at the same service coverage area as a transmit antenna assembly 121 of the communications satellite 120. Thus, some native feed element pattern coverage areas 211 for antenna feed elements 128 configured for reception may naturally correspond to native feed element pattern coverage areas 211 for antenna feed elements 128 configured for transmission. In these cases, the receive antenna feed elements 128 may be mapped in a manner similar to their corresponding transmit antenna feed elements 128 (e.g., with similar array patterns of different feed array assemblies 127, with similar wiring and/or circuit connections to signal processing hardware, similar software configurations and/or algorithms, etc.), yielding similar signal paths and processing for transmit and receive native feed element pattern coverage areas 211. In some cases, however, it may be advantageous to map receive antenna feed elements 128 and transmit antenna feed elements 128 in dissimilar manners.

In some examples, a plurality of native feed element patterns 210 with a high degree of overlap may be combined by way of beamforming to provide one or more spot beams 125. Beamforming for a spot beam 125 may be performed by adjusting the signal phase (or time delay) and/or signal amplitude, of signals transmitted and/or received by multiple feed elements 128 of one or more feed array assemblies 127 having overlapping native feed element pattern coverage areas 211. For transmissions (e.g., from transmitting feed elements 128 of a feed array assembly 127), the relative phases, and sometimes amplitudes, of the transmitted signals are adjusted, so that the energy transmitted by feed elements 128 will constructively superpose at a desired location (e.g., at a location of a spot beam coverage area 126). This phase and/or amplitude adjustment is commonly referred to as applying beam weights (e.g., beamforming coefficients) to the transmitted signals. For reception (e.g., by receiving antenna feed elements 128 of a feed array assembly 127, etc.), the relative phases, and sometimes amplitudes, of the received signals are adjusted (e.g., by applying the same or different beam weights) so that the energy received from a desired location (e.g., at a location of a spot beam coverage area 126, etc.) by antenna feed elements 128 will constructively superpose for a given spot beam coverage area 126. The term beamforming may be used to refer to the application of the beam weights, whether for transmission, reception, or both. Adaptive beamformers include the function of dynamically computing the beam weights. Computing the beam weights may require direct or indirect discovery of the communication channel characteristics. The processes of beam weight computation and beam weight application may be performed in the same or different system components.

Spot beams 125 may be steered, selectively formed, and/or otherwise reconfigured by applying different beam weights. For example, a number of active native feed element patterns, spot beam coverage areas 126, size of spot beams, relative gain of native feed element patterns and/or spot beams 125, and other parameters may be varied over time. Such versatility is desirable in certain situations. Antenna assemblies 121 that apply beamforming can generally form relatively narrow spot beams 125, and may be able to form spot beams 125 having improved gain characteristics. Narrow spot beams 125 may allow the signals transmitted on one beam to be distinguished from signals transmitted on other spot beams 125 to avoid interference, for example. Accordingly, narrow spot beams 125 can allow frequency and polarization to be re-used to a greater extent than when larger spot beams 125 are formed. For example, spot beams 125 that are narrowly formed can service two discontiguous spot beam coverage areas 126 that are non-overlapping, while overlapping spot beams 125 can be made orthogonal in frequency, polarization, or time. Greater reuse by use of smaller spot beams 125 can increase the amount of data transmitted and/or received. Additionally or alternatively, beamforming may be used to provide sharper gain rolloff at the beam edge may allow for higher beam gain through a larger portion of a spot beam 125. Thus, beamforming techniques may be able to provide higher frequency reuse and/or greater system capacity for a given amount of system bandwidth.

Some communications satellites 120 may use on-board beamforming (OBBF) to electronically steer signals transmitted and/or received via an array of feed elements 128. For example, a communications satellite 120 may have a phased array multi-feed per beam (MFPB) on-board beamforming capability. The beam weights may be computed at a ground-based computation center (e.g., at an access node terminal 130, at a network device 141, at a communications service manager, etc.) and then transmitted to the communications satellite 120 or may be pre-configured at the communications satellite 120 for on-board application.

In some cases, significant processing capability may be needed at the communications satellite 120 to control the phase and gain of each feed element 128 that is used to form spot beams 125. Such processing power may increase the complexity of a communications satellite 120. Thus, in some cases, communications satellites 120 may operate with ground-based beamforming (GBBF) to reduce the complexity of the communications satellite 120 while still providing the advantage of electronically forming narrow spot beams 125.

Figure 4A:
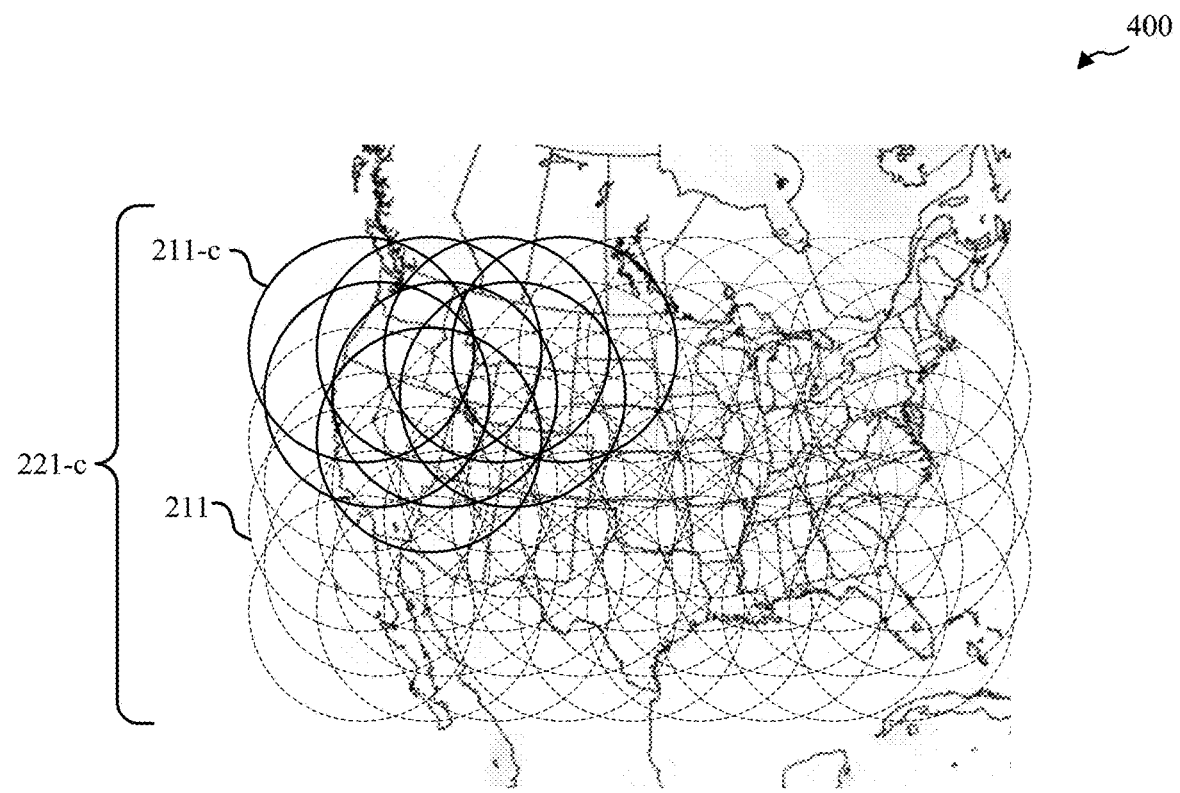
FIGS. 4A and 4B illustrate an example of beamforming to form spot beam coverage areas from a native antenna pattern coverage area provided by an antenna assembly operating in a defocused condition, in accordance with aspects of the present disclosure.
Figure 4B:
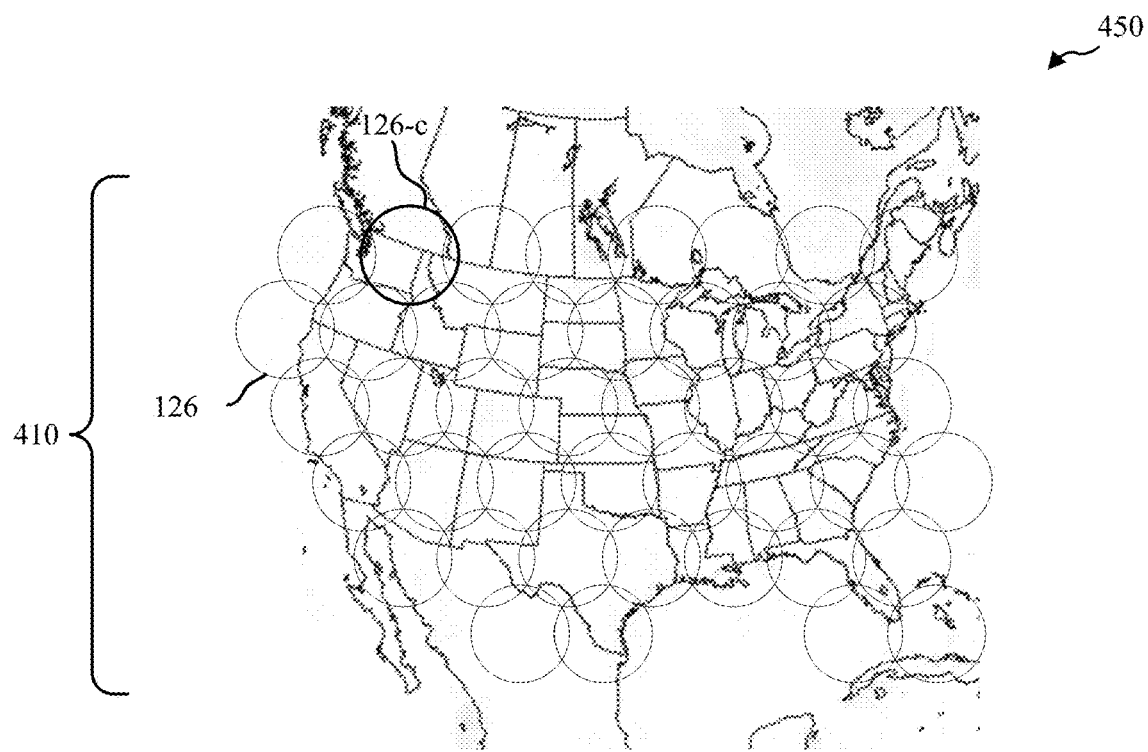

FIGS. 4A and 4B illustrate an example of beamforming to form spot beam coverage areas 126 from a native antenna pattern coverage area 221-c provided by an antenna assembly 121 operating in a defocused condition, in accordance with aspects of the present disclosure. In FIG. 4A, diagram 400 illustrates native antenna pattern coverage area 221-c that includes multiple native feed element pattern coverage areas 211 provided using a defocused multi-feed antenna assembly 121. Each of the native feed element pattern coverage areas 211 may be associated with a respective feed element 128 of a feed array assembly 127 of the antenna assembly 121. In FIG. 4B, diagram 450 shows a pattern of spot beam coverage areas 126 over a service coverage area 410 of the continental United States. The spot beam coverage areas 126 may be provided by applying beamforming coefficients to signals carried via the feed elements 128 associated with the multiple native feed element pattern coverage areas 211 of FIG. 4A.

Each of the spot beam coverage areas 126 may have an associated spot beam 125 which may support a communications service within the respective spot beam coverage areas 126. Each of the spot beams 125 may be formed from a composite of signals carried via multiple feed elements 128 for those native feed element pattern coverage areas 211 that include the respective spot beam coverage area 126. For example, a spot beam 125 associated with spot beam coverage area 126-c shown in FIG. 4B may be a composite of signals from the eight feed elements 128 associated with the native feed element pattern coverage areas 211-c shown with dark solid lines in FIG. 4A. In various examples, spot beams 125 with overlapping spot beam coverage areas 126 may be orthogonal in frequency, polarization, and/or time, while non-overlapping spot beams 125 may be non-orthogonal to each other (e.g., a tiled frequency reuse pattern). In other examples, non-orthogonal spot beams 125 may have varying degrees of overlap, with interference mitigation techniques such as ACM, interference cancellation, or space-time coding used to manage inter-beam interference. Although generally discussed as downlink spot beams 125 generated by applying appropriate beam weights to signals transmitted from the feed elements 128, spot beams 125 for receiving uplink communications may also be processed by way of beamforming.

Beamforming may be applied to signals transmitted via the satellite using OBBF or GBBF receive/transmit signal paths. For a forward link of the service coverage area 410, one or more access node terminals 130 may transmit respective forward uplink signals 132 to a communications satellite 120, which may then relay multiple forward downlink signals 172 to multiple user terminals 150 within the service coverage area 410. Thus, the communications service provided to spot beam coverage areas 126 illustrated in FIG. 4B may be based on the native antenna pattern coverage area 221-c of the antenna assembly as well as beam weights applied.

Although service coverage area 410 is illustrated as being provided via a substantially uniform pattern of spot beam coverage areas 126 (e.g., having equal or substantially equal beam coverage area sizes and amounts of overlap), in some examples spot beam coverage areas 126 for a service coverage area 410 may be non-uniform. For example, areas with higher population density may be served by smaller spot beams 125 while areas with lower population density may be served by larger spot beams 125. In some cases, adjacent spot beams 125 may substantially overlap with each other. For example, adjacent spot beams 125 may be configured to overlap at an area of high population density, therefore providing multiple options for serving a large number of users. Additionally or alternatively, multiple spot beams 125 of different sizes may be configured to serve an area, with only a subset of the spot beams 125 being active at a given time. Thus, communications for particular user terminals 150 may be assigned to spot beams 125 that can carry the communications with greater efficiency (e.g., supporting better modulation and coding rate, etc.).

FIGS. 5A-5E illustrate an example of locations of spot beam coverage areas 126 of a service coverage area 410-a during different communications service timeslots, in accordance with aspects of the present disclosure. In this example, the allocated spectrum is W Hz, and two polarizations (e.g., LHCP and RHCP) are available. At any instant of time, 40 spot beams 125 having associated spot beam coverage areas 126 may be active, 20 LHCP and 20 RHCP, although more or fewer spot beams 125 may be active in actual implementations. Each spot beam 125 may use the full W Hz of allocated spectrum, but only one polarization. In other embodiments, each spot beam 125 may use only a portion of the allocated spectrum. In the described example, a frame consists of Q=4 timeslots, although actual implementations may use frames with more or fewer timeslots. During each timeslot, the user receive and transmit spot beams 125 may reside at different locations. The hopping pattern may automatically repeat at the conclusion of each frame or a new frame definition may be applied to vary the hopping pattern.

Figure 5A:
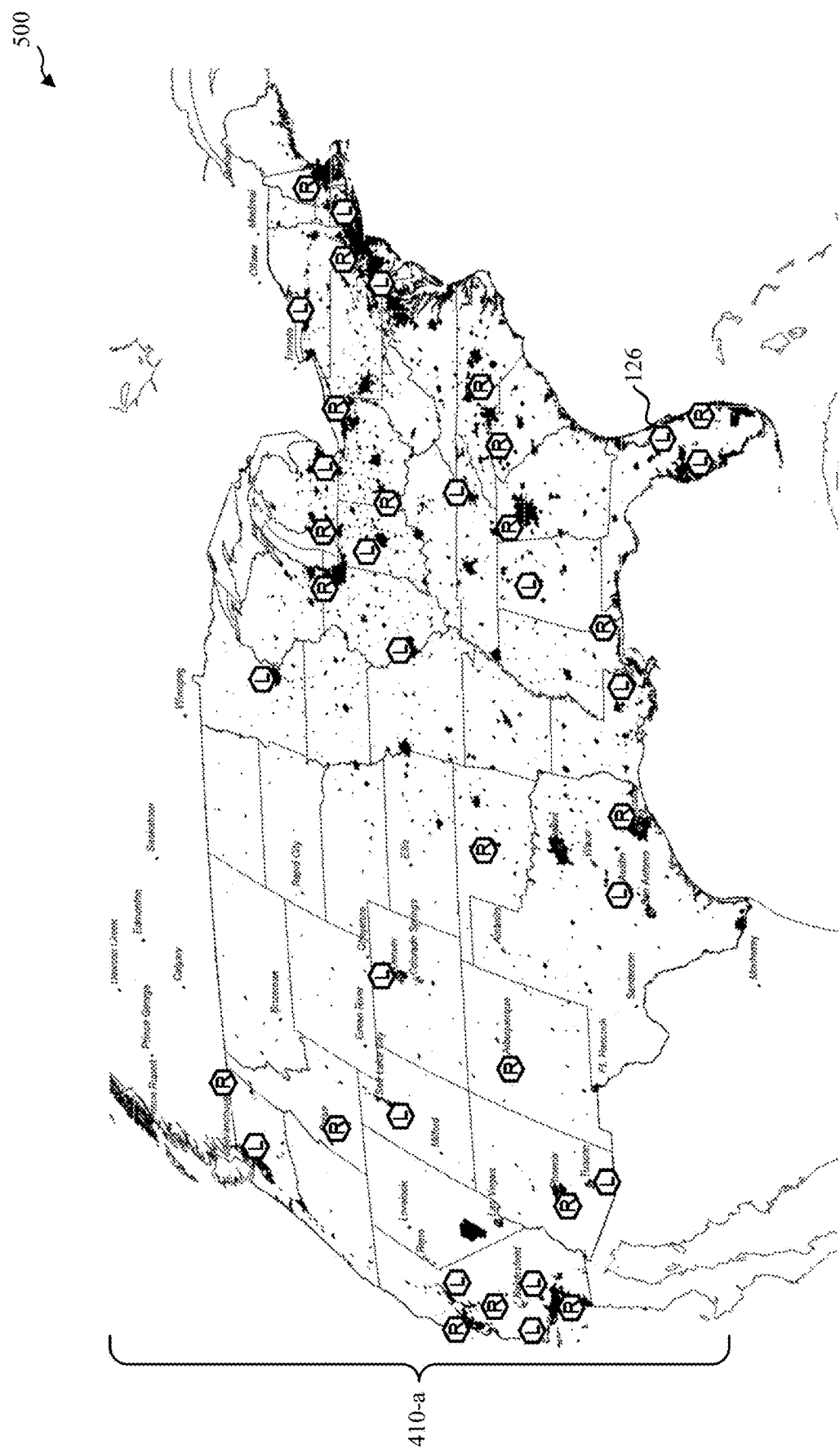
FIGS. 5A-5E illustrate an example of locations of spot beam coverage areas of a service coverage area during different communications service timeslots, in accordance with aspects of the present disclosure.
Figure 5B:
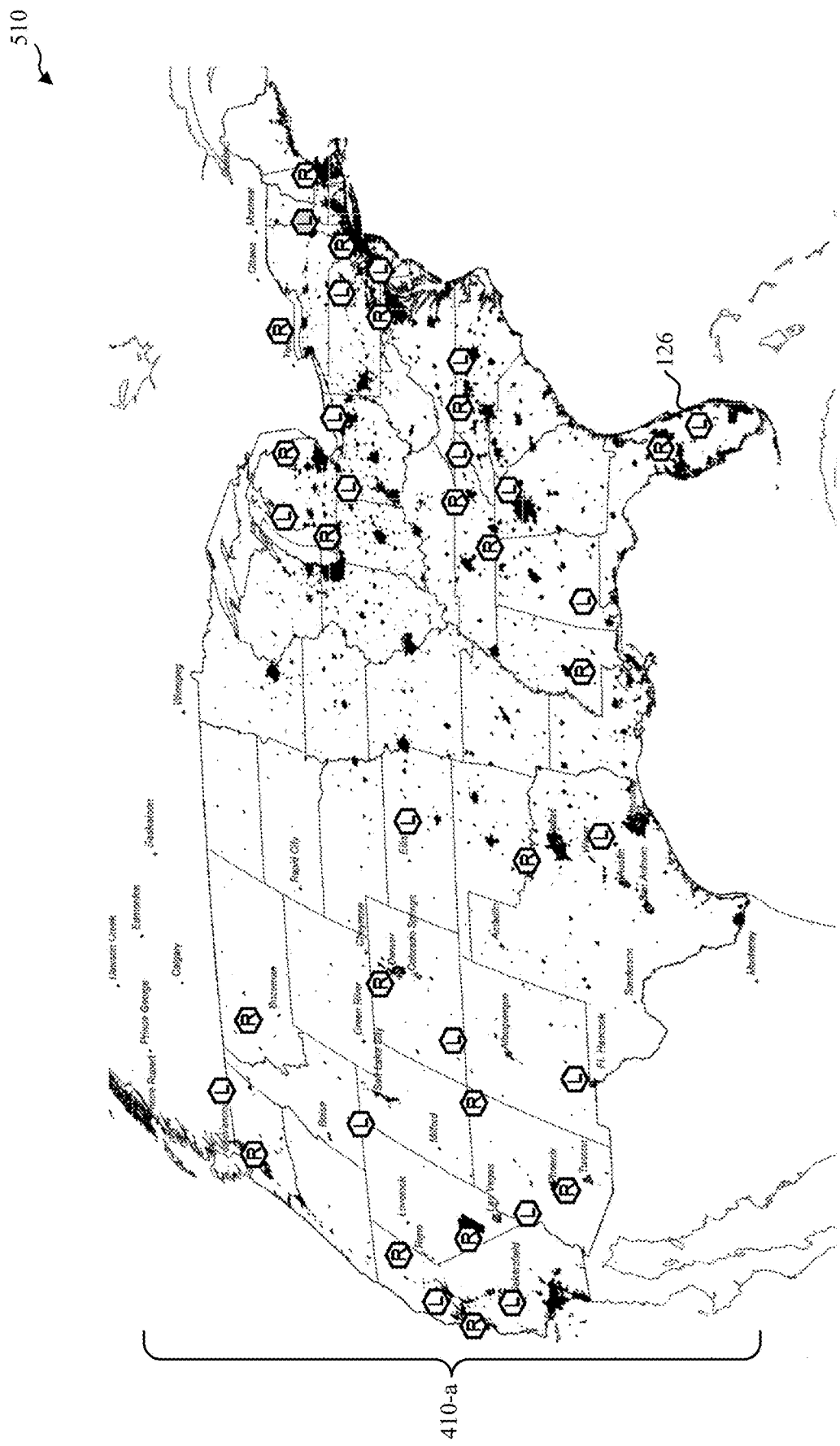
Figure 5C:
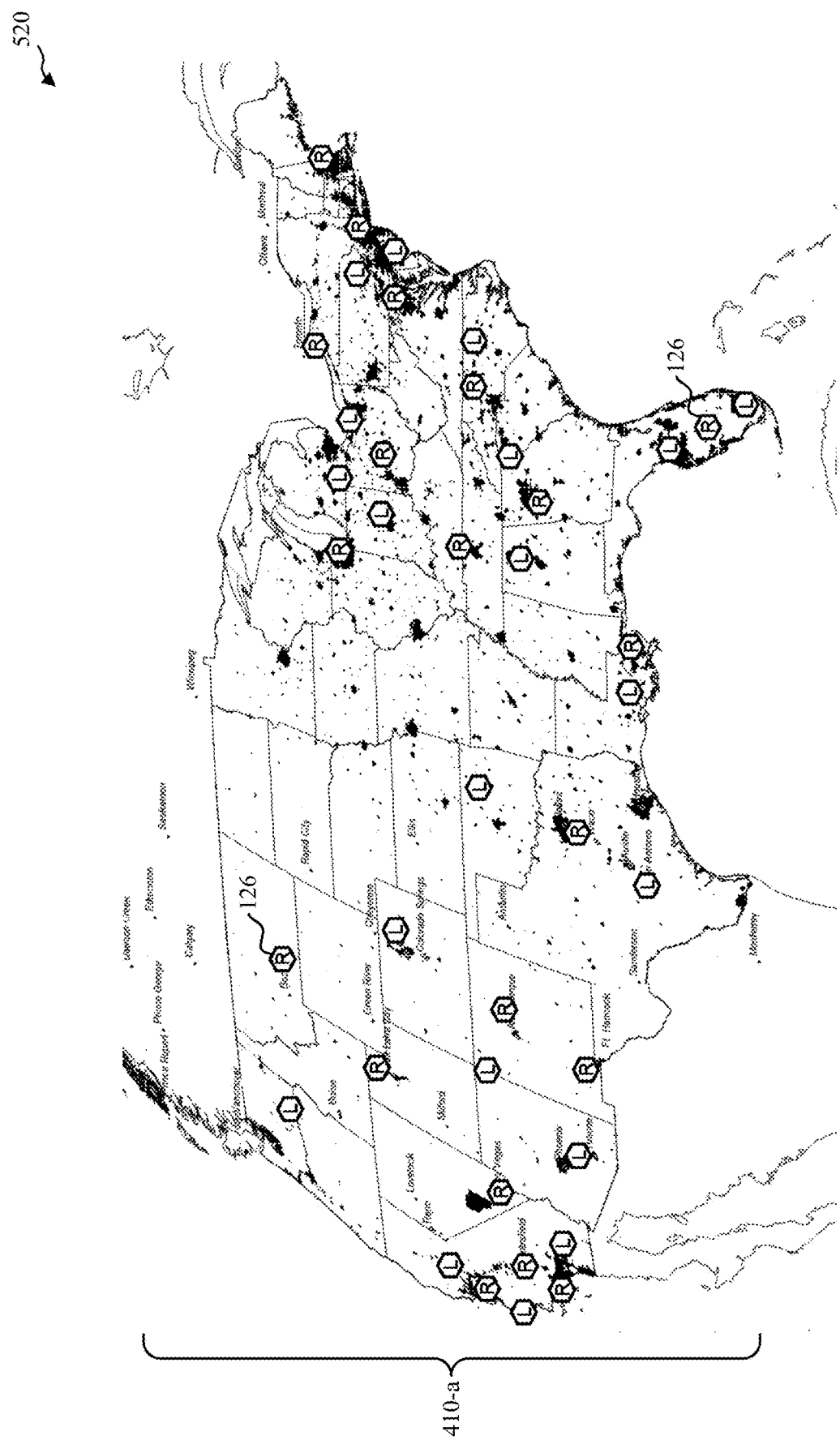
Figure 5D:
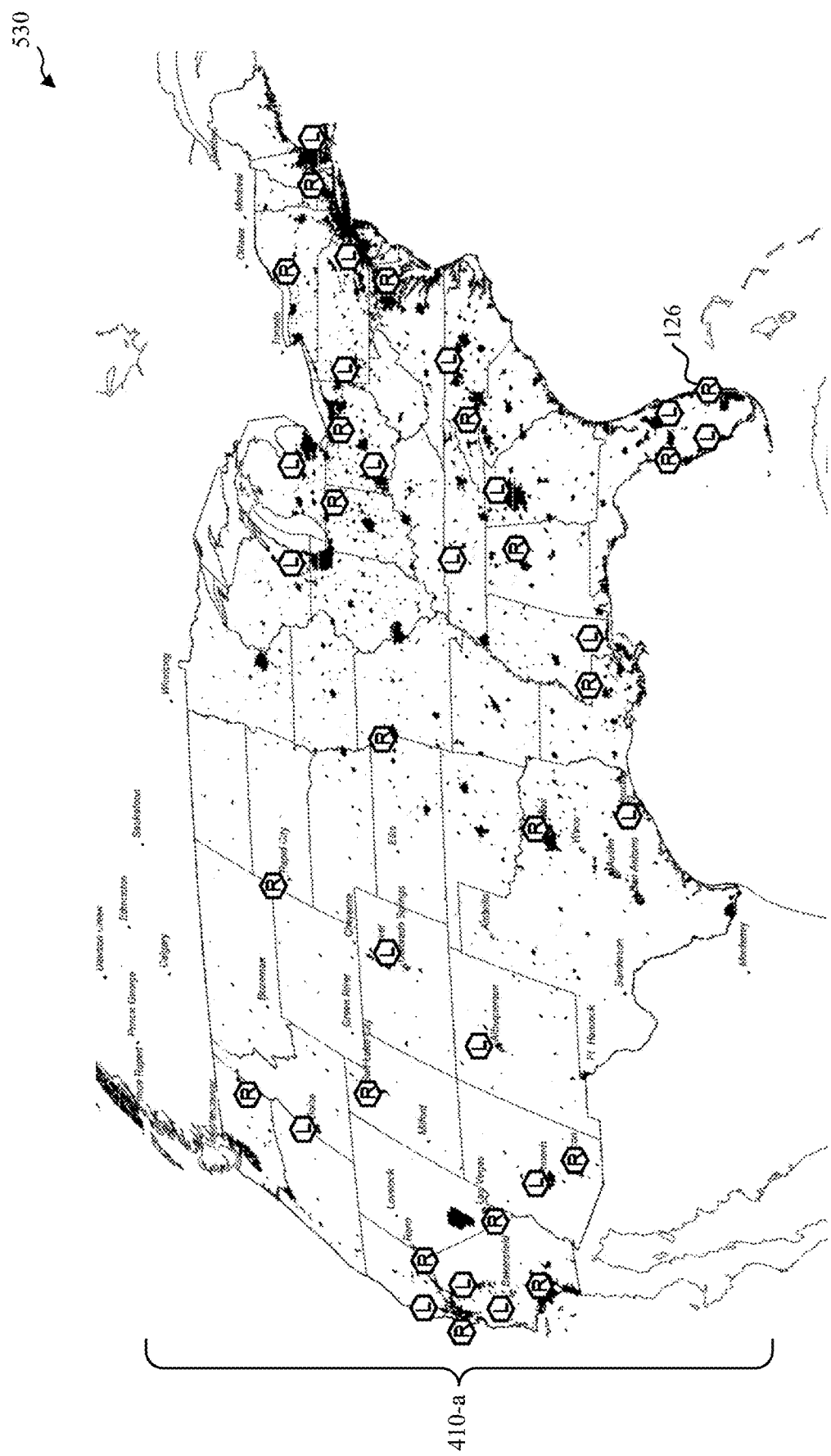

FIG. 5A includes beam map 500 showing exemplary locations of spot beam coverage areas 126 during the first timeslot of the frame. A spot beam coverage area 126 labeled with an "L" in the center indicates a LHCP spot beam 125 and a spot beam coverage area 126 labeled with an "R" indicates a RHCP spot beam 125, although any number of other polarizations (e.g., linear polarizations) may be used in other embodiments. Due to the small spot beam coverage area diameters, desired large spread of the service coverage area 410-a, and the relatively small number of spot beams 125 active at one time, beams that use the same polarization during a given timeslot may be spaced relatively far apart. This may lead to low interference levels between the spot beams 125. The resulting high carrier to interference ratio (C/I) may help to increase the capacity per spot beam 125. FIG. 5B includes beam map 510 showing exemplary locations of spot beam coverage areas 126 during the second timeslot of the frame. FIG. 5C includes beam map 520 showing exemplary locations of spot beam coverage areas 126 during the third timeslot of the frame. FIG. 5D includes beam map 530 showing exemplary locations of spot beam coverage areas 126 during the fourth timeslot of the frame. As described in more detail below, each spot beam coverage area 126 shown in FIGS. 5A-5D may be part of a dedicated receive pathway, a dedicated transmit pathway, or a hybrid transmit/receive pathway.

In each of the beam maps shown in FIGS. 5A-5D, spot beams 125 of the same polarization are generally spaced very far apart (e.g., at the maximum distance possible). This spacing enables large values of C/I by minimizing interference from other active spot beams of the same polarization. The selection of the actual locations for the spot beam coverage areas 126 may depend on such factors as a desired service coverage area 410, the diameter of various spot beam coverage areas 126, the number of polarizations used, and the number of timeslots per frame. FIGS. 5A-5D provide just one example.

Figure 5E:
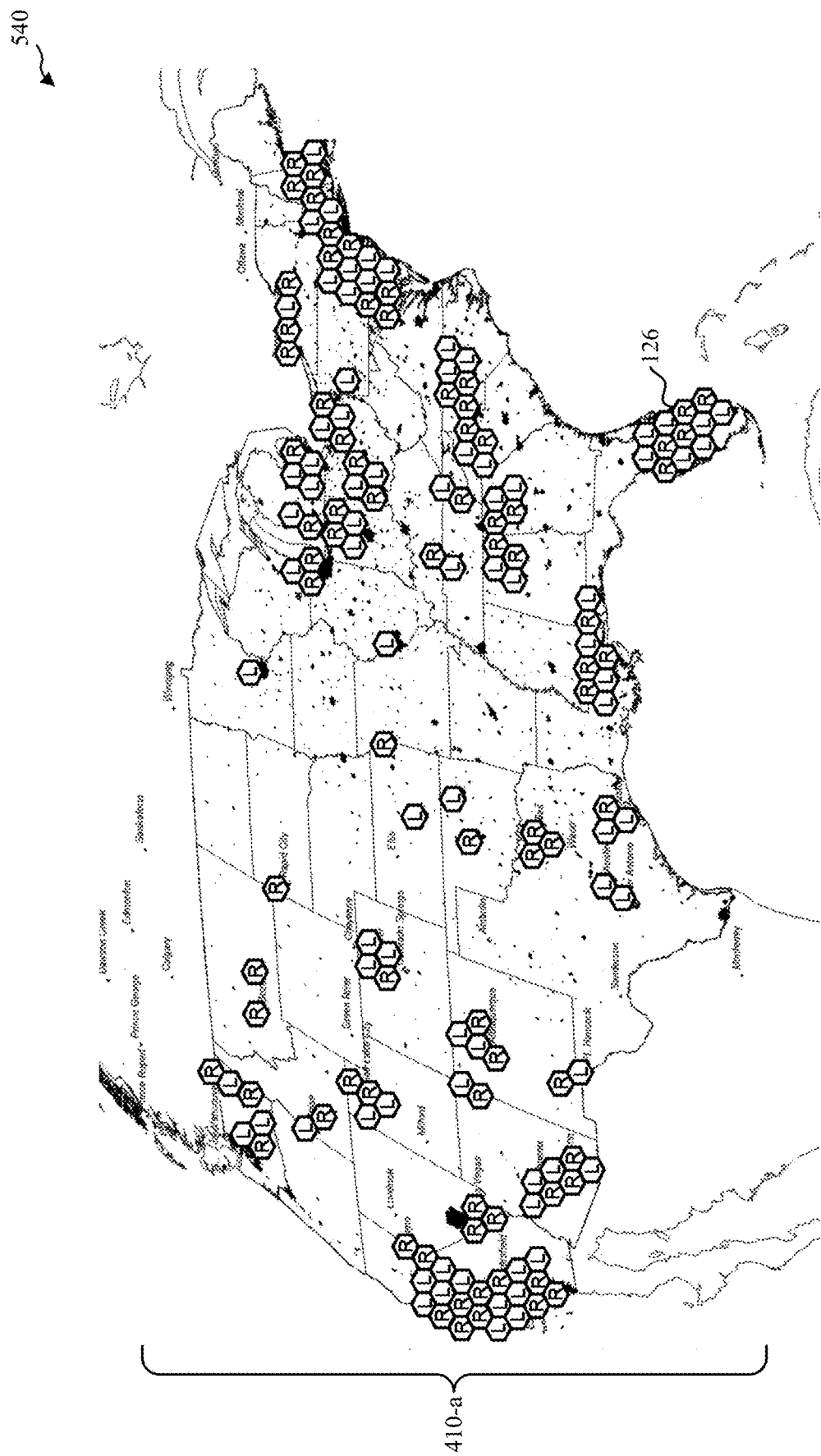

FIG. 5E includes beam map 540 showing a composite overlay of all the spot beam coverage areas 126 during all four timeslots (e.g., the service coverage area 410-a). Only spot beams 125 of the same timeslot in FIG. 5E are active at the same time. Only spot beams 125 of the same timeslot and the same polarization (e.g., LHCP or RHCP) present the potential for significant interference. As mentioned above, the location of these spot beam coverage areas 126 can be selected so as to maximize their spatial separation. Several geometric models may be used to maximize the separation of spot beams 125 of like polarizations.

Figure 6:
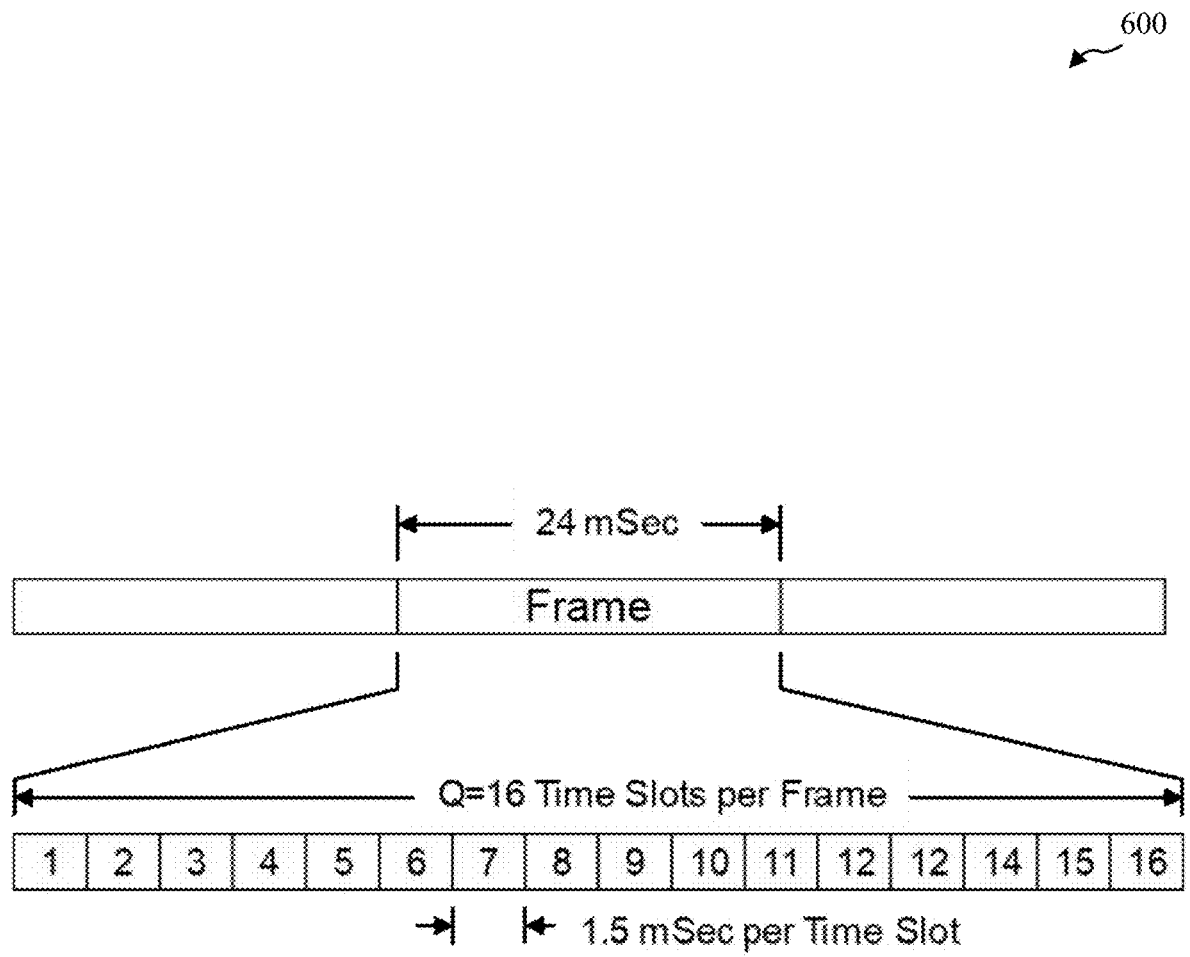
FIG. 6 shows an illustrative beam hopping frame, in accordance with aspects of the present disclosure.

FIG. 6 shows an illustrative beam hopping frame 600, in accordance with aspects of the present disclosure. In the depicted example, Q=16 timeslots per frame, and each timeslot occupies a 1.5 mSec interval resulting in a total beam hopping frame duration of 24 mSec. A spot beam 125, therefore, may be active in a given spot beam coverage area 126 for a minimum of 1.5 mSec or 1 timeslot, although a spot beam 125 may be active in the same cell for more than 1 consecutive timeslot depending on the timeslot definitions included in the beam hop frame definition. In some embodiments, a single region within the service coverage area 410, denoted a cell, might only have one active spot beam 125 on the region for one timeslot in the beam hopping frame. The length of the beam hopping frame, therefore, may represent the potential waiting duration before information can be transmitted or received. It may be desirable to use this architecture for low latency applications, such as voice, so this hopping frame delay should be made insignificant relative to other unavoidable delays. For example, for a satellite in a Geo-Synchronous Orbit (GSO), the one-way path delay (e.g., signal propagation delay) is approximately 250 mSec and is an unavoidable delay. Therefore, selection of a beam hopping frame length approximately 1/10 this value or less renders the framing delay insignificant relative to the unavoidable one-way path delay. Thus for a GSO satellite a frame size on the order of 25 mSec is generally adequate. Shorter frame sizes may not significantly change the total delay experienced, as it is dominated by the one-way path delay, and will generally result in more overhead and increased complexity due to the fact that the spot beams 125 are hopping faster. Thus, a beam hopping frame size of approximately 25 mSec is suitable for most applications.

In other embodiments, more than one spot beam 125 may be active in a cell during a single frame. For example, regions or cells may be assigned priorities indicative of the maximum acceptable delay for supported applications with the region or cell. Assigned priorities may then be used, at least in part, to determine the number of active spot beams 125 in a particular region or cell per frame. For example, to support higher bandwidth or lower latency applications within a region or cell, the region or cell may be assigned a higher priority than a region or cell supporting lower bandwidth or higher latency applications. Cells or regions assigned higher priorities may have more than one active spot beam 125 covering that cell or region in a single frame. Any number of priorities may be defined corresponding to any number of active spot beams 125 for an individual cell per frame. A single cell may have a maximum of Q transmit spot beams 125 and Q receive spot beams 125 active in that cell in a single frame (e.g., beams are active in the cell during all timeslots). In some embodiments, a transmit spot beam 125 and a receive spot beam 125 may be active in the same cell during the same timeslot, allowing for both transmission and reception of data in the same timeslot.

Figure 7:
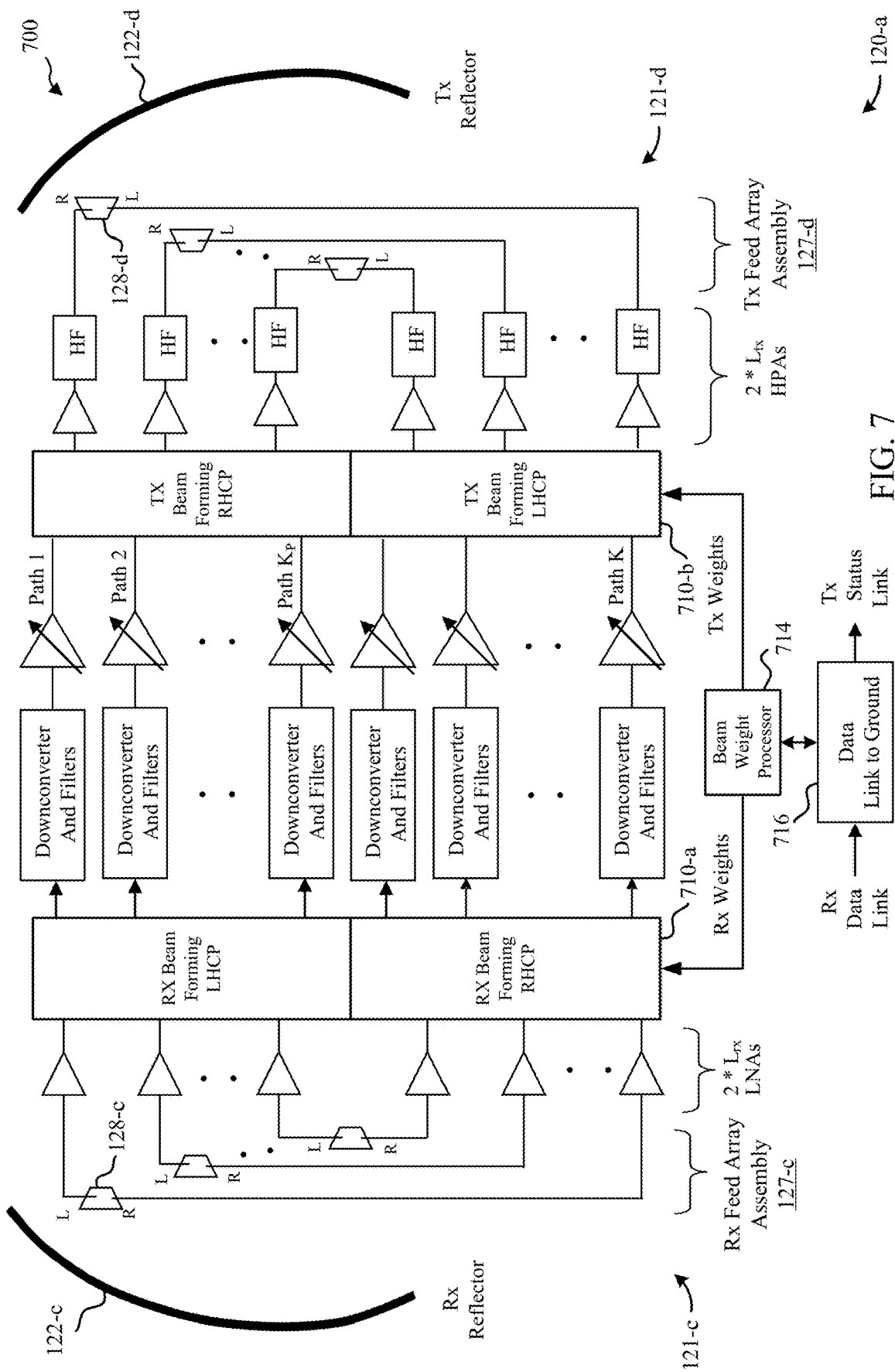
FIG. 7 shows a block diagram for part of exemplary satellite architecture, in accordance with aspects of the present disclosure.

FIG. 7 shows a block diagram for part of exemplary satellite architecture 700, in accordance with aspects of the present disclosure. The satellite architecture 700 includes a satellite 120-a with a first antenna assembly 121-c and a second antenna assembly 121-d, each with respective feed array assemblies 127 having a plurality of antenna feed elements 128. Antenna feed elements 128 are shown for both LHCP and RHCP to support multiple polarizations. In some embodiments (not shown), a satellite architecture may support only a single polarization. In other embodiments, a satellite architecture may operate with a single polarization although it supports multiple polarizations.

Two separate antenna assemblies 121-c and 121-d are used in the exemplary satellite architecture 700, one for Rx (e.g., antenna assembly 121-c) and one for Tx (e.g., antenna assembly 121-c), but an integrated Tx/Rx antenna assembly 121 could also be used. Each antenna assembly includes a reflector 122, which is illuminated by a respective feed array assembly 127 (e.g., a phased array) consisting of L feed elements 128 in the feed array assembly 127. Satellite architecture 700 uses a phased array fed reflector as its antenna system, but Direct Radiating Array (DRA) or any other type of phased array based antenna assembly 121 that uses a beamforming network may be used in other embodiments. The Rx antenna assembly 121-c includes a feed array assembly 127-c having $L_{rx}$ feed elements 128-c in the phased array, and the output of each feed element port (e.g., feed element Rx signals) may be connected to a Low Noise Amplifier (LNA). Each LNA may be located near the associated feed element 128-c to minimize the system noise temperature. Ideally, the LNAs may be attached directly to the feed elements 128-c, which will yield an optimal noise figure. The output of each of the $2 \times L_{rx}$ LNAs is routed to Rx beamforming network (BFN) 710-a, which is composed of both LHCP and RHCP sections. Since the system noise figure is essentially set by the LNAs, Rx BFN 710-a can be located away from the LNAs with an interconnection of, for example, coaxial cable or a waveguide. Rx BFN 710-a may take the $2 \times L_{rx}$ inputs and provide K output signals, each corresponding to one of the K Rx spot beams 125. Rx BFN 710-*a* may operate at the Rx frequency and provide no frequency translation, in this example.

The K outputs of Rx BFN 710-*a* from both the LHCP and RHCP sections may be fed through K signal pathway hardware sections. In some embodiments, the same number of pathways are used for each available polarization (e.g., LHCP and RHCP), although in general there may be a different number of pathways connected to the received signals of each polarization. Each pathway of the bent-pipe architecture typically consists of a frequency conversion process, filtering, and selectable gain amplification. Other forms of processing (e.g., demodulation, remodulation, or remaking of the received signals, like in a "regenerative" system) are not performed when using a bent-pipe architecture. In a bent-pipe architecture, the frequency conversion may be required to convert the spot beam signal at the uplink frequency to a separate downlink frequency, for example. The filtering generally consists of pre-filtering before the downconverter and post-filtering after the downconverter and is present to set the bandwidth of the signal to be transmitted as well as to eliminate undesired mixer intermodulation products. The selectable gain channel amplifier may provide independent gain settings for each of the K pathways in the example of FIG. 7.

Tx BFN 710-*b*, which may include both LHCP and RHCP sections, may generate $2 \times L_{tx}$ outputs from the K pathway output signals. In some embodiments, the pathway output signals that derive from an LHCP receive spot beam 125 may be output on a RHCP transmit spot beam 125, and vice versa. In other embodiments, the pathway output signals that derive from an LHCP receive spot beam 125 may be output on a LHCP transmit spot beam 125. Tx BFN 710-*b* may operate at the Tx frequency and may provide no frequency translation in this example. The outputs of Tx BFN 710-*b* are routed to $2 \times L_{tx}$ high power amplifiers (HPAs). The harmonic filters (HF) connected to the output of each HPA may perform low pass filtering to provide suppression of the $2^{nd}$ and higher order harmonics, for example, from the output of the HPAs. The output of the harmonic filters (e.g., feed element Tx signals) may then be input to the $2 \times L_{tx}$ feed elements 128-*d* in the Tx feed array assembly 127-*d*. Each HPA and harmonic filter may be located close to the associated Tx feed element 128-*d* to minimize the losses. Ideally, the HPA/HFs may be attached directly to the Tx feed elements 128-*d*, which may yield an optimal radiated power.

As shown in FIG. 7, separate reflectors (e.g., reflectors 122-*c* and 122-*d*), and separate feed array assemblies (e.g., feed array assemblies 127-*c* and 127-*d*) may be used for the Tx and Rx spot beams 125. However, as described above, in some embodiments a single reflector 122 and a single feed array assembly 127 may be used to perform both Tx and Rx functions. In these embodiments, each feed element 128 may include two ports, one for Tx and one for Rx. For a system using two polarizations (e.g., RHCP and LHCP), a 4-port feed element (2 for Tx and 2 for Rx) may be included. To maintain acceptable Tx to Rx isolation, such a single reflector 122 approach may also employ diplexers or other filtering elements within some or all of the feed elements 128. These filtering elements may pass the Rx band while providing suppression in the Tx band. The increased number of feed elements 128 and the phase matching requirements for the BFNs 710 can make this approach more complex to implement but may reduce costs associated with multiple reflectors 122 and multiple feed array assemblies 127.

In some embodiments, Rx BFN 710-*a*, Tx BFN 710-*b*, or both, may use time-varying beam weight sets to hop receive spot beam coverage area locations, transmit spot beam coverage area locations, or both, around over time. These beam weight sets may be stored in Beam Weight Processor (BWP) 714. BWP 714 may also provide the control logic to generate the proper beam weights at the proper times. BWP 714 may be connected to the ground via bi-directional data link 716, which can be in-band with the traffic data or out-of-band with its own antenna assembly 121 and transceiver. Bi-directional data link 716 is shown as bi-directional in the example of FIG. 7 to assure that the correct beamforming weight sets have been received by BWP 714. As such, error detection and/or correction techniques, including retransmission requests, may be supported using the bi-directional link. In other embodiments, a uni-directional link is used with error detection and/or correction. In some embodiments, an initial beamforming weight set can be loaded into the memory of BWP 714 before launch.

Data link 716 may be used, for example, to receive pre-computed beam weights and deliver such weights to BWP 714. In some embodiments, the beam weights are generated on the ground at a network device 199 such as a network management entity or a Network Operational Center (NOC). The desired locations of each of the K Tx and Rx beams, along with the native feed element patterns 210, may be used to generate the beam weight values. There are several techniques for generating appropriate beam weights given the desired spot beam coverage area locations. For example, in one approach, beam weights may be generated on the ground in non-real time. The dynamic weights may then be uploaded to BWP 714 through data link 716, and then applied to the BFNs in a dynamic manner to produce hopping beams on both the Rx uplink and the Tx downlink.

The downlink portion of data link 716 may be used to report the status of the BFNs 710 and to provide confirmation of correct reception of the uplinked beam weights. Correct reception of the beam weight sets can be determined by use of a traditional CRC code, for example. In the event of incorrect reception, as indicated by a failure of the CRC to check, for example, the uplink transmission of the beam weight sets (or the portion of the beam weight sets that was deemed incorrect or invalid), may be retransmitted. In some embodiments, this process may be controlled by an automatic repeat request ARQ retransmission protocol (such as, for example, selective repeat ARQ, stop-and-wait ARQ, or go-back-N ARQ, or any other suitable retransmission, error detection, or error correction protocol) between the ground station and BWP 714.

In general, satellite architecture 700 provides for K generic hopping pathways. Each pathway functionally consists of an Rx spot beam 125 and a Tx spot beam 125, connected together through electronics and circuitry that provide signal conditioning, such as one or more of filtering, frequency conversion, amplification, and the like. The pathways may each be represented as bent pipe transponders that can be used in a hub-spoke configuration or a mesh configuration. For example, in one embodiment with a mesh configuration, a pathway carries signals between a first plurality of terminals and a second plurality of terminals via the satellite. In accordance with the systems and methods described herein, the termination points (e.g., the Tx spot beam coverage area location and Rx spot beam coverage area location) for each pathway may be dynamic and programmable, resulting in a highly flexible satellite communications architecture.

Figure 8:
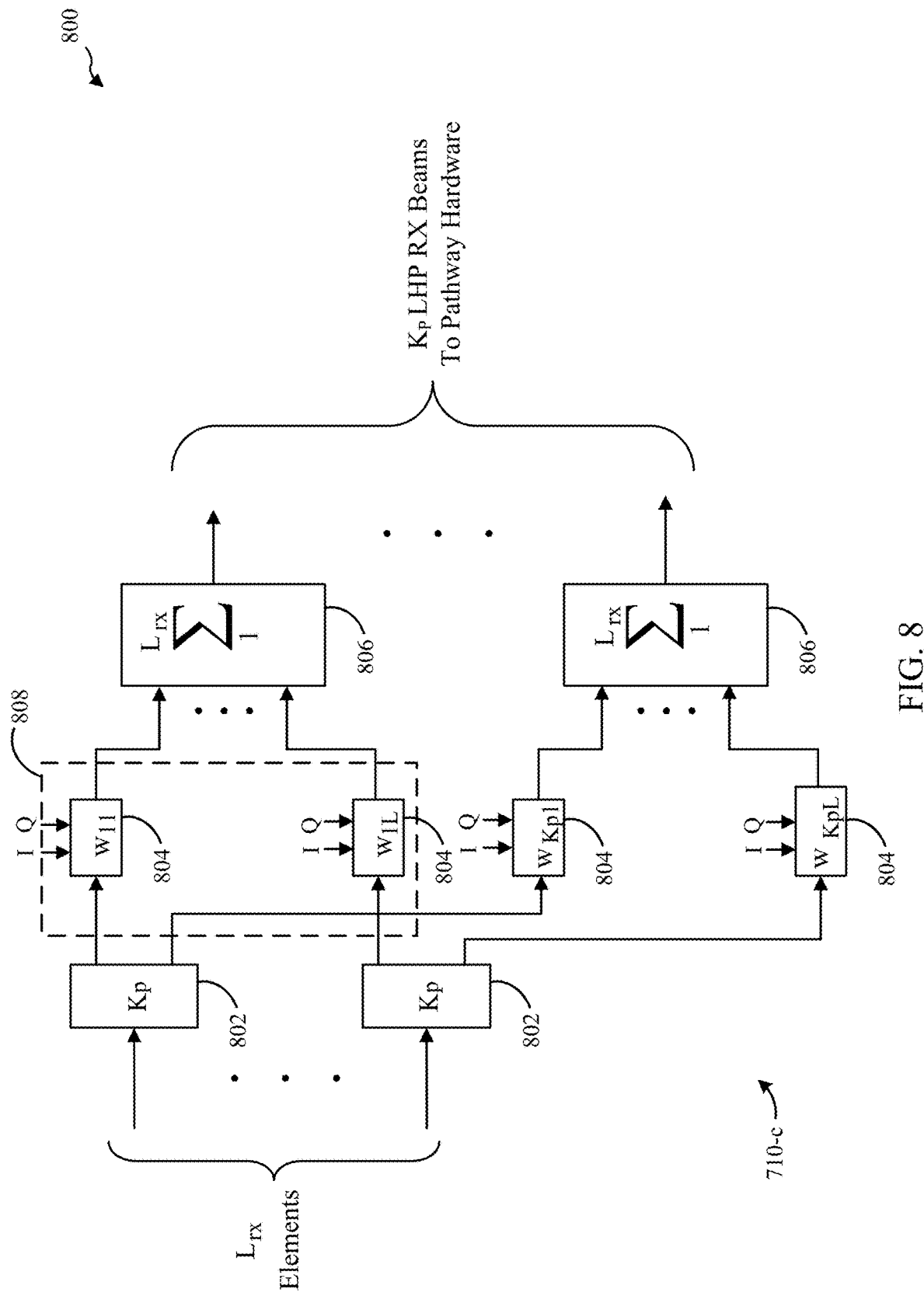
FIG. 8 shows block diagram of one polarization of an exemplary receive beamforming network, in accordance with aspects of the present disclosure.

FIG. 8 shows block diagram 800 of one polarization of an exemplary Rx BFN 710-*c*, in accordance with aspects of the present disclosure. The receive BFN 710-*c* may take in feed element Rx signals from $L_{rx}$ feed elements 128 and provides the spot beam signals of $K_p$ LHCP and RHCP formed spot beams 125 as outputs. In this example, there are $K_p=K/2$ LHCP receive spot beams 125 and K/2 RHCP receive spot beams 125 although different numbers of receive spot beams 125 of each polarization may be used in other embodiments.

Each feed element Rx signal from a feed element 128 is first split, via splitters 802, into K identical copies, one for each spot beam 125. Then $K_p$ parallel beamformers are realized. Each beamformer may include, among other components, amplitude and phase adjustment circuitry 804 and summer 806. Each instance of amplitude and phase adjustment circuitry 804 may take an input signal from one of the $L_{rx}$ splitters and provide an amplitude and phase adjustment to the signal (e.g., via receive beam weights of a receive beamforming weight vector associated with an Rx spot beam 125). The $L_{rx}$ amplitude and phase adjusted signals may then be summed using summer 806 to produce the spot beam signal from one formed spot beam 125. Each Rx spot beam signal may then be fed into one of $K_p$ independent signal pathways as discussed herein. The beamforming vector coefficients used to create the Rx spot beam signal of pathway 1 of the antenna assembly 121 are shown by dashed line 808 in FIG. 8.

The process of adjusting the amplitude and phase of the signals may be mathematically described as the multiplication of the complex base band representation of the signal by a complex number (e.g., a complex weight). Letting the complex number be represented as w=I+jQ, the magnitude of w is the amplitude adjustment and the phase of w is the phase adjustment. In practice the amplitude and phase adjustment can be realized in a number of ways. Two common techniques in phased array antenna assemblies 121 are vector multiplier circuits that take as an input the I and Q values, and circuits that have independent phase and amplitude adjustment mechanisms and take as input the desired amplitude and phase adjustments. One should recognize I+jQ as the rectangular coordinates of the complex number, w, and Amplitude/Phase as the polar coordinates of the complex number, w. Rx BFN 710-c may provide dynamic (changing) and programmable complex beam weight values on each of the K beamformers in both halves of the Rx BFN 710-c. In practice, a Rx BFN 710-c may generally have amplification stages within the Rx BFN structure to account for some or all of the insertion losses of the devices used to perform the Rx BFN functions (e.g., splitting, weighting, and combining).

The signal processing of the Rx BFN 710-c may be carried out in the analog and/or digital signal domain. For example, when signal processing is carried out by the Rx BFN 710-c in the digital domain, the Rx BFN 710-c may include one or more analog-to-digital converters (e.g., converting the $L_{rx}$ feed element Rx signals to the digital domain). In other examples, each of the feed elements 128 may be associated with its own analog-to-digital converters that provides a digital signal to the Rx BFN 710-c. In various examples that include digital domain processing, the pathway hardware may provide spot beam signals in the digital domain, or may include one or more digital-to-analog converters to convert the spot beam signals of the pathway hardware into the analog domain. In other examples, the signal processing of the Rx BFN 710-c may be carried out entirely in the analog domain, such that the $L_{rx}$ feed element signals are received in the analog domain, and processed signals remain in the analog domain through the pathway hardware that provides the spot beam signals in the analog domain.

Figure 9:
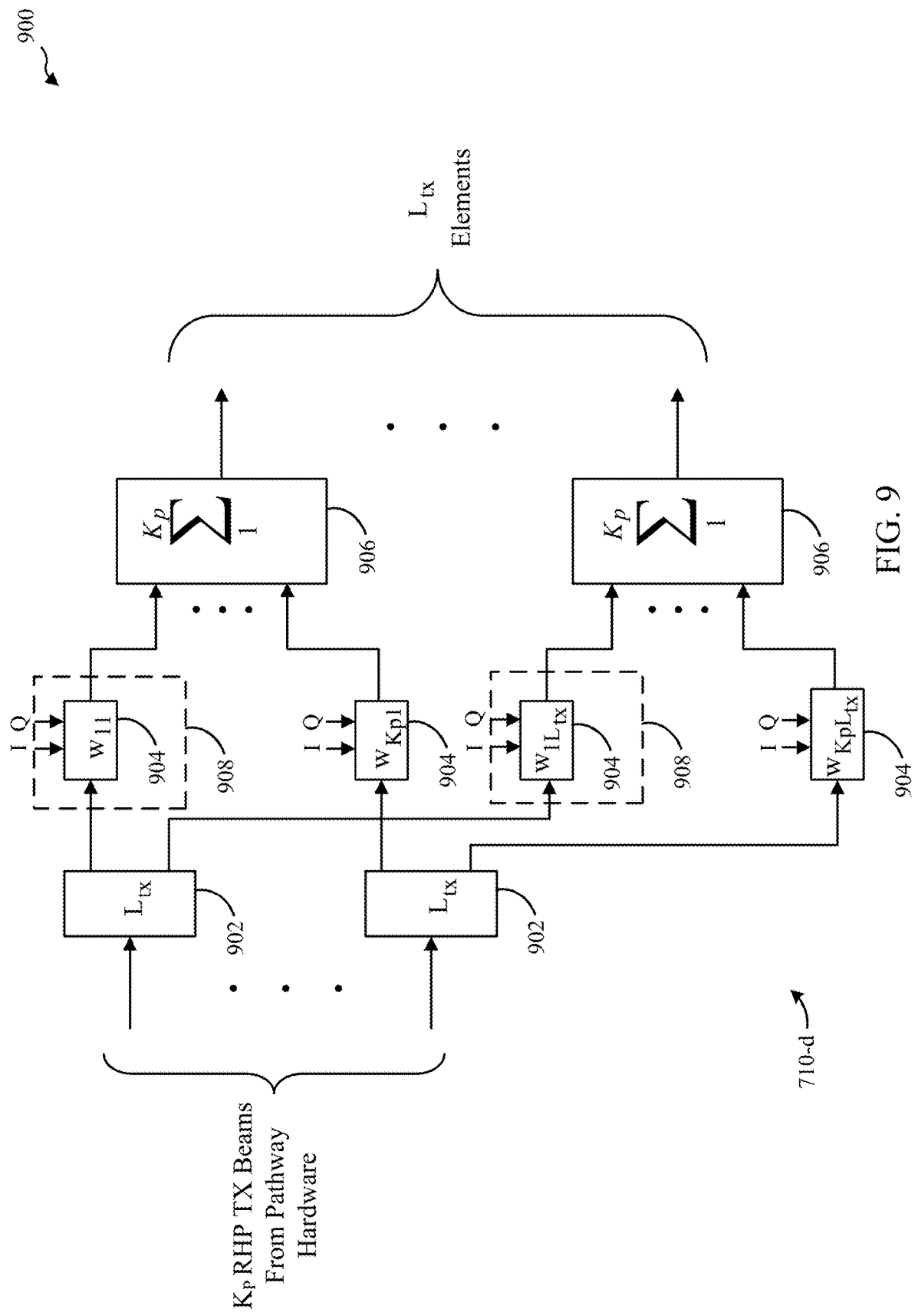
FIG. 9 shows block diagram of one polarization of an exemplary transmit beamforming network, in accordance with aspects of the present disclosure.

FIG. 9 shows block diagram 900 of one polarization of an exemplary Tx BFN 710-d, which may be referred to as a feed forming network (FFN), in accordance with aspects of the present disclosure. The Tx BFN 710-d takes in signals from $K_p$ signal pathways (e.g., K/2 LHCP and K/2 RHCP pathways) and provides feed element Tx signals to each of the $L_{tx}$ feed elements 128. Each input signal from a pathway is first split, via splitters 902, into $L_{tx}$ identical copies, one for each feed element 128. Then $L_{tx}$ parallel "feed formers" are realized. Each feed former may include amplitude and phase adjustment circuitry 904 and summer 906. Amplitude and phase adjustment circuitry 904 may take an input spot beam signal from one of the $K_p$ splitters, and provide an amplitude and phase adjustment (e.g., via transmit beam weights of a transmit beam weight vector associated with a Tx spot beam 125). The $L_{tx}$ amplitude and phase adjusted feed element Tx component signals are then summed using summer 906 to produce the feed element Tx signal for transmission by one feed element 128.

The process of adjusting the amplitude and phase of the signal may be mathematically described as multiplication of the complex base band representation of the signal by a complex number (e.g., a complex weight). Letting the complex number be represented as w=I+jQ, the magnitude of w is the amplitude adjustment and the phase of w is the phase adjustment. In practice, the amplitude and phase adjustment can be realized a number of ways (e.g., as described above with regard to FIG. 8). The first and last beamforming vector coefficients used to form the Tx spot beam 125 of pathway 1 of the satellite are shown by dashed line 908. The remaining coefficients are not explicitly shown in the example of FIG. 9.

The signal processing of the Tx BFN 710-d may be carried out in the analog and/or digital signal domain. For example, when signal processing is carried out by the Tx BFN 710-d in a digital domain, the Tx BFN 710-d may include one or more analog-to-digital converters (e.g., converting the K spot beam signals to the digital domain). In other examples, each of the K spot beam signals may be provided by the pathway hardware to the Tx BFN 710-d as a digital signal. In various examples that include digital domain processing, the Tx BFN 710-d may provide the $L_{tx}$ feed element Tx signals in the digital domain (e.g., to be converted to an analog signal at a respective feed element 128 by an associated digital-to-analog converter), or may include one or more digital-to-analog converters to convert the feed element Tx signals into the analog domain. In other examples, the signal processing of the Tx BFN 710-d may be carried out entirely in the analog domain, such that the K spot beam signals are received in the analog domain, and processed signals remain in the analog domain through the beamforming hardware that provides the $L_{tx}$ feed element signals in the analog domain.

As described above with regard to the Rx BFN 710-c, the Tx BFN 710-d may provide dynamic (changing) and programmable complex beam weight values on each of the K feed formers in the Tx BFN 710-d. In practice, the Tx BFN 710-d will also have amplification stages within the Tx BFN structure to make up for some or all of the insertion losses of the devices used to perform the Tx BFN functions (e.g., splitting, weighting, and combining).

Figure 10:
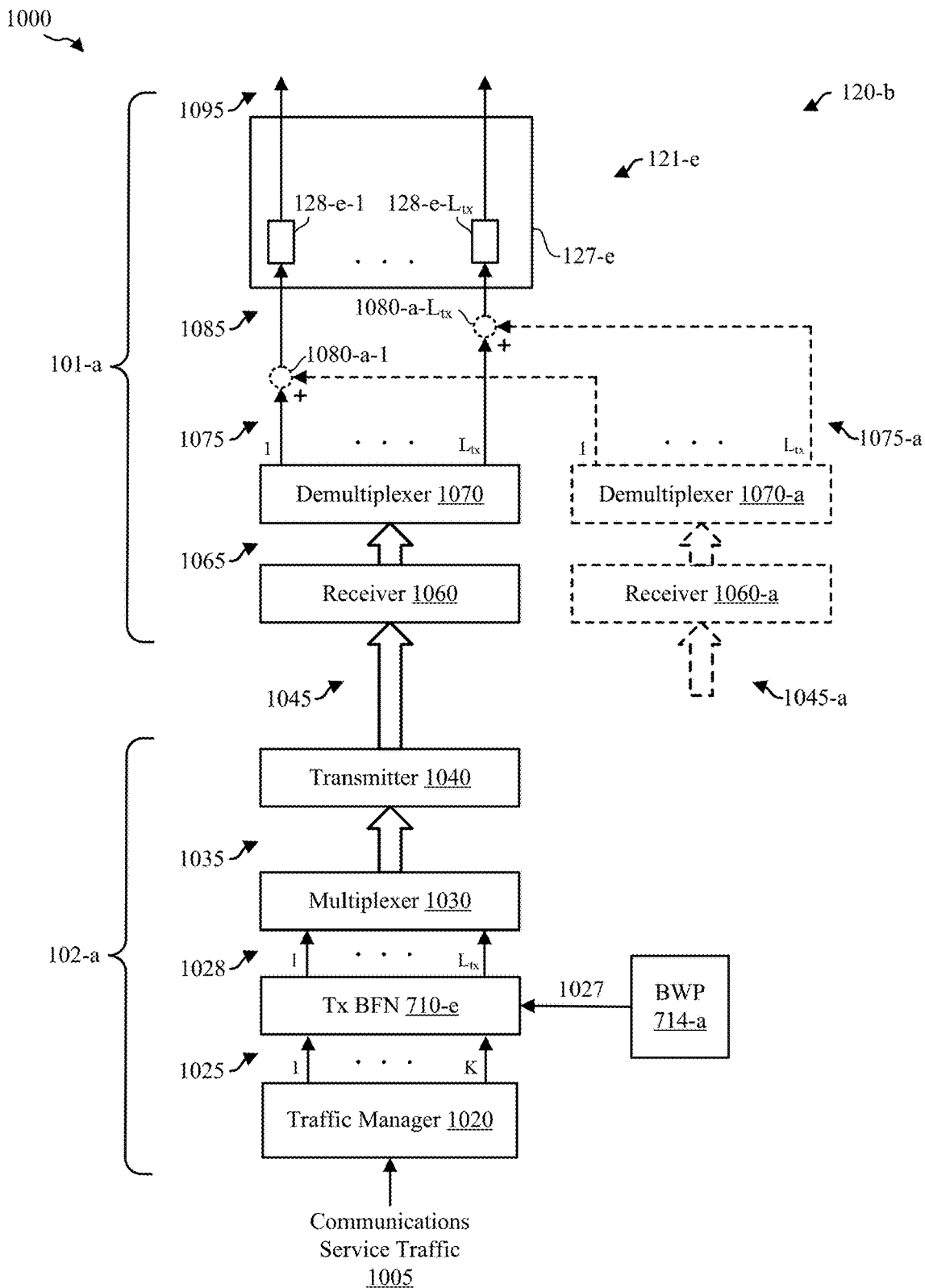
FIG. 10 shows a block diagram of an illustrative system for ground-based beamforming for forward link signal transmission, in accordance with aspects of the present disclosure.

FIG. 10 shows a block diagram of an illustrative system 1000 for GBBF for forward link signal transmission, in accordance with aspects of the present disclosure. The components of the system 1000 may be distributed between a ground segment 102-a (e.g., including access node terminal(s) 130, network device(s) 141, etc.) and a space segment 101-*a* (e.g., including communications satellite(s) 120-*b*), and illustrate an example of implementing a transmit beamforming network at a ground segment.

The ground segment 102-*a* of the system 1000 may receive, as an input, communications service traffic 1005 that is destined for one or more user terminals 150. The communications service traffic 1005 may be received from one or more networks 140, from one or more network devices 141, and/or one or more access node terminals 130. The communications service traffic 1005 may be provided to one or more traffic managers 1020, which may allocate portions of the communications service traffic 1005 to one or more spot beams 125. The traffic manager 1020 may have location information for the target devices and may assign portions of the communications service traffic 1005 to spot beams 125 based on the locations of the intended target device (e.g., the target user terminal(s) 150) relative to the spot beam coverage areas 126 (e.g., assigning communications service traffic 1005 for a given target device to a spot beam 125 for which the given target device is located within the corresponding spot beam coverage area 126). In various examples, the ground segment 102-*a* of the system 1000 may have a traffic manager 1020 for all communications service traffic 1005 (e.g., in a network management entity or other network device 141), or the ground segment 102-*a* of the system 1000 may have a distributed plurality of traffic managers 1020 (e.g., co-located with a plurality of access node terminals 130).

The traffic manager 1020 generates K Tx spot beam signals 1025 containing the portions of the communications service traffic 1005 destined for the various target devices, where K may be the number of spot beams 125 simultaneously supported by the system 1000. The Tx spot beam signals 1025 may be provided by separate digital or analog hardware pathways (e.g., the K signal pathway hardware section as described with reference to FIG. 7), or may be logical channels embodied in software. The Tx spot beam signals 1025 may be provided to a Tx BFN 710-*e*, which may be co-located with the traffic manager 1020 (e.g., at a network device 141 or an access node terminal 130 including the traffic manager 1020), or may be located at another device of the ground segment 102-*a* (e.g., a transmitting access node terminal 130 that does not include the traffic manager 1020).

The Tx BFN 710-*e* may be an example of Tx BFNs 710 as described herein, and be coupled between the K spot beam signal pathways and a transmitting device such as an access node terminal 130. The Tx BFN 710-*e* generates $L_{tx}$ feed element component signals 1028, where $L_{tx}$ may be the number of antenna feed elements 128 used by the communications satellite 120-*b* to support forward link transmissions of the communications service. Tx BFN 710-*e* may receive a beamforming weight set 1027 from a BWP 714-*a*, and apply beam weights to the received Tx spot beam signals 1025 to generate the feed element component signals 1028 that will be used to form the respective spot beams 125. BWP 714-*a* may provide beamforming weight set 1027 according to any of the techniques described herein, including applying beam weights according to time slots of a beam hopping configuration, adjustments according to a native antenna pattern, adjustments according to an orbital position of the communications satellite 120-*b*, and combinations thereof.

The process of applying beam weights to generate the respective feed element component signals 1028 may be similar to the process for generating feed element Tx signals described with reference to FIG. 9. However, because the feed element component signals 1028 are not directly transmitted by feed elements of the ground segment 102-*a*, the feed element component signals 1028 are not required to have the same characteristics (e.g., frequency, polarization, time synchronization, etc.) as those that are transmitted by a communications satellite 120-*b* of the space segment 101-*a*. Rather, the feed element component signals 1028 need only to be formatted in a manner that may be later used to generate feed element Tx signals transmitted by the communications satellite 120-*b* of the space segment 101-*a* (e.g., feed element Tx signals 1085).

The feed element component signals 1028 may be provided to a multiplexer 1030, which may combine the feed element component signals 1028 to generate a multiplexed uplink signal 1035. The multiplexer 1030 may be co-located with the Tx BFN 710-*e* (e.g., at a network device 141 or an access node terminal 130), or may be located at another transmitting device of the ground segment 102-*a* (e.g., a transmitting access node terminal 130). The feed element component signals 1028 may be combined by frequency-division multiplexing, time-division multiplexing, code-division multiplexing, or any other form of multiplexing that supports communication of the information of feed element component signals 1028 in a separable manner. The multiplexed uplink signal 1035 may be provided to a transmitter 1040 of the ground segment 102-*a*, which may be an example of an access node terminal antenna system 131 described with reference to FIG. 1. The transmitter 1040 transmits the multiplexed uplink signal 1035 in a feeder uplink signal 1045 (e.g., via an access node terminal antenna 131, etc.) to the communications satellite 120-*b*.

The communications satellite 120-*b* receives, via an antenna (e.g., an antenna assembly 121 or another type of antenna), the feeder uplink signal 1045 at a receiver 1060. Receiver 1060 may perform various operations including demodulation, down-conversion (e.g., to an intermediate frequency or a baseband frequency, etc.) to generate received multiplexed uplink signal 1065. The received multiplexed uplink signal 1065 may be provided to a demultiplexer 1070, which separates the received multiplexed uplink signal 1065 into $L_{tx}$ feed element Tx component signals 1075, where $L_{tx}$ is the number of feed elements 128-*e* of a feed array assembly 127-*e* used by an antenna assembly 121-*e* for transmitting forward link signals. The demultiplexer 1070 may support frequency-division demultiplexing, time-division demultiplexing, code-division demultiplexing, or any other demultiplexing that can separate the feed element Tx component signals 1075 from the received multiplexed uplink signal 1065.

In some examples, a communications satellite 120-*b* may have more than one receiver 1060, which may each be associated with a different feeder uplink signal 1045, and each receiver 1060 may be associated with a separate demultiplexer 1070. In some examples, different feeder uplink signals 1045 may be transmitted by separate access node terminals 130 of the ground segment 102-*a*, and different feeder uplink signals 1045 may be associated with different sets of spot beams 125. For example, each feeder uplink signal 1045 may include Tx component signals 1075 for a subset of spot beams supported by the GBBF architecture. In one example, each feeder uplink signal 1045 is associated with a particular "color" as described herein (e.g., feeder uplink signals 1045 and 1045-*a* being different colors from each other, or otherwise orthogonal to each other). In other examples, each feeder uplink signal 1045 is associated with Tx component signals 1075 corresponding to different sets of spot beams (e.g., which may be orthogonal or non-orthogonal in frequency and polarization). For example, the communications satellite 120-*b* may include a second receiver 1060-*a*, and a second demultiplexer 1070-*a*, which may provide a second set of feed element Tx component signals 1075-*a*. In various examples, the receiver 1060 and additional receivers 1060 (e.g., receiver 1060-*a*) may be associated with separate antennas (e.g., separate antenna assemblies 121), or may be associated with separate portions of the same antenna.

In some examples, the set of feed element Tx component signals 1075 may be combined with the second set of feed element Tx component signals 1075-*a*, for each respective feed element 128, by a plurality of summers 1080 (e.g., summers 1080-*a*-1 through 1080-*a*-$L_{tx}$, associated with feed elements 128-*e*-1 through 128-*e*-$L_{tx}$, as shown). The summers 1080 may provide a set of feed element Tx signals 1085 to the feed array assembly 127-*e* for transmission. In examples with a single receiver 1060, receiving a single feeder uplink signal 1045 from a single access node terminal 130, the feed element Tx component signals 1075 may be substantially equivalent to the feed element Tx signals 1085 described herein. In some examples, the feed element Tx signals 1085 may be an output of a signal processor (e.g., an analog signal processor or a digital signal processor) of the communications satellite 121-*e* that includes demultiplexer(s) 1070, the summer(s) 1080, and/or any other components for providing the feed element Tx signals 1085, which may be a dedicated transmission signal processor, or may share components with a reception signal processor (e.g., the signal processor described with reference to illustrative system 1100 of FIG. 11). In other examples, each feeder uplink signal 1045 is associated with Tx component signals 1075 for a different set of Tx elements 128-*e*. In this example, GBBF system 1000 does not include summers 1080 and Tx component signals 1075 are coupled with a first subset of feed elements 128-*e* while Tx component signals 1075-*a* are coupled with a second subset of feed elements 128-*e*.

The feed element Tx signals 1085 may be provided to the feed elements 128 (e.g., feed elements 128-*e*-1 through 128-*e*-$L_{tx}$) of the feed array assembly 127-*e*, which may convert the electrical feed element Tx signals 1085 to electromagnetic wave energy of feed element signal transmissions 1095, thus providing the communications service traffic 1005 to reach the various target devices. As a result of the beamforming applied to the Tx spot beam signals 1025 by the Tx BFN 710-*e*, the feed element signal transmissions 1095 may form spot beams 125, and reach the target devices located in the associated spot beam coverage areas 126. Thus, the communications satellite 120-*b* may transmit the communications service traffic 1005 via feed elements 128-*e*, according to spot beams 125 assigned by the ground segment 102-*a*, and a beamforming weight set 1027 applied at the ground segment 102-*a*. By performing such beamforming at the ground segment 102-*a*, the communications satellite 120-*e* may be less complex than a communications satellite 120 that performs beamforming at the communications satellite 120 (e.g., communications satellite 120-*a* described with reference to FIG. 7). This reduced complexity provided by GBBF may, for example, reduce satellite deployment weight, satellite cost, satellite power consumption, and/or satellite failure modes, while providing comparable service as a communications satellite that performs OBBF.

Figure 11:
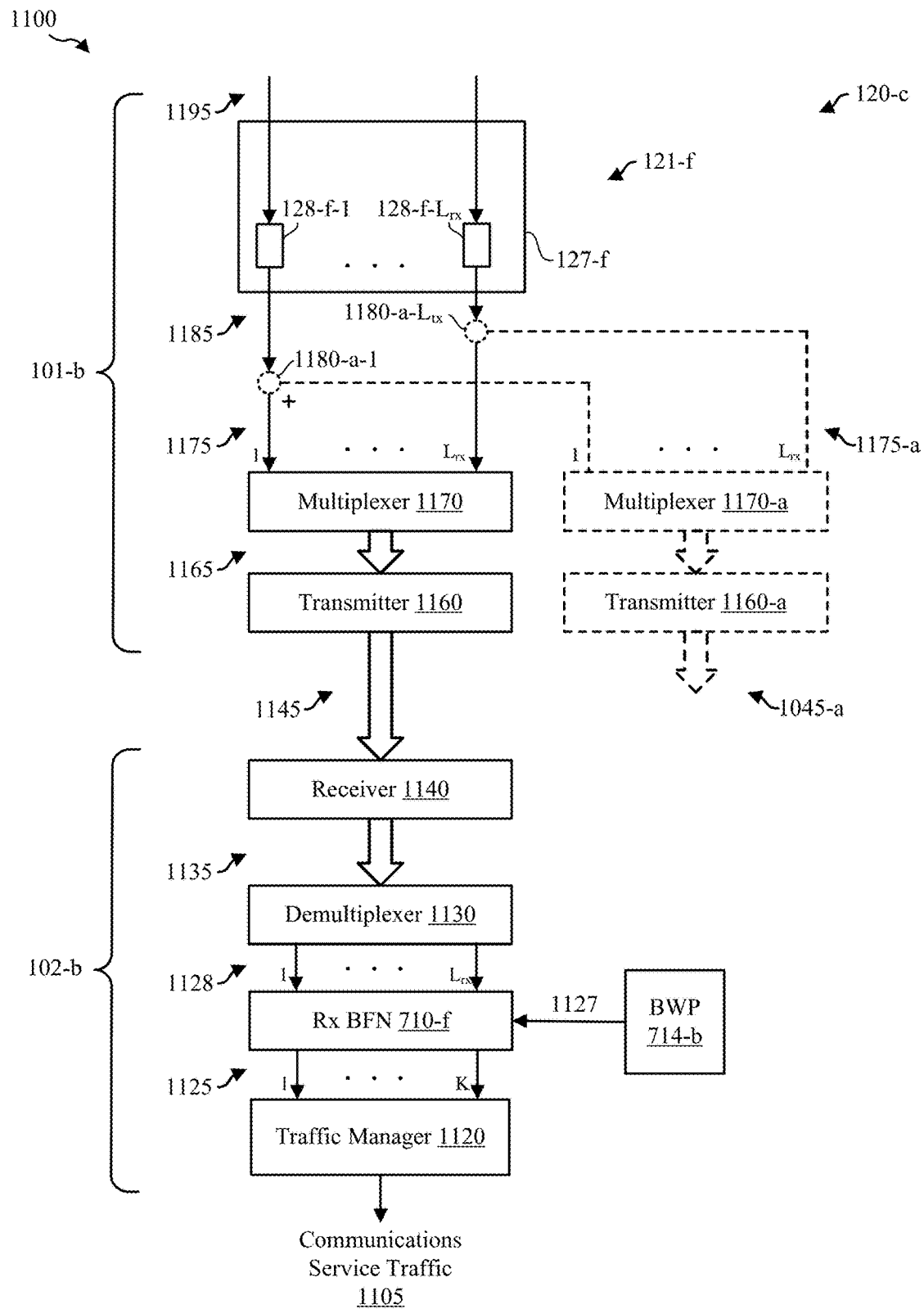
FIG. 11 shows a block diagram of an illustrative system for ground-based beamforming for return link signal reception, in accordance with aspects of the present disclosure.

FIG. 11 shows a block diagram of an illustrative system 1100 for GBBF for return link signal transmission, in accordance with aspects of the present disclosure. The components of the system 1100 may be distributed between a ground segment 102-*b* (e.g., including access node terminal(s) 130, network device(s) 141, etc.) and a space segment 101-*b* (e.g., including communications satellite(s) 120-*c*), and illustrate an example of implementing a receive beamforming network at a ground segment. In some examples, the ground segment 102-*b* may share components with a ground segment 102-*a* as described with reference to FIG. 10 (e.g., supporting GBBF for forward link and return link at a common access node terminal 130, sharing a common traffic manager 1020 or 1120, etc.). Similarly, in some examples the space segment 101-*b* may share components with a space segment 101-*a* as described with reference to FIG. 10 (e.g., supporting forward link and return link communications on the same communications satellite 120). In other examples, separate communications satellites may be used for forward link and return link communications (e.g., communications satellite 120-*b* for forward link communications, and a different communications satellite 120-*c* for return link communications).

The space segment 101-*b* of the system 1100 may receive (e.g., at an antenna assembly 121-*f* of communications satellite 120-*c*) return link communications signals 1195 of a communications service, and associated with communications service traffic 1105, where the return link communications signals 1195 may have been transmitted by one or more source devices (e.g., user terminals 150). The return link communications signals 1195 may be received at a plurality of antenna feed elements 128-*f* (e.g., feed elements 128-*f*-1 through 128-*f*-$L_{rx}$) of the feed array assembly 127-*f*, and converted from electromagnetic wave energy to Lx electrical feed element Rx signals 1185, where $L_{rx}$ is the number of feed elements 128-*f* used for receiving return link communications. In some examples, the feed array assembly 127-*f* used for return link communications may share components with a feed array assembly 127 used for forward link communications (e.g., using transceivers at common feed elements 128 as a feed array assembly 127-*e* described with reference to FIG. 10). In other examples, feed array assembly 127-*f* used for return link communications may be an entirely different assembly than a feed array assembly 127 used for forward link communications (e.g., a feed array assembly 127-*f* for reception being separate from a feed array assembly 127-*e* for transmission as described with reference to FIG. 10).

Although various components of the return link communications signals 1195 may have been transmitted by a plurality of source devices from various locations of a return link service coverage area 410, the components of the return link communications signals 1195 are not yet associated with particular spot beams 125. Rather, the return link communications signals 1195 may be received by respective feed elements 128-*f*-1 through 128-*f*-$L_{rx}$ in a manner where signals of a particular frequency and/or polarization may have characteristic phase and/or amplitude offsets that may be used to determine a direction from which particular components of the return link transmissions 1095 were transmitted from, thereby associating particular components of the return link transmissions 1095 with a particular spot beam 125 and providing a spatial degree of orthogonality for signal reception. Because the reception beamforming calculations are not performed on the communications satellite 120-*c*, the feed element Rx signals 1185 are maintained in separate form (e.g., by separate wiring), and provided to multiplexer 1170.

In some examples, the multiplexer 1170 may combine the feed element Rx signals 1185 to generate a multiplexed downlink signal 1165, which is provided to transmitter 1160. The feed element Rx signals 1185 may be combined by frequency-division multiplexing, time-division multiplexing, code-division multiplexing, or any other form of multiplexing that supports the communication of information of feed element Rx signals 1185 in a separable manner. In some examples, the multiplexer 1170 used for return link communications may share components with a demultiplexer 1070 used for forward link communications as described with reference to FIG. 10, and in other examples a multiplexer 1170 and a demultiplexer 1070 may be entirely separate components of a communications satellite 120 (e.g., separate signal processing chains). In some examples, the multiplexed downlink signal(s) 1165 may be an output of a signal processor (e.g., an analog signal processor or a digital signal processor) of the communications satellite 121-$f$ that includes the splitter(s) 1180, the multiplexer(s) 1070, and/or other components for providing the multiplexed downlink signal(s) 1165, which may be a dedicated reception signal processor, or may share components with a transmission signal processor (e.g., the signal processor described with reference to illustrative system 1000 of FIG. 10).

The communications satellite 120-$c$ transmits the multiplexed downlink signal 1165 in a feeder downlink signal 1145 to the ground segment 102-$b$ via transmitter 1160 (e.g., by an antenna assembly 121 or another type of antenna). In some examples, the transmitter 1160 used for return link communications may share components with a receiver 1060 used for forward link communications (e.g., using a transceiver of a common antenna). In other examples, transmitter 1160 used for return link communications may be an entirely different assembly than a receiver 1060 used for forward link communications (e.g., using separate antenna assemblies 121, using a separate transmitter and receiver that share a common reflector, etc.).

In some examples, the communications satellite 120-$c$ may include splitters 1180-$a$ that split the feed element Rx signals 1185 into feed element Rx component signals 1175 to feed a plurality of multiplexers 1170 (e.g., first multiplexer 1170 and second multiplexer 1170-$a$). The splitters 1180-$a$ may split the feed element Rx signals 1185 into different frequency or polarization components, for example, which may be associated with different colors as described herein. In some examples, the second multiplexer 1170-$a$ may generate a second multiplexed downlink signal 1165-$a$, which may be provided to a second transmitter 1160-$a$ (though in some examples the transmitters 1160 and 1160-$a$ may be the same transmitter, or otherwise share components of a common transmitter 1160). The second transmitter 1160-$a$ may transmit the second multiplexed downlink signal 1165-$a$ in a second feeder downlink signal 1145-$a$, which may be a feeder downlink signal associated with a different color than the feeder downlink signal 1145. In some examples, different access node terminals 130 may be associated with communications of different colors, and thus the feeder downlink signals 1145 and 1145-$a$ may be provided to different access node terminals 130. In other examples, different multiplexers 1170 may be coupled with different subsets of feed elements 128-$f$, such that different feeder downlink signals 1145 are associated with spot beams 125 supported by different subsets of feed elements 128-$f$.

The ground segment 102-$b$ may receive, as an input, the feeder downlink signal 1145 at a receiver 1140, which may be an example of an access node terminal antenna system 131. In some examples, the receiver 1140 used for return link communications may share components with a transmitter 1040 used for forward link communications (e.g., using a transceiver of a common access node terminal 130). In other examples, a receiver 1140 used for return link communications may be an entirely different assembly than a transmitter 1040 used for forward link communications (e.g., using separate access node terminal antenna systems 131 at the same access node terminal 130, using a separate transmitter and receiver that share a common reflector of an access node terminal antenna system 131, using an entirely separate access node terminal 130, etc.).

The received multiplexed downlink signal 1135 may be provided to a demultiplexer 1130, which separates the received multiplexed downlink signal 1135 into $L_{rx}$ feed element component signals 1128. The demultiplexer 1070 may support frequency-division demultiplexing, time-division demultiplexing, code-division demultiplexing, or any other demultiplexing that can separate the feed element component signals 1128 from the received multiplexed downlink signal 1135. In some examples, the demultiplexer 1130 used for return link communications may share components with a multiplexer 1030 used for forward link communications as described with reference to FIG. 10, and in other examples a demultiplexer 1130 and a multiplexer 1030 may be entirely separate components of a communications satellite 120 (e.g., separate signal processing chains). The demultiplexer 1130 may subsequently provide the feed element component signals 1128 to an Rx BFN 710-$f$.

The Rx BFN 710-$f$ may be an example of Rx BFNs 710 as described herein, and may be coupled between the receiver 1140 and the K spot beam signal pathways. The Rx BFN 710-$f$ generates K Rx spot beam signals 1125 containing portions of communications service traffic 1105 as received from the various source devices, where K may be the number of spot beams 125 simultaneously supported by the system 1100 for return link transmissions of the communications service. Rx BFN 710-$f$ may receive a beamforming weight set 1127 from a BWP 714-$b$, and apply beam weights to the feed element component signals 1128 to generate the Rx spot beam signals 1125. BWP 714-$b$ may provide beamforming weight set 1127 according to any of the techniques described herein, including applying beam weights according to time slots of a beam hopping configuration, adjustments according to a native antenna pattern, adjustments according to an orbital position of the communications satellite 120-$c$, and combinations thereof.

The process of applying beam weights to generate the respective Rx spot beam signals 1125 may be similar to the process for generating Rx spot beam signals described with reference to FIG. 8. However, because the feed element component signals 1028 are not directly received by feed elements of the ground segment 102-$b$, the feed element component signals 1128 are not required to have the same characteristics (e.g., frequency, polarization, time synchronization, etc.) as those that are received by the communications satellite 120-$c$ of the space segment 101-$b$. Rather, the feed element component signals 1028 may have been converted in a manner to facilitate multiplexing/demultiplexing, feeder link transmission, and/or the conversion by Rx BFN 710-$f$.

The Rx spot beam signals 1125 may subsequently be provided by the Rx BFN 710-$f$ to a traffic manager 1120. The Rx spot beam signals 1125 may be provided by separate digital or analog hardware pathways (e.g., the K signal pathway hardware section as described with reference to FIG. 7), or may be logical channels embodied in software. As a result of the Rx beamforming applied to the feed element component signals 1128, the information carried by components of the return link communications signals 1195 may be identified according to separate spot beams 125, thus separating communications signals according to an associated spot beam coverage area 126 and supporting frequency reception reuse across a return link service coverage area 410. The traffic manager 1120 may subsequently provide the communications service traffic 1105 to, for example, one or more other devices and/or networks, such as networks 140 and/or network devices 141 described with reference to FIG. 1

Thus, the traffic manager 1120 may interpret return link signals of a communications service according to a Rx spot beams 125 formed by a beamforming weight set 1127 applied at the ground segment 102-*b*. By performing such reception beamforming at the ground segment 102-*b*, the communications satellite 120-*c* may be less complex than a communications satellite 120 that performs beamforming at the communications satellite 120 (e.g., communications satellite 120-*a* described with reference to FIG. 7). This reduced complexity provided by GBBF may, for example, reduce satellite deployment weight, satellite cost, satellite power consumption, and/or satellite failure modes, while providing comparable service as a communications satellite that performs OBBF.

Figure 12:
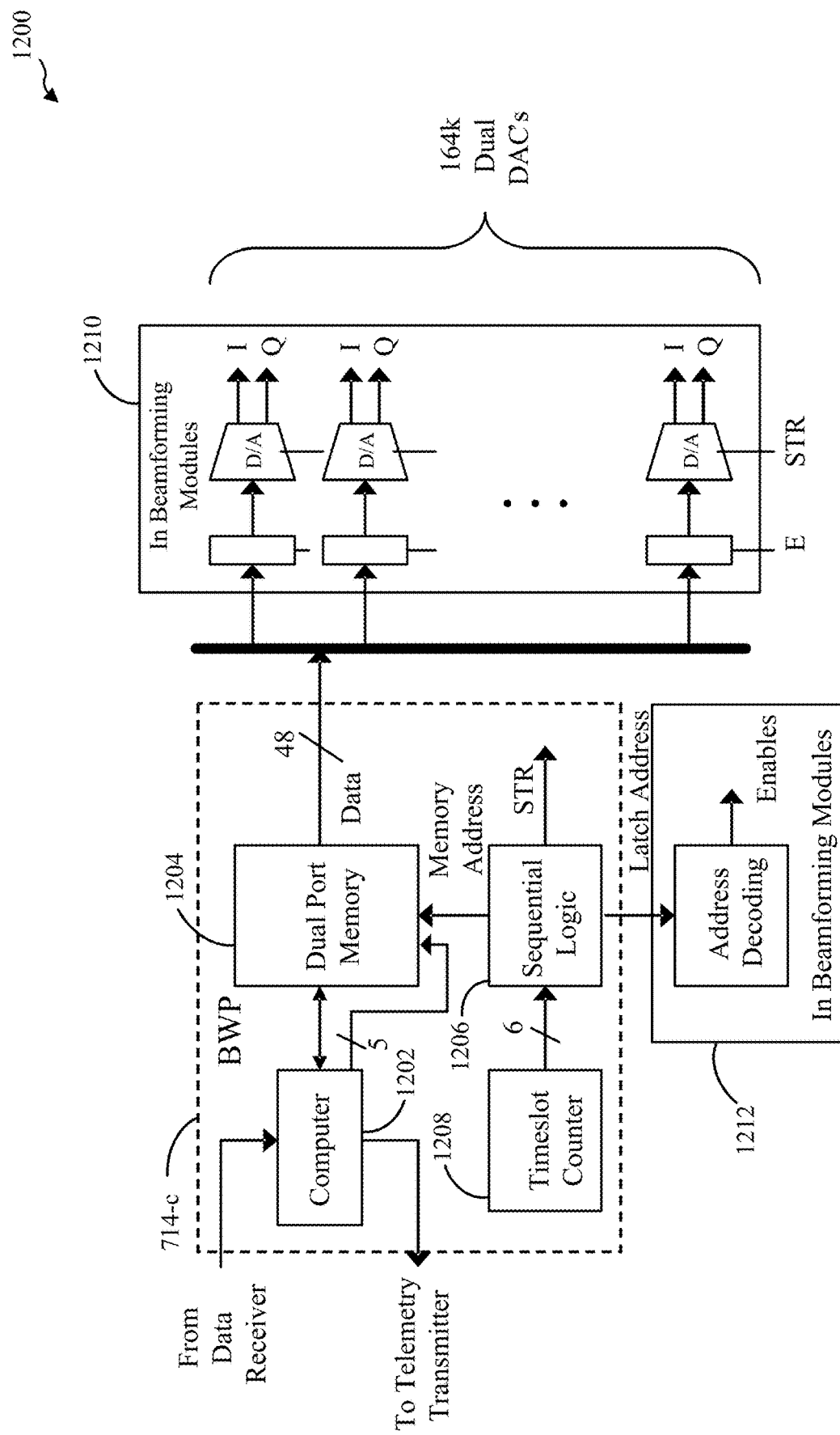
FIG. 12 shows block diagram of a system that employs an exemplary beam weight processor.

FIG. 12 shows block diagram of a system 1200 that employs an exemplary beam weight processor (BWP) 714-*c*. Single or multiple board computer 1202 (or equivalent) may be used to interface with a bi-directional data link (e.g., data link 716 described with reference to FIG. 7) to a control station, which is typically a ground control station such as a NOC (e.g., a network device 141 as described with reference to FIG. 1). Generally, the NOC is different than the Telemetry, Tracking, and Control (TT&C) station, but it may be implemented in the TT&C if desired. The beam weights may be received for all the spot beams 125 and all timeslots. Computer 1202, which may include one or more processors coupled to memory, may implement an ARQ protocol providing feedback data to the data link transmitter for transmission down to the control station. The feedback data may include a notification of successful or unsuccessful reception of the uplink data. Uplink data may include, for example, beam weights, dwell times, pathway gains, commands, and any other suitable data.

The BWP 714-*c* or affiliated hardware may provide the bulk storage for a plurality of beamforming weight matrices (e.g., a transmit beamforming weight set, a receive beamforming weight set, or a combination thereof). A beamforming weight matrix may include the set of all beamforming weight vectors used for transmission and reception of all spot beams 125 in one timeslot. A beam weight vector may include the group of $L_{tx}$ or Lx individual complex beam weights used to create one spot beam 125 during one timeslot. Thus, a transmit beamforming weight vector includes individual complex transmit beam weights, while a receive beamforming weight vector includes individual complex receive beam weights. Beamforming weight matrices are generally computed at the control station based on the desired locations of spot beam coverage areas 126 (e.g., the desired directions of the transmit spot beams 125, the receive spot beams 125, or both) for each timeslot in the beam hop frame. A beam hop frame may include a sequence of beam hop timeslots, each timeslot with an associated dwell time. The dwell time may be fixed for all slots, or the dwell time can be variable on a timeslot by timeslot basis, with the dwell times potentially changing frame by frame. In one example, a dwell time can be the duration of a variable number of timeslots, where each timeslot is of fixed duration. In another example, a dwell time can be the duration of one or more timeslots, where the durations of the timeslots vary.

In some embodiments, a beamforming weight set includes the set of all beamforming weight vectors used for transmission and reception of all spot beams 125 in all timeslots of a beam hopping frame. Additionally or alternatively, a beam hop frame definition may include a linked list of beam hop timeslots. In the linked list approach, a dynamic dwell time for each timeslot may be easily incorporated into the linked list. Any other suitable data structure may also be used for frame definitions. The beam hop frame definition can also include pathway gains for setting a selectable gain channel amplifier for each pathway, for example, as illustrated in FIG. 7.

In an example communications satellite 120 using the beamforming weight set approach, a small number (e.g., tens) of beamforming weight sets can be pre-computed and uploaded to a BWP 714 in a communications satellite 120. These beamforming weight sets can then be switched into operation at any time via a single command from the ground indicating which beamforming weight set to use and at what time. This allows switching beamforming weight sets without requiring a significant amount of information to be uploaded to the BWP 714. For example, in some embodiments, 24 complete beamforming weight sets are pre-computed, uploaded, and stored at the BWP 714-*c* (e.g., in memory 1204). Once an hour (or on any other suitable schedule), a different beamforming weight set may be selected for use by the BWP via the data link. This allows the spot beam coverage areas 126 and capacity allocation to track, for example, the hourly variations of the demand on a daily or 24-hour basis.

A beamforming weight set may include a significant amount of data. For example, in some embodiments, a beamforming weight set may include data corresponding to $L_{tx}$+Lx feed elements 128 (e.g., 1024), times K pathways (e.g., 80), times Q timeslots (e.g., 64), times the number of bits required per beam weight (e.g., 12, 6 bits for I and 6 bits for Q). For example, in FIG. 12, this sums to approximately 16 MB of data per weight set. Data and command uplink to the satellite may typically not be very fast. Even at a 1 Mbps data link, it would take 128 seconds to upload the 16 MB beamforming weight set. Thus, pre-loading many beamforming weight sets in non-real time may be more convenient for certain applications where a BWP 714 is located at a satellite. When a BWP 714 is part of a ground segment 102 (e.g., ground segment 102-*a* described with reference to FIG. 10), such considerations may not be critical.

One of the stored beamforming weight sets in the BWP 714-*c* may be selected as the active beamforming weight set and used in the generation of the hopped spot beams 125. This active beamforming weight set may be stored in memory 1204, such as a dual port RAM, that allows computer 1202 to load the next active beamforming weight set and some external logic to dynamically access the individual beamforming weight vectors of the current active beamforming weight set. The individual beamforming weight vectors of the active beamforming weight set may then be output as beamforming weights at the proper time under control of sequential logic 1206. An example of sequential logic 1206 may include timeslot counter 1208 that is incremented once per timeslot. Timeslot counter 1208 may be a simple 6-bit counter in some embodiments and may handle frames with up to $2^6$=64 timeslots per frame. The counter value may represent the slot number (e.g., 1 . . . 64) of the beam hopping frame. Sequential logic 1206 takes the output of timeslot counter 1208 and may generate (1) the proper addresses for memory 1204, (2) addresses for the latches in the BFN modules, and (3) the control signals to place the beam weights on the data bus. Sequential logic 1206 may then load this data into the appropriate latches in beamforming modules 1210, which may be co-located with, or part of either a BFN 710 or a BWP 714.

Within beamforming modules 1210, data may be double latched to allow all of the beam weights within each beamforming weight vector to change at the same time. This may ensure hopping of all spot beams synchronously with the timeslot boundary. The data may be loaded into the first latch based on enable signals, which are decoded from the latch address by decoder 1212, which may be co-located with, or part of either a BFN 710 or a BWP 714. Then all data may be simultaneously loaded into the digital-to-analog (D/A) converters synchronously with a strobe signal from the sequential logic. The strobe may be generated within sequential logic 1206 to occur at the start of each timeslot.

In the example of FIG. 12, certain components are shown within the BFN modules. This approach may be advantageous since it may reduce or minimize the number of connections between a BWP 714 and a BFN 710, but other possible implementations may be used. For example, the interconnect signals may be limited to the 48-bit data bus, the latch address bus, plus a strobe line. The 48-bit data bus may enable loading of 4 complex weights at one time (based on 6 bits for I+6 bits for Q×4 weights=48 bits). In this example, there is a total of L=1024 feed elements×K=80 pathways×2 (for Tx and Rx), for a total of 163,840 complex weights. Loading 4 complex beam weights at a time requires 40,960 addressable locations, or a 16-bit latch address bus resulting in a total interconnect of 48+16+1=65 lines.

In some embodiments, the address decoding, latches, and D/As are incorporated in the BWP itself. This may simplify the BFN modules, but significantly increase the required number of interconnects. For example, using L=1024 elements×K=80 pathways×2 (for Tx and Rx)×2 (I and Q)=327, 680 analog voltage (D/A output) lines.

FIGS. 13A through 13C illustrate an example of a communications satellite 120 having K=4 pathways, in accordance with aspects of the present disclosure.

FIG. 13A shows an illustration 1300 of the payload of the communications satellite 120. The instantaneous (e.g., timeslot) signal flow for an example pathway that conveys traffic that originates in Cleveland (designated Spot Beam 124) and destined is for Pittsburgh (designated Spot Beam 319) is shown within dashed line 1302. BWP 714-*d* will set the coefficients, e.g., as shown in FIG. 8, to the proper values to focus the LHCP feed elements 128 of the phased array receive antenna assembly 121 upon the spot beam coverage area 126 associated with the Cleveland spot beam 125. Terminals, including access node terminals 130 and/or user terminals 150, within the designated receive spot beam coverage area 126 will broadcast on the designated uplink frequency through an LHCP antenna. The received version of these signal(s) (e.g., feed element Rx signals) will be processed and output from the Rx BFN 710-*g* to pathway 1 and will then go through the pathway processing as discussed above. The output from pathway 1 will then be input into the Tx BFN 710-*i* (e.g., feed forming network). BWP 714-*d* will set the coefficients (e.g., as described with reference to FIG. 9) to the proper values to focus the RHCP feed elements 128 of the phased array transmit antenna upon the area designated as the Pittsburgh beam. Terminals, including access node terminals 130 and/or user terminals 150, within the designated transmit spot beam coverage area 126 will receive on the designated downlink frequency through an RHCP antenna.

From the perspective of the communications satellite 120, uplink signals are received by the communications satellite 120 from transmitting user terminals 150 or from transmitting access node terminals 130 located in the satellite's receive service coverage area 410. Downlink signals are transmitted from the communications satellite 120 to receiving user terminals 150 or to receiving access node terminals 130 located in the satellite's transmit service coverage area 410. From the perspective of the ground equipment (e.g., user terminals 150 and access node terminals 130), the receive service coverage area 410 and the transmit service coverage area 410 may be reversed.

FIG. 13B shows a configuration table 1310 of the instantaneous configuration of the example communications satellite 120. Each row corresponds to one pathway. Column 1312 includes the number of the pathway, 1 . . . K. Column 1316 includes 1. a unique designation of the uplink receive spot beam 125, which may be an alphanumeric string
2. an alphanumeric 'arrow' to designate the direction of signal travel
3. the corresponding downlink transmit spot beam 125, which may also be an alphanumeric string In these examples, pathways may cross polarizations, in accordance with typical industry practice. The convention for the example communications satellites 120 in this document is that the first K/2 pathways receive LHCP uplink spot beams 125 and transmit RHCP downlink spot beams 125, while the second K/2 pathways receive RHCP uplink spot beams 125 and transmit LHCP downlink spot beams 125.

FIG. 13C shows an example timeslot coverage area superimposed on area map 1320. As discussed previously, pathway 1 has an LHCP uplink from Cleveland and an RHCP downlink to Pittsburgh. The communications satellite 120 is shown for this pathway, but is omitted for the other three pathways shown in this figure. For example, pathway 3 has an RHCP uplink from Washington, D.C. and an LHCP downlink to Columbus and is indicated by a straight line on the figure.

At any timeslot in the beam hopping frame, the forward capacity in each spot beam 125 can be calculated by performing a link analysis including the characteristics of the ground equipment. By performing a standard link analysis, one can calculate the end-to-end carrier-to-noise-plus-interference ratio, $E_s/(N_o+I_o)$, to a particular point in the spot beam coverage area 126. The end-to-end carrier-to-noise ratio, $E_s/N_o$, typically includes the effects of thermal noise, C/I, intermodulation distortion, and other interference terms on both the uplink and the downlink. From the resulting end-to-end $E_s/(N_o+I_o)$, the modulation and coding may be selected from a waveform library that maximizes the capacity. An example of a waveform library is contained in the DVB-S2 specification, although any suitable waveform library may be used. The selected waveform (modulation and coding) results in a spectral efficiency, measured in bps/Hz, to that specific point in the spot beam coverage area 126.

For broadcast data delivery, the spectral efficiency may be computed at the most disadvantaged point (e.g., at the worst link budget) within the spot beam coverage area 126. For multicast data delivery, the spectral efficiency may be computed at the location of the most disadvantaged user in the multicast group. For unicast data delivery, Adaptive Coding and Modulation (ACM) may be employed, where the data delivered to each location in the spot beam coverage area 126 is individually encoded to fit the link budget for that particular location in the spot beam coverage area 126. This is also the case with the DVB-S2 standard. When ACM is employed, the average spectral efficiency is relevant. As described in U.S. Patent Application Publication No. 2009-0023384 to Mark J. Miller, filed Jul. 21, 2008, which is incorporated by reference herein in its entirety, the average spectral efficiency may be generated by computing the weighted average of the spectral efficiency for every location in the spot beam coverage area 126.

The link capacity in a spot beam 125 may then be calculated as the product of the spectral efficiency (bps/Hz) and the allocated BW in the spot beam 125. The total capacity during one timeslot in the beam hopping frame is the sum of capacities of all the spot beams 125 that are active during that timeslot. The total capacity is the average of the capacities of the individual beam hopping frames. To maximize total capacity, the beam weights may be set for all spot beams 125 and all timeslots to yield the largest antenna directivity. Spot beams 125 that are formed in the same timeslot and use the same polarization and spectrum should be spaced as far apart as possible to maximize the C/I (and hence minimize the interference into other spot beams 125). Under these requirements, it is not uncommon for the spectral efficiency of each spot beam 125 to be approximately the same for all spot beams 125 in all timeslots. Under this assumption, the system forward capacity can be approximated in accordance with:

$$C_F = K_F \cdot \eta_{Hz} \cdot W \qquad (1)$$

where $\eta_{Hz}$ is the spectral efficiency in bps/Hz, $K_F$ is the number of forward spot beams 125, and W is the spectrum allocated per spot beam 125. From equation (1), it can be seen that increasing any of the parameters increases the capacity.

The maximum number of spot beam pairs that can be active at one time, $K_F$, is essentially determined by the mass and volume budgets of the communications satellite 120. The power limitations on the communications satellite 120 can also affect the value $K_F$, but the volume and mass constraints generally are more limiting.

The architecture for providing a satellite communications service disclosed herein is effective in maximizing $\eta_{Hz}$ and W. Due to the small size of the spot beams 125, and the relatively small number of spot beams 125 that can be active at one time (due to payload size, weight, and power limits on $K_F$), all of the allocated spectrum can be used within each spot beam 125 with minimal interference between spot beams 125. To accomplish this, spot beams 125 of the same polarization that are active in the same timeslot should be positioned as far apart as possible. Alternatively, one could use only a fraction of the spectrum per spot beam 125 in order to improve the C/I, but due to the beam hopping nature of the present architecture this may result in less capacity. For example, suppose each spot beam 125 used one-half of the available spectrum, or W/2 Hz. Then at any instant in time, there would be half as many spot beams 125 that are co-frequency and present the potential for interference. The resulting C/I would increase, thus slightly increasing the spectral efficiency, $\eta_{Hz}$, as C/I is just one of many components in the end-to-end $E_s/(N_o+I_o)$ budget and spectral efficiency generally varies as the logarithm of the $E_s/(N_o+I_o)$. But the BW per spot beam 125 is reduced by a factor of 2, and as expected, the total capacity will be reduced, since the number of spot beams 125 may limited by the number of signal pathways in the communications satellite 120.

The spectral efficiency per spot beam 125 is quite high using the present architecture because active spot beam coverage areas 126 can be spaced far apart and the directivity of the spot beams 125 may be large. The former is a result of the large extents of a service coverage areas 410, the small size of spot beams 125, and the relatively small number of spot beams 125 that can be active at one time. The latter is a result of the small size of spot beams 125.

In some embodiments, it may also be desirable to increase the spectral efficiency of a spot beam 125 by reducing the associated spot beam coverage area 126 relative to its beamwidth. Typically, the spot beam coverage area 126 in spot beam systems may extend out to the −3 dB contours of a spot beam 125 or beyond. Some systems extend the spot beam coverage area 126 out to the −6 dB contours. These low contour regions are undesirable for many reasons. First, they may reduce the downlink $E_s/N_o$ and reduce the downlink C/I. The reduced C/I is a result of the reduced signal power (C) and the increased interference (I) as the locations at the edge of a spot beam coverage area 126 are closer to other spot beam coverage areas 126. When computing the weighted average capacity (e.g., for unicast data delivery) or the edge of spot beam capacity (e.g., for broadcast data delivery), this large antenna roll off at the edge of the spot beam 125 may reduce capacity. In accordance with the present architecture, however, the spot beam coverage area 126 may be constrained to regions within the spot beam 125 where the antenna roll-off is much less, such as approximately −1.5 dB. This may increase the spectral efficiency since there are no locations in the spot beam 125 at the −3 to −6 dB levels relative to beam center. The spot beam coverage area 126 may be smaller, however, but this is compensated for by hopping to more areas within the beam hopping frame (e.g., increasing the number of timeslots per frame).

The link capacity may be enhanced by:
Use of the full allocated spectrum per spot beam 125.
Use of small spot beams 125 resulting in high beam directivity and large uplink $E_s/N_o$ and ultimately better return link spectral efficiency.
Large service coverage areas 410 realized by hopping small spot beams 125 around in a beam hopping frame with many slots per frame resulting in a relatively small number of spot beams 125 active at one time and spread over a large service coverage area 410. Thus, spot beams 125 can be spaced far apart resulting in high C/I values leading to higher spectral efficiency.
Defining smaller spot beam coverage areas 126 such that the edge of spot beam roll off is relatively small, such as approximately −1.5 dB. This increases the average spectral efficiency, and the capacity per spot beam 125, as the relatively high roll-off locations of spot beam coverage areas 126 that degrade both uplink C/I and $E_s/N_o$ have been eliminated.

Figure 14:
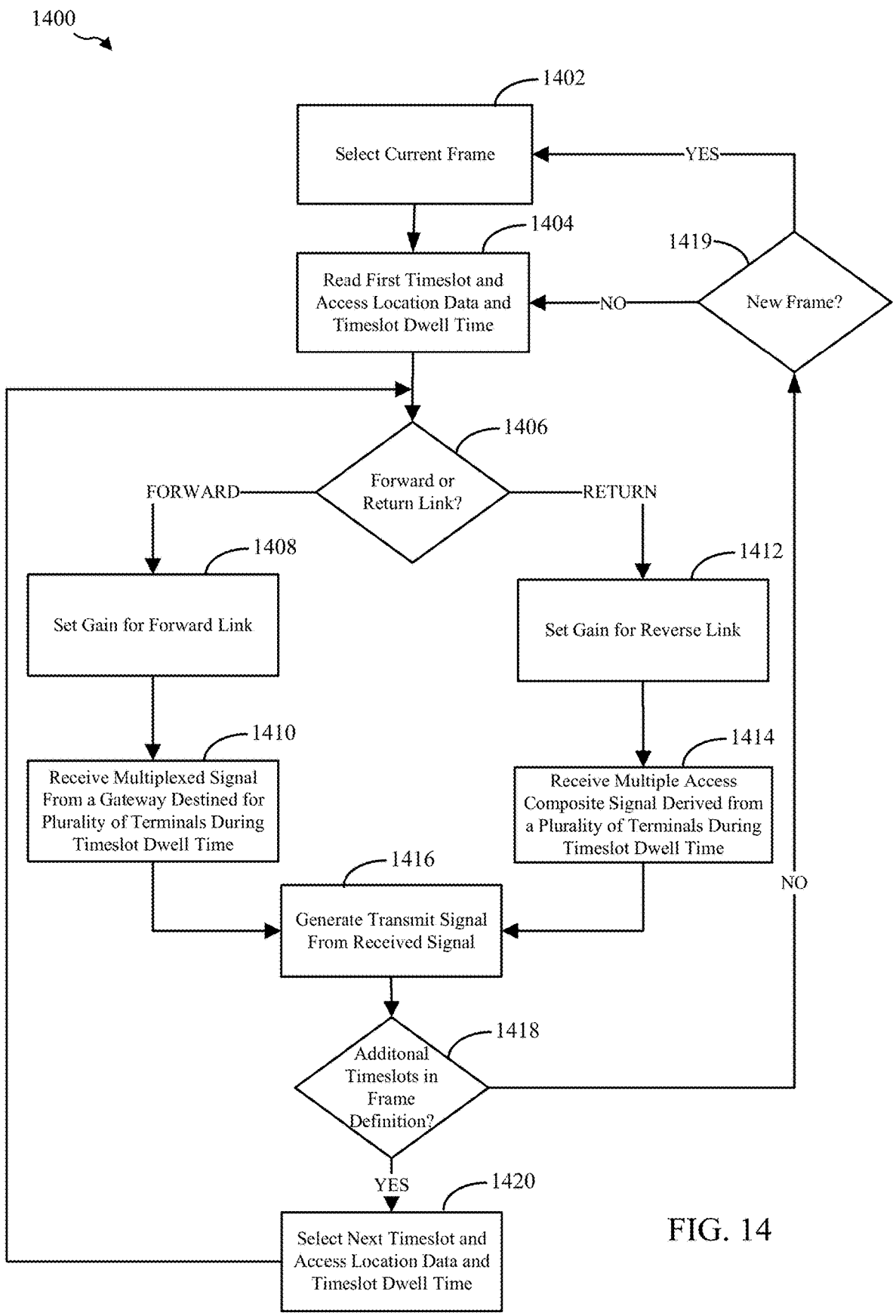
FIG. 14 illustrates an example process for supporting satellite communication, in accordance with aspects of the present disclosure.

FIG. 14 illustrates an example process 1400 for supporting satellite communication, in accordance with aspects of the present disclosure. Process 1400 may correspond to one pathway (such as the pathway shown within dashed line 1302 of FIG. 13A), which can service a forward and/or return link of a hub-spoke satellite communication system, such as satellite communications system 100 described with reference to FIG. 1. It should be understood that in practical applications, a large number of these pathways will be active during a single timeslot dwell time, and thus a corresponding large number of these processes will be operating in parallel.

At 1402, a current frame is selected. For example, a beam weight processor (e.g., BWPs 714 as described with reference to FIG. 7 or 10-13) may receive one or more precomputed weight sets via a data link (e.g., a data link 716 as described with reference to FIG. 7). The frame selected at 1402 may include one or more timeslot definitions and one or more beamforming weight matrices. For example, the BWP 714 or affiliated hardware may provide the bulk storage for a plurality of beam hop timeslot definitions and a plurality of beamforming weight matrices. A beamforming weight matrix may include the set of all complex beamforming weight vectors used for transmission and reception of all spot beams 125 in one timeslot. A beamforming weight vector may include the group of $L_{tx}$ or $L_{rx}$ individual complex beam weights used for calculations to/from feed element Tx/Rx signals carried via the feed elements 128 of a feed array assembly 127 to form one spot beam 125 during one timeslot. A beam hop timeslot definition may include the set of all pathway gains of all spot beams 125 in one timeslot and may specify all dwell times associated with the timeslot.

At 1404, a first timeslot definition and a first beamforming weight matrix are selected for the current frame. For example, sequential logic (e.g., sequential logic 1206 as described with reference to FIG. 12) of a BWP may include a counter for selecting a timeslot. Timeslot definitions and/or weight matrices may also include location data used to create one or more receive spot beams 125, one or more transmit spot beams 125, or both. For example, the location data may include the set of all complex weight vectors used to generate the active spot beams 125 for the timeslot.

At 1406, a determination is made whether the communication is part of a forward link or a return link. As explained above, in a hub-spoke system, an access node terminal (e.g., an access node terminal 130 described with reference to FIG. 1) may communicate with user terminals (e.g., user terminals 150 as described with reference to FIG. 1) using downstream (e.g., forward) links, while user terminals (e.g., user terminals 150 as described with reference to FIG. 1) may communication with an access node terminal 130 using upstream (e.g., return) links. The access node terminal 130 may service its own uplinks and downlinks to and from a communications satellite (e.g., communications satellites 120 described with reference to FIGS. 1A through 3D, 7, 10, or 11). The access node terminal 130 may also schedule traffic to and from the user terminals 150. Alternatively, the scheduling may be performed in other parts of the satellite communications system (e.g., at one or more NOCs, gateway command centers, or other network devices 141). For example, in some embodiments, the gain settings included in the frame definition (e.g., as part of each timeslot definition) may be used to determine whether a communication is a forward link or a return link.

If, at 1406, a forward link is being processed, then at 1408 the gain for the pathway may be adjusted, if necessary, to support a forward link. For example, a selectable gain channel amplifier may provide the gain setting for the pathway in use, as shown in FIG. 7. The gain setting can be determined from the first timeslot definition. At 1410, a receive spot beam signal is created for the duration of the timeslot dwell time. For example, a satellite-based receive antenna assembly 121 including a receive beamforming network (e.g., BFN 710-a as described with reference to FIG. 7) may be configured to create one or more receive spot beams 125 on the antenna assembly 121 for the duration of the timeslot dwell time. The receive spot beams 125 may be used to receive one or more multiplexed signals (e.g., a multiplexed signal from an access node terminal 130) destined for a plurality of terminals. For example, the multiplexed signal may be destined for user terminals 150. At least some of the individual component signals of the multiplexed signal can differ in content, for example, if destined for different user terminals 150. The multiplexed signal may be multiplexed using any suitable multiplexing scheme, including, for example, MF-TDM, TDM, FDM, OFDM, and CDM. In general, TDM is used for simplicity.

If, at 1406, a return link is being processed, then at 1412 the gain may be adjusted, if necessary, to support a return link. For example, a selectable gain channel amplifier may provide independent gain settings for the pathways in use, as described with reference to FIG. 7. The gain setting can be determined from the first timeslot definition. At 1414, a receive spot beam signal is created for the duration of the timeslot dwell time. For example, a satellite-based receive phased array antenna assembly 121 including a receive beamforming network (e.g., BFN 710-a described with reference to FIG. 4) may be configured to create one or more receive spot beams on the antenna assembly 121 for the duration of the timeslot dwell time. The receive spot beam is used to receive one or more multiple access composite signals (e.g., a composite signal derived from a plurality of user terminals 150) destined for an access node terminal 130. The multiple access composite signal may be formed using any suitable multiple access scheme, including, for example, MF-TDMA, TDMA, FDMA, OFDMA, and CDMA. The multiple accesses during the slot period may be all random access, all scheduled transmissions, or a mixture of random access and scheduled transmissions.

At 1416, a satellite-based transmit phased array antenna assembly 121 including a transmit beamforming network (e.g., BFN 710-b described with reference to FIG. 7) is configured to generate one Tx spot beam signal for the duration of the timeslot dwell time. The Tx spot beam signal is derived from the received multiplexed or multiple access composite signal using a bent-pipe pathway on the satellite. For example, one or more of frequency conversion, filtering, and selectable gain amplification may be performed on the received signal to create the Tx spot beam signal.

At 1418, the timeslot dwell period has passed and a determination is made whether there exist additional timeslots in the frame definition to process. For example, sequential logic (e.g., sequential logic 1206 described with reference to FIG. 12) may be instructed to automatically loop timeslots included in a frame definition at the conclusion of each frame. As described above, frame definitions and beamforming weight sets may be time-varying and dynamically adjusted locally at the communications satellite 120 (e.g., by sequential logic 1206 or computer 1202 described with reference to FIG. 12), or remotely at a ground facility using a data link (e.g., a data link 716 as described with reference to FIG. 7). If, at 1418, there are more timeslots to process, then at 1420 the next timeslot may be selected for processing. For example, a new timeslot may be selected immediately after the timeslot dwell time of the timeslot selected in 1404 has elapsed. In practice, multiple timeslot definitions and multiple beamforming weight sets may be loaded into memory (e.g., memory 1204 of BWP 714-c described with reference to FIG. 12) and timeslot definitions and beamforming weight matrices may be accessed by following a pointer, for example, of a linked list or other data structure. Process 1400 may then return to 1406 to create new Rx spot beam signals and generate new Tx spot beam signals for the new timeslot dwell time. If, at 1418, a determination is made that there are no more timeslots to process in the frame, then at 1419 a determination is made whether or not a new frame definition or a new beamforming weight set has been received. For example, a command to change frame definitions and/or beamforming weight sets may have been received (e.g., from a computer 1202 as described with reference to FIG. 12, or from a remote scheduler) or a new frame definition and/or a new beamforming weight set may have been uploaded to the communications satellite 120. If, at 1419, neither a new frame definition or a new beamforming weight set has been received, then the current frame may be processed again (e.g., automatically repeated). If a new frame definition or a new beamforming weight set has been received, this new frame definition or this new beamforming weight set may be selected for processing.

As an example of the high capacity offered, consider a satellite communications system with the following parameters:

A 5.2 m reflector 122 of an antenna assembly 121 on communications satellite 120 with a 15 kW power available for use by the payload.

Ka band operation with an allocated spectrum of 1.5 GHz on each of 2 polarizations.

Payload volume and mass constraints support up to 100 pathways, each 1.5 GHz wide (using all spectrum on one polarization) active at one time. Assume 50 pathways are used for forward traffic and 50 pathways for return traffic, yielding a total of 50*1.5 GHz=75 GHz of spectrum in each direction.

A 75 cm user terminal 150. For large spacing of spot beam coverage areas 126 (large service coverage area 410), the resulting forward link budget supports a spectral efficiency of about 3 bps/Hz resulting in about 225 Gbps of forward capacity The return link budget supports 1.8 bps/Hz resulting in 135 Gbps of return link capacity. The total capacity is about 360 Gbps.

As shown in FIG. 7, a communications satellite 120 may contain K generic sets of pathways. Each pathway consists of a formed receive spot beam 125 or a formed transmit spot beam 125 which are interconnected by path electronics nominally consisting of filters, a downconverter, and amplifiers. In accordance with one embodiment of the subject invention employing a hub spoke system architecture, these K pathways can be used to flexibly and programmably allocate capacity between the forward direction (e.g., access node terminal(s) 130 to user terminal(s) 150) and the return direction (e.g., user terminal(s) 150 to access node terminal(s) 130). The allocation is flexible in that that the total resources can be split amongst forward and return in any proportion desired resulting in any desired ratio between forward and return channel capacity. The allocations are programmable in that the splitting of the resources can be altered at every frame, thus rapidly changing the ratio between forward and return capacity. This is particularly useful for changing the forward/return capacity allocation to accommodate new and evolving applications using data/information transfer over a satellite communications system.

The flexible capacity allocation is accomplished by a flexible allocation of resources in the satellite architecture. The resources of interest here are the number of physical pathways on a communications satellite 120 and the time fractions in each beam hopping frame. Two approaches are presented for flexible capacity allocation. Approach 1 flexibly allocates time resources, where approach 2 flexibly allocates HW resources.

Approach 1: Flexible Allocation of Time Resources

In this approach, one or more pathways are allocated for use in the forward direction a fraction of the time, $\alpha_F$. The remainder of the time $(1-\alpha_F)$ it is used for return traffic. Suppose there are Q fixed length time slots in the beam hopping frame. Then for $Q_F \approx \alpha_F Q$ out of the Q time slots the pathway will be configured for forward traffic. Alternatively, the forward time slots and return time slots could vary in length by the same ratio, although the examples that follow will be limited to the case of fixed length time slots.

Configured for forward traffic means that the Rx spot beam 125 uses a beamforming weight vector that has the Rx spot beam 125 pointed to a site of an access node terminal 130, the Tx spot beam 125 uses a beamforming weight vector that has the Tx spot beam 125 pointed at a user service area (e.g., a Tx spot beam coverage area 126 including one or more user terminals 150), and the channel amplifier associated with the pathway is set to yield the satellite net gain that is consistent with a forward channel. Configured for return traffic means that the Rx spot beam 125 uses a beamforming weight vector that has the Rx spot beam 125 pointed to a user service area (e.g., an Rx spot beam coverage area 126 including one or more user terminals 150), the Tx spot beam 125 uses a beamforming weight vector that has the Tx spot beam 125 pointed at a site of an access node terminal 130, and the channel amplifier associated with the pathway is set to yield the satellite net gain that is consistent with a return channel.

In many, if not most, hub spoke applications the sizes of user terminal(s) 150 and access node terminal(s) 130 are quite different. For example, an antenna of an access node terminal 130 might be 7 m in diameter with 100's of Watts of output power capability in the HPA behind it, and an antenna of a user terminal 150 may be less than 1 m in diameter with only several Watts of output power capability in the HPA behind it. In such scenarios, it is common for the desired net electronic gain of one or more antenna assemblies 121 of a communications satellite 120 to be different in the forward direction from the return direction. Thus, in general, the channel amplifier in a pathway needs to be configured for different gains in the forward and return directions.

In an extreme example, let $Q_F = Q$ for all pathways. The result is a Forward Link Only (FLO) system in which all capacity is allocated to the forward link and no capacity is allocated to the return link. This is useful for a media broadcast system, for example. However, the same communications satellite 120 can be configured (via uploading a different beamforming weight set and channel amplifier gain set) to allocate 75% (for example) of the time slots for forward transmission and 25% for return transmission. This would result in a forward direction capacity of 75% of the FLO example and a return capacity of 25% of the maximum of what could be achieved. In general, let $C_{F\_max}$ be the forward channel capacity with all time slots allocated to the forward direction and let $C_{R\_max}$ be the return channel capacity with all time slots allocated to the return direction. Then for $Q_F$ forward time slot allocations and $Q_R = Q - Q_F$ return channel time slot allocations, the forward and return capacity is $$C_F = \frac{Q_F}{Q} \cdot C_{F\_max} \text{ and} \qquad (2)$$

$$C_R = \left(1 - \frac{Q_F}{Q}\right) \cdot C_{R\_max}$$

where $Q_F$ can assume any value from 0 (all return traffic) to Q (all forward traffic). It is clear from (2) that the allocation of capacity between forward and return can take on any arbitrary proportion limited only by the value of Q, the number of time slots per beam hopping frame. For reasonable sizes of Q, such as Q=64, this limitation is not very limiting as it allows allocation of capacity in increments of ¹⁄₆₄ of the maximum value.

In this approach, all K pathways are used exclusively for forward traffic or exclusively for return traffic at any instant of time. The requirements for the total number of locations of access node terminals 130 can be determined as follows. Let there be K pathways each using W Hz of spectrum on a single polarization. Furthermore, let there be $N_{GW}$ access node terminal sites, each capable of using W Hz of spectrum on each of two polarizations. At any instant of time, the total user link spectrum is KW Hz, which is being used for either forward link or return link transmissions (but never both). The total feeder link spectrum utilized at any given instant is $2N_{GW}W$, which is also used for either forward link transmission or return link transmission, but never both. Equating the two spectrum quantities results in the required number of access node terminals, $N_{GW}=K/2$.

This approach is inefficient since an access node terminal 130 is not both transmitting and receiving 100% of the time. The fraction of time an access node terminal 130 spends transmitting added to the fraction of time that the access node terminal 130 spends receiving is equal to 1. However, an access node terminal 130 could both transmit and receive 100% of the time and is thus being inefficient and underutilized.

Figure 15A:
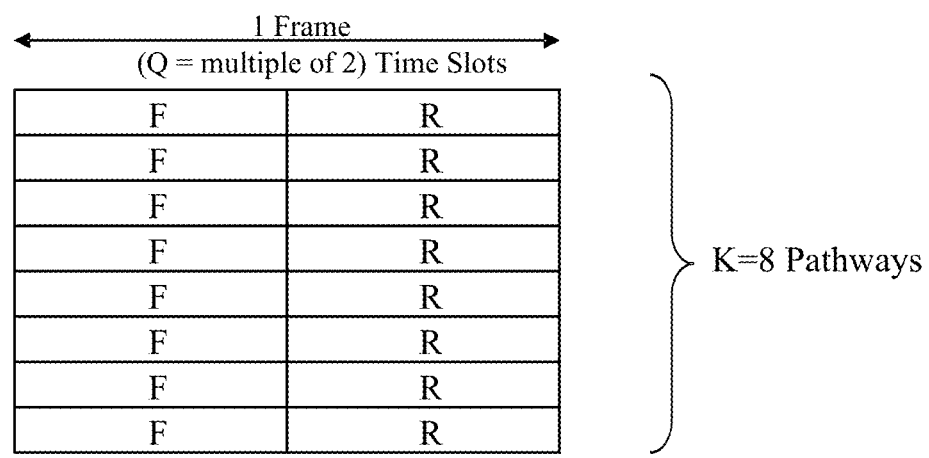
FIG. 15A shows an illustrative synchronized timeslot allocation, in accordance with aspects of the present disclosure.

Such an approach is said to be synchronized, as illustrated in FIG. 15A which shows a 50%-50% time resource allocation 1500 between the forward and return link for each pathway. The pathways are synchronized in that they all service the forward link at some times and all service the return link at other times. As can be seen in time resource allocation 1500, the total feeder link spectrum used is always KW Hz, and it is always either all forward link spectrum or all return link spectrum. As discussed above, this synchronized system requires K/2 access node terminals 130.

Figure 15B:
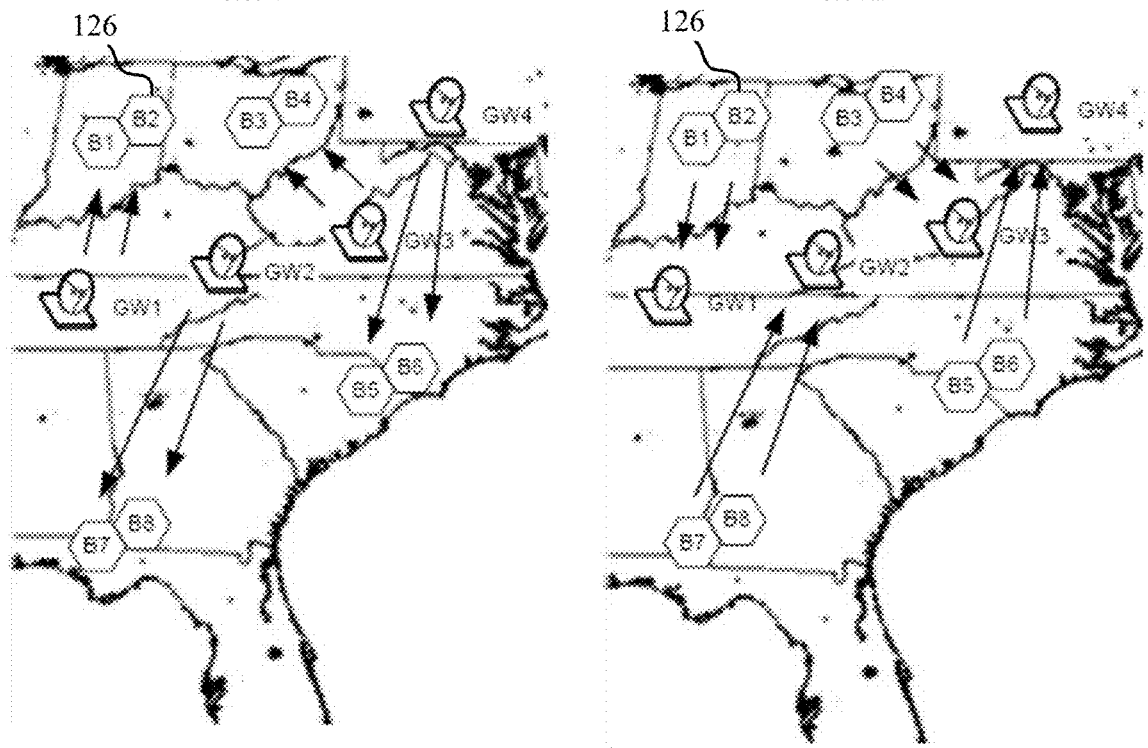
FIG. 15B shows an illustrative timeslot definition table and illustrative timeslot pathways, in accordance with aspects of the present disclosure.

FIG. 15B shows an example synchronized time resource allocation 1510 on an example 8-pathway communications satellite 120 with 8 spot beams 125 and 4 access node terminals 130. In Slot 1 of time resource allocation 1510, all four access node terminals 130 (e.g., GW1, GW2, GW3 and GW4) are transmitting to spot beams B1-B8 as shown in the slot configuration of the time resource allocation 1510. Below the slots, the pathway (PW) usage of the slot is detailed. In Slot 1, all 8 pathways are used for forward links, thus the entry 8F. In Slot 2, user terminals 150 in all the spot beam coverage areas 126 are transmitting to their respective access node terminals 130, so the pathways usage is denoted 8R. To the right of the table, the slot usage is listed for each pathway. For all pathways, the first slot is forward and the second slot is return, so each slot usage entry is FR.

In this example, the access node terminals 130 may be autonomous from each other, although equivalently the transmit access node terminal 130 to a user spot beam 125 could be different than the receive access node terminal 130 for that user spot beam 125. In that case, the access node terminals 130 would need to cooperate in order to provide coherent two-way communication to and from user terminals 150. Note that in all such synchronized cases, half-duplex (transmit and receive at different times) user terminals 150 could be deployed, as all the user spot beams 125 can be scheduled such that the user terminal transmit slots do not overlap with corresponding receive slots.

Figure 16A:
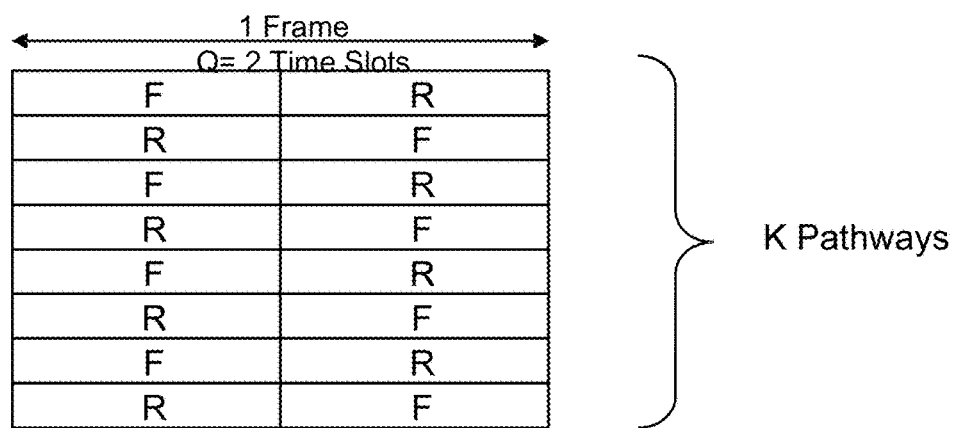
FIG. 16A shows an illustrative interleaved timeslot allocation, in accordance with aspects of the present disclosure.

The approach can be improved by interleaving the forward and return time allocations as shown in time resource allocation 1600 of FIG. 16A. The forward and return time allocations for each pathway are structured such that at any instant of time, half of the pathways are used for forward traffic and half are used for return traffic. This results in the total feeder link spectrum requirement at any instant of time being the same (KW Hz), but it is evenly split between the forward link and the return link. Since the example access node terminal 130 has 2 W Hz of spectrum to use in forward direction and 2 W Hz to use in the return direction, the total number of access node terminals 130 required is K/4. This is half the number of access node terminals 130 required when synchronizing the forward and return time allocations, and hence the preferred way to operate.

Figure 16B:
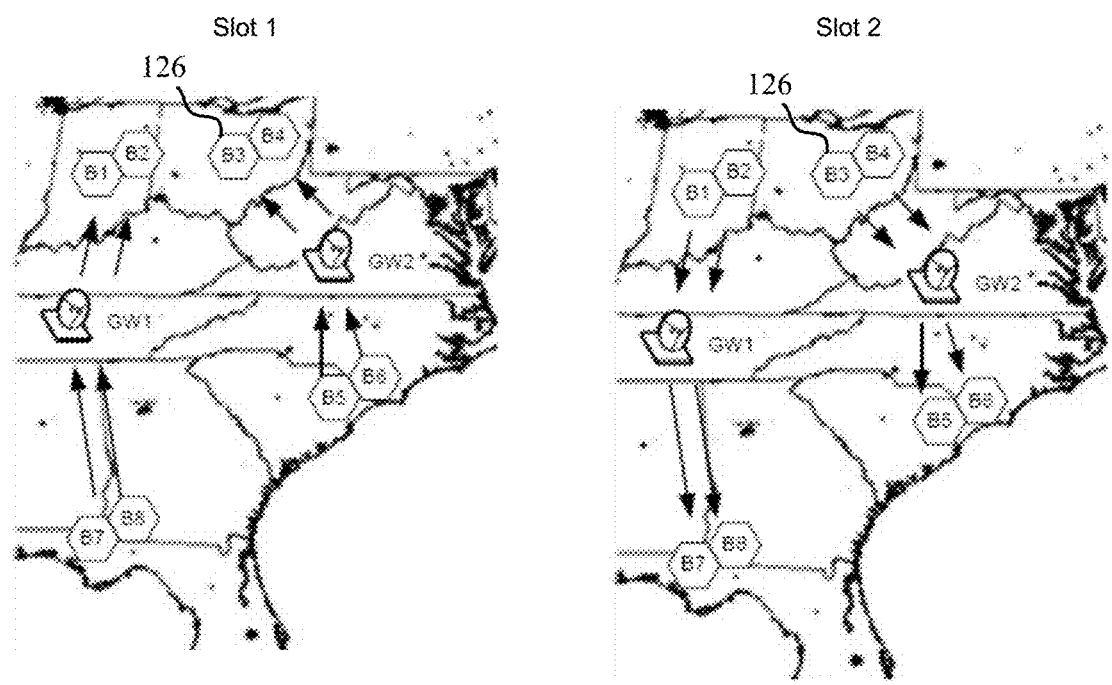
FIG. 16B shows an illustrative timeslot definition table and illustrative timeslot pathways, in accordance with aspects of the present disclosure.

FIG. 16B shows an example of a 50%-50% time resource allocation 1610 with a similar 8-path communications satellite 120 and 8 spot beams 125 as in FIG. 15B. Now, however, only two access nodes are required, GW1 and GW2. In FIG. 16B, GW1 is transmitting LHCP to B1 (which receives RHCP) and transmitting RHCP to B2 (which receives LHCP). Due to the separate polarization, there is no signal interference between spot beams 125, even though they are physically adjacent and could even overlap partially or totally. At the same time (during that first time slot), the user terminals in B7 and B8 are transmitting to access node terminal GW1. Also during this first time slot of FIG. 16B, access node terminal GW2 is transmitting to B3 and B4, while B5 and B6 are transmitting to access node terminal GW2. In the second slot, as in FIG. 15B, the transmission directions are reversed from those of slot 1. Comparing FIG. 16B to FIG. 15B, it can be seen that each spot beam 125 has exactly the same number of transmission and reception opportunities. Note that in this specific case, half-duplex user terminals 150 could be deployed, as the spot beams 125 are scheduled such that the user terminal transmit slots do not overlap with corresponding receive slots. A different schedule could be used that would also achieve the 50%-50% time allocation, but with spot beam transmit and receive slot overlap, possibly requiring that user terminals 150 operate full-duplex, where they could transmit and receive at the same time.

In this example, again the access node terminals 130 may be autonomous from each other, since each spot beam 125 has a single access node terminal 130 for both its forward (to the user spot beam 125) and return (to the access node spot beam 125) transmissions. Also equivalently to the scenario of FIG. 16B, the transmitting access node terminal 130 to a user spot beam 125 could be different than the receiving access node terminal 130 for that user spot beam 125. In that case, the access node terminals 130 would need to cooperate in order to provide coherent two-way communication to and from user terminals 150.

FIG. 17A shows an example of an interleaved time resource allocation 1700 for a 75%-25% time allocation between the forward and return traffic. In this example, 75% of the pathways are used for forward traffic at each instant of time. The remaining 25% are used for return traffic. Each individual pathway is also used for forward traffic during 75% of the beam hopping frame and return traffic during 25% of the beam hopping fame. The result is that at any and every instant of time, the BW used for forward traffic is 3 KW/4 and the BW used for return traffic is KW/4. Since each access node terminal 130 can use 2 W Hz of bandwidth for forward traffic and 2 W Hz of bandwidth for return traffic, the total number of access node terminals 130 required is 3K/8 and is limited by the forward link BW utilization. This number is still smaller than the K/2 value required for the synchronized approach for a 50%-50% time resource allocation, as shown in FIGS. 15A-B.

Figure 17B:
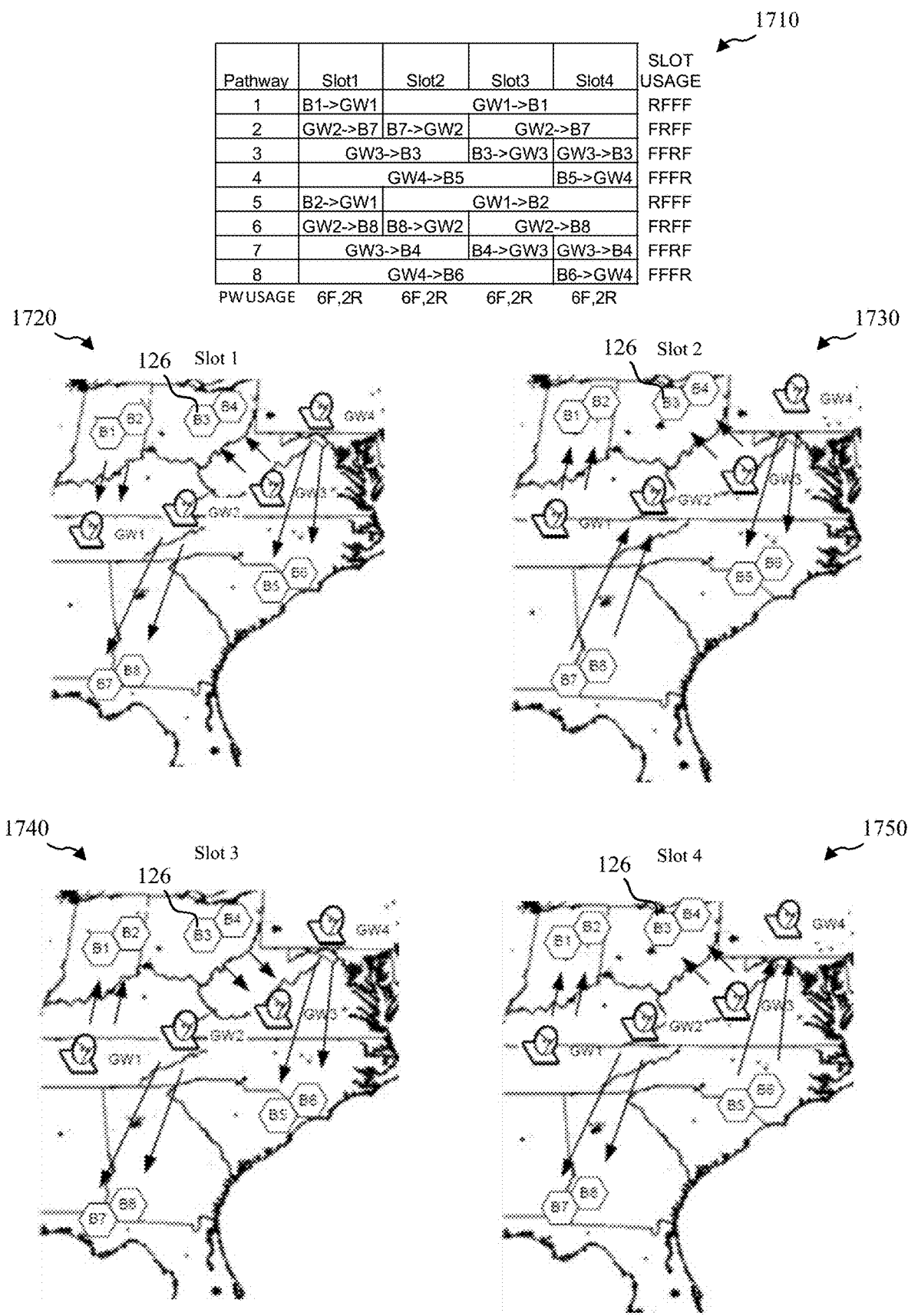
FIG. 17B shows an illustrative timeslot definition table and illustrative timeslot pathways, in accordance with aspects of the present disclosure.

FIG. 17B shows the 4 time slots of an example system including the eight spot beams 125 and four access node terminals 130 of FIG. 15B. As in that example, access node terminals 130 either transmit or receive during each slot, but never both transmit and receive in the same slot. The usage summary at the bottom of the configuration table shows that each slot has 6 forward (e.g., access node terminal to user terminal) pathways and 2 return (user terminal to access node terminal) pathways.

In the first slot, user terminals in B1 and B2 transmit to access node terminal GW1, while all other user terminals 150 receive. In the second slot, the user terminals in B7 and B8 transmit, while the others receive. In the third slot, the user terminals 150 in B3 and B4 are the only ones to transmit, while in the fourth slot, the user terminals 150 in B5 and B6 are the only transmitters. Tabulation of the slots will confirm that each spot beam has 3 forward pathways from a single access node terminal 130 to the spot beam 125, and one return pathway from the spot beam 125 to that same access node terminal. In this case, K/2=4 access node terminals 130 are used, although the minimum number of access node terminals 130 is 3K/8=3 access node terminals.

If 100% of the traffic were allocated to the forward link, all pathways would be used for forward traffic 100% of the time. This would result in the total forward spectrum of KW Hz and the required number of access node terminals 130 would be K/2, the same number as in the synchronized approach.

In the general case, each pathway is allocated to be a forward pathway for a fraction $\alpha_F$ of the time in the beam hopping frame. The allocations are interleaved with the objective of having a fraction $\alpha_F$ of the K total pathways operating as forward pathways at each instant of time. The remainder, K(1-$\alpha_F$), would be operating as return link pathways. At each instant of time, the required forward link spectrum is KW$\alpha_F$ and the required return link spectrum is KW(1-$\alpha_F$). Hence the total number of required access node terminals 130 is $N_{GW}$=Max($\alpha_F$, 1-$\alpha_F$)K/2. Note this may require coordination among the access node terminals 130.

Approach 2: Flexible Allocation of Hardware Resources

Figure 18A:
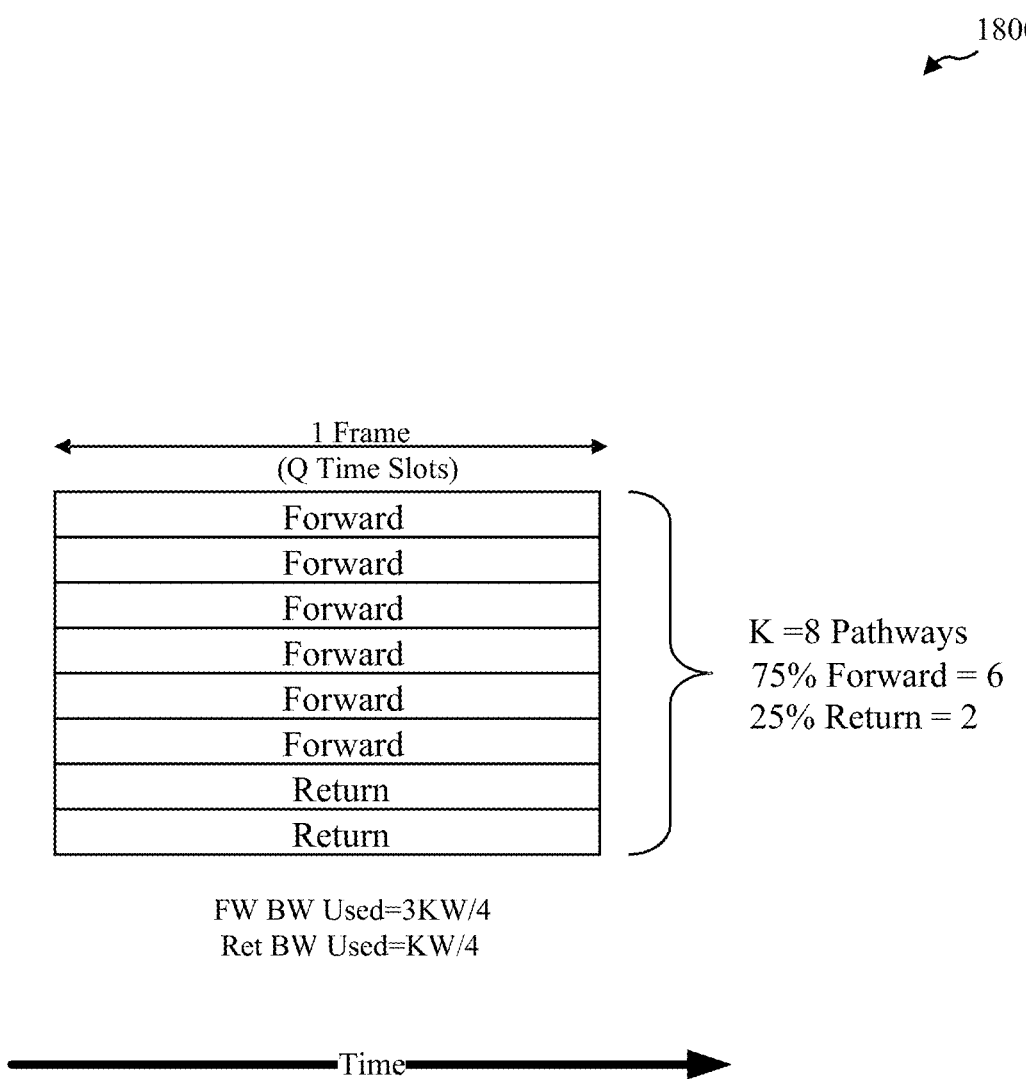
FIG. 18A shows an illustrative dedicated pathways allocation, in accordance with aspects of the present disclosure.

In this approach, any single pathway is either dedicated entirely (all times slots in the beam hopping frame) to forward link transmissions or dedicated entirely to return link transmissions. What is flexible is the number of pathways that are dedicated to forward pathways and the number of pathways that are dedicated to return pathways. This is illustrated in FIG. 18A for an example allocation of 75% of the pathways to forward links and 25% to return links.

Figure 18B:
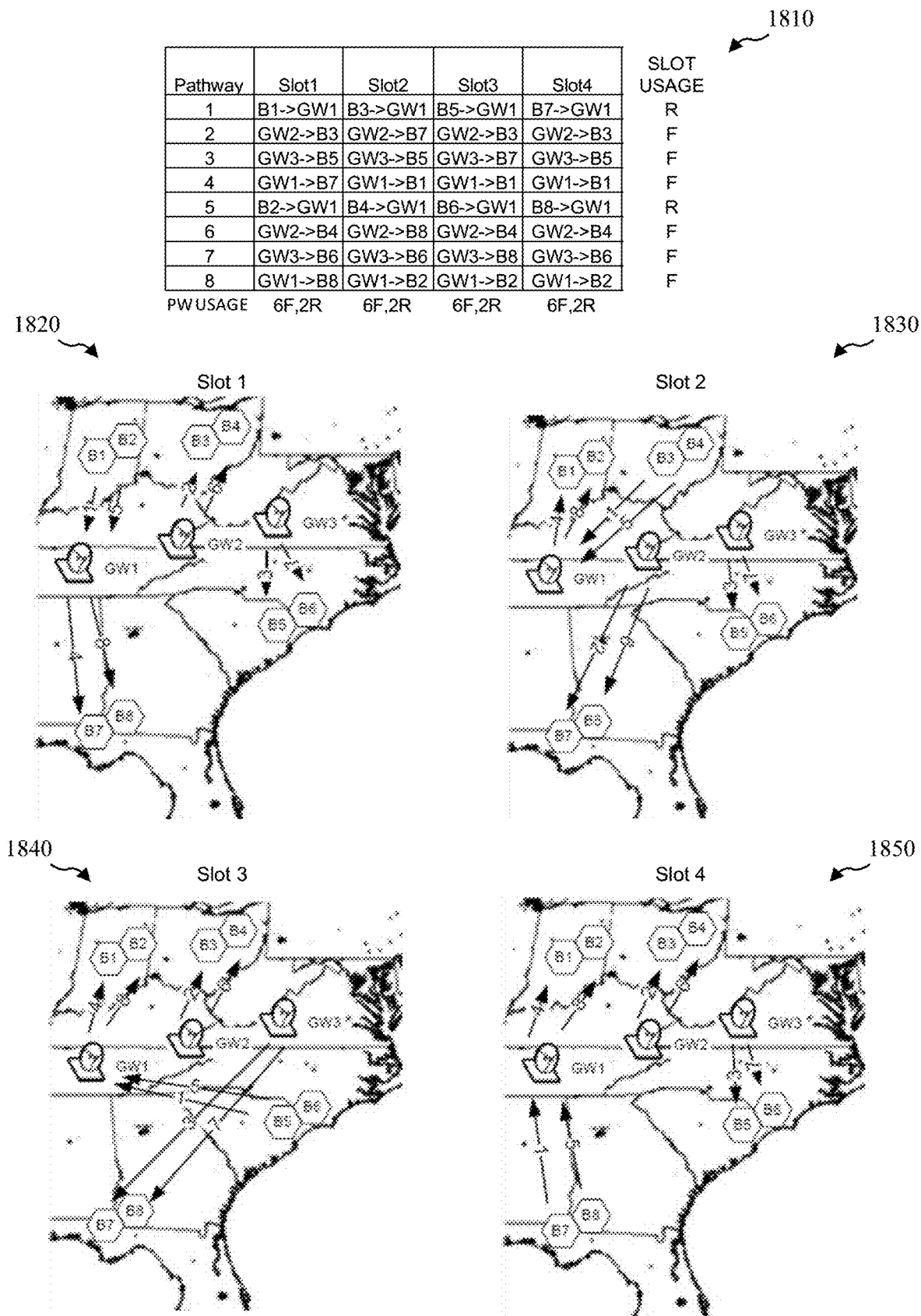
FIG. 18B shows an illustrative timeslot definition table and illustrative timeslot pathways, in accordance with aspects of the present disclosure.

FIG. 18B shows the timeslots for a 75%-25% pathway allocation 4 slot frame for the example 8 pathway communications satellite 120 as discussed previously. Here, the pathways are identified by number in the map view. Pathway 1 (LHCP→RHCP) and Pathway 5 (RHCP→LHCP) are dedicated to return traffic, while the remaining pathways are dedicated to forward traffic.

In slot 1, access node terminal GW 1 receives data from spot beams B1 and B2, while all three access node terminals transmit to the remaining spot beams. In slot 2, spot beams B3 and B4 transmit to access node terminal GW1, while all three access node terminals transmit to the remaining spot beams. In slot 3, spot beams B5 and B6 transmit to access node terminal GW1, while all three access node terminals transmit to the remaining spot beams. In slot 4, spot beams B7 and B8 transmit to access node terminal GW1, while all three access node terminals transmit to the remaining spot beams.

Consider one polarization of this example two-pole system. This system still uses three access node terminals, GW1-GW3 (each operating in one of the two available polarizations), but now only consider spot beams B1-B4 and pathways 1-4. There are still 4 slots per frame and thus 4 pathways×4 slots=16 total slots available. This system has allocated 75% (12) of these slots to forward traffic and 25% (4) of these slots to return traffic. The 4 return slots fill the entire frame exactly. The 12 forward slots need to be distributed across the 4 spot beams, so each spot beam gets 3 slots. These same 12 forward slots, however, need to be distributed across 3 access node terminals, so each access node terminal must fill 4 forward slots. Thus, there cannot be a one-to-one mapping between access node terminals and spot beams such that all the traffic for any spot beam passes through the same access node.

Figures 18C, 18D, 18E:
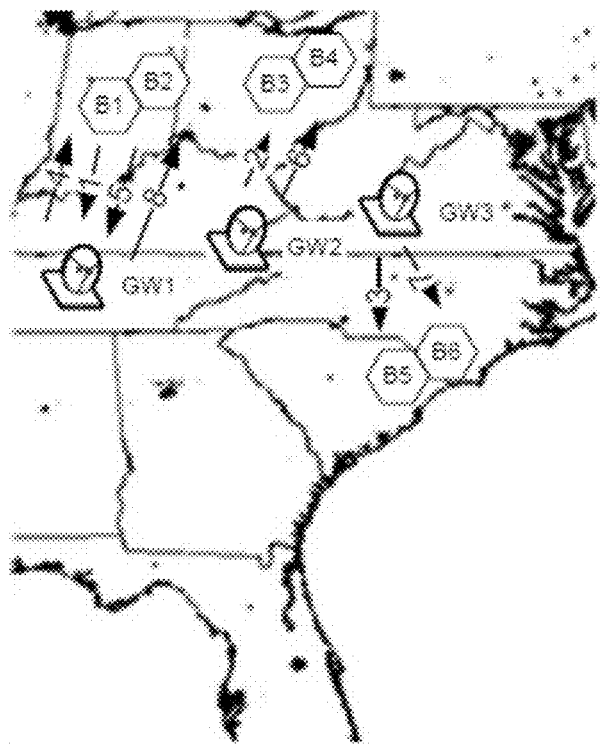
FIG. 18C shows an illustrative timeslot definition table, in accordance with aspects of the present disclosure.
FIG. 18D shows an illustrative timeslot definition table, in accordance with aspects of the present disclosure.
FIG. 18E shows illustrative timeslot pathways, in accordance with aspects of the present disclosure.

Careful attention to the number of spot beams 125, slots, access node terminals 130, and pathways can provide flexibility in the mapping of access node terminals 130 to spot beams 125. FIGS. 18C-18E show two more example embodiments of flexible allocation of hardware resources. Here, there are 6 spot beams that require a 75%-25% pathway allocation in the example communication system having an 8 pathway satellite and 3 access node terminals as discussed previously. Since there are only 6 spot beams B1-B6, only 3 time slots are required. The user terminals 150 will generally operate in full-duplex (simultaneous receive and transmit) mode during their active beam hopping time slots. Now there are 4 pathways×3 slots=12 slots to be allocated per polarity. 75% of 12 (9) slots are used for forward traffic, while 25% of 12 (3) slots are used for return traffic. The 3 return slots again fill one frame, corresponding to the one pathway allocated for return traffic per polarity. Now, however, the 9 forward slots (3 per pathway) per polarization can be divided such that there are exactly 3 slots per access node terminal and 3 slots per spot beam, thus allowing a one-to-one mapping between user spot beams and access node terminals.

In FIGS. 18C and 18D, both polarizations are depicted. Forward pathways 2-4 and 6-8 are each dedicated to a single access node terminal 130: pathways 2 and 6 (for the two polarizations) of GW 2, pathways 3 and 7 for GW 3 and pathways 4 and 8 for GW 1. In FIG. 18C, the return pathways are shared among the three access node terminals 130 such that each access node terminal 130 receives from the same spot beam coverage areas 126 to which it transmits, thus implementing a one-to-one mapping between user spot beams 125 and the access node terminals 130 that service them. Alternatively, in FIG. 18D, the return pathways are all directed to GW 1. In this case, GW 1 is considered a shared receive access node terminal 130 and GW 2 and GW 3 can operate half-duplex as transmit only. In this shared receive access node terminal embodiment, a number of access node terminals 130 transmit to a number of user terminals 150, while those user terminals 150 only transmit (if they transmit at all) to a single access node terminal 130, typically one of the transmit access node terminals 130. FIG. 18E shows the first time slot of the system of either FIG. 18C or FIG. 18D, as it is the same in both cases.

A shared receive access node terminal 130 can have utility, for example, if there are user terminals 150 that transmit requests for information that is located at one access node terminal 130, or if one access node terminal 130 is the interface between the ground network of access node terminals 130 and a network 140. In this case, having all user terminals 150 request the information directly from that access node terminal 130 will avoid the problem of having the other access node terminal 130 forward requests to that interface access node terminal 130.

The reverse is also possible: a shared transmit access node terminal system where user terminals 150, perhaps sensor terminals, transmit a large amount of information, but only need to receive a small amount. For example, a 25%-75% time allocation could be implemented by switching the direction of the spot beams 125 in FIG. 15B. Thus, access node terminal GW1 would be the common transmitter for all the user spot beams 125. In these shared access node terminal embodiments, half-duplex access node terminals 130 can be deployed if the system operator has a backbone network (e.g., an example of a network 140 as described with reference to FIG. 1) that connects the access node terminals 130 such that traffic can be directed and scheduled properly.

Let $K_F$ be the number of forward pathways and $K_R$ be the number of return pathways where $K_F+K_R=K$ is the total number of pathways. Since each pathway is always used entirely in the forward or return direction, there is no need to dynamically change the net electronic gain through the pathway on a time slot by time slot basis. Hence, dynamic adjustment of the channel amplifier gain on a slot-by-slot basis may not be required.

By setting $K_F=K$ and $K_R=0$, we have all forward traffic, (FLO). By setting $K_R=K$ and $K_F=0$, we have all return traffic, (Return Link Only or RLO). In general, the capacity allocation is each direction is, $$C_F = \frac{K_F}{K} \cdot C_{F\_max} \text{ and} \quad (3)$$
$$C_R = \frac{K_R}{K} \cdot C_{R\_max} = \left(1 - \frac{K_F}{K}\right) \cdot C_{R\_max}$$

where $K_F$ can assume any value from 0 (all return traffic) to K (all forward traffic). It is clear from (3) that the allocation of capacity between forward and return can be take on any arbitrary proportion limited only by the value of K, the number of pathways (e.g., of a communications satellite 120, or of a GBBF system). For reasonable sizes of K, such as K=100, this limitation is not very limiting as it allows allocation of capacity in increments of 1/100 of the maximum value.

In this approach, at any instant of time the total user link spectrum used in the forward direction is $K_F W$. In the return direction, the total spectrum used is $K_R W$. Again, it is assumed that each access node terminal 130 has W Hz available for use on each of two polarizations. The total feeder link spectrum available for use is $2N_{GW} W$ in each direction (forward and return). Therefore the number of cooperating (not autonomous) access node terminals 130 required is, $N_{GW}=\text{Max}(K_F,K_R)/2$, which is the same as approach one when careful assignment of the Transmit and Receive slots was chosen to minimize the access node terminal count. However, approach 2 has the advantage of not needing to dynamically change the net gain of the pathway during the beam hopping frame to accommodate dynamic changing between forward and return configurations.

Figure 19:
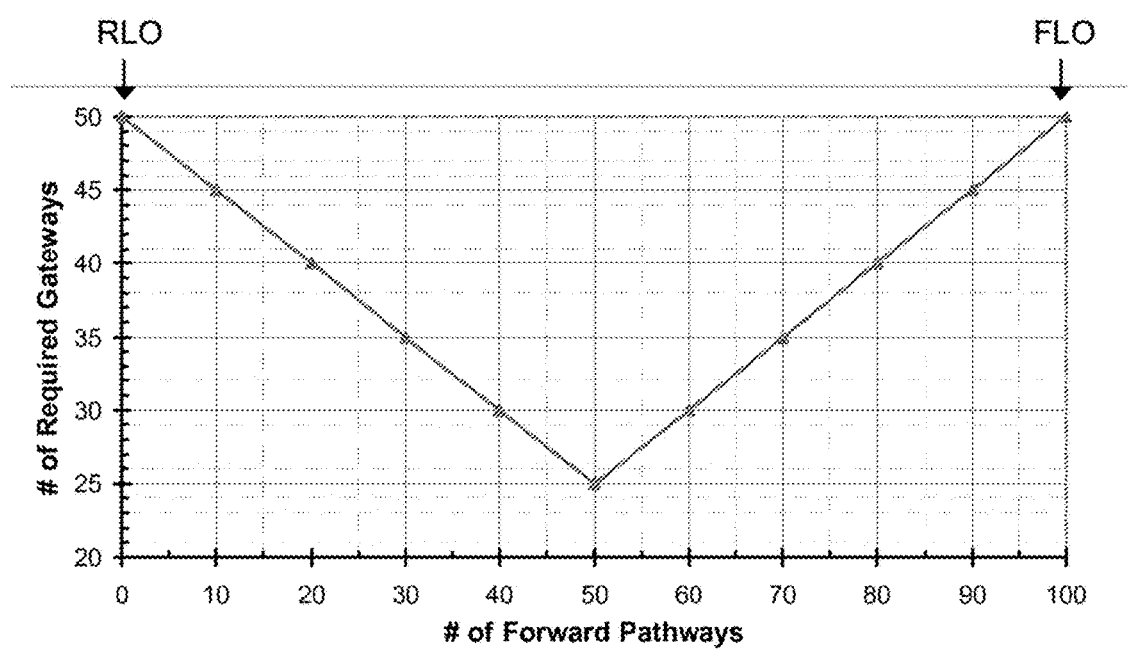
FIG. 19 shows an illustrative chart of the number of access node terminals required versus the number of forward pathways allocated, in accordance with aspects of the present disclosure.

FIG. 19 shows an illustrative chart 1900 of the number of cooperating access node terminals 130 (e.g., gateways) required versus the number of forward pathways allocated when K=100. As shown in FIG. 19, the number of cooperating access node terminals 130 required is minimum when $K_F=K_R$, while the number of cooperating access node terminals 130 required is maximum for RLO (i.e., $K_F=0$) and FLO (i.e., $K_R=0$).

In all of the discussed approaches, it should be clear that the forward link and return link can be operated as two independent transmission systems. The allocation of capacity between the two transmission systems can be divided up in nearly any proportion desired, as possibly limited by K or Q. Then each transmission system can independently spread its capacity around a service coverage area 410 in any way desired by appropriate setting of the beamforming weight vectors that create the spot beams 125 in each time slot. Generally, one would set the service coverage area 410 for the forward link and return links to be the same physical area. This provides every point in the service coverage area 410 with opportunities for reception of forward link data and transmission of return link data. In general, these opportunities will not always occur in the same time slots. It can also be seen that the ratio of forward to return traffic need not be the same at every point in the service coverage area 410. This allows the ratio of forward to return traffic to be customized in each spot beam coverage area 126. The mechanism for customizing this ratio is the adjustment of the number (and/or size) of forward and receive time slots allocated to each physical location of spot beam coverage areas 126.

Figure 20A:
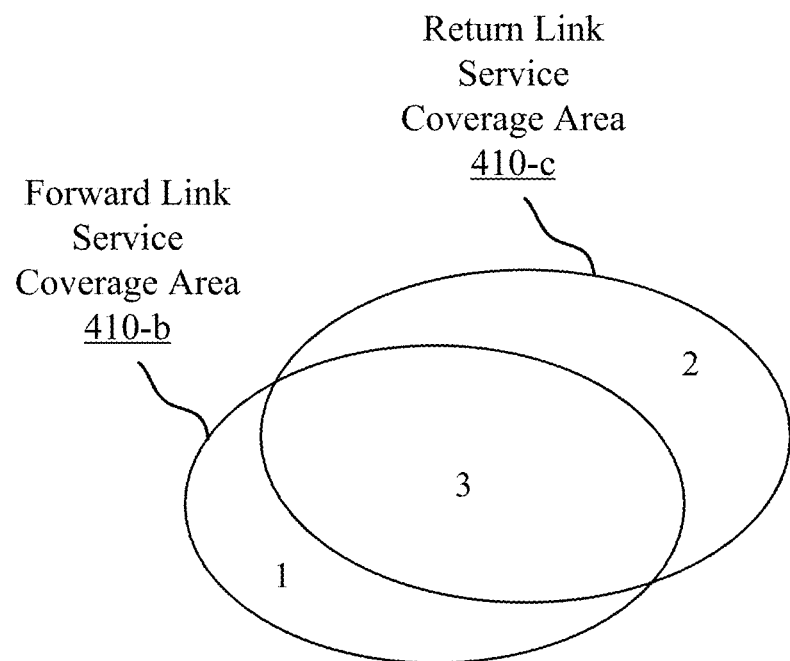
FIG. 20A shows illustrative non-congruent forward and return link service coverage areas, in accordance with aspects of the present disclosure.

FIG. 20A illustrates an example 2000 of non-congruent service coverage areas 410 for forward and return link service, according to aspects of the present disclosure. The forward link service coverage area 410-b is the union of the spot beam coverage areas 126 of the individual forward link spot beams 125 formed during a beam hopping time frame. Likewise, the return link service coverage area 410-c is the union of the spot beam coverage areas 126 of the individual return link spot beams 125 formed during a beam hopping time frame. The union of the forward link service coverage area 410-b and the return link service coverage area 410-c can be broken into 3 regions. Region 1 is the area where the beamforming weight set provides forward link spot beams 125 but no return link spot beams 125. This region could support forward link traffic only. Region 2 is the area where the beamforming weight set provides return link spot beams 125 but not forward link spot beams 125. This region could support return link traffic but not forward link traffic. Region 3 is the region where the beamforming weight set provides both forward and return spot beams 125, although not necessarily in the same time slot. Both forward and return link traffic can be supported. Furthermore, the ratio of forward to return capacity can be customized in each physical location of spot beam coverage areas 126 within region 3.

Figure 20B:
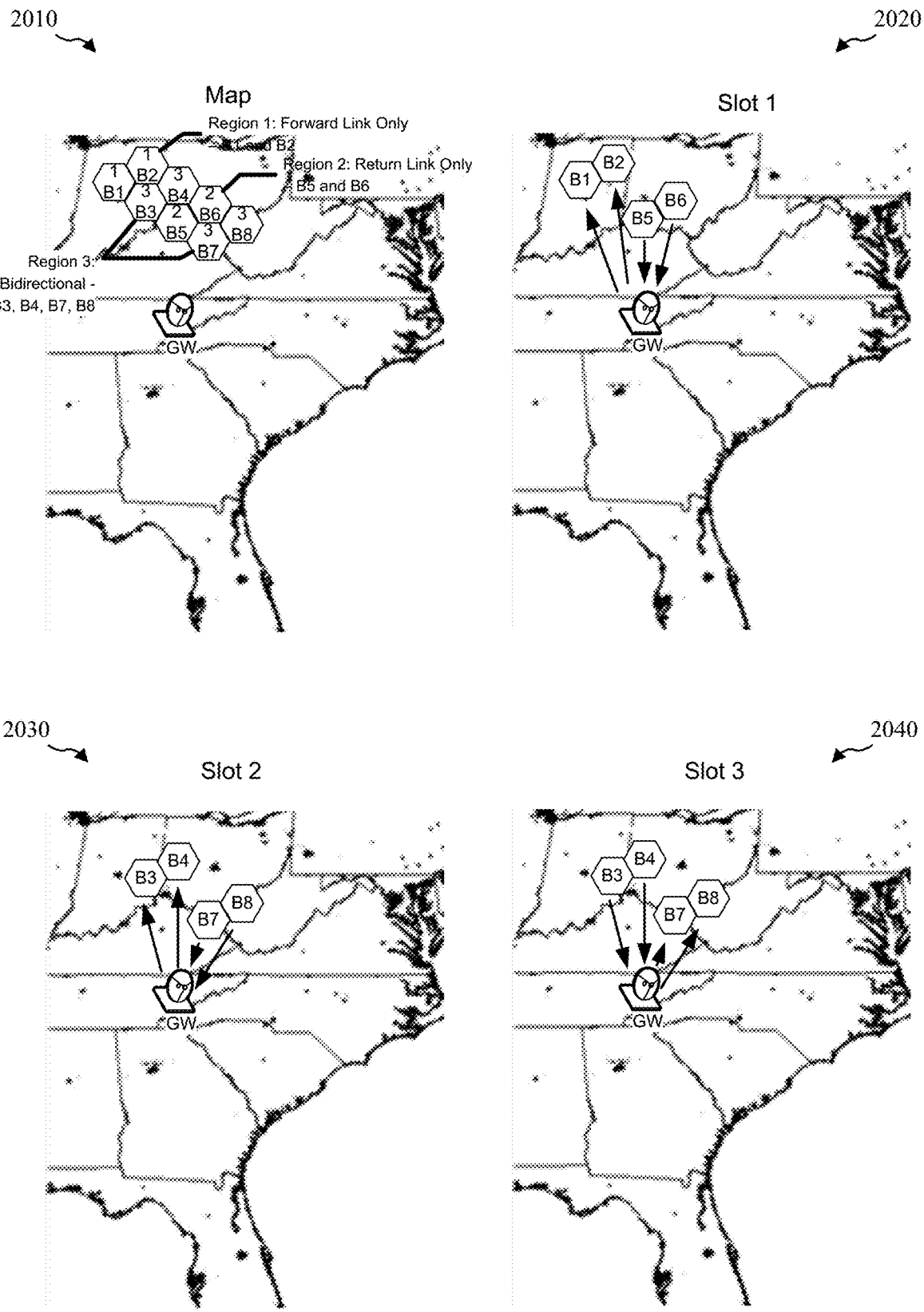
FIG. 20B shows illustrative timeslot pathways in accordance with aspects of the present disclosure.

FIG. 20B illustrates a simple single access node terminal, 4 pathway system, in accordance with aspects of the present disclosure. Here, forward link Region 1 contains spot beams 1 and 2, return link Region 2 contains spot beams 5 and 6, while bi-directional Region 3 contains spot beams 3, 4, 7 and 8. This illustrates that while Region 3 was shown in FIG. 20A as a single logical zone, there is no requirement that the spot beams 125 comprising Region 3 be contiguous. In fact, Regions 1 and 2, shown in this example as contiguous, could also have been comprised of a number of distinct areas.

In Slot 1, the access node terminal GW transmits to the terminals in Region 1, spot beam coverage areas B1 and B2, and receives from the terminals in Region 2, spot beam coverage areas B5 and B6. The terminals in Region 3 are inactive during this slot, while the terminals in Regions 1 and 2 are inactive during the remaining slots. In Slot 2, the access node terminal GW transmits to terminals in spot beam coverage areas B3 and B4 and receives from terminals in spot beam coverage areas B7 and B8. In Slot 3, the access node terminal GW receives from terminals in spot beam coverage areas B3 and B4 and transmits to terminals in spot beam coverage areas B7 and B8.

The present invention provides a flexible high-capacity satellite communications architecture. Characteristics of this architecture may include one or more of the following:

1. high capacity;
2. flexible allocation between forward and return capacity;
3. flexible capacity distribution and service coverage areas 410;
4. re-configurable service coverage areas 410 and capacity allocation;
5. flexible locations for access node terminals 130, for example, using beam hopping to enable access node terminals 130 to occupy the same spectrum and the same location as spot beams 125; and the ability to move access node terminal locations over the lifetime of the satellite;
6. incremental rollout of access node terminals 130;
7. orbital position independence;
8. dynamic equivalent isotropically radiated power (EIRP) allocation across access node terminals 130 to mitigate rain fade, for example, where margin requirements are based on a sum of rain fade on all diverse paths rather than on statistics of an individual path;
9. operation with half-duplex terminals; and
10. operation with reduced redundancy payload hardware.

Characteristics (1) and (2) have been described. Further details of characteristics (3) through (10) are provided below.

A small number of cells can be active at any instant of time, where a cell may refer to a portion of a service coverage area 410 (e.g., spot beam) providing a communications service to a subset of terminals, for example. In one example, $K_F$=40 to 60 transmit spot beams 125 (e.g., for user terminal downlink). Beamforming weight vectors can be dynamically changed per an uploaded schedule. Take an example where the total number of user cells equals $K_F \times Q$, where Q=number of timeslots and $1 \leq Q \leq 64$. Here, the composite of spot beam coverage areas 126 is increased by a factor of Q. The average duty cycle of a spot beam 125 may be equal to 1/Q. The forward link speed to a spot beam 125 is reduced by a factor of Q. It may be preferable for a user terminal 150 to be able to demodulate all carriers in the W Hz bandwidth. For W=1500 MHz, $\eta_{Hz}$=3 bps/Hz, and Q=16, the average downlink speed to a user terminal 150 is about 281 Mbps.

Turning to the return link, in one example, $K_R$=40 to 60 receive spot beams 125 (e.g., for user terminal uplink). Beamforming weight vectors can be dynamically changed per an uploaded schedule. Take an example where the total number of user cells equals $K_R \times Q$, where Q=number of timeslots and $1 \leq Q \leq 64$. Here, the composite of spot beam coverage areas 126 is increased by a factor of Q. The average duty cycle of a spot beam may be equal to 1/Q. The return link speed to a spot beam 125 is reduced by a factor of Q. It may be preferable for a user terminal 150 to use a burst HPA capable of high peak power but lower average power. For 12 W peak HPA with 3 W average power limit, 40 Msps uplink, 2.25 bits/sym, and Q=16, the average uplink speed from a user terminal 150 is 5.625 Mbps.

The flexible high-capacity satellite communications architecture described herein may also provide non-uniform distribution of capacity around a service coverage area 410. Capacity can be allocated to different cells in near arbitrary proportions by assigned differing numbers of slots per cell. Again, there are Q timeslots in a beam hopping frame. Each cell uses $q_j$ timeslots, such that $$\sum_{j=1}^{J} q_j = Q \qquad (4)$$

where J is the number of service beam coverage area locations that a spot beam signal pathway hops to in the beam hopping frame. Capacity in each cell is:

$$C_j = C_b \frac{q_j}{Q} \qquad (5)$$

where the instantaneous capacity per spot beam=$C_b$.

FIGS. 21A-21C illustrate an example of beam hopping with non-uniform distribution of capacity, in accordance with aspects of the present disclosure. FIG. 21A shows an illustrative beam hop pattern 2100 of a single spot beam signal pathway for 8 non-uniform timeslot dwell times of a beam hopping frame. In the example, Q=32 and $C_b$=4.5 Gbps. The cell locations in the beam hop pattern 2100 are shown as contiguous for ease of illustration. FIG. 21B shows an illustrative timeslot dwell time table 2110 for the beam hop pattern 2100. For each of the 8 timeslot dwell times of the timeslot dwell time table 2110, the number of timeslots $q_j$ assigned to the corresponding cell location and the area capacity $C_j$ in Mbps is shown. FIG. 21C shows an illustrative beam hopping frame 2120 for the timeslot dwell time table 2110. The beam hopping frame 2120 includes K spot beams 125. The non-uniform timeslot dwell times for spot beam #1 of the beam hopping frame 2120 match the dwell times illustrated in the timeslot dwell time table 2110. It is preferable to have all the spot beams 125 change locations at the same time. This minimizes the beam-beam interference as each spot beam 125 only overlaps in time with K−1 other spot beams 125. However, the system can operate without this constraint. More spot beams 125 can then interfere with each other, and the spot beam locations should be chosen with this in mind.

Spot beam locations are defined by the weight vectors used in the BFNs 710. Capacity per cell is set by the duration of the beam hopping frame the spot beam 125 stays pointed at a cell (dwell time). Both beam weight vectors and dwell times (e.g., as beam hop frame definitions) can be stored in a BWP 714. These values can be uploaded to the BWP 714 by a data link from the ground. Both the beam locations (e.g., spot beam coverage areas 126) and dwell time (capacity allocation) can be changed. For example, the beam locations and/or the dwell times can be changed occasionally by uploading new weight sets and new beam hop frame definitions, or frequently in response to daily variations (e.g., capacity shifting to match the busy hour) by commanding the BWP 714 to use one of several pre-stored weight sets and beam hop frame definitions. One beamforming weight set contains beam weights and one beam hop frame definition contains dwell times for all the beams in all time slots in a beam hopping frame.

Access node terminals 130 can be placed outside of a user terminal service coverage area 410, or in a user terminal service coverage area 410 at the cost of a small increase in the number of access node terminals 130. To facilitate mapping access node terminal locations, one can use the number of colors available from the access node terminals 130. The total number of colors=time colors×polarization colors×frequency colors. Take an example with Q=4, W=1500 MHz (full band), and dual polarization. The total number of colors=4 times×2 poles×1 frequency=8. The number of access node terminals 130, $N_{GW}$, is determined by $$\sum_{i=1}^{N_{GW}} C_i \geq K \cdot Q = M = \text{\# of user beams} \quad (6)$$

where $C_i$=the number of colors serviceable by access node terminals #i.

Figure 22A:
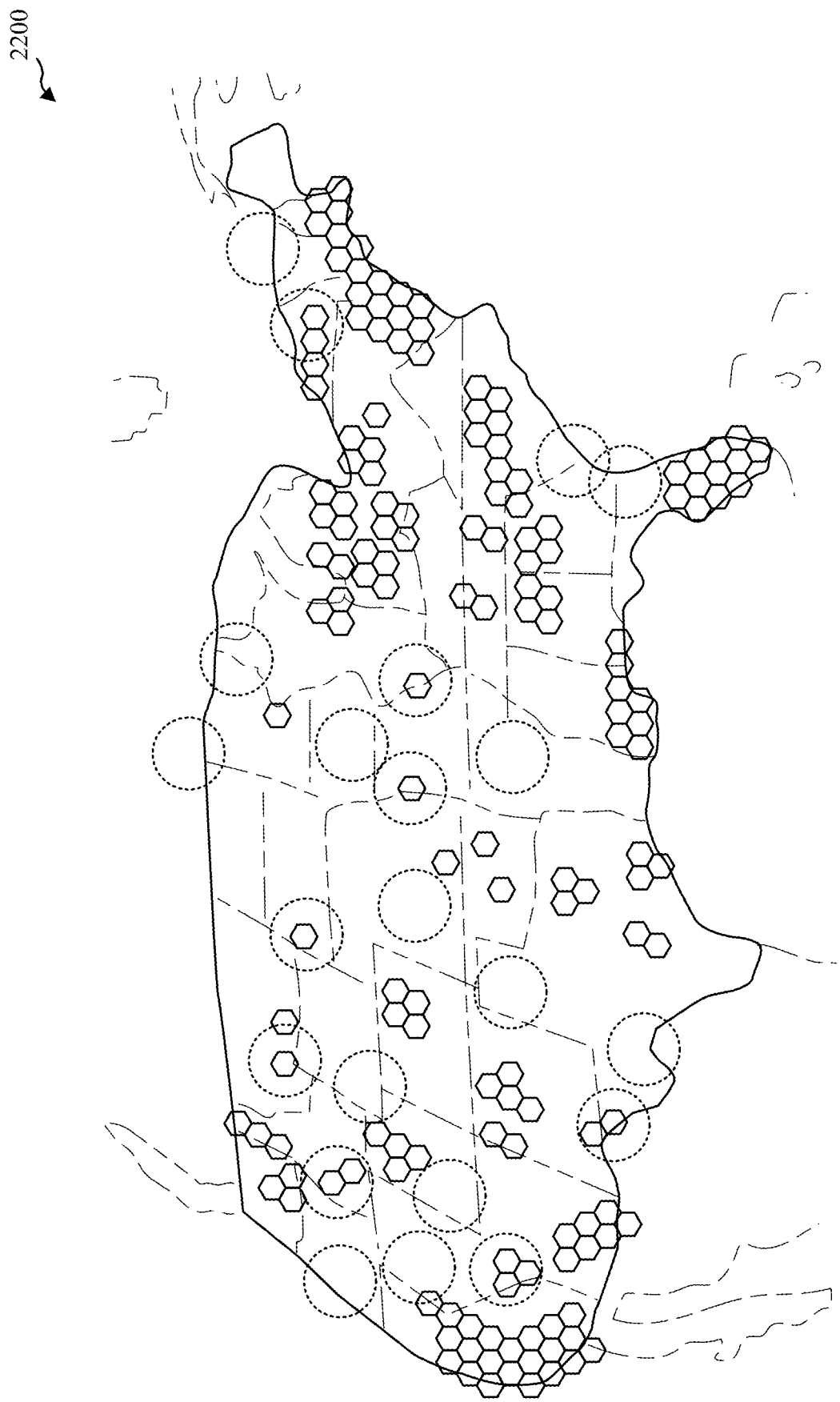
FIG. 22A shows illustrative access node terminal locations and user spot beam locations in accordance with aspects of the present disclosure.

FIG. 22A shows illustrative access node terminal locations and user spot beam coverage area locations for an example with 23 access node terminals 130 (22 operational access node terminals+1 utility access node terminal). The user spot beam coverage area locations are shown as cells and the access node terminal locations are shown as dashed circles in the map 2200 of FIG. 22A.

Figures 22B, 22C:
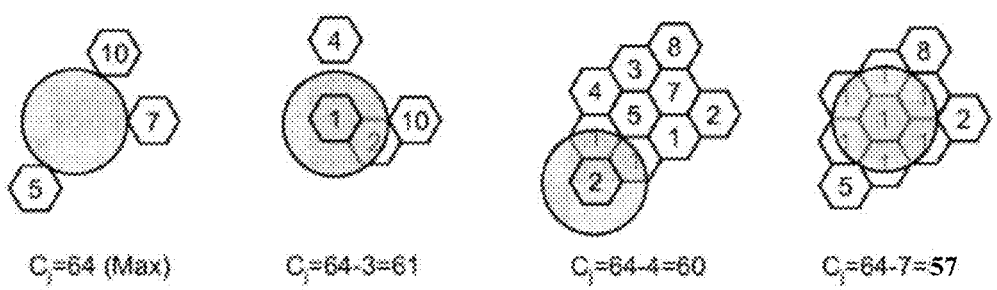
FIG. 22B shows an illustrative access node terminal table, in accordance with aspects of the present disclosure.
FIG. 22C shows illustrative placements of access node terminal locations, in accordance with aspects of the present disclosure.

FIG. 22B shows an illustrative access node terminal table 2210 for the map 2200. The access node terminal table 2210 shows, for each access node terminal 130, the access node terminal location, the number of spot beam issues (i.e., the number of colors unusable), and the number of colors serviceable by the access node terminal 130, $C_i$. For K=40, Q=4, M=160 spot beams, and the $C_i$ illustrated in the access node terminal table 2210, $\Sigma C_i$=168≥160. Thus, for this example, the system can operate with any 22 out of the 23 access node terminals 130. Placing all the access node terminals 130 with no spot beam infringements would require K/2=20 access node terminals 130. In this example, only 2 additional access node terminals 130 are required to allow some spatial overlay between access node terminals 130 and user spot beam coverage areas 126.

In an extreme example, all the access node terminals 130 are located in the user terminal service coverage area 410. Here, K=40, Q=24, and M=960 spot beams 125 for full CONUS coverage and a hop dwell=1/24th of the beam hopping frame for all spot beams 125. The total number of colors is 48=24 times×2 poles. If the access node terminals 130 were located away from the user terminal service coverage area 410, the minimum number of access node terminals 130 would be 20. However, for this extreme example with all access node terminals 130 located in the user terminal service coverage area 410, the maximum number of colors unusable is assumed to be 7. Thus, $C_i \geq 41=48-7$ for all access node terminals 130. It is further assumed that 6 access node terminals 130 are located where the number of unusable colors is ≤4 (e.g., service coverage area boundaries such as coastal regions). For these 6 access node terminals 130, $C_i$=48-4=44. The number of access node terminals 130 required is equal to 23, where $\Sigma C_i$=(6×44)+(17×41)=961≥960. This results in a 15% increase (i.e., from 20 to 23) in access node terminals 130 required, but with complete flexibility in the location of 17 out of 23 access node terminals 130, all of which are within the user terminal service coverage area 410.

Flexibility in access node terminal locations can also be achieved with non-uniform hop dwell times. The number of access node terminals 130 required is defined by a similar equation $$\sum_{j=1}^{N_{GW}} C_j \geq K \cdot Q \quad (7)$$

where $C_j$=total number of useable hop dwell periods by access node terminal j. The maximum possible value of $C_j$ is 2Q (i.e., 2 polarization colors, 1 frequency color). The optimum placement of access node terminals is, first, in regions of no service (i.e., $C_j$=maximum value), and second, in cells of low hop dwell time and next to cells of low hop dwell time. Placing access node terminals 130 accordingly will generally result in even fewer additional access node terminals 130, compared to the examples above where the hop dwell times are uniform.

FIG. 22C shows illustrative placements 2220 of access node terminals 130. In this example, Q=32 hop dwells per beam hopping frame, there are 2 polarization colors, and 1 frequency color. The first placement, where $C_j$=64=maximum value, places the access node terminal 130 in a region of no user terminal service. The other three placements, where $C_j$<64, place the access node terminals 130 in cells of low hop dwell time and next to cells of low hop dwell time.

Incremental rollout for access node terminals 130 is described for an example system with K=40, Q=4, and $N_{GW}$=20. The number of spot beams M=160, and the average duty cycle=1/Q=25%. In a first example, if service is started with one access node terminal (K=2 pathways), one access node terminal services two beams at a time. Setting the number of time slots Q=80 provides all 160 spot beams 125. However, the resulting duty cycle=1/80. Thus, in this first example, there is a reduction in speed and capacity. The duty cycle can be increased as the number of access node terminals 130 increase.

In a second example, if service is started with four access node terminals 130 and only 40 spot beams 125, the resulting service coverage area 410 is 25% of the initial service coverage area 410. Note that it can be any 25%. With K=8 pathways, setting Q=5 provides 40 beams, with a duty cycle=1/5. Thus, in this second example, there is minimal reduction in speed and spot beam capacity. The service coverage area 410 can be increased as the number of access node terminals 130 increase. These approaches trade off initial service coverage area 410 and/or speed/capacity for a reduced number of initial access node terminals 130.

Beamforming weight vectors, and thus locations of spot beam coverage areas 126, are flexible in the satellite communications architecture described herein. Supporting a communications service after a change of an orbital position can be accomplished by updating (e.g., uploading) a new set of beamforming weight vectors to allow coverage of the same spot beam coverage areas 126 from a different orbit position. This provides several benefits. The orbital position can be undefined at the time the communications satellite 120 is being built. The orbital position can be changed at any time during the lifetime of the communications satellite 120. A generic design for a communications satellite 120 can be used for any orbital position and any definition of a service coverage area 410 within the reasonable scan range of the reflector 122. Furthermore, a native antenna pattern coverage area 221 for an antenna assembly 121 may be adapted for such changes in orbital position, as described herein.

Updates to a beamforming weight set for providing a communications service at a new orbital position may be accomplished in various manners. In some examples, new beamforming weight sets may be uploaded to a communications satellite 120, or new beamforming weight sets may be selected from those stored at the communications satellite 120. In some examples, a new beamforming weight set may be received from a network device 141, such as a network management entity. In some examples, a new beamforming weight set may be calculated at a communications satellite 120, based at least in part on the new orbital position of the communications satellite. In some examples, BFNs 710 may be located at a ground segment 102 (e.g., for GBBF), in which case beamforming weight sets may be selected and/or calculated at the ground segment 102.

The updated beamforming weight sets may provide various characteristics of a communications service at the new orbital position. For example, the beamforming weight sets may be configured in a manner that uses the same, or a different plurality of feed elements to form a particular spot beam 125, and/or to provide the communications service to a particular cell. In some examples, the beamforming weight sets may be updated to provide spot beams having the same spot beam coverage area at an updated orbital position. In some examples, the beamforming weight sets may be updated to provide sesame service coverage area at an updated orbital position. In some examples, a communications service may be provided to a plurality of cells of a service coverage area, and in response to the change in orbital position, the communications service may be provided to at least one of the cells via a spot beam having the same bandwidth, the same frequency, the same polarization, and/or the same timing slot sequence as a spot beam from the prior orbital position.

In a beamformed Tx system, it is very easy to allocate Tx power to each access node terminal spot beam 125 in a non-uniform and dynamic manner. Tx power to a spot beam 125 is proportional to the sum of the magnitude squared of the beam weights. Scaling the beam weights up or down will increase or decrease the power to the spot beam 125. Power can also be adjusted via the channel amplifier attenuation.

Power can be allocated to each access node terminal spot beam 125 in inverse proportion to the rain fade attenuation. This allocation can be dynamic based on the actual rain fade attenuation, or static based on the rain fade that is associated with a particular availability.

In one embodiment, transmit power is allocated to access node terminals 130 based on downlink SNR. For $N_{GW}$ access node terminals 130, the total Tx power $P_{GW}$ on the communications satellite 120 (e.g., the transmitting antenna assembly 121) that is allocated to transmissions to the access node terminals 130 is $$\sum_{n=1}^{N_{GW}} P_n = P_{GW} \qquad (8)$$

where $P_n$=Tx power allocated to access node terminal number n. The proper power allocation to equalize downlink SNR is $$P_n = P_{GW} \cdot \frac{L_n R_n}{D_n} \cdot \frac{1}{\sum_{i=1}^{N_{GW}} \frac{L_i R_i}{D_i}} \qquad (9)$$

where $R_n$=antenna assembly gain to access node terminal number n; $D_n$=downlink SNR degradation due to rain attenuation at access node terminal number n; and $L_n$=free-space path loss to access node terminal number n.

In a static approach, power allocations can be selected based on rain attenuation at the target link availability. These fixed power allocations can be determined by the network planner prior to network operation. The rain attenuation, $A_n$, can be determined at each access node terminal 130 that corresponds to the desired availability. The rain degradation, $D_n$, can be calculated from $A_n$ and the access node terminal HW parameters. The free-space path loss, Ln (e.g., signal propagation loss), can be calculated to each access node terminal 130. The Tx antenna assembly gain to each access node terminal, $R_n$, can be determined from the beam weights and native feed element patterns 210. The allocated powers, $P_n$, and the required channel amplitude attenuation setting can be calculated to produce those powers.

The channel amplitude attenuator setting can be sent via uplink to the communications satellite 120 and kept at that setting until (and if) one desires to change the network operation concept (e.g., access node terminal locations, downlink availability, total power allocated to the access node terminal downlink etc.).

Figure 23:
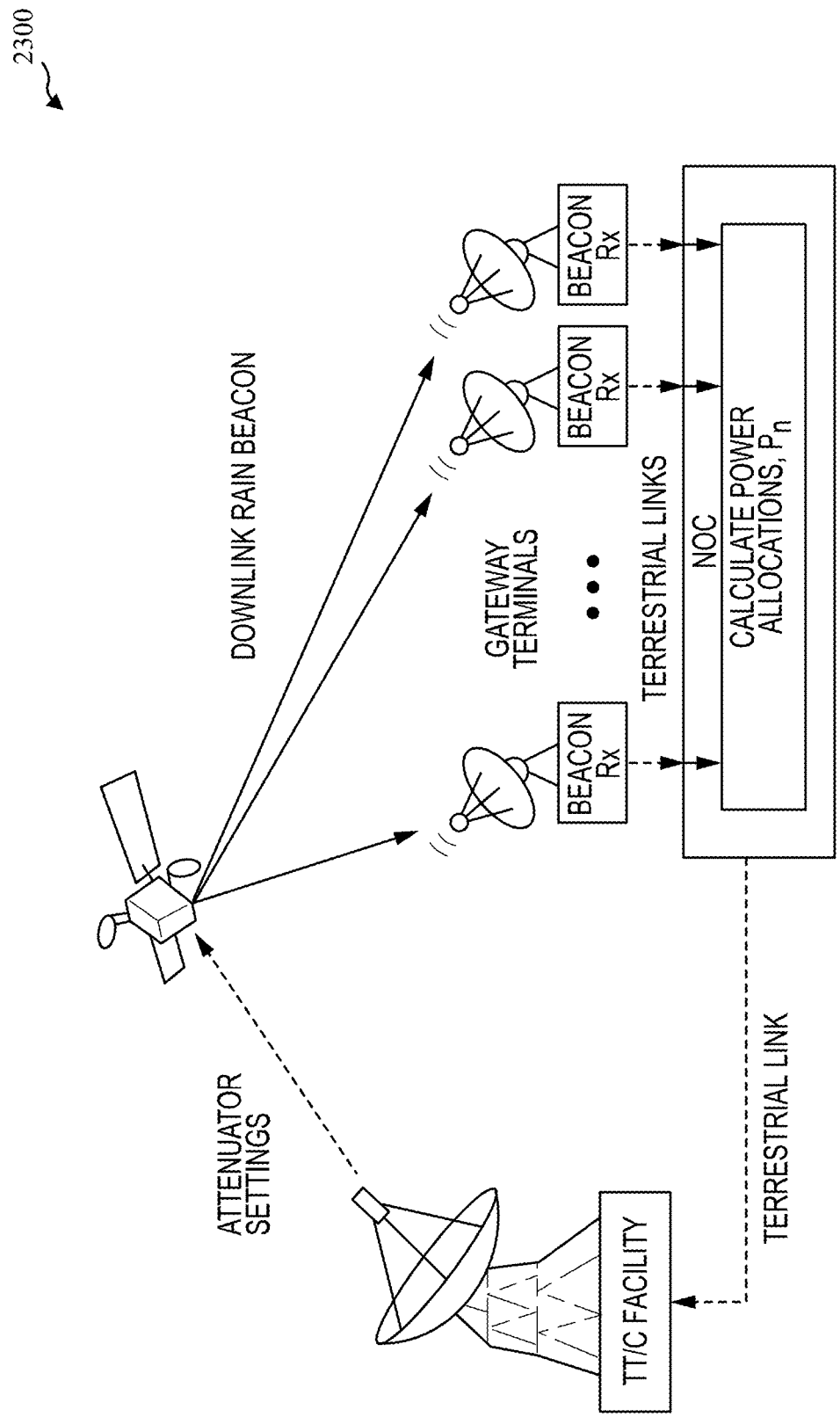
FIG. 23 is a simplified diagram of an illustrative satellite communications system, in accordance with aspects of the present disclosure.

In a dynamic approach, the power allocations can be selected based on the observed rain attenuation at each access node terminal 130. The Tx power settings, $P_n$, will change dynamically as the rain attenuations changes. In some embodiments, a rain attenuation measurement system is used, and a central processing site (e.g., an NOC, or other network device 141) to gather all the measured rain attenuations, dynamically compute the power allocations, and send uplink the power allocation (e.g., as a channel amplitude gain or a beam weight vector) information to the satellite. FIG. 23 is a simplified diagram of an illustrative satellite communications system 2300 that can support this dynamic approach.

In another embodiment, transmit power is allocated to access node terminals 130 based on signal-to-interference-and-noise ratio (SINR). For access node terminal downlinks that have relatively high spot beam interference, it may be preferable to allocate power with an objective to equalize downlink SINR.

Both the static approach and the dynamic approach can accommodate this by using a different equation to calculate the power allocations. Here the power allocations are $$x = [R_{gw}C - \lambda GC(R - R_{gw})]^{-1} \lambda Dg \qquad (10)$$

where $\lambda$ is chosen to force the equality $$\sum_{n=1}^{N} x_n = P_{GW} \qquad (11)$$

and the below definitions apply.

x: An N×1 column vector, which contains the Tx power allocations to each access node terminal 130.

R: An N×N beam gain matrix. The component $R_{ij}$ is the gain of the spot beam pointed at access node terminal j in the direction of access node terminal i. The diagonal component $r_{ij}$ is the antenna gain for access node terminal i.

$R_{gw}$: An N×N diagonal matrix containing the gain to access node terminal n. The diagonal elements of $R_{gw}$=the diagonal elements of R.

D: An N×N diagonal matrix whose elements contain the rain degradation of each access node terminal. This is calculated from the measured values of $A_n$.

C: An N×N diagonal matrix whose elements contain the link constants of each access node terminal. Specifically, $C = \text{Diag}[c_n]$ where $$c_n = \frac{G}{T}(n) \cdot \frac{1}{L_p(n)} \cdot \frac{1+\alpha}{\text{kW}}$$

G: An N×N diagonal matrix whose diagonal elements contain the target relative downlink SINRs for each access node terminal. If it is desired for all access node terminals to have the same downlink SINR, then G=the N×N identity matrix.

g: An N×1 column vector whose elements are the same as the diagonal elements of G.

x: A free scalar parameter that must be chosen such that the power allocations, $x_n$, sum up to the total allocated access node terminal Tx power, $P_{GW}$.

Equation (10) can be solved with an iterative technique.

Thus, as described herein, a satellite communications service may be provided by a communications satellite 120 that supports beamformed spot beams 125, which may further support spot beam coverage area locations that change according to a beam hopping configuration. Beamformed spot beams 125 may be flexibly formed by applying beam weights to signals carried via antenna feed elements 128, which leverage constructive and destructive effects of electromagnetic signals propagating via a plurality of native feed element patterns 210 of a native antenna pattern 220. Flexibility of providing the communications service may be further improved with a communications satellite 120 that employs one or more antenna assemblies 121 that support a change in native antenna pattern 220.

Figure 24A:
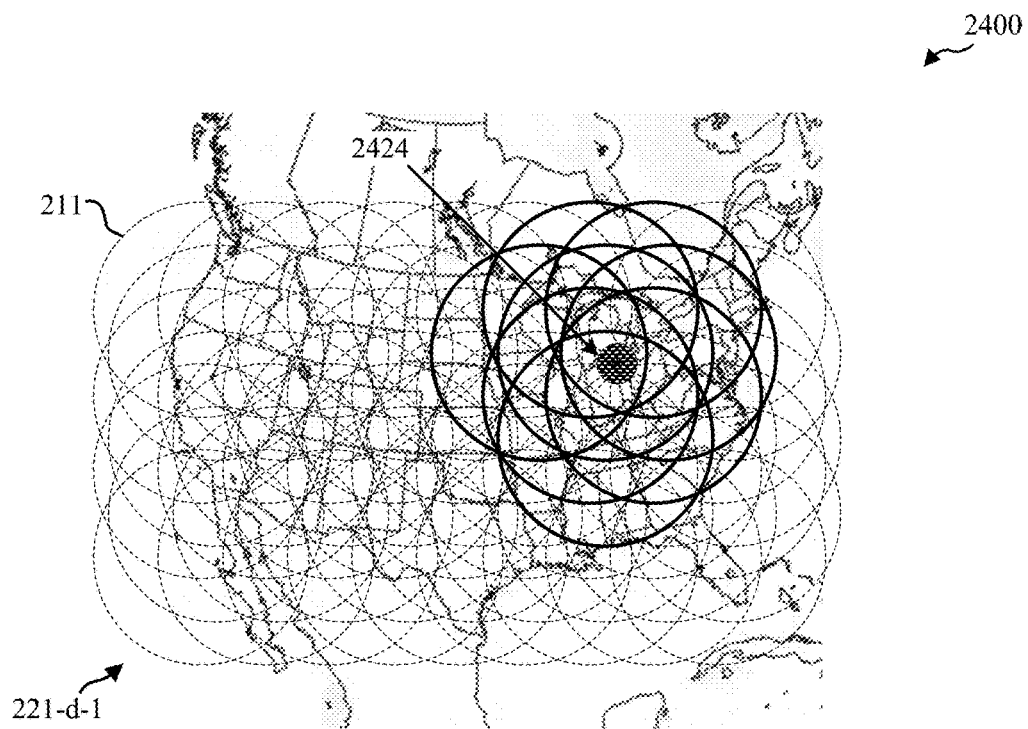
FIGS. 24A through 24E illustrate changes to native antenna pattern coverage areas that may be supported by an antenna assembly, in accordance with aspects of the present disclosure.
Figure 24B:
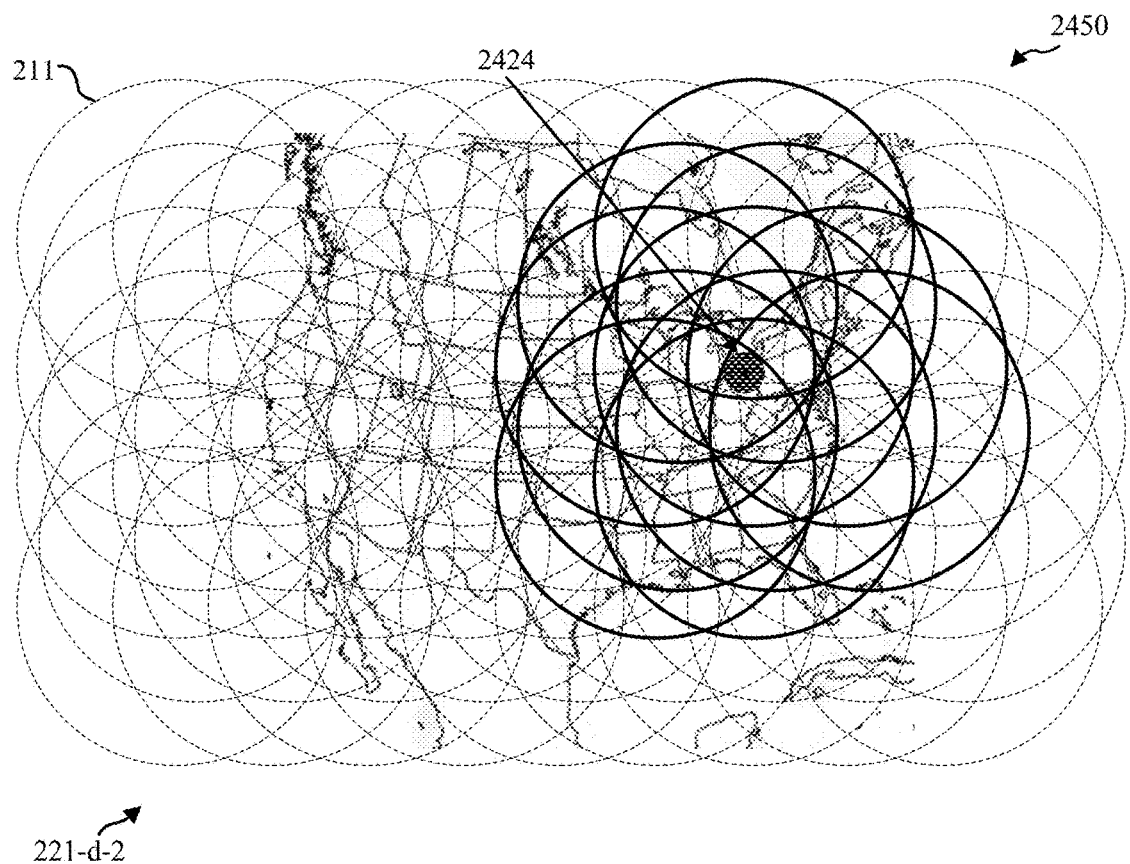

FIGS. 24A and 24B illustrate a change in native antenna pattern coverage areas 221-*d* that may be supported by an antenna assembly 121, in accordance with aspects of the present disclosure. The change in native antenna pattern coverage areas 221-*d* may be provided by commanding an actuator that is included in a feed array assembly 127, included in a reflector 122, coupled between a feed array assembly 127 and a reflector 122, coupled between two reflectors 122, and so on. For example, an antenna assembly 121 may support a change from native antenna pattern coverage area 221-*d*-1 to native antenna pattern coverage area 221-*d*-2 by adjusting a relative position between a feed array assembly 127 and a reflector 122 of the antenna assembly 121 as described herein. The change in relative position may be provided by a linear actuator 124, and may support, for example, different native antenna patterns 220 for providing flexible beamforming of a communications service to a service coverage area (e.g., service coverage area 410 as described with reference to FIG. 4).

FIG. 24A illustrates an example diagram 2400 of an native antenna pattern coverage area 221-*d*-1 formed by a plurality of native feed element pattern coverage areas 211. In some examples, the native antenna pattern coverage area 221-*d*-1 may have been intended to support a service coverage area such as the service coverage area 410 described with reference to FIG. 4. In an example, the native antenna pattern coverage area 221-*d*-1 may be used to provide a communication service to the service coverage area 410 according to particular conditions of a communications service. However, it may be desired to change the conditions of the communications service for various reasons. For example, the demand profile within a service coverage area 410 may change, the desired service coverage area 410 may change, an orbital position of a communications satellite 120 may have changed, or it may be desired to change the characteristics of spot beams 125 formed by the associated native antenna pattern 220-*d*.

The characteristics of spot beams 125 may be a result of the native antenna pattern coverage area 221-*d*-1 and different beam weights. For example, diagram 2400 illustrates an area of interest 2424 in the vicinity of Chicago, Illinois. To support area of interest 2424, a communications satellite 120 may apply beamforming techniques to antenna feed elements 128 of a feed array assembly 127 that are associated with native feed element pattern coverage areas 211 that enclose the area of interest 2442. According to diagram 2400, the native antenna pattern coverage area 221-*d*-1 includes 8 native feed element pattern coverage areas 211 that enclose the area of interest 2424, as indicated with dark, solid lines. Accordingly, the communications satellite 120 may employ 8 antenna feed elements 128 of a feed array assembly 127 to support a communications service at the area of interest 2424.

FIG. 24B illustrates an example diagram 2450 of an native antenna pattern coverage area 221-*d*-2 formed by a plurality of native feed element pattern coverage areas 211, which may be associated with the same antenna feed elements 128 of the native feed element pattern coverage areas 211 of native antenna pattern coverage area 221-*d*-1. However, the native antenna pattern coverage area 221-*d*-2 may have native feed element pattern coverage areas 211 with different characteristics (e.g., larger native feed element pattern coverage area size, higher degree of overlap of native feed element pattern coverage areas, etc.) than native antenna pattern coverage area 221-*d*-1. The change from native antenna pattern coverage area 221-*d*-1 to native antenna pattern coverage area 221-*d*-2 may be provided by commanding an actuator 124 to change a relative distance between a feed array assembly 127 and a reflector 122. For example, the native antenna pattern coverage area 221-*d*-2 of diagram 2450 may represent a feed array assembly 127 being located nearer to a reflector 122 than in diagram 2400, which may cause a more heavily defocused condition.

As illustrated by diagram 2450, the adjustment of an actuator 124 may provide broader native antenna pattern coverage area 221-*d*-2, as compared with native antenna pattern coverage area 221-*d*-1. By broadening the native antenna pattern, native antenna pattern coverage area 221-*d*-2 may be able to support a broader service coverage area 410, and/or provide a communications service in a service coverage area according to a different coverage area condition (e.g., different spot beam pattern, spot beam size, spot beam gain, etc.).

For example, the native antenna pattern coverage area 221-*d*-2 may also support the area of interest 2424 in the vicinity of Chicago, Illinois, but according to different native antenna pattern coverage areas 221-*d*. As illustrated in example diagram 2450, the native antenna pattern coverage area 221-*d*-2 includes 11 native feed element pattern coverage areas 211 that enclose the area of interest 2424, as indicated with dark, solid lines. Accordingly, the communications satellite 120 may employ 11 antenna feed elements 128 of the feed array assembly 127 to support a communications service at the area of interest 2424. As compared to native antenna pattern coverage area 221-*d*-1, the greater number of antenna feed elements 128 that may be used in native antenna pattern coverage area 221-d-2 to support a communications service at area of interest 2424 may improve various aspects of the communications service, such as feed redundancy, signal quality characteristics (e.g., higher beam gain, different beam gain profile, etc.), and utilization of orthogonal communications resources. Thus, the service coverage area 410, including area of interest 2424, may be provided a communications service using a change from native antenna pattern coverage area 221-d-1 to native antenna pattern coverage area 221-d-2 and a different beamforming weight matrix (e.g., with different beam weights and/or different numbers of feed elements 128 used to support a given beamformed spot beam 125).

Although providing the transition from native antenna pattern coverage area 221-d-1 to native antenna pattern coverage area 221-d-2 by commanding an antenna assembly 121 to transition to a more defocused position may be desirable in some circumstances, in some circumstances it may be desirable to command an antenna assembly 121 to transition to a more focused position. Thus, commanding an actuator to provide a change in native antenna patterns 220 may provide various means of adapting how a communications satellite 120 provides a communications service. In some examples, an adaptive beamforming system may employ the distance between a feed array assembly 127 and the reflector 122 as a component of a beamforming system. For example, an arrangement of beamformed spot beams 125 may be determined computationally at different combinations of focal positions and beamforming weight matrices to optimize the arrangement for various target parameters (e.g., coverage, average power density, system capacity, matching of spatial capacity to geographical demand). The arrangement may be determined using computational techniques such as Monte Carlo analysis, iterative computation, and the like.

Although the change between native antenna pattern coverage area 221-d-1 and native antenna pattern coverage area 221-d-2 is described as being based on providing different coverage area conditions for adapting coverage or service, a change in native antenna pattern coverage area 221 may be used to respond to other circumstances. For example, a change in orbital position may modify a native antenna pattern coverage area 221 for the same native antenna pattern 220, and result in a pattern that is deficient to support a communications service across the service coverage area 410. This condition may arise, for example, if an orbital position of a communications satellite 120 is at a different orbital slot than intended, either as-deployed, as a result of satellite drift, etc. Alternatively, the change in orbital position may be a planned or desired re-deployment of the satellite. Thus, a change in the native antenna pattern 220 may be dictated by circumstances external to the antenna assembly 121 or communications satellite 120, and result in a change to conditions for the service coverage area 410. The actuator 124 may be used (e.g., in combination with beamforming) to return or substantially return the satellite operation to the desired service coverage area 410, for example.

Figure 24C:
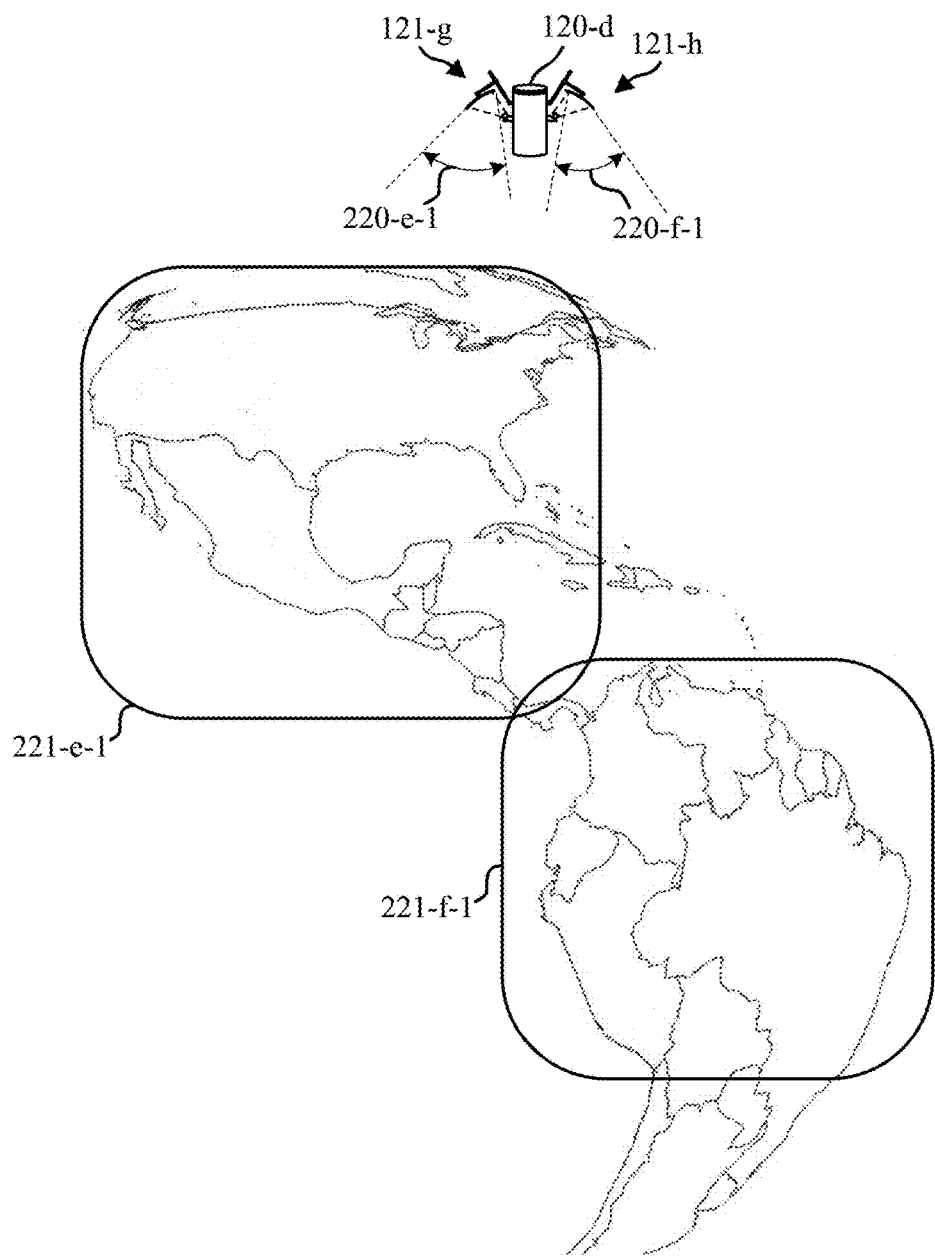
Figure 24D:
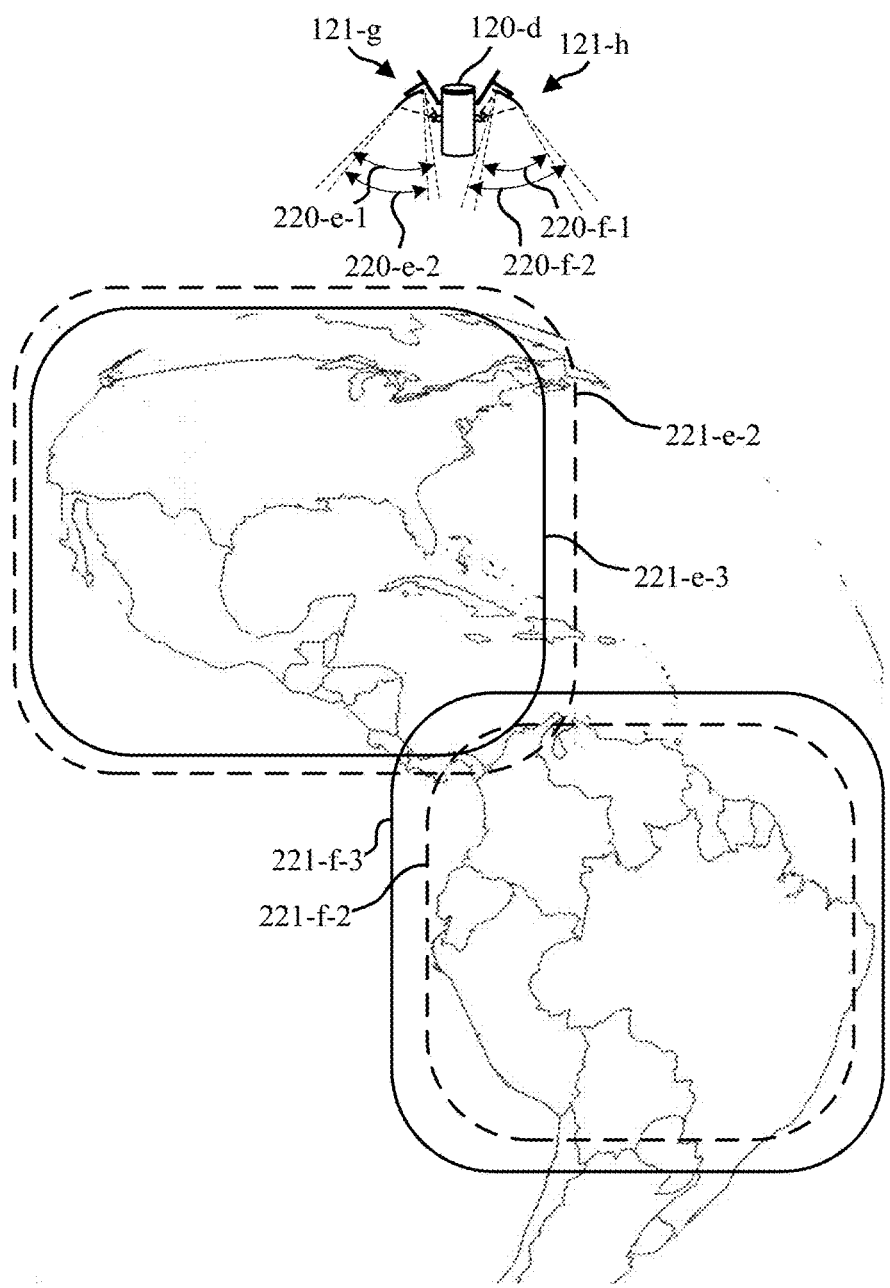

FIGS. 24C and 24D illustrate native antenna pattern coverage areas 221-e and 221-f provided by native antenna patterns 220 of a communications satellite 120-d via multiple antenna assemblies 121, in accordance with aspects of the present disclosure. For simplicity, only the outer border is shown for each of the native antenna pattern coverage areas 221-e and 221-f, but each of the native antenna pattern coverage areas 221-e and 221-f may be formed from a plurality of native feed element pattern coverage areas 211 associated with feed array assemblies 127 of a first antenna assembly 121 and a second antenna assembly 121, as described herein. Native antenna pattern coverage areas 221-e and 221-f may, for example, provide one or more communications services to different service coverage areas 410.

FIG. 24C shows an illustration 2470 of native antenna pattern coverage areas 221-e-1 and 221-f-1 provided by the communications satellite 120-d while positioned in a first geostationary orbital position (e.g., an orbital slot at 980 longitude) with visible earth coverage of North America and South America. The native antenna pattern coverage areas 221-e-1 and 221-f-1 may be provided by first native antenna patterns 220-e-1 and 220-f-1, which may represent first defocused conditions of the first and second antenna assemblies 121-g and 121-h, respectively. The communications satellite 120-d may provide a communications service according to the first native antenna pattern 220-e-1 to a first service coverage area 410 (not shown) that covers a substantial portion of the North American continent. The communications service may be provided to the first service coverage area 410 based on the native antenna pattern coverage area 221-e-1 and other parameters (e.g., beam weights, capacity distribution, spot beam hopping, etc.). The communications satellite 120-d may provide a communications service according to the second native antenna pattern 220-f-1 to a second service coverage area 410 (not shown) that includes a substantial portion of the South American continent. The communications service may be provided to the second service coverage area 410 based on the native antenna pattern coverage area 221-f-1 and other parameters (e.g., beam weights, capacity distribution, spot beam hopping, etc.). In various examples, the communications services provided to the first and second service coverage areas 410 may be the same, or different.

FIG. 24D shows an illustration 2480 of native antenna pattern coverage areas 221-e and 221-f provided by the communications satellite 120-d while positioned in a second geostationary orbital position that has a more eastward position than the first geostationary orbital position. For various reasons (e.g., orbital drift, a change in deployment, etc.), the communications satellite 120-d may be moved to from the first geostationary orbital position to the second geostationary orbital position (e.g., an orbital slot at 880 longitude) for operation at the new orbital position.

Native antenna pattern coverage areas 221-e-2 and 221-f-2 may represent projected coverage areas of the native antenna patterns 220-e-1 and 220-f-1 described with reference to FIG. 24C, but at the second geostationary orbital position. In some examples, the native antenna pattern coverage areas 221-e-2 and 221-f-2 may be provided by not only changing the orbital position of the communications satellite 120-d, but also by changing a boresight direction of the associated antennas 121 of the communications satellite 120-d (e.g., changing a skew angle as measured from the communications satellite 120-d between the antenna boresight direction and the center of the Earth, thereby compensating for the adjustment from an orbital slot at 980 to an orbital slot at 88°). In some examples, this change to the antenna boresight direction may be accomplished by causing the communications satellite 120-d to be oriented with a different attitude. However, in some examples the antennas 121 of the communications satellite 120-d may have the entire Earth in their field of view, and adjusting the boresight direction of the antenna assemblies may not be necessary (e.g., the antennas 121 may continue to be pointed at the center of the Earth).

As shown by illustration 2480, for the same native antenna pattern 220-e-1, the size of the native antenna pattern coverage area 221-e-2 from the second geostationary orbital position is larger than the size of the native antenna pattern coverage area 221-e-1 from the first geostationary orbital position, due to the target area of the earth being rotated away from the communications satellite 120-d. In other words, the field of view of the first antenna assembly 121-g is broader towards the service coverage area 410 over North America from the second geostationary orbital position than from the first geostationary orbital position, and may therefore provide a lower signal power density across the desired service coverage area 410. In contrast, for the same native antenna pattern 220-f-1, the size of the native antenna pattern coverage area 221-f-2 from the second geostationary orbital position is smaller than the size of the native antenna pattern coverage area 221-f-1 from the first geostationary orbital position, due to the target area of the earth being rotated nearer to the communications satellite 120-d. In other words, the field of view of the second antenna assembly 121-h is narrower from the second geostationary orbital position than from the first geostationary orbital position, and may not properly cover the desired service coverage area 410.

Although illustrated generally as a change in size, changes to a native antenna pattern coverage area 221 for a given native antenna pattern 220 when moving from a first orbital position to a second orbital position may include changes in size, shape, angle of incidence of signals (e.g., signal radiation direction) between the surface of a native antenna pattern coverage area 221 and a communications satellite 120, and various combinations thereof. In order to continue providing a communications service according to such changes, it may be beneficial to change a native antenna pattern 220 at an antenna assembly 121 to compensate for such changes.

For example, in response to the change in orbital position from the first geostationary orbital position to the second geostationary orbital position, the first antenna assembly 121-g may be commanded to provide a narrower native antenna pattern 220-e-2. The change in native antenna patterns may be provided by commanding an actuator 124 of the first antenna assembly 121-g to change from a first defocused position to a second defocused position (e.g., by changing a length of a linear actuator). Thus, illustration 2480 shows an example of commanding an actuator of an antenna assembly 121 to provide a narrower native antenna pattern 220-e-2, and the result of the narrower native antenna pattern 220-e-2 may be the native antenna pattern coverage area 221-e-3.

In some examples, the native antenna pattern coverage area 221-e-3 may be substantially coextensive with the native antenna pattern coverage area 221-e-1 described with reference to FIG. 24C from the first geostationary orbital position. Alternatively, due to changes in angle of incidence caused by the change in orbital position, the native antenna pattern coverage are 221-e-3 may not necessarily be coextensive with the native antenna pattern coverage area 221-e-1, but may be otherwise provided such that the signal transmission/reception density is similar to that provided by the native antenna pattern coverage area 221-e-1, which may or may not require that the native antenna pattern coverage areas 221-e-1 and 221-e-3 be coextensive (although native antenna pattern coverage areas 221-e-1 and 221-e-3 may be at least partially overlapping). In other words, in response to a change in orbital position, the updated native antenna pattern 220-e-2 may be provided such that a service coverage area 410 provided by the second native antenna pattern 220-e-2 at the second geostationary orbital position is substantially coextensive with the service coverage area 410 provided by the first native antenna pattern 220-e-1 at the first geostationary position.

In another example, in response to the change in orbital position from the first geostationary orbital position to the second geostationary orbital position, the second antenna assembly 121-h may be commanded to provide a broader native antenna pattern 220-f2. The change in native antenna patterns may also be provided by commanding an actuator 124 of the second antenna assembly 121-h to change from a first defocused position to a second defocused position (e.g., by changing a length of a linear actuator). Thus, illustration 2580 also shows an example of commanding an actuator of an antenna assembly 121 to provide a broader native antenna pattern 220-f2, and the result of the broader native antenna pattern 220-f2 may be the native antenna pattern coverage area 221-f-3.

In some examples, the native antenna pattern coverage area 221-f3 may be substantially coextensive with the native antenna pattern coverage area 221-f-1 described with reference to FIG. 24C from the first geostationary orbital position. Alternatively, due to changes in angle of incidence caused by the change in orbital position, the native antenna pattern coverage area 221-f-3 may not necessarily be coextensive with the native antenna pattern coverage area 221-f-1 may be otherwise provided such that the signal transmission/reception density is similar to that provided by the native antenna pattern coverage area 221-f-1, which may or may not require that the native antenna pattern coverage areas 221-f-1 and 221-f-3 be coextensive (although native antenna pattern coverage areas 221-f-1 and 221-f-3 may be at least partially overlapping). In other words, in response to a change in orbital position, the updated native antenna pattern 220-f-2 may be provided such that a service coverage area 410 provided by the second native antenna pattern 220-f-2 at the second geostationary orbital position is substantially coextensive with the service coverage area 410 provided by the first native antenna pattern 220-f-1 at the first geostationary position.

Figure 24E:
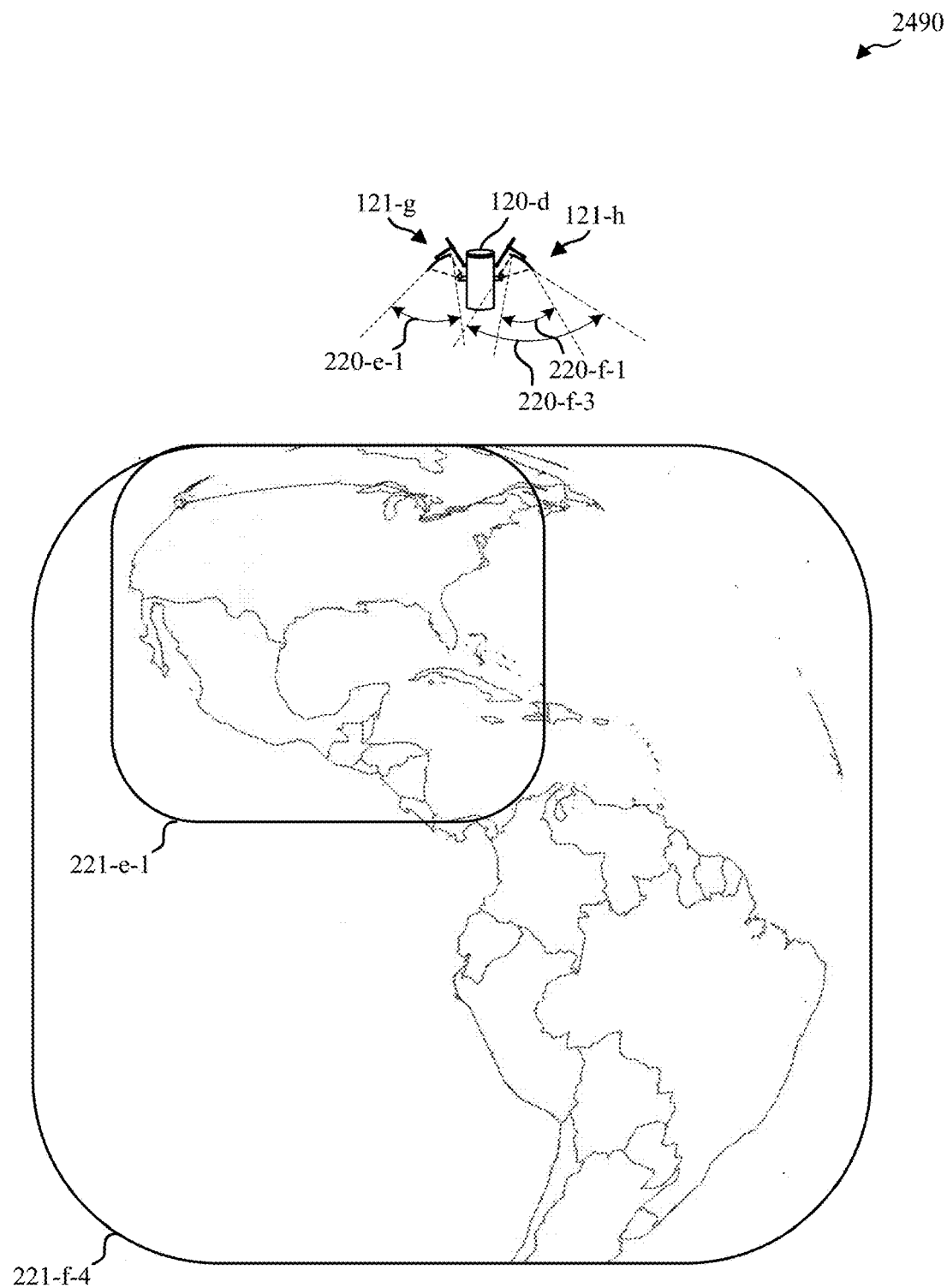

In some cases, for a communications satellite 120 with multiple antenna assemblies 121, the native antenna pattern 220 for one antenna assembly 121 may be adjusted while the native antenna pattern 220 for other antenna assemblies 121 remain unchanged. FIG. 24E illustrates an alternative for native antenna pattern coverage areas 221 provided by a communications satellite 120-d via multiple antenna assemblies 121, in accordance with aspects of the present disclosure. In one example, the communications satellite 120-d may be initially configured at the first orbital position, as illustrated in FIG. 24C, for providing the native antenna pattern coverage area 221-e-1 via the first antenna assembly 121-g and for providing the native antenna pattern coverage area 221-f-1 via a second antenna assembly 121-h. The second antenna assembly 121-h may be reconfigured (e.g., by commanding an actuator 124 for providing a change from the native antenna pattern 220-f-1 to the native antenna pattern 220-f-3) for providing the native antenna pattern coverage area 221-f-4 as shown in FIG. 24E, which may be used to provide visible earth coverage from the first geostationary orbital position. In another example, the communications satellite 120-d may be initially configured with the second antenna assembly 121-h adjusted to provide visible earth coverage as illustrated in FIG. 24E (e.g., native antenna pattern coverage area 221-f-4), and subsequently the second antenna assembly 121-h may be adjusted (e.g., by commanding an actuator 124) for providing the native antenna pattern coverage area 221-f-1 as shown in FIG. 24C. Thus, illustration 2490 shows an example of commanding an actuator of one antenna assembly 121 to provide a change native antenna pattern 220, while maintaining the native antenna pattern 220 of another antenna assembly 121.

Although described with reference to communications satellites 120 having generally geostationary orbital positions, adjustments to native antenna patterns 220 are also applicable to non-geostationary applications such as LEO or MEO applications. For example, a native antenna pattern 220 may be adjusted to provide a larger, smaller, or otherwise adapted service coverage area that follows the orbital path of a LEO or MEO satellite. Further, native antenna patterns 220 may be adjusted based on characteristics of the orbital path, such as the elevation and/or rate of the orbital path. This may provide design flexibility when adjustments to an orbital path are required, and/or when an orbital path deviates from a design orbital path. Thus, antenna assemblies 121 that support a plurality of native antenna patterns 220 may also provide flexibility for beamforming of a communications service provided by non-geostationary communications satellites 120.

Figure 25A:
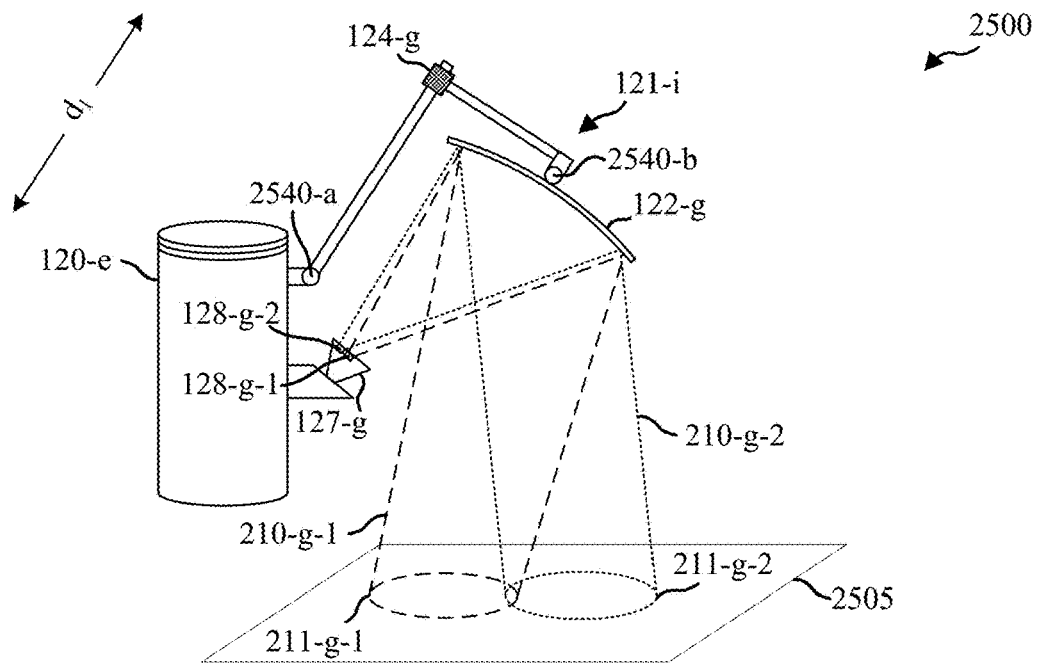
FIGS. 25A-25D illustrate communications satellites that supports adjusting a relative position between a feed array assembly and a reflector to support a change in native antenna patterns, in accordance with aspects of the present disclosure.
Figure 25B:
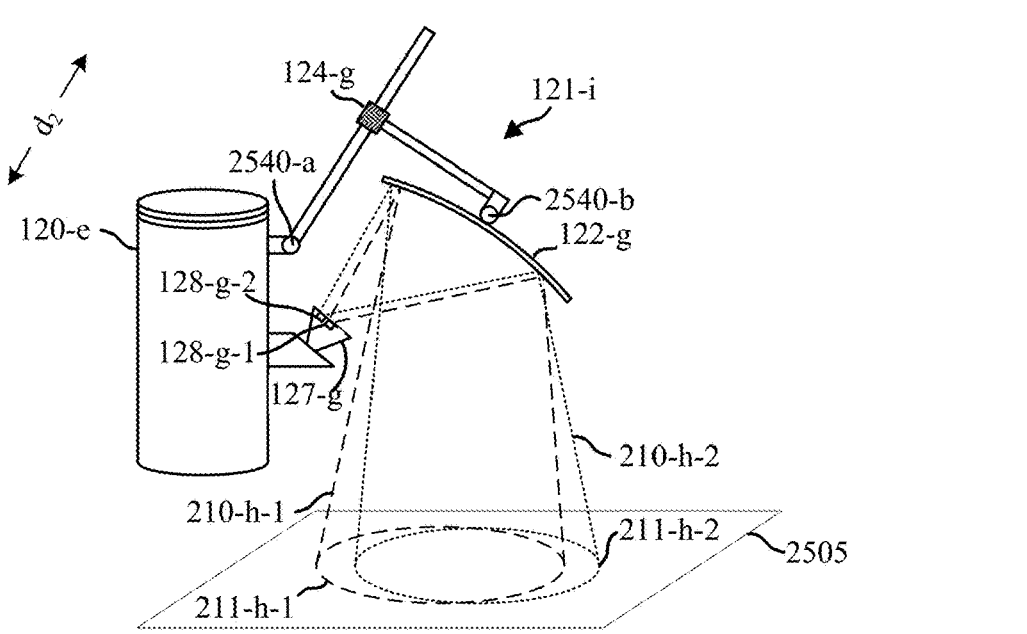
Figure 25C:
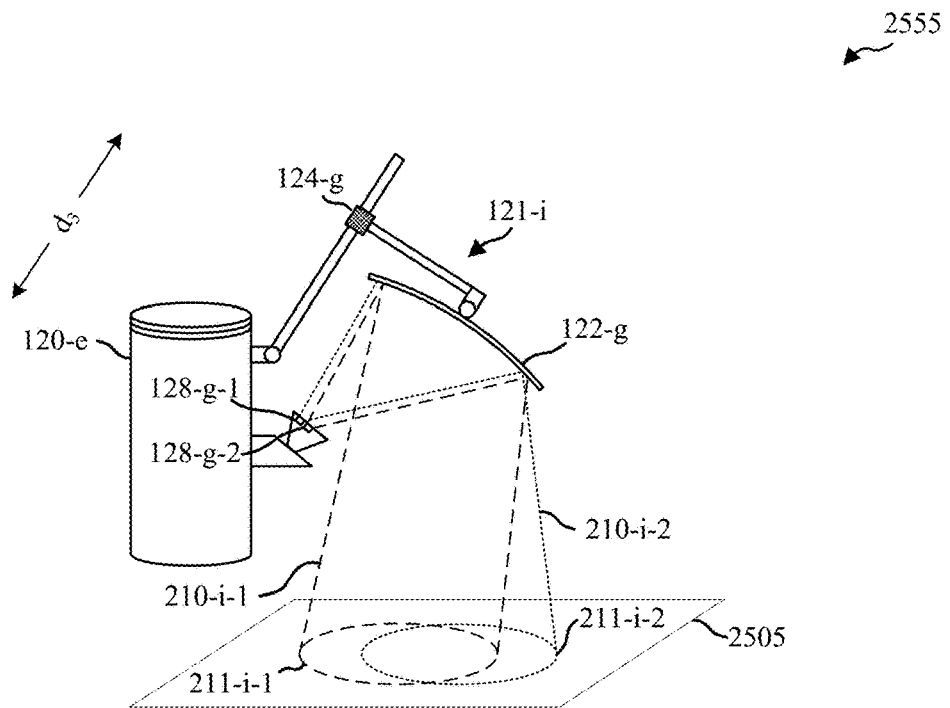

FIGS. 25A-25C illustrate a communications satellite 120-e that supports adjusting a relative position between a feed array assembly 127-g and a reflector 122-g to support a change in native antenna patterns 220, in accordance with aspects of the present disclosure. The communications satellite 120-e includes an antenna assembly 121-i having a feed array assembly 127-g, a reflector 122-g, and an actuator 124-g coupled between the feed array assembly 127-g and the reflector 122-g.

The feed array assembly 127-g may include multiple feed elements 128-g, such as feed elements 128-g-1 and 128-g-2. Although only two antenna feed elements 128-g are shown for simplicity, a feed array assembly 127-g may include any number of antenna feed elements 128-g (e.g., tens, hundreds, thousands, etc.). Moreover, the antenna feed elements 128-g may be arranged in any suitable manner (e.g., in a linear array, an arcuate array, a planar array, a honeycomb array, a polyhedral array, a spherical array, an ellipsoidal array, or any combination thereof).

Each feed element 128 of a feed array assembly 127 may be associated with a gain profile, which may be examples of native feed element pattern gain profiles 250 described with reference to FIGS. 2C and 3C. Each feed element 128 of a feed array assembly 127 may also be associated with a respective native feed element pattern 210 (e.g., native feed element pattern 210-g-1 associated with feed element 128-g-1, native feed element pattern 210-g-2 associated with feed element 128-g-2, etc.). Each native feed element pattern 210 may provide a native feed element pattern coverage area 211 (e.g., native feed element pattern coverage area 211-g-1 associated with native feed element pattern 210-g-1, native feed element pattern coverage area 211-g-2 associated with native feed element pattern 210-g-2, etc.), which may be examples of native feed element pattern coverage areas 211 described with reference to FIGS. 2A, 2D, 3A, 3D, 4A, 24A, and 24B. Native feed element pattern coverage areas 211 may include areas projected on a reference plane 2505, and/or volume above or below the reference plane 2505, after reflection from the reflector, as described herein.

The reflector 122-g may be configured to reflect signals transmitted between the feed array assembly and one or more target devices (e.g., access node terminals 130 and/or user terminals 150). The reflector surface may be of any suitable shape for distributing signals between the feed array assembly 127-g and a service coverage area 410 of the communications satellite 120-e, which may include a parabolic shape, a spherical shape, a polygonal shape, etc. Although only a single reflector 122-g is illustrated, a communications satellite 120 may include more than one reflector 122 for a particular feed array assembly 127. Moreover, a reflector 122 of a communications satellite 120 may be dedicated to a single feed array assembly 127, or shared between multiple feed array assemblies 127.

The reflector 122-g may be associated with a focal region 123, which may refer to one or more locations at which signals received by the communications satellite 120-a are concentrated, as described with reference to FIGS. 2A and 2B. For example, a focal region of reflector 122-g may refer to a location at which those signals that arrive at the reflector in a direction parallel to a primary axis of the reflector 122-g are reflected to a coincident point. Conversely, the focal region of the reflector 122-g may refer to the location from which signals that are emitted from the focal region reflect off the reflector in a plane wave.

In some examples, it may be advantageous to position the feed array assembly 127-g at a defocused position with respect to the reflector 122-g (e.g., between the surface of the reflector 122-g and the focal region of the reflector 122-g, or some other defocused position with respect to the reflector 122-g). As used herein, feed array assembly 127-g being located at a defocused position with respect to the reflector 122-g may refer to a feed element 128-g (e.g., an opening of a feed aperture, a transducer of a feed, etc.) being located at a distance from a reflector that is different than a distance between the reflector 122-g and the focal region of the reflector 122-g. In some examples, feed array assembly 127-g being located at a defocused position with respect to the reflector 122-g may refer to a surface of antenna feed elements 128-g (e.g., a reference surface of a plurality of feed aperture openings, a reference surface of a plurality of feed transducers, etc.) being located at a distance from a reflector 122-g along a reference axis that is different from the distance between the reflector 122-g and a focal region along the reference axis. Such an arrangement may result in broader native feed element pattern coverage areas 211 than when the feed array assembly 127-g is positioned at the focal region of the reflector 122-g, which may improve flexibility for beamforming of spot beams 125. For example, with broader native feed element pattern coverage areas 211, a greater quantity of antenna feed elements 128-g of a feed array assembly 127-g may be able to support a particular spot beam coverage area 126. Moreover, broader native feed element patterns 210-g may also allow each feed element 128-g of the feed array assembly 127-g to support a greater quantity of spot beam coverage areas 126.

The actuator 124-g may support adjusting a relative distance between the feed array assembly 127-g and the reflector 122-g. For example, the actuator 124-a may be a linear actuator that is constrained to provide the change in relative distance along one translational direction, which may be aligned along a direction predominantly between a center of the reflector 122-g and a focal region of the reflector 122-g. In various examples the actuator 124-g may include a linear motor, a stepper motor, a servo motor, a rack and pinion assembly, a ball screw assembly, a kinematic linkage, an extendable truss assembly, a hydraulic cylinder, or any combination thereof.

As illustrated in FIGS. 25A-25C, the feed array assembly 127-g may be fixed with respect to the body of the communications satellite 120-g, and therefore the actuator 124-g may move the reflector 122-g along an axis with respect to the body of the communications satellite 120-e. In other examples, the reflector 122-g may be fixed with respect to the body of the communications satellite 120-e, and therefore the linear actuator 124-g may move the feed array assembly 127-g along an axis with respect to the body of the communications satellite 120-e. In yet other examples, neither the feed array assembly 127-g nor the reflector 122-g may be fixed with respect to the body of the communications satellite 120-e, and the actuator 124-g may move one or both of the feed array assembly 127-g or reflector 122-g along an axis with respect to the body of the communications satellite 120-e (e.g., in a combined manner, in a coordinated manner, in a separate manner, etc.).

In some examples, the communications satellite 120-e may include additional actuators, such as a secondary actuators 2540-a and/or 2540-b. Secondary actuators 2540 may be configured to provide one or more additional degrees of freedom (e.g., a rotational degree of freedom, a translational degree of freedom, or a combination thereof) between the feed array assembly 127-g and the reflector 122-g. In such examples, a secondary actuator 2540 may be commanded to cause a change in relative position between the feed array assembly and the reflector about an axis different from an axis of the actuator 124-g, with such a change combining with the adjustment of the actuator 124-g to provide the commanded change in native antenna patterns. Secondary actuators 2540 may include one or more suitable components for providing such additional degrees of freedom between the feed array assembly 127-g and the reflector 122-g. For example, a secondary actuator 2540 may include a hinge or ball joint that may be actuated to compensate for satellite wobble (e.g., rotational vibration that may affect antenna boresight direction). Although secondary actuator 2540-a is illustrated as providing a rotational coupling between a body portion of the communications satellite 120-e and the actuator 124-g, and secondary actuator 2540-g is illustrated as providing a rotational coupling between the actuator 124-g and the reflector 122-g, additional actuators may be coupled in any suitable location with any suitable degree(s) of freedom between the feed array assembly 127-g and the reflector 122-g.

FIG. 25A illustrates an example 2500 of the communications satellite 120-e having a first distance (e.g., distance $d_1$) between the feed array assembly 127-g and the reflector 122-g corresponding to a focused arrangement of the antenna assembly 121-i. In the arrangement of example 2500, the native feed element patterns 210-g may be relatively narrow (e.g., as shown by native feed element patterns 210-g-1 and 210-g-2). Accordingly, the native feed element pattern coverage areas 211-g with respect to reference plane 2505 may be relatively small (e.g., as shown by native feed element pattern coverage areas 211-g-1 and 211-g-2), and the resulting native antenna pattern 220 may be referred to as having a low native feed element pattern overlap condition.

In some examples, a low native feed element pattern overlap condition is associated with each feed element 128 having less than half of its native feed element pattern 210 overlapping with a native feed element pattern 210 of any given neighboring feed element 128. In other examples, a low native feed element pattern overlap condition may be described as each feed element 128 having less than 40 percent, 30 percent, 20 percent, or 10 percent of its native feed element pattern 210 overlapping with a native feed element pattern 210 of any given neighboring feed element 128. In yet other examples, a low native feed element pattern overlap condition may be described as each feed element 128 having no overlap of its native feed element pattern 210 with a native feed element pattern 210 of any given neighboring feed element 128.

In various examples, distance $d_1$ may cause the distance between the feed array assembly 127-g and the reflector 122-g to be equal to, or relatively near a focal distance of the reflector 122-g (e.g., a zero focal offset distance). While example 2500 may represent the feed array assembly 127-g being at a lightly defocused position with respect to the reflector 122-g because neighboring native feed element pattern coverage areas 211-g have some beam overlap with each other, example 2500 is considered to be a focused position of antenna assembly 121-i for the purposes of this description. In other words, a low beam overlap condition of native feed element pattern coverage areas 211 is considered for the purposes of this description to be a result of a focused position of an antenna assembly 121.

FIG. 25B illustrates an example 2550 of the communications satellite 120-e having the antenna assembly 121-i in a first defocused position. In example, 2550, the actuator 124-g provides a relatively small distance (e.g., distance $d_2$), resulting in the feed array assembly 127-g being nearer to the reflector 122-g than the focal region of the reflector 122-g (e.g., the feed array assembly 127-g may be closer to the reflector 122-g than in example 2500). In other words, example 2550 may represent the feed array assembly 127-g being located at a heavily defocused position with respect to the reflector 122-g. In the arrangement of example 2550, the native feed element patterns 210-h may be relatively wide (e.g., as shown by native feed element patterns 210-h-1 and 210-h-2). Accordingly, the native feed element pattern coverage areas 211-h with respect to reference plane 2505 may be relatively large (e.g., as shown by native feed element pattern coverage areas 211-h-1 and 211-h-2).

FIG. 25C illustrates an example 2555 of the communications satellite 120-e having the antenna assembly 121-i in a second defocused position. In example 2555, the actuator 124-g has been adjusted to increase the distance between the feed array assembly 127-g and the reflector 122-g from distance $d_2$ to distance $d_3$. In the arrangement of example 2555, the native feed element patterns 210-i may be relatively wide and have substantial overlap (e.g., as shown by native feed element pattern coverage areas 211-i-1 and 211-i-2), but may each be narrower than in the arrangement of example 2550.

Example 2550 may represent a first operating condition (e.g., a first native antenna pattern 220-h) of the communications satellite 120-e that supports a communications service according to a first native antenna pattern, wherein the first native antenna pattern 220-h is based at least in part on the length of, or the length otherwise provided by the actuator 124-g (e.g., distance $d_2$). The first native antenna pattern 220-h may be characterized by such features as the size of the native feed element pattern coverage areas 211-h, a degree of overlap between native feed element pattern coverage areas 211-h, locations of native feed element pattern coverage areas 211-h, or other characteristics of the native feed element pattern coverage areas 211-h. Although only two native feed element pattern coverage areas 211-h are shown in example 2550, a communications satellite 120 may have any number (e.g., tens, hundreds, thousands, etc.) of native feed element pattern coverage areas 211.

Example 2555 may represent a second condition (e.g., a second native antenna pattern 220-i) of the communications satellite 120-e that supports a communications service according to a second native antenna pattern 220-i, wherein the second coverage condition is based at least in part on the length of, or the length otherwise provide by the actuator 124-g (e.g., distance $d_3$). As the beamwidth of each native feed element pattern 210-i is different than native feed element patterns 210-h of the first condition, the features of the second native antenna pattern 220-i may be different from the first condition. Such changes in features between the first native antenna pattern 220-h and the second native antenna pattern 220-i may support, for example, various beamforming operations according to different defocused conditions, as described herein.

The actuator 124-g may be configured for distances between the feed array and the reflector that are not illustrated in FIG. 25A, 25B, or 25C, such as distances greater than $d_1$, less than $d_2$, or in-between $d_1$, and $d_2$. Thus, as described herein, the actuator 124-g may provide a change in relative distance between the feed array assembly 127-g and the reflector 122-g, and accordingly provide a change in the native antenna pattern 220 which may be used to provide service according to a variety of native antenna patterns 220. For example, changing the length of the actuator 124-g may be used to change the beam width and amount of overlap of native feed element patterns in the antenna pattern. Changing the length of the actuator 124-g may also be used to distribute energy received from a given location (e.g., a location in a service coverage area 410) to more feed elements 128 of a feed array assembly 127.

Although the adjustment shown between example 2550 and example 2555 is illustrated to show a change in size, degree of overlap, and location of native feed element pattern coverage areas 211, in some examples other characteristics may be changed to provide different conditions. For example, secondary actuator assemblies 440 may be used to change pointing direction of a native antenna pattern 220. Thus, an antenna assembly 121 may be configured such that the adjustment of an actuator 124 coupled between a feed array assembly 127 and a reflector 122 may provide various desired changes in characteristics and/or ratios or relationships of multiple characteristics between native feed element pattern coverage areas 211.

Figure 25D:
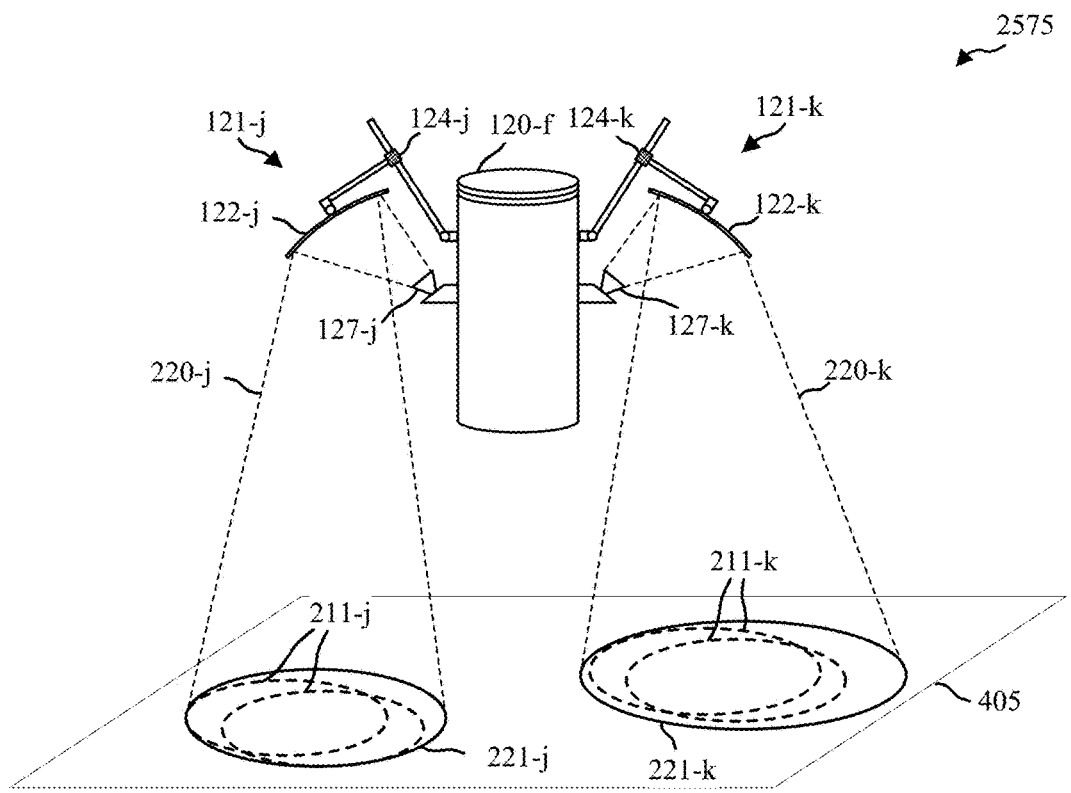

FIG. 25D illustrates an example diagram 2575 of a communications satellite 120-f that supports adjusting a relative position between feed array assemblies 127 and reflectors 122 to support a change in native antenna patterns for two antenna assemblies 121, in accordance with aspects of the present disclosure. For example, communications satellite 120-f includes antenna assemblies 121-j and 121-k for supporting multiple independent native antenna pattern coverage areas (e.g., native antenna pattern coverage areas 221-j and 221-k). For example, a first antenna assembly 121-j may provide a communication service to a first native antenna pattern coverage area 221-j while a second antenna assembly 121-k may provide a communication service to a second native antenna pattern coverage area 221-k. In the illustrated example, the first antenna assembly 121-j includes a first actuator 124-j (e.g., a linear actuator coupled between the feed array assembly 127-j and the reflector 122-j) that adjusts a relative distance between a first feed array assembly 127-j and a first reflector 122-j to provide the first native antenna pattern coverage area 221-j. The second antenna assembly 121-k includes a second actuator 124-k (e.g., a linear actuator coupled between the second feed array assembly 127-k and the second reflector 122-k) that adjusts a relative distance between the second feed array assembly 127-k and the second reflector 122-k to provide a second native antenna pattern coverage area 221-k. The first and second native antenna pattern coverage areas 221-j and 221-k may each be a composite of multiple native feed element pattern coverage areas 211 (only two of which are shown for each native antenna pattern coverage area 221 for clarity). Thus, each antenna assembly 121 may have an independently controlled native antenna pattern 220 via separate actuators 124.

In some examples, the first antenna assembly 121-j is associated with a user terminal service coverage area 410 and the second antenna assembly 121-k is associated with an access node terminal service coverage area 410. For instance, communication signals between user terminals 150 and the communications satellite 120-f may be communicated according to the first native antenna pattern coverage area 221-j, which is dependent on a first native antenna pattern 220-j provided by the first antenna assembly 121-j while communication signals between access node terminals 130 and the communications satellite 120-f may be communicated according to a second native antenna pattern coverage area 221-k that is dependent on a second native antenna pattern 220-k provided by the second antenna assembly 121-k. Thus, different service coverage areas 410 may be provided a communications service according to different native antenna patterns 220 via separate antenna assemblies 121. Although illustrated with two antenna assemblies 121, a communications satellite 120 may have more than two antenna assemblies 121, including multiple antenna assemblies 121 associated with corresponding access node terminal service coverage areas 410 and/or multiple antenna assemblies 121 associated with corresponding user terminal service coverage areas 410.

Figure 26A:
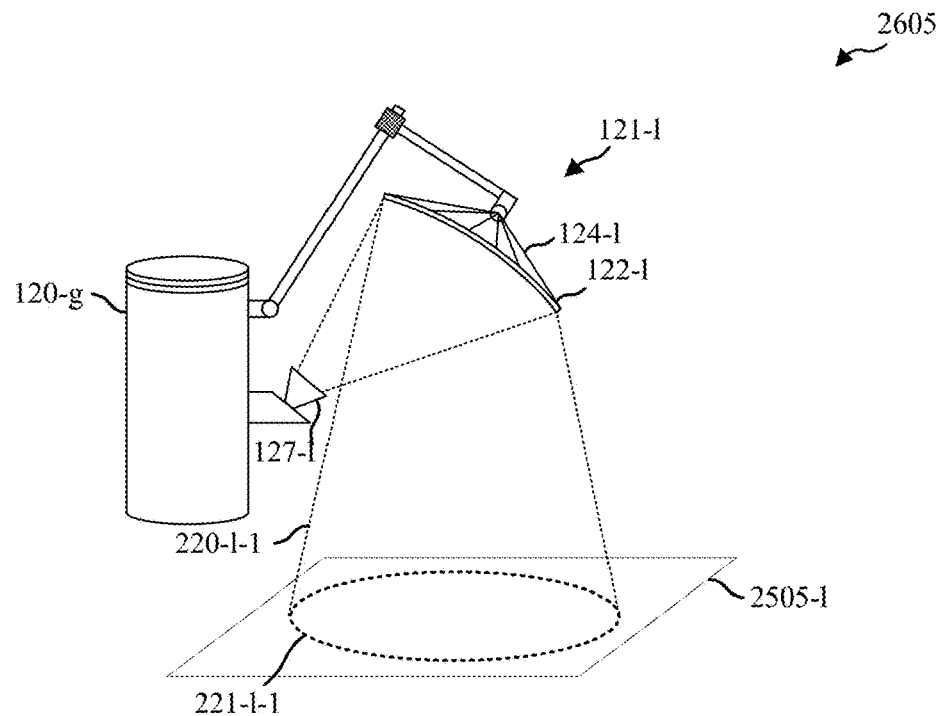
FIGS. 26A-26F illustrate examples of communications satellites having antenna assemblies with different types of actuators that may support changes in native antenna patterns, in accordance with aspects of the present disclosure.
Figure 26B:
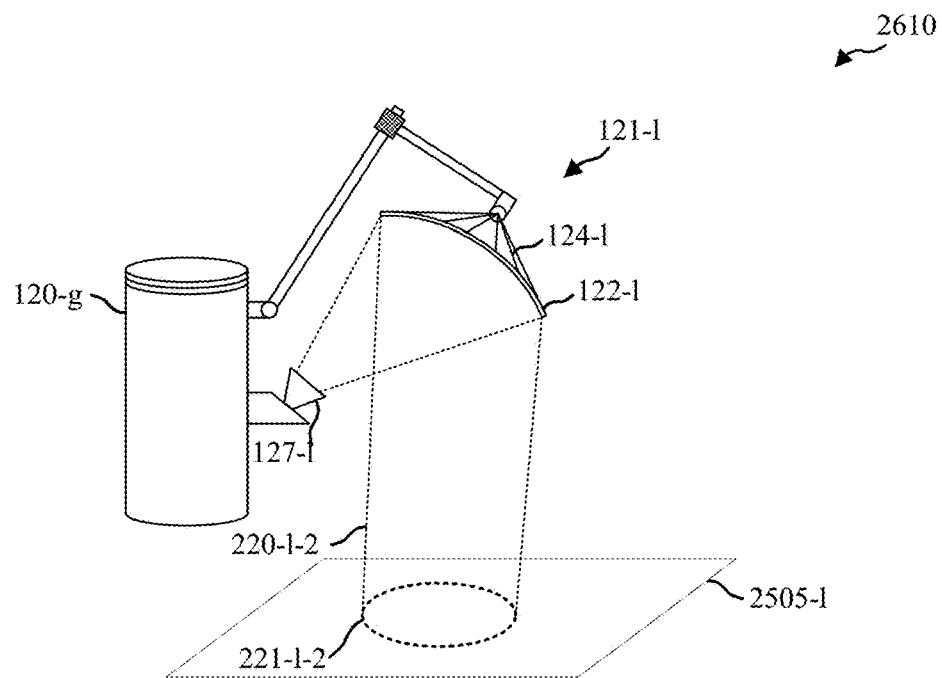

FIGS. 26A & 26B illustrate an example of a communications satellite 120-g having an antenna assembly 121-1 with a reflector-based actuator 124-1 that may support changes in native antenna pattern coverage areas 221-1, in accordance with aspects of the present disclosure. The actuator 124-1 may cause the reflector 122-1 to change shape, such that the location of the focal region 123 of the reflector 122-1 changes location. For example, in condition 2605 of FIG. 26A, the focal region 123 of the reflector 122-1 may be relatively far from the reflector 122-1. Accordingly, the native antenna pattern 220-1-1 may be relatively broad, such that the native antenna pattern coverage area 221-1-1 projected on the reference plane 2505-1 is consequently relatively wide. By contrast, in condition 2610 of FIG. 26B, the focal region 123 of the reflector 122-1 may be relatively near to the reflector 122-1. Accordingly, the native antenna pattern 220-1-2 may be relatively narrow, such that the native antenna pattern coverage area 221-1-2 projected on the reference plane 2505-1 is consequently relatively narrow.

Various mechanisms, or combinations of mechanisms may provide the function of the reflector-based actuator 124-1, such as a collection of linear actuators, a cable and pulley system, a kinematic linkage, or any other mechanism that changes the shape of a reflector 122, and thereby changes the characteristics of a focal region 123 of the reflector 122. Such changes to a focal region 123 of a reflector 122 may include moving from a first focal point to a different focal point, changing from a single focal point to a plurality of focal points, changing from a focal point to a focal line or focal surface, changing from a focal line to a focal point or a focal surface, changing from a focal surface having a first shape to a focal surface having a second shape, or various combinations thereof. Furthermore, a reflector 122 may include an actuator 124 that changes the shape of all of, or a portion of the reflector 122, and in some examples a reflector may have more than one actuator 124 to change various portions of the reflector shape. Thus, various types of reflector-based actuators 124 may be used to adjust a native antenna pattern 220 of an antenna assembly 121.

Figure 26C:
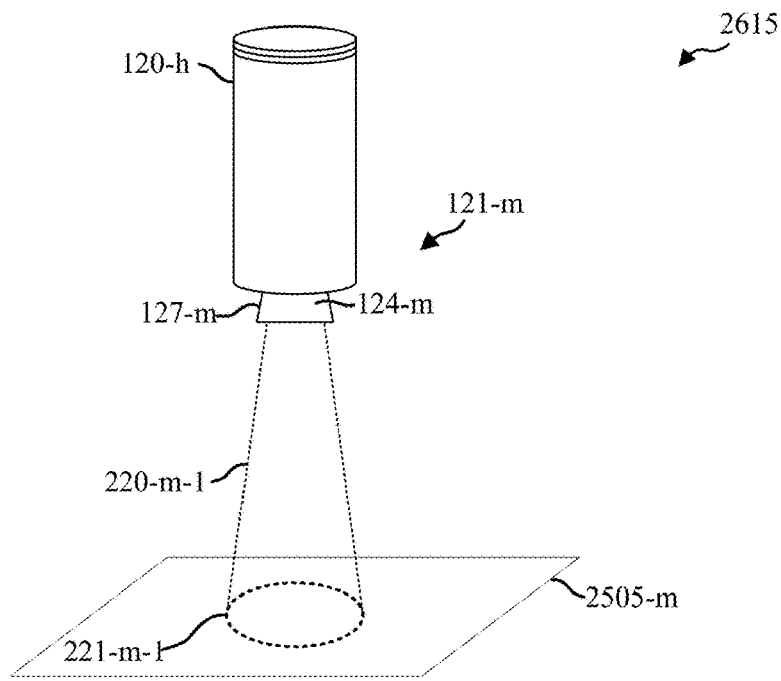
Figure 26D:
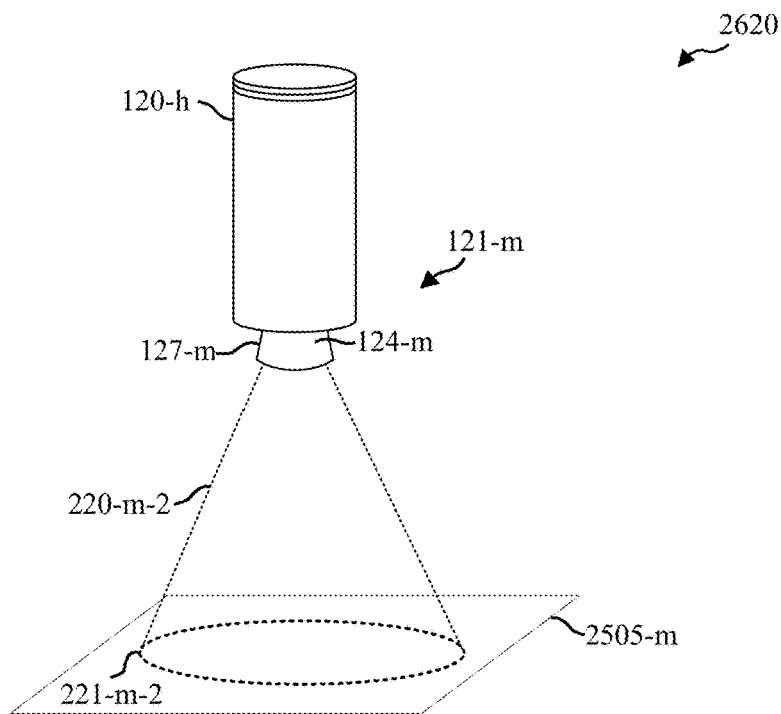

FIGS. 26C & 26D illustrate an example of a communications satellite 120-$h$ having an antenna assembly 121-$m$ with an actuator 124-$m$ integrated with a feed array assembly that may support changes in native antenna pattern coverage areas 221-$m$, in accordance with aspects of the present disclosure. Antenna assembly 121-$m$ does not include a reflector, and instead illustrates an example of a direct radiating array (DRA) antenna assembly 121. For the antenna assembly 121-$m$, the actuator 124-$m$ may cause the arrangement of antenna feed elements 128-$m$ of the feed array assembly 127-$m$ to change characteristics, such that the native feed element patterns 210 associated with the feed elements 128 are pointed to a different location. Accordingly, the actuator 124-$m$ may change the shape, orientation, and/or distribution of native feed element patterns 210, thereby changing the native antenna pattern coverage area 221-$m$ for the antenna assembly 121-$m$. For example, in condition 2615 of FIG. 26C, the actuator 124-$m$ may be commanded to provide a relatively narrow distribution of native feed element patterns 210-$m$ (e.g., a tight distribution of pointing directions for each of the feed elements 128-$m$), such that the native antenna pattern coverage area 221-$m$-1 projected on the reference plane 2505-$m$ is consequently relatively narrow. By contrast, in condition 2620 of FIG. 26D, the actuator 124-$m$ may be commanded to provide a relatively wide distribution of native feed element patterns 210-$m$ (e.g., a wide distribution of pointing directions for each of the feed elements 128-$m$), such that the native antenna pattern coverage area 221-$m$-1 projected on the reference plane 2505-$m$ is consequently relatively broad.

Various mechanisms, or combinations of mechanisms may provide the function of the actuator 124-$m$ that is integrated into the feed array assembly 127-$m$. For example, a mechanism may be provided to change the shape of the feed array assembly 127-$m$, such as a mechanism to change the curvature of a surface of the feed array assembly 127-$m$ that includes the feed horn apertures of the feed elements 128-$m$. In other examples, one or more actuators 124-$m$ may be provided to change the orientation of the feed elements 128-$m$, without changing the shape of the feed array assembly 127-$m$. Furthermore, a feed array assembly 127 may include an actuator 124 that changes the orientation and/or native feed element pattern 210 of all of, or a portion of the feed elements 128 of the feed array assembly 127, and in some examples a feed array assembly 127 may have more than one actuator 124 to change various portions of the feed array assembly 127. Thus, various types of actuators 124 may be integrated into a feed array assembly to adjust a native antenna pattern 220 of an antenna assembly 121.

Figure 26E:
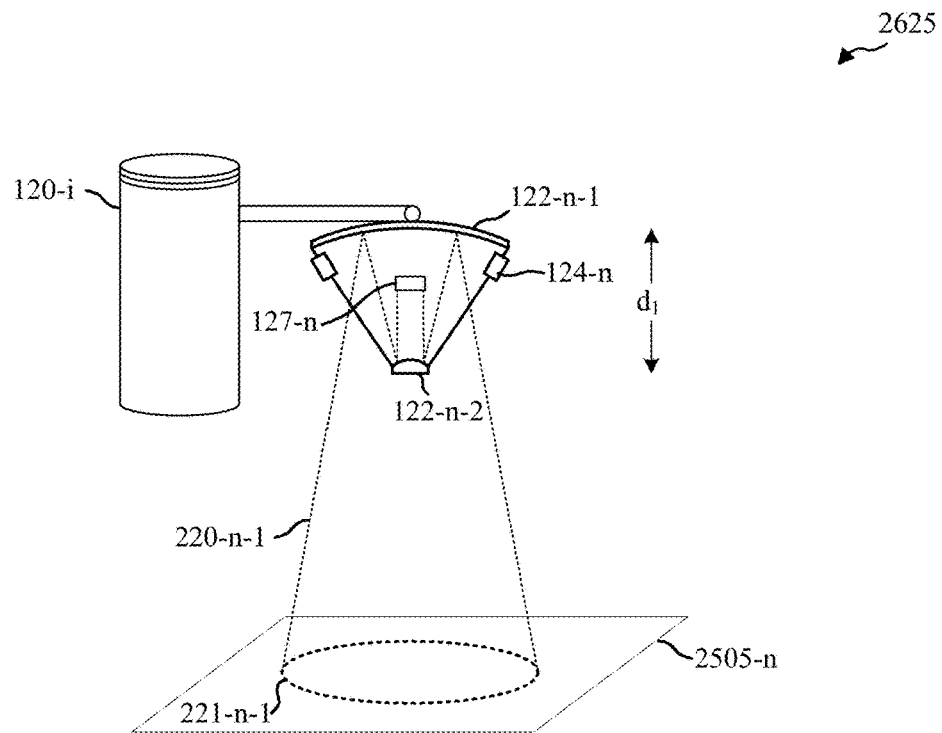
Figure 26F:
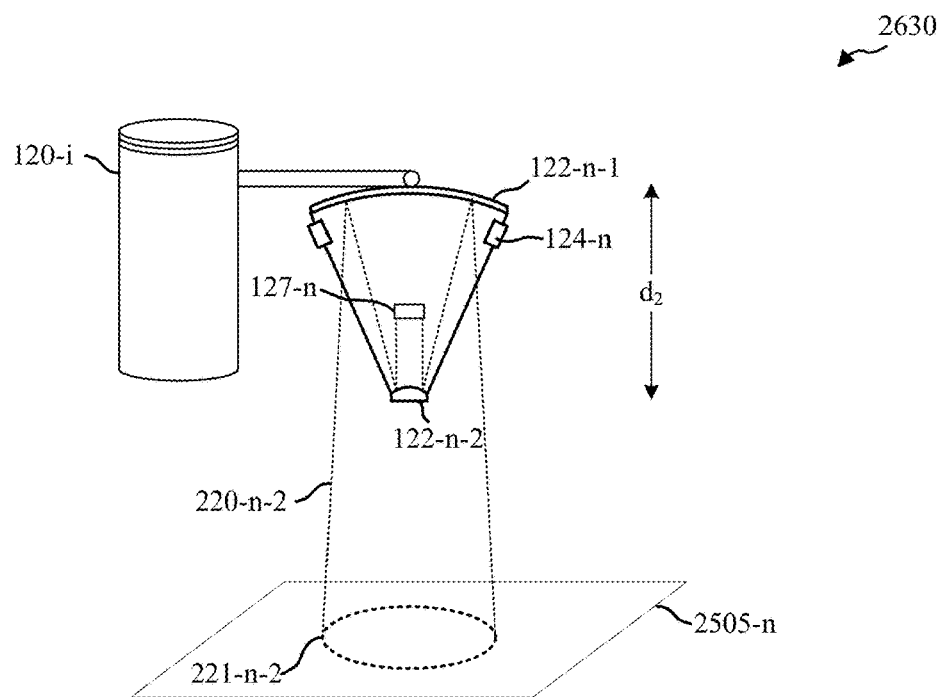

FIGS. 26E & 26F illustrate an example of a communications satellite 120-$i$ having an antenna assembly 121-$n$ with an actuator 124-$n$ coupled between a first reflector 122-$n$-1 and a second reflector 122-$n$-2, and may support changes in native antenna pattern coverage areas 221-$n$, in accordance with aspects of the present disclosure. The actuator 124-$n$ may cause the second reflector 122-$n$-2 to be nearer or farther from the first reflector 122-$n$-1. For example, in condition 2625 of FIG. 26E, the second reflector 122-$n$-2 may be relatively near to the first reflector 122-$n$-1. Accordingly, the native antenna pattern 220-$n$-1 may be relatively broad, such that the native antenna pattern coverage area 221-$n$-1 projected on the reference plane 2505-$n$ is consequently relatively wide. By contrast, in condition 2620 of FIG. 26E, the second reflector 122-$n$-2 may be relatively far from the first reflector 122-$n$-1. Accordingly, the native antenna pattern 220-$n$-2 may be relatively narrow, such that the native antenna pattern coverage area 221-$n$-2 projected on the reference plane 2505-$n$ is consequently relatively narrow. Various mechanisms, or combinations of mechanisms may provide the function of the actuator 124-$n$ that is coupled between a first reflector 122 and a second reflector 122, including any of the actuators 124 described with reference to an actuator 124 coupled between a reflector 122 and a feed array assembly 127.

Figure 27:
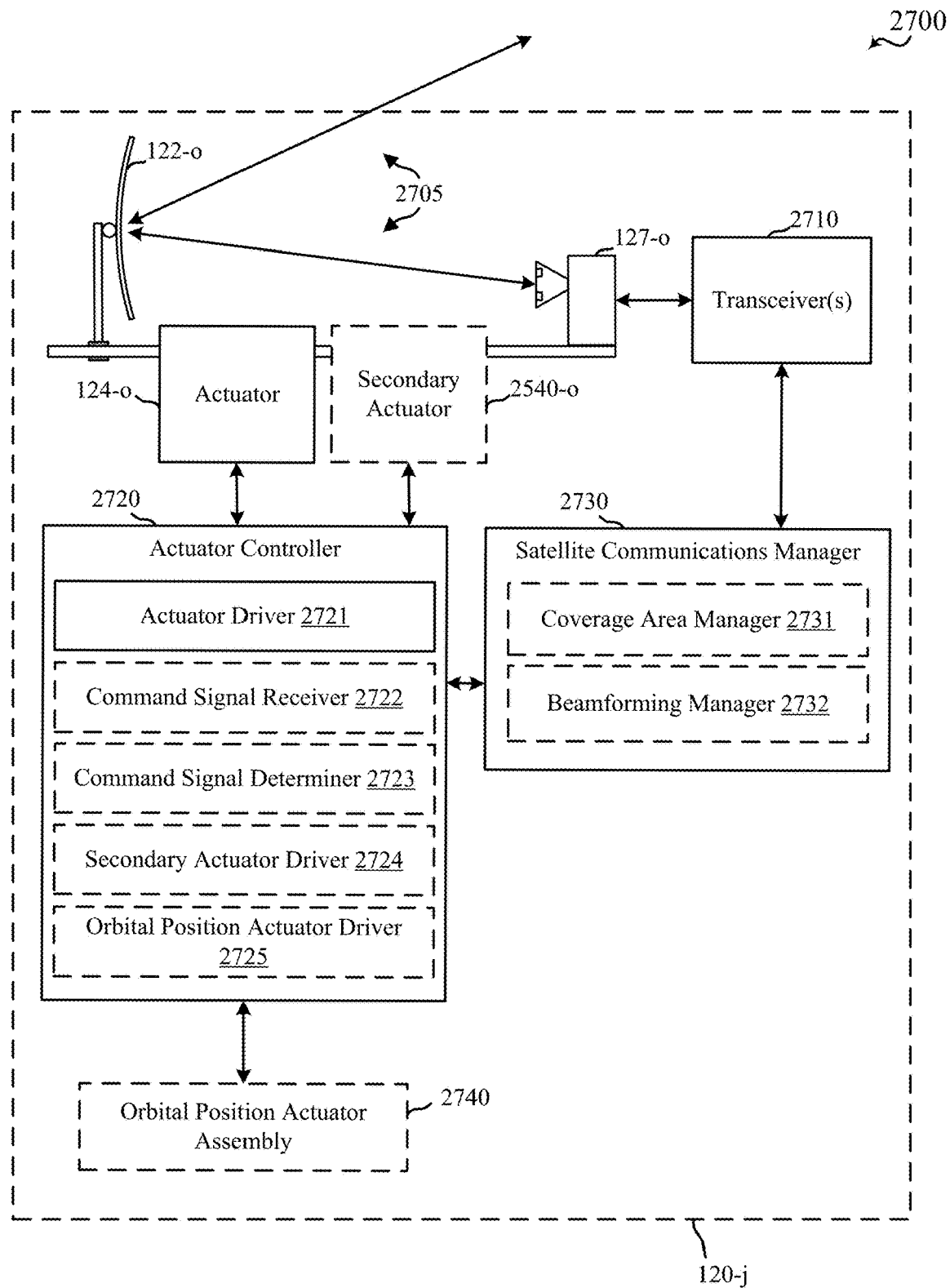
FIG. 27 illustrates a block diagram of a communications satellite that supports providing a communications service according to a plurality of native antenna patterns, in accordance with aspects of the present disclosure.

FIG. 27 illustrates a block diagram 2700 of a communications satellite 120-$j$ that supports providing a communications service according to a plurality of native antenna patterns 220, in accordance with aspects of the present disclosure. The communications satellite 120-$j$ may be an example of one or more of the communications satellites 120 described herein, and may include a feed array assembly 127-$o$, a reflector 122-$o$, an actuator 124-$o$, an actuator controller 2720, and a satellite communications manager 2730.

The feed array assembly 127-$o$ may be an example of any of the feed array assemblies 127 described herein, and may include a plurality of antenna feed elements 128 arranged in any suitable manner to support a plurality of native feed element patterns 210. The reflector 122-$o$ may be an example of any of the reflectors 122 described herein, and may be configured to reflect signals transmitted between the feed array assembly 127-$o$ and one or more target devices (e.g., access node terminals 130 and/or user terminals 150). Although only feed array assembly 127-$o$ and one reflector 122-$o$ are illustrated, a communications satellite 120 such as communications satellite 120-$j$ may include more than one feed array assembly 127 and/or more than one reflector 122.

Actuator 124-$o$ may be an example of any of the actuators 124 described herein for supporting a communications service according to a plurality of native antenna patterns 220. For example, actuator 124-$o$ may be a linear actuator coupled between the reflector 122-$o$ and the feed array assembly 127-$o$, and may support adjusting a relative distance between the feed array assembly 127-$o$ and the reflector 122-$o$. The actuator 124-$o$ may be constrained to provide the change in relative distance along one translational direction, which may be aligned along a direction predominantly between a center of the reflector 122-$o$ and a focal region 123 of the reflector 122-$o$. In various examples the actuator 124-$o$ may include linear motor, a stepper motor, a servo motor, a rack and pinion assembly, a ball screw assembly, a kinematic linkage, an extendable truss assembly, a hydraulic cylinder, or any combination thereof. In other examples the actuator 124-$o$ may be coupled between two reflectors 122, integrated in a feed array assembly 127, or reflector-based, as described with reference to FIGS. 26A through 26F. In some examples, the communications satellite 120-$j$ may optionally include additional actuators, such as secondary actuator 2540-$c$, which may be an example of secondary actuator 2540 described with reference to FIGS. 25A-25C, or an orbital position actuator 2740 (e.g., a thruster, a flywheel, etc.) for adjusting an orientation (e.g., attitude) or location of the communications satellite 120-$j$.

The actuator controller 2720 may be configured to define, command, and/or monitor various states of one or more actuators (e.g., the actuator 124-$o$, the secondary actuator 2540-$o$, the orbital position actuator 2740, etc.) of the communications satellite 120-*j*, and may provide other high-level functions of actuation control. States of the actuator controller 2720 can include initialization states, operational states, and/or fault states, and the actuator controller can change between states or maintain a particular state in response to pre-programmed commands and/or signals received from the one or more actuators, the satellite communications manager, and/or signals from outside the actuator controller 2720 such as position detectors and/or encoders, sensors, relays, user commands, or any other control signal. The actuator controller 2720 may generate various control signals that are delivered to the one or more actuators in response to pre-programmed instructions (e.g., operational configurations, control algorithms, controller gains, offsets, deadbands, multipliers, etc.) and/or received signals. For example, the actuator controller 2720 may include an actuator driver 2721, which may support actuation of the actuator 124-*o* according to command signals of the actuator controller 2720. In communications satellites 120 that include a secondary actuator and/or an orbital position actuator, an actuator controller 2720 may optionally include a secondary actuator driver 2724 and/or an orbital position actuator driver 2725, respectively.

In various examples, the command signals described herein may be received by the actuator controller 2720 and/or determined by the actuator controller 2720. For example, the actuator controller may optionally include a command signal receiver 2722, which may support receiving (e.g., via the satellite communications manager 2730) a command signal for controlling the actuator 124-*o* (and/or other actuators, when present) from a command signal generator, such as a terrestrial access node terminal 130 or other network device 141 configured to control aspects of providing a communications service according to various native antenna patterns 220. Additionally or alternatively, the actuator controller 2720 may include a command signal determiner 2723 that supports determining (e.g., at the communications satellite 120-*j*) a command signal for actuating the actuator 124-*o* (and/or other actuators, when present) to provide a desired native antenna pattern 220. In various examples, command signals may include indications of actuator positions, a difference between positions, a desired position of a component of the communications satellite 120-*j* (e.g., the reflector 122-*o*, the feed array assembly 127-*o*, etc.), a length or angle of an actuator, a parameter of a native antenna pattern 220, a lookup value associated with the second native antenna pattern 220, or any other command signal suitable for identifying or determining how to drive a particular actuator 124 and/or secondary actuator 2540 to achieve a desired result.

The satellite communications manager 2730 may be configured to manage one or more aspects of providing a communications service via the communications satellite 120-*j*. For example, the satellite communications manager 2730 may manage communication via signals 2705 provided to, or received from (e.g., via transceiver(s) 2710) other devices, such as access node terminals 130, network devices 141, user terminals 150, CPEs 160, etc. In some examples, signals 2705 may be part of the communications service provided via the communications satellite 120-*j*. Additionally or alternatively, signals 2705 may include control signals or diagnostic or control information unrelated to the communications service, but otherwise provided by, or received by the communications satellite 120-*j*.

Some examples of a satellite communications manager 2730 may optionally include a coverage area manager 2731, which may manage one or more aspects of coverage areas as described herein. For example, the coverage area manager 2731 may include a database, equations, or other configuration that supports providing, monitoring, and/or adjusting native antenna patterns 220 for providing a communications service via the communications satellite 120-*o*. The coverage area manager 2731 may, for example, include algorithms for determining and/or providing a desired native antenna pattern 220, native feed element pattern coverage area 211, native feed element pattern coverage area overlap, and the like. In some examples, the coverage area manager 2731 may be operable based at least in part on characteristics of the actuator 124-*o*, a position or rotation of the secondary actuator 2540-*o*, an orbital position, or a change in orbital position (e.g., to calculate coverage area parameters, to trigger a change in a native antenna pattern 220, etc.). In other examples, coverage area management may be performed by some other device, such as a communications service manager as described herein.

In examples where the satellite communications manager 2730 provides a communications service by way of beamforming, the satellite communications manager may optionally include a beamforming manager 2732. The beamforming manager 2732 may, for example, support on-board beamforming at the communications satellite 120-*j*, and may include a BFN 710 and/or a BWP 714 as described herein. For example, the beamforming manager 2732 may apply a beamforming weight set to signals 2705 carried via the feed array assembly 127-*o*. Beam weights of the beamforming weight set may, for example, be applied to signals prior to transmission to support directional transmission of Tx spot beams 125, or may be applied to signals received by the communications satellite 120-*o* to support directional reception of Rx spot beams 125. In various examples, such beam weights may be selected and/or calculated by the beamforming manager (e.g., at a BWP 714) in order to provide a desired native antenna pattern 220 (e.g., to provide a desired size and/or position of spot beam coverage areas 126, to provide a desired degree of overlap amongst a plurality of spot beam coverage areas 126, to assign a desired set of antenna feed elements 128 of the feed array assembly 128-*o* used for one or more spot beams 125, etc.). In other examples, beamforming management may be performed by some other device, such as a communications service manager as described herein.

The actuator controller 2720 and/or the satellite communications manager 2730 may be implemented or performed, individually or collectively, with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Figure 28:
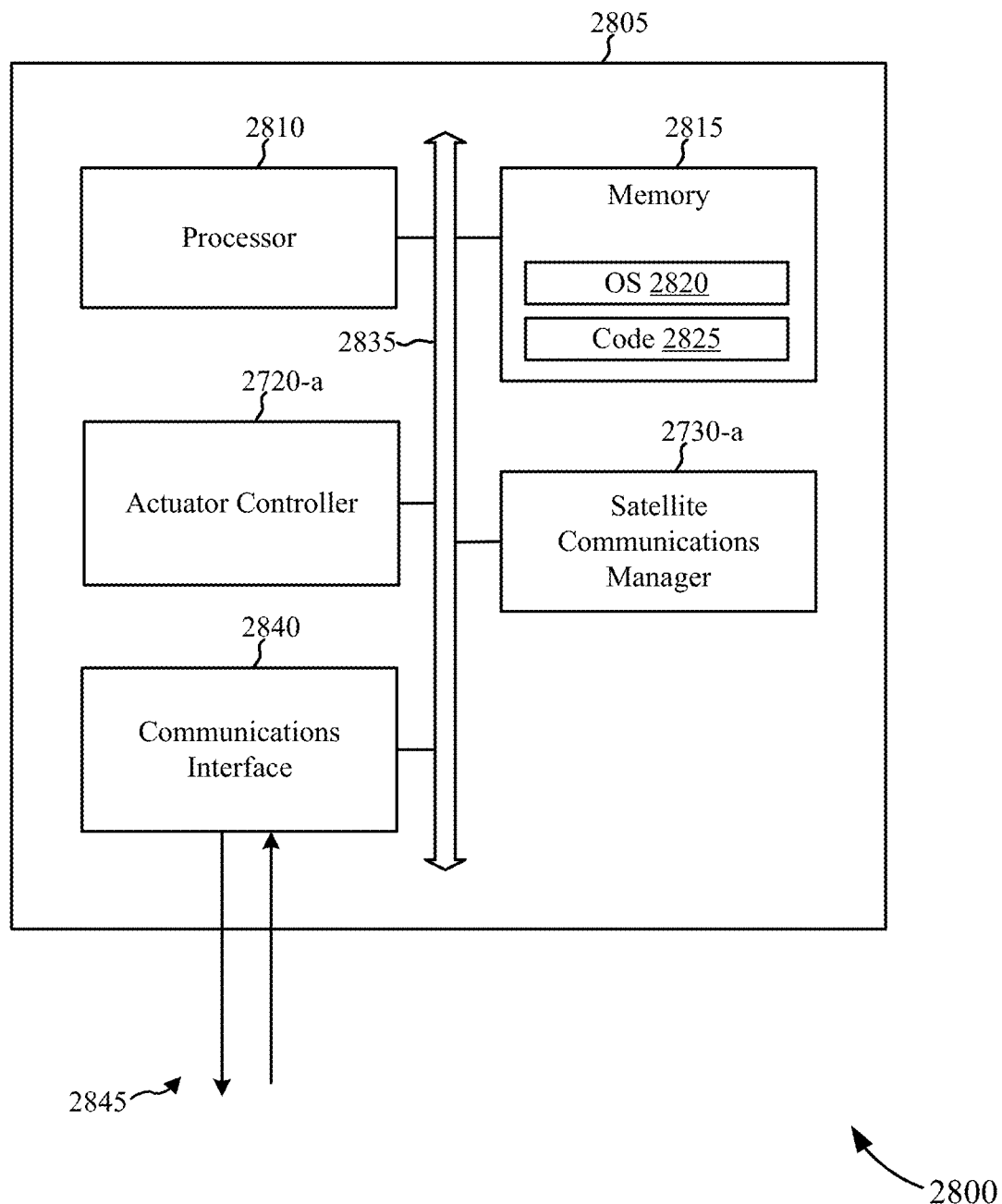
FIG. 28 shows a block diagram of a satellite controller that supports providing a communications service according to a plurality of native antenna patterns, in accordance with aspects of the present disclosure

FIG. 28 shows a block diagram 2800 of a satellite controller 2805 that supports providing a communications service according to a plurality of native antenna patterns, in accordance with aspects of the present disclosure. The satellite controller 2805 may include a processor 2810, memory 2815, an actuator controller 2720-*a*, a satellite communications manager 2730-*a*, and a communications interface 2840. Each of these components may be in communication with each other, directly or indirectly, over one or more buses 2835.

The memory 2815 may include random access memory (RAM) and/or read-only memory (ROM). The memory 2815 may store an operating system (OS) 2820 (e.g., built on a Linux or Windows kernel). The memory 2815 may also store computer-readable, computer-executable code 2825 including instructions that are configured to, when executed, cause the processor 2810 to perform various functions described herein related providing a communications service according to different native antenna patterns. Alternatively, the code 2825 may not be directly executable by the processor 2810 but be configured to cause the satellite controller 2805 (e.g., when compiled and executed) to perform one or more of the functions described herein.

The satellite controller may include an actuator controller 2720-a, which may be an example of the actuator controller 2720 of FIG. 27. The actuator controller 2720-a may control a linear actuator to provide a change in relative distance between a feed array assembly and a reflector, as described herein. The satellite communications manager 2730-a may support providing a communications service according to a native antenna pattern, as described herein. In some examples operations may be supported by the communications interface 2840, which may provide for signals 2845 to be transmitted to, or received from other features of a communications satellite (e.g., a feed array assembly, one or more actuators, etc.) By supporting the features described herein, a communications satellite 120 that includes the satellite controller 2805 may therefore support providing a communications service according to different native antenna patterns.

The satellite controller 2805, including the processor 2810, the memory 2815, the actuator controller 2720-a, and satellite communications manager 2730-a, and/or the communications interface 2840 may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The satellite controller 2805 may also be implemented as a combination of computing devices, e.g., a combination of a DSP and a microprocessor, multiple microprocessors, one or more microprocessors in conjunction with a DSP core, integrated memory, discrete memory, or any other such configuration.

FIG. 29 shows a block diagram 2900 of a communications service manager 2905 that supports providing a communications service according to a plurality of native antenna patterns, in accordance with aspects of the present disclosure. The communications service manager 2905 may include a communications manager 2910 and a command signal determiner 2920.

The communications manager 2910 may manage aspects of communications that are provide by the communications service, such as forward link communications and return link communications. For example, the communications manager 2910 may manage one or more aspects of the providing of a first plurality of signals between a plurality of access node terminals and a satellite, and the providing a second plurality of signals between the satellite and a plurality of terminals.

The command signal determiner 2920 may determine one or more command signals to be provided to a communications satellite to adapt how a communications service is provided. For example, the command signal determiner 2920 may determine a command for a linear actuator of a communications satellite to change from the first length to a second length, which may provide a change in a relative distance between a feed array assembly and a reflector of the communications satellite. The change in length of the linear actuator of the communications satellite may subsequently support providing a communications service according to a new native antenna pattern.

The coverage area manager 2930 may manage various parameters and/or equations relating to coverage areas of the communications satellite. In some examples, the coverage area manager may determine aspects of the coverage areas based at least in part on a length of a linear actuator of the communications satellite, a position or rotation of a second actuator, an orbital position of the communications satellite, or any combination thereof which may be detected by the communications service manager 2905, or received from the communications satellite itself. The coverage area manager 2930 may be used to identify a desired native antenna pattern and/or determine a change in native antenna patterns to trigger the command signal determiner 2920 to initiate a command to an actuator of the communications satellite.

In examples where the communications service manager 2905 manages a communications service that employs beamforming, the communications service manager may optionally include a beamforming manager 2940. The beamforming manager 2940 may, for example, support ground-based beamforming via a communications satellite 120. For example, the beamforming manager 2940 may apply a set of beamforming coefficients to signals transmitted by an access node terminal 130. Such beamforming coefficients may, for example, be applied to signals prior to transmission to support directional transmission, or may be applied to signals received by the communications satellite 120 to support directional reception. In other examples, such beamforming coefficients may be determined by the beamforming manager 2940, and provided to a communications satellite 120 in order to support on-board beamforming at the communications satellite. In various examples, beamforming coefficients may be selected and/or calculated by the beamforming manager 2940 in order to provide a desired native antenna pattern determined by the communications service manager 2905.

Figure 30:
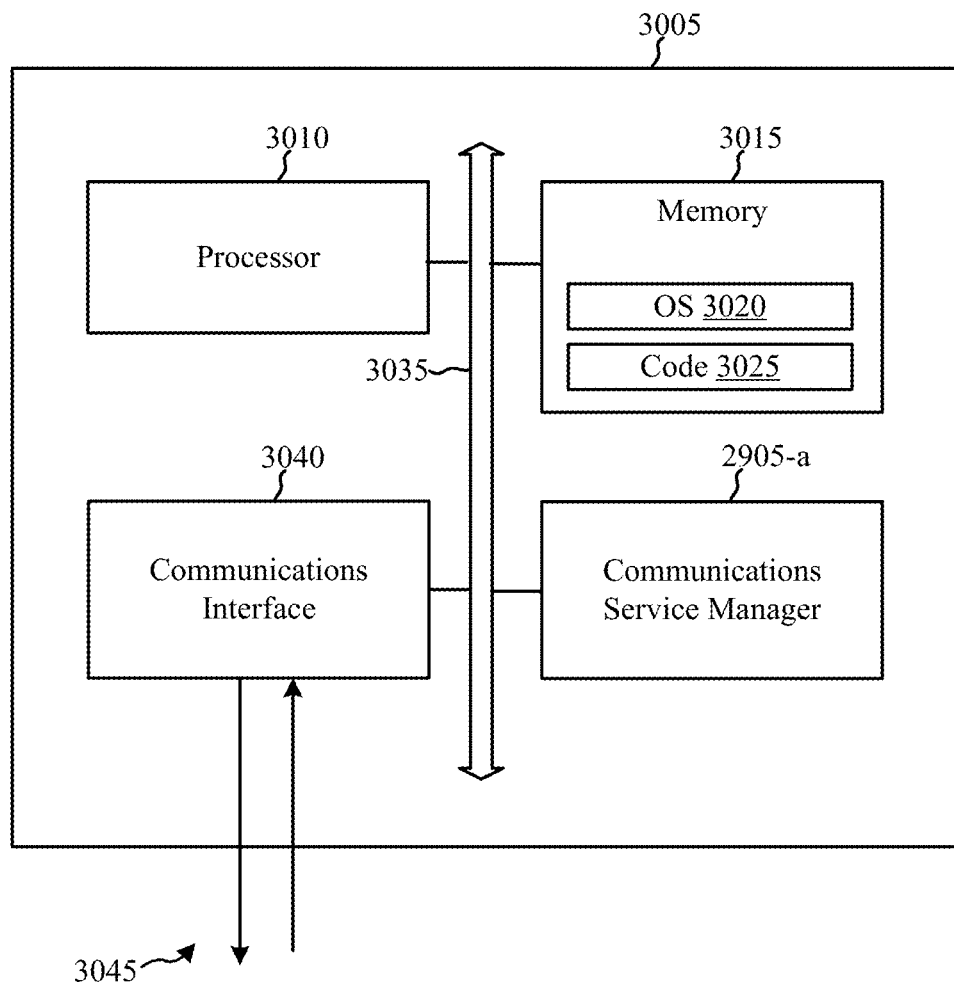
FIG. 30 shows a block diagram of a communications service controller 3005 that supports providing a communications service according to a plurality of native antenna patterns, in accordance with aspects of the present disclosure.

FIG. 30 shows a block diagram 3000 of a communications service controller 3005 that supports providing a communications service according to a plurality of native antenna patterns, in accordance with aspects of the present disclosure. The communications service controller 3005 may include a processor 3010, memory 3015, a communications service manager 2905-a, and a communications interface 3040. Each of these components may be in communication with each other, directly or indirectly, over one or more buses 3035. In various examples, the communications service controller 3005 may be, or be part of an access node terminal 130 or a network device 141 described with reference to FIG. 1A.

The memory 3015 may include random access memory (RAM) and/or read-only memory (ROM). The memory 3015 may store an operating system (OS) 3020 (e.g., built on a Linux or Windows kernel). The memory 3015 may also store computer-readable, computer-executable code 3025 including instructions that are configured to, when executed, cause the processor 3010 to perform various functions described herein related providing a communications service according to different native antenna patterns. Alternatively, the code 3025 may not be directly executable by the processor 3010 but be configured to cause the communications service controller 3005 (e.g., when compiled and executed) to perform one or more of the functions described herein.

The satellite controller may include a communications service manager 2905-*a*, which may be an example of the communications service manager 2905 of FIG. 29. The communications service manager 2905-*a* may manage one or more aspects of providing a communications service according to different native antenna patterns, as described herein. The communications service may, for example, be provided via the communications interface 3040. In some examples, the communications service manager may determine a desired native antenna pattern, and subsequently determine a command to be sent to a communications satellite 120 (e.g., by way of signaling 3045 via the communications interface 3040) to provide the desired native antenna pattern. For example, the determined command may indicate a change in a position and/or length of a linear actuator to provide a change in relative distance between a feed array assembly and a reflector, which subsequently provides the change in native antenna pattern.

Figure 31:
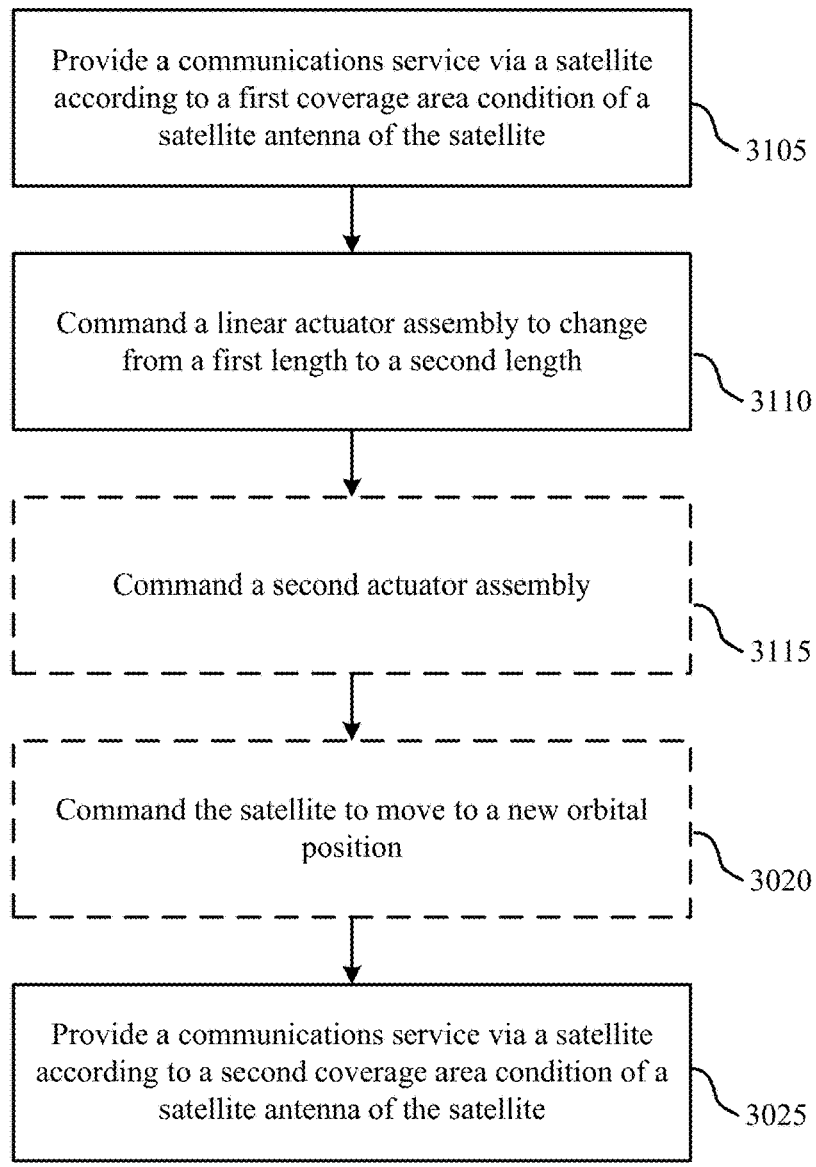
FIG. 31 illustrates a flow chart of an example method that supports providing a communications service via a communications satellite according to a plurality of native antenna patterns, in accordance with aspects of the present disclosure.

The communications service controller 3005, including the processor 3010, the memory 3015, the communications service manager 2905-*a*, and/or the communications interface 3040 may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The communications service controller 3005 may also be implemented as a combination of computing devices, e.g., a combination of a DSP and a microprocessor, multiple microprocessors, one or more microprocessors in conjunction with a DSP core, integrated memory, discrete memory, or any other such configuration FIG. 31 illustrates a flow chart of an example method 3100 that supports providing a communications service via a communications satellite according to a plurality of native antenna patterns, in accordance with aspects of the present disclosure. The method 3100 is described below with reference to one or more aspects of a communications satellite 120 having a feed array assembly 127, a reflector 122, and a linear actuator 124 coupled between the feed array assembly, as described herein. In some examples, the communications satellite 120 itself may perform one or more of the operations of method 3100 described below. In some examples, one or more of the operations of method 3100 may be performed by a communications service controller 3005.

At 3105, the method 3100 may include providing a communications service via the satellite according to a first native antenna pattern of a satellite antenna of the satellite, as described herein. The first native antenna pattern may include a first plurality of spot beams, and may be based at least in part on a first length of the linear actuator providing a first defocused position of a feed array assembly relative to a reflector of the satellite antenna. Providing the communications service may include providing a first plurality of signals between a plurality of access node terminals and the satellite and providing a second plurality of signals between the satellite and a plurality of terminals. In some examples, the first defocused position may be associate with the feed array assembly being located between the reflector and a focal region of the reflector. The communications service may be provided by way of beamforming, and providing the communications service according to the first native antenna pattern may include applying a first set of beamforming coefficients to signals carried via the feed array assembly. The described beamforming coefficients may be determined at the communications satellite 120, or may be determined at another device such as a communications service controller 3005, and subsequently provided to the communications satellite 120 (e.g., by way of wireless transmissions received at the communications satellite 120).

At 3110, the method 3100 may include commanding the linear actuator to change from the first length to a second length, as described herein. In various examples, the commanding at 3110 may include providing an indication of a new position of the linear actuator, a difference between position, a desired position of the reflector, a desired position of the feed array assembly, a length of the linear actuator, a parameter of the second native antenna pattern, or a lookup value associated with the second native antenna pattern. The commanding at 3110 may be determined at the communications satellite 120, or may be determined at another device such as a communications service controller 3005, and subsequently provided to the communications satellite 120 (e.g., by way of wireless transmissions received at the communications satellite 120).

In some examples, at 3115 the method 3100 may optionally include commanding a second actuator. The second actuator may be coupled between the feed array assembly and the reflector, and may support causing a change in relative position between the feed array assembly and the reflector about an axis different from an axis along the first and the second lengths of the linear actuator. The commanding at 3115 may be determined at the communications satellite 120, or may be determined at another device such as a communications service controller 3005, and subsequently provided to the communications satellite 120 (e.g., by way of wireless transmissions received at the communications satellite 120).

In some examples, at 3120 the method 3100 may optionally include commanding the satellite to move from the first orbital position to a second orbital position. The commanding at 3120 may be determined at the communications satellite 120, or may be determined at another device such as a communications service controller 3005, and subsequently provided to the communications satellite 120 (e.g., by way of wireless transmissions received at the communications satellite 120).

At 3125, the method 3100 may include providing the communications service via the satellite according to a second native antenna pattern of the satellite antenna. The second native antenna pattern may include a second plurality of spot beams, and may be based at least in part on the second length of the linear actuator providing a second defocused position of the feed array assembly relative to the reflector. The second defocused position may provide various differences of the second native antenna pattern when compared to the first native antenna pattern. For example, the second defocused position may provide a second native feed element pattern coverage area size of the feed of the feed array assembly that is different from the first native feed element pattern coverage area size. In some examples, the second defocused position provides a second overlap of native feed element patterns of the two or more antenna feed elements of the feed array assembly that is different from the first overlap of native feed element patterns.

In some examples, the communications service at 3125 may be provided via the communications satellite at the same orbital position as the communications service provided at 3105, and the second native antenna pattern may correspond to a different service coverage area than the first native antenna pattern. In some examples, the service coverage area of the second native antenna pattern may at least partially overlap the service coverage area of the first native antenna pattern. Providing the communications service at 3125 may include applying a different set of beamforming coefficients to signals carried via the feed array assembly. The described beamforming coefficients may be determined at the communications satellite 120, or may be determined at another device such as a communications service controller 3005 and subsequently provided to the communications satellite 120 (e.g., by way of wireless transmissions received at the communications satellite 120).

Thus, method 3100 may support providing a communications service according to different native antenna patterns, wherein the different native antenna patterns are based at least in part on the commanding of a linear actuator coupled between a feed array assembly and a reflector of a communications satellite. It should be noted that method 3100 discusses exemplary implementations and that the operations of method 3100 may be rearranged or otherwise modified such that other implementations are possible. For example, certain described operations may be optional (e.g., those enclosed by boxes having dashed lines, those described as optional, etc.), wherein optional operations may be performed when certain criteria are met, performed based on a configuration, omitted intermittently, omitted entirely, etc.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. An antenna system, comprising:
   a feed array assembly comprising a plurality of antenna feed elements;
   a reflector; and
   one or more actuators configured to establish a native antenna pattern, from among a plurality of native antenna patterns supported via the feed array assembly, based at least in part on changing a shape of at least a portion of the reflector.

2. The antenna system of claim 1, further comprising:
   a beamforming network configured for communicating signals in accordance with a plurality of beamformed spot beams based at least in part on the established native antenna pattern.

3. The antenna system of claim 2, wherein, for the communicating signals in accordance with the plurality of beamformed spot beams, the beamforming network is configured to apply a beamforming weight set to a plurality of feed element signals carried via the plurality of antenna feed elements.

4. The antenna system of claim 2, wherein for the communicating signals in accordance with the plurality of beamformed spot beams, the reflector is configured such that:
   a first antenna feed element of the plurality of antenna feed elements communicates signaling of a first spot beam of the plurality of beamformed spot beams and communicates signaling of a second spot beam of the plurality of beamformed spot beams; and
   a second antenna feed element of the plurality of antenna feed elements communicates signaling of the first spot beam of the plurality of beamformed spot beams and communicates signaling of the second spot beam of the plurality of beamformed spot beams.

5. The antenna system of claim 1, wherein each native antenna pattern of the plurality of native antenna patterns is a respective composite of native feed element patterns of the plurality of antenna feed elements, and wherein each of the plurality of native antenna patterns has a native feed element pattern associated with a given antenna feed element that is different relative to another of the plurality of native antenna patterns for the given antenna feed element.

6. The antenna system of claim 1, wherein the one or more actuators comprise a set of linear actuators.

7. The antenna system of claim 1, wherein the one or more actuators comprise a cable and pulley system.

8. The antenna system of claim 1, wherein the one or more actuators comprise a kinematic linkage.

9. The antenna system of claim 1, wherein the one or more actuators are configured to change a characteristic of a focal region of the reflector.

10. The antenna system of claim 9, wherein the one or more actuators are configured to change a location of a focal region of the reflector.

11. The antenna system of claim 9, wherein the one or more actuators are configured to change a shape of a focal region of the reflector.

12. The antenna system of claim 1, wherein the one or more actuators are configured to change a shape of an entire surface of the reflector.

13. The antenna system of claim 1, further comprising:
    a receiver configured to receive a command to actuate the one or more actuators from a ground station.

14. The antenna system of claim 1, wherein the one or more actuators are configured to establish the native antenna pattern based at least in part on a rotational degree of freedom between the feed array assembly and the reflector.

15. The antenna system of claim 1, wherein the one or more actuators are configured to establish the native antenna pattern based at least in part on a translational degree of freedom between the feed array assembly and the reflector.

16. The antenna system of claim 1, wherein, for at least one native antenna pattern of the plurality of native antenna patterns, an associated service coverage area is associated with a visible earth coverage area.

17. The antenna system of claim 1, implemented as a payload of a satellite.

* * * * *